(12) United States Patent
Cappellini

(10) Patent No.: US 7,363,319 B2
(45) Date of Patent: Apr. 22, 2008

(54) SEARCH AND RETRIEVAL SYSTEM OF TRANSPORTATION-RELATED FLEXIBLY DEFINED PATHS

(76) Inventor: Pablo Dario Cappellini, 42 Fields Park Rd., Newport, Gwent (GB), NP20 5BB ( * ) Notice: Subject to any disclaimer, the term of this patent is extended or adjusted under 35 U.S.C. 154(b) by 1051 days.

(21) Appl. No.: 10/192,507

(22) Filed: Jul. 11, 2002

(65) Prior Publication Data

US 2003/0014286 A1 Jan. 16, 2003

(30) Foreign Application Priority Data

Jul. 16, 2001 (GB) .............................................. 0117251

(51) Int. Cl.
*G06F 17/30* (2006.01)

(52) U.S. Cl. .................................................. 707/104.1
(58) Field of Classification Search .................. 707/100, 707/102, 104.1; 701/209, 29, 3, 202
See application file for complete search history.

(56) References Cited

U.S. PATENT DOCUMENTS

| | | | |
|---|---|---|---|
| 5,021,953 | A | 6/1991 | Webber et al. |
| 5,122,959 | A | 6/1992 | Nathanson et al. |
| 5,311,425 | A | 5/1994 | Inada |

(Continued)

FOREIGN PATENT DOCUMENTS

| | | |
|---|---|---|
| EP | 0407026 | 1/1991 |
| EP | 07/85537 A1 | 2/1997 |
| EP | 1003140 | 5/2000 |
| JP | WO 01/99022 A2 | 12/2001 |
| WO | WO 98/18096 | 4/1998 |
| WO | WO 98/58303 | 12/1998 |
| WO | WO 99/06934 | 2/1999 |
| WO | WO 02/03221 A2 | 1/2006 |

OTHER PUBLICATIONS http://www.august–design.com, 2000–2002.
http://www.visualload.com, 2000–2002.
http://www.loadcaptain.com, 2002.

(Continued)

*Primary Examiner*—Sana Al-Hashemi

(57) ABSTRACT

A search engine of flexibly-defined paths applicable to the search of transportation-related routes.

A location system within a spatial subsystem (059) is used to define nodes or waypoint locations (031), and flexible nodes by defining loci (030) in the proximity of the nodes (031), which represent operational spaces.

Flexible paths (FIG. 4B) are defined by elements comprising these nodes or waypoints (031) and loci or associated spaces (030), as well as with other constraints. These are structured and organized into spatially-related database and indexes (5106, 5102, 5102) with the aid of a spatial subsystem (059), typically a G.I.S.

The system can search for paths or combinations of paths (300 to 310) representing service providers, capable of fulfilling requirements specified by a service user.

Reservations are enabled through a central reservation system managing three-dimensional space and constraints comprising a dimensional subsystem (061).

The flexible path concept is extendible to networks with flexible nodes where similar analysis for connections or routing can be made.

48 Claims, 127 Drawing Sheets

U.S. PATENT DOCUMENTS

| | | | |
|---|---|---|---|
| 5,331,546 | A | 7/1994 | Webber et al. |
| 5,559,707 | A | 9/1996 | DeLorme et al. |
| 5,737,728 | A | 4/1998 | Sisley et al. |
| 5,802,492 | A | 9/1998 | DeLorme et al. |
| 5,835,376 | A | 11/1998 | Smith et al. |
| 5,835,716 | A | 11/1998 | Hunt et al. |
| 5,884,216 | A | 3/1999 | Shah et al. |
| 5,893,093 | A | 4/1999 | Wills |
| 5,898,093 | A | 4/1999 | Wills |
| 5,948,040 | A | 9/1999 | DeLorme et al. |
| 5,953,706 | A | 9/1999 | Patel |
| 6,029,112 | A | 2/2000 | Nam et al. |
| 6,035,289 | A | 3/2000 | Chou et al. |
| 6,122,572 | A * | 9/2000 | Yavnai ............... 701/23 |
| 6,134,500 | A * | 10/2000 | Tang et al. ........... 701/202 |
| 6,438,468 | B1 * | 8/2002 | Muxlow et al. ........ 701/3 |
| 6,816,782 | B1 * | 11/2004 | Walters et al. ........ 701/209 |

OTHER PUBLICATIONS

Horizon Services Group—Load Captain Powerpoint Slides, 2002.

http://www.magiclogic.com—Cube IQ, 2000-2002.

http://www.capesystems.com—Truckfill, 2000-2002.

http://www.esri.com, 2000-2002.

ESRI, Arc Logistics™ Route No. GS-35F-5086H, 2002.

ESRI™—What's New in Arc Logistics Route 2, J-8478 White Paper. No. GS-35F-5086H, 2000.

http://www.caps.com, 2000-2002.

http://www.ilog.com, ILOG Business Rules, ILOG Solver, ILOG Optimization Suite, 2000-2002.

http://www.Lufthansa.com—Info Flyway, 2000-2002.

http://www.travelocity.com, 2000-2002.

http://www.gf-x.com, 2000-2002.

http://www.roadrunner.uk.com, 2000-2002.

http://www.getloaded.com, 2000-2002.

Global Logistics Technologies, Inc. G-Log™ Brochure, CTF Mar. 2000 ©2000.

* cited by examiner

ORIGIN                DESTINATION

ORIGIN                DESTINATION

|  | D VECTOR | D PATH |
|---|---|---|
| O VECTOR | 2V | PV |
| O PATH | PV | 2P |

5180

|  | D VECTOR | D PATH |
|---|---|---|
| O VECTOR | O 2G-D 2G | O 2G-D 3G |
| O PATH | O 3G-D 2G | O 3G-D 3G |

|  | D AREA | D VECTOR | D PATH |
|---|---|---|---|
| O AREA | 2A | AV | AP |
| O VECTOR | VA | 2V | VP |
| O PATH | PA | PV | 2P |

5184

|  | D AREA | D VECTOR | D PATH |
|---|---|---|---|
| O AREA | O 1G-D 1G | O 1G-D 2G | O 1G-D 3G |
| O VECTOR | O 2G-D 1G | O 2G-D 2G | O 2G-D 3G |
| O PATH | O 3G-D 1G | O 3G-D 2G | O 3G-D 3G |

SEARCH AND RETRIEVAL SYSTEM OF TRANSPORTATION-RELATED FLEXIBLY DEFINED PATHS

CROSS-REFERENCE TO RELATED APPLICATIONS

Not applicable

BACKGROUND

1. Field of the Invention

The present invention generally relates to an information search and retrieval system of structured pre-classified vectors including those representing transport paths and routes, optionally integrated with a computer reservation system for the reservation and purchase of capacity, on such structured pre-classified vectors including those representing transport paths and routes.

2. Description of Prior Art

With the advent of computer technology, sophisticated third party computerized reservation systems have been developed among others for airlines, taxis, buses, trains, ships and hotels. In all these cases the systems are dealing with substantially standardized units such as passengers, seats, cabins or rooms. In the case of third party computer reservation systems (CRS) for airlines, buses, trains and ships, the independent service providers operate between substantially discrete locations such as airports, stations and ports. The fact that most of these services are scheduled, that most of the reservation units are somewhat standardized and that the locations involved are limited, has been to the advantage of these computer reservation systems.

Nevertheless the road transport of cargo involves conditions far beyond the capability of the above mentioned systems, and although some systems have been successfully developed to search, make reservations, manage, control and optimise certain road freight transport operations, they have been designed for and restricted mainly to established networks such as national postal systems and transportation companies with extensive networks such as FedEx™ Corporation of Memphis, Tenn., U.S.A. (www.fedex.com), UPS™ of Atlanta, Ga., U.S.A. (www.ups.com) and TNT™ Holdings B.V. with headquarters in Amsterdam, Netherlands (www.tnt.com) that take advantage of centralized distribution hubs, scheduled and/or frequent services, standardized procedures, shared communication systems and extensive information technology infrastructures, again conveniences that are not available to the great majority of relatively small independent road freight transport service providers, which are responsible in most countries for over two thirds of all road freight transport operations.

While the flexible nature of the road transport mode is believed to be the most important factor behind its success and predominance over other modes of transport, it is also this flexible nature that generates one of the main obstacles in developing a successful, effective and reliable computer reservation system open to third party service providers.

This flexible nature is exemplified, among other ways, in that different loads in the same transport unit, more often than not, will have different time window constraints, and will have to be picked up and delivered to different places, at different times. The locations involved as origin and destination of a road transport operation are not limited to a comparatively few airports, stations or ports, but extend to thousands or even hundreds of thousands of places, post codes or discrete points, a fact that has not made things any easier for developing a successful CRS system for road and therefore also multimodal transport, on a countrywide or global scale.

Some systems as Teleroute based in Brussels, Belgium (www.teleroute.com) are based on a Notice Board system with searching processes that have overcome some of these problems by dividing the countries in areas which are normally based on states, provinces or counties, but this only gives a rough picture of what the service providers' route is, and up to where the service provider is intending to divert from the planned route to pick up or deliver a prospective consignment. Other online transport path search systems such as those developed by GetLoaded.com LLC based in Midlothian, Va., U.S.A. (www.getloaded.com) and Road Tech Computer Systems Ltd. of Shenley, United Kingdom (www.roadrunner.uk.com) have incorporated features such as the radius around certain cities or postcodes to specify circumference areas, which define the regional areas on which the service providers are intending to operate i.e. pick up or deliver cargo. While these are important improvements, the areas do not have necessarily a good correlation with the service providers' particular needs or preferences, and there has been no offer of alternative functions, such as isochrones, i.e. lines connecting places of equal travel time, to define the areas that are more suitable, convenient or tailor-made to the service providers' activity.

These search systems on the other hand do not have reservation facilities and therefore transport arrangements have to be made separately with the individual service providers, involving further communications, and in the case of contract, often further time investment in administration and payment procedures. Without a reservation system, communication can be jeopardized by barriers that arise in the multicultural environments typical of transcontinental shipments, such as different languages, standards and regulations. Sometimes these barriers are enough to discourage prospective shippers from attempting these complex transport operations at all.

Transport exchange systems as the one described in U.S. Pat. No. 6,035,289 by Chou et al, assigned to IBM™ of Armonk, N.Y., U.S.A., and Global Freight Exchange of London, United Kingdom (www.gf-x.com) are normally auction processes that are rarely instantaneous and that have internal search mechanisms similar to those of notice boards.

Many current transport path search systems such as the ones mentioned above rely basically on input of origin and destination of the transport paths as the geographical parameters and therefore, the systems for matching loads and transport paths, or asks and bids in the case of the exchanges, are limited to matching the load origin-destination pair with the transport path origin-destination pair. While this allows for some matching opportunities, these are limited, due to the multifarious nature of road transport, as well as to the scarcity of centralized hubs, a fact that leads to scattered origin and destination points that are far more difficult to match. More often than not, in these cases, the shippers or service users will not be able to find service providers that fufil their transport requirements, therefore unfulfilling the main object of the search system, due to lack of practical functionality.

In order to develop a more useful search system, the quest for obtaining a greater amount of relevant solutions for a given quantity of transport paths has led to the construction of combinations of relevant transport paths to fulfil a certain transport requirement. One of such solutions was devised by Webber et al. U.S. Pat. No. 5,021,953 for the possible combination of flights, or similar hub-to-hub forms of transport.

The combination of road transport service providers to perform a specified transport task is far more complicated than combinations of air, sea or rail service providers, as unlike the road transport mode, these modes have a reasonable amount of common exchange hubs or nodes such as airports, ports and terminals. Examples of online search and reservation systems involving combinations of air transport service providers include WEB Flight Finder™ developed by AND Data Solutions of Rotterdam, Netherlands (www.and.com), Travelocity Corn, Inc. of Fort Worth, Tex., U.S.A. (www.travelocity.com) and InfoFlyway™ developed by Lufthansa AG, of Köln, Germany. No comparable system has currently yet been developed for hub independent transport modes as is generally the case of road transport, and one of the main obstacles in the development of comparable solutions for road freight including multimodal transport is believed to be that the exchange points for the road transport service providers are not only more ambiguous, but also almost unlimited, as for example, a parcel could be handed over at the side of a route on any agreed point and similarly a group of pallets could be exchanged at a depot belonging to one of the service providers participating in the combination. This type of panorama presents a complex task to an automated system in order to find and organize common exchange points to produce solutions involving combinations between two or more road freight transport service providers.

Another factor affecting the development of efficient freight reservation systems is the variegated nature of vehicles and cargo.

Cargo is substantially non-standard and except for the case of containers or pallets, loads can have all sorts of shapes and constraints, they can be stackable or not, they may have to be stored in certain positions and may have to follow a certain loading or unloading order. Reservation systems up to now have relied on the weight and volume of the cargo or on standardized cargo units to manage the availability of transport capacity.

A problem affecting automated reservation systems managing available capacity through only weight and volume, is that they cannot sense exactly the shape of the cargo and therefore have to allow for generous tolerances because of a relatively high uncertainty factor when committing the available capacity of the service providers. On the other hand, human reservation operators would use their experience, intelligence and common sense to monitor availability according to the cargo dimensions and constraints, as well as to find reasonable schemes for loading and unloading in a certain order, but more often than not, these tasks would be time consuming and when based only on a few trials, may not always result in efficient solutions. The present load third party reservation practices do not achieve maximum efficiency on spare capacity use and do not provide the precision needed to enable a service provider to delegate with a high degree of confidence, the handling of spare capacity to a third party reservation system under critical loading conditions.

Another problem affecting the transport industry is that many service providers, more often than not, do not want to give the competition information on their intended travel plans, or their available price offerings. While the exchange systems offer options to conceal, or not, the identity of the offering parties as well as the bidding parties, these systems deal with a substantial description of transport matters subject to trade, i.e. transport contracts, and more often that not, these specifications would be sufficient not to require further communications prior to a trade settlement.

On the other hand, current search and reservation systems for the freight transport industry show the identity of service providers, and therefore, are not only a source of competitive intelligence to the competition, but also enable "jumping out" of the system in order to contract transport services directly. While this is not criticisable, it promotes the use of subscription based sources of revenue to maintain the service offered by the system, a fact that makes the system "closed" to non-subscribers and therefore more limited, a characteristic that is against the very nature of a networking agent as a search engine system, which can offer a better service as a result of the greater relevant information they are able to process and present in a useful way.

The transport path search systems, unlike the transport exchanges, search for a generic available capacity, i.e. capacity between certain places, of certain types, on certain modes and maybe on certain vehicles and within a time frame, among other conditions, sometimes these specifications are not enough to ensure a smooth, well coordinated, successful transport operation for both parties and further communication is needed to ensure that the extra specifications or conditions can be met. This extra communication need, is an obstacle for search systems hiding or safeguarding the identities of the users as well as service providers and is one of the main reasons for current automated transport path search systems adopting policies offering only known identity results.

SUMMARY

A computer implemented search and retrieval system of trajectory-related capabilities, which can be represented by flexibly-defined paths applicable to the search of transportation-related routes representing available transportation-related capabilities, providing also for these an optional reservation system. A location system is used to define locations and to define loci in the proximity of these locations in order to represent catchment operation areas. The system can search for single independent service providers as well as a combination of two or more independent service providers, capable of fulfilling the transport-related requirements specified by a service user or an information seeker. The transportation-related paths representing available transportation related capabilities are defined by elements comprising waypoints and associated spaces or areas, as well as with other constraints such as time windows and capacity, which are input into path database as well as organized and associated in a series of indexes in a structured format, typically with the aid of a spatial or geographical information system. The associated spaces or areas of the transportation-related paths permit the system to find matches by proximity between the service provider and the transport requirements of the service user, or combinations by proximity, of service providers between each other, to fulfil a specified transport requirement.

Search results can be classified according to user-defined criteria and reservations can be made through a central reservation system capable of managing three-dimensional space with constraints, and executing transactions through a general-purpose e-commerce infrastructure. Communication between service providers and service users is also permitted under or concealed identity mechanisms.

The associated spaces or areas when applied to networks in general allow for the definition of networks with flexible nodes or loosely connectable networks and also allow for the analysis of routing or connectability between nodes in these so called networks with flexible nodes.

Objects and Advantages

It is therefore an object of the present invention to provide, a new search and retrieval system providing an optional reservation system of transportation-related paths representing available transportation-related capabilities suitable for operation not only on substantially standardized transportation modes operating between common transportation hubs such those including commercial air, sea, rail transport modes, but also suitable for operation on substantially nonstandard, flexible, variegated and multifarious transportation modes such as those including from the most important freight mode, road freight, to less important, but nevertheless useful shared taxi and mini-bus passenger services, as well as other on-demand transport services.

Another object of the present invention is to provide a unified search and reservation system including communication and payment facilities capable of offering new and effective solutions to the majority of transport requirements including problems arising for unusual or complex transport operations such as international or transcontinental shipments. The reservation and payment systems allow for immediate price-quality comparisons and saves time and resources on communications regarding the definition of cargo, price calculation and administration time regarding payment arrangements with the service providers. One of the main advantages that the search and reservation system provides is that non-professional shippers or transport service users will be able to arrange complex door-to-door transport operations involving domestic and/or global transport service providers, on a regional or a worldwide scale, which before were limited generally to professional shippers, with almost the same simplicity as it is possible today to reserve a passenger airline ticket.

A feature of the invention is the use of Spatial or Geographical Information Systems (G.I.S.) to manage the vast amounts of spatial or geographical data in a unified worldwide system as a latitude-longitude coordinate system or a latitude-longitude-altitude coordinate system, instead of the usual postcode systems, which vary across countries and are difficult to deduce if they are unknown. The G.I.S. tools also permit the definition of areas of proximity including circumferences, isochrone and isodistance curves or surfaces, to facilitate matches by a defined proximity, in variegated and multifarious transportation modes, which are usually characterized by the absence of common hubs.

An object of the present invention is to provide the transport service providers with tools and functions that allow them to define paths through waypoints and to define operation areas around those waypoints through a coordinate system that enables more precise definitions further adapted to their needs, in order to gain from more convenient opportunities.

Still another object of the present invention is to provide a search and optional reservation system capable of finding, by a defined proximity, not only complete transportation-related paths capable of fulfilling a transport requirement, i.e. matching origin and destination of transport requirement with origin and destination of transport path, respectively, but also partial transportation-related paths capable of fulfilling the same task, i.e. matching, by a defined proximity, the origin and destination of transport requirement with any two waypoints of a transport path, provided the second is relatively downstream of the first, respectively.

A further object of the present invention is to provide a search and optional reservation system capable of finding possible combinations of two or more transport service providers capable of fulfilling a transportation-related requirement, without the need of centralized transportation hubs or nodes. An advantage of the present invention is that the combinations that are produced, are always compliant with the transportation-related paths and other conditions, which are all defined according to the service providers' convenience or to their actual plans.

Still another object of the present invention is to provide a search and reservation system capable of an advanced, adaptable and precise management of available capacity, including also the management of capacity with physical dimensions, i.e. three-dimensional capacity and capacity with multiple constraints, i.e. multidimensional capacity, with the precision needed to enable a service provider to delegate with a high degree of confidence, the handling of spare capacity to a third party reservation system under critical loading conditions.

A feature and advantage of the present invention is to provide a search and reservation system capable of providing communication facilities between the transport service providers and the transport service users in order to explore further options or fine tune complex transport operations, which can preserve the identities of the two parties, precluding then competitors from gathering competitive intelligence and promoting business through the reservation system, which therefore enables an "open" system, attracting much more data input and offering as a result many more relevant search solutions.

It is also an object of the present invention to provide a new search and retrieval system of structured pre-classified paths, typically vector-based or node based paths capable of finding single pre-classified paths and/or finding a combination of two or more pre-classified paths, connected through predefined proximity areas, that fulfil a certain requirement between any two given points, either exactly or by a predefined proximities. The paths in this case can also be networks or partial parts of networks.

At least one of the preceding objects is met, in whole or in part, by the present invention, in which, accordingly, there is provided a system or process as defined in claims 1 to 48.

SUMMARY

According to the invention what is provided is a system or process as defined in the accompanying claims, which are incorporated herein by reference.

DESCRIPTION OF THE DRAWINGS

In the drawings, in general, closely related figures have the same number but different alphabetic suffixes.

FIGS. 6ZA to 6ZD—shows a flowchart that is a continuation of the search process, showing the different stages of the retrieval and reservation process.

FIG. 25C—shows an example of the combinations available as matching possibilities, when the first generation waypoint associated-area is not used as a possibility for matching.

FIG. 25D—shows an example of the combinations available as matching possibilities, when the first generation waypoint associated-area of a path is used also as a possibility for matching or combining service providers.

DETAILED DESCRIPTION OF AN EXEMPLARY EMBODIMENT OF THE INVENTION

Figure 1A:
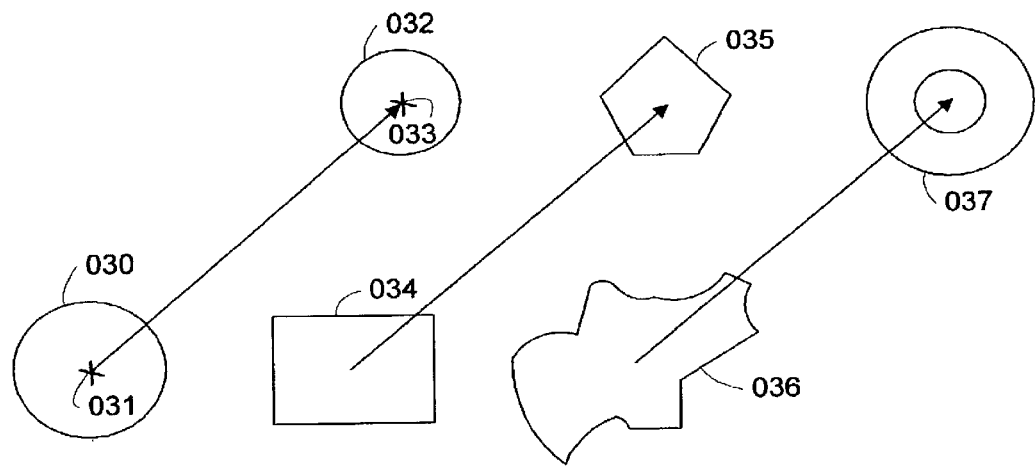
FIGS. 1A to 1B—show the possibilities for defining paths with vectors defined by a Starting waypoints, Finishing waypoints and different types of associated spaces or areas related to the waypoints.

The following definitions apply throughout the application:

Service provider or supply entity: a provider of transportation or distribution services, including carriers, freight operators, passenger services, delivery services, taxis, limousine services, ambulances and on-demand services of all modes of transport. In alternative embodiments it is also the provider of node-to-node services, such as for example telecommunications.

Service user or demand entity: a prospective user or information seeker of the services offered by service providers, including shippers, passengers, transportation brokers, arbitrageurs and intermediate agents supplying transportation services or information.

Place or Location: Points, loci or sites on or proximate to the surface of the earth. Such points, loci or sites are associated in Geographical Information Systems with particular or ascertainable geographical coordinates e.g. latitude/longitude, plus an index of elevation, altitude or depth as appropriate. The loci or sites are also ascertainable in other location systems with other logically-coded elements such as postcodes or spatial coordinates.

Fixed Path—A sequential network of two or more nodes, where pairs of nodes define vectors, and where the nodes and the vectors may have capabilities and/or constraints.

Flexibly Defined Path—A path in which at least one of the nodes has a predefined flexibility determined by a function providing a limit, typically a margin, an area, a space or a boundary. Each node may have its own flexibility determined by its own associated margin, area, space or boundary. A Fixed path is also a limiting case of a flexibly defined path where all the predefined node flexibilities are zero.

Transport Path—A Path or a Flexibly defined Path representing the total planned route of a transport service provider or carrier.

Path Document—a structured file, in table, XML, EDI, HTML form or other formats, which is created by the service provider to specify all the characteristics of a transport path with all the selected or enabled transport path attributes.

Transportation attributes: A group of parameters and/or variables representing transport capabilities and/or constraints. It can include for example Total capacity, available capacity, spatial distribution of volume, type of service, type of link ability, estimated leg distance, available extra distance coverage, estimated leg time, available extra time, price per unit load, price per unit distance, and scheduling information. They are typically parameters that can be defined or assigned between two consecutive nodes or waypoints.

Transport Path Attributes—A group of attributes comprising the Transportation attributes and attributes that define the path or trajectory of an available transportation-related capability. They can include in the case of transport versions, waypoints, total capacity, available capacity, Spatial distribution of volume, departure time windows, arrival time windows, type of service, type of link ability, departure geographical area, arrival geographical area, intermediate waypoints geographical area, estimated leg distances, available extra distance coverage on each leg, estimated leg times, available extra time for each leg, price per unit load and per unit distance among other transport related parameters and rules.

Waypoint (WP)—A spatial or geographical point, node or location that is used as an element to partially define a path or route. It is a term utilized for the starting place, ultimate destination and intermediate locations to stop or pass through on an intended trip, route or path A waypoint list is a selection and ordinal arrangement of the routable nodes or geographic point components of the transportation routes Path (P)—A partial or complete Flexibly Defined Path More specifically when applied to transportation-related applications it is a set of waypoint parameters, associated areas, vector(s), and selected associated attributes that define a total, or partial part of the route that has been input as a planned itinerary by the service provider into the system Vector (V)—A set of Transportation Attributes representing an available transportation-related capability between two consecutive waypoints of a path or route.

Link ability condition—a parameter that defines the capacity of a path component such as a waypoint, to link, combine or connect with similar path components corresponding to other paths, so that a first and a second path can be linked, combined or connected through the possible linkage of two compatible path components, one corresponding to the first and the other corresponding to the second path, to effectively produce a linked sequence of a first path with and a second path. The second path, in this definition, can also be replaced by a node or a flexible node, such as for example, an origin or a destination.

Linkable WP (LWP)—a waypoint that has linkable characteristics, i.e. a waypoint where a link or exchange is allowed with other independent points, nodes or locations, and/or with waypoints or waypoint areas belonging to other paths or routes Starting (S)—a starting characteristic of a vector Finishing (F)—a finishing characteristic of a vector Starting WP (SWP)—a waypoint that defines the starting point of a Vector.

Finishing WP (FWP)—a waypoint that defines the finishing point of a Vector.

Starting Linkable WP (SLWP)—a LWP that defines the starting point of a Vector.

Finishing Linkable WP (FLWP)—a LWP that defines the finishing point of a Vector.

Waypoint parameter—a term encompassing parameters pertaining to path nodes such as for example Waypoints, starting WP, Finishing WP LWP, SLWP and FLWP.

Associated Area (A)—Also Associated Space, is a boundary typically encompassing a bi-dimensional area or a three-dimensional space surrounding a path waypoint or node defined by a service provider and representing a service provider operational area, typically a pick up and/or delivery area or a catchment area. It is also used to describe an area surrounding an origin or a destination of a transportation-related capability request defined by a service user, representing the operational area of the service user when assuming the role of a service provider collaborator, typically an area where the service user can carry to, or bring from, a service provider base or hub.

Associated attributes—All the attributes that can be directly related to a certain vector or waypoint.

Main Vector (Main V)—A candidate vector for carrying a consignment from the said vector's starting associated area to its finishing associated area.

Auxiliary Vector (Aux V)—A candidate vector for carrying a consignment only within one of the said vector's associated areas, which generally complements one or more main vectors of the same path.

Origin (O)—An attribute used to describe any element that is related to the load origin on a particular search in the search process described.

Destination (D)—An attribute used to describe any element that is related to the load destination on a particular search in the search process described.

Generation (G)—An attribute used to describe the vectors, waypoints or waypoint attributes relevant to a particular search, with relation to the order in which they are found and retrieved, according to the step-by-step search process described in the preferred embodiments of this invention. This disclosure uses for example 1G, 2G and 3G as first generation, second generation and third generation respectively.

Load—the term will refer mainly to objects or entities that have substantial quantitative and qualitative characteristics for which transport possibilities are to be analysed. The term includes letters, parcels, cargo, consignments, raw materials, live animals and passengers. In alternative embodiments or applications it can also include more subtle concepts as quantitative and qualitative values for signals, waves, and other forms of non-material transmission.

Leg—a term describing a trajectory-related section of a path or route.

Isochrone—A line on a map connecting places of equal travel time

Isodistances—A line on a map connecting places of equal travel distance through a network, such as for example a road network.

Spatial Index—a database index of locations cross-referenced to a set of coordinates in a predefined coordinate system.

Path database—a plurality or path files or a database of path elements cross-referenced between each other each other in a structured format that allows selective retrieval according to the relative order or the sequence of the elements between each other within the same path.

Waypoint Index—an index of path waypoint parameters each cross-referenced to a set of coordinates representing the path waypoint parameters and their associated areas in a predefined coordinate system.

Path Coordinate-Waypoint Index—an index categorized by coordinates representing the path waypoint parameters and their associated areas with cross-references to the path waypoint parameters they represent.

The transportation-related path search and retrieval system with optional reservation facilities in the preferred embodiment is a system ideally accessible through a network such as the Internet, using existing state-of-the-art hardware and software configured to ensure adequate speed, high availability, resiliency and disaster recovery capabilities (not shown). Systems such as these are well known in the art of e-commerce and other mission-critical applications and are described for example in a publicly available document called "Resilient Blueprint Version 1.2"© by ECO-structure™ a joint effort by EMC²™Corporation, Cisco™ Systems, and Oracle™ Corporation (not shown). On the other simpler hardware and software configurations are also possible and as search and retrieval system for internal analysis could be even implemented on stand alone workstations or small cluster computing units.

The system can also include existing software such as relational web enabled database systems, G.I.S/geocoding systems, Multidimensional spatial loading tools, optimisation tools, rule solvers, routing software, accounting and transaction tools, encrypting systems, e-commerce tools, forwarding systems, interface tools, graphic tools, communication, middleware, protocol and navigation tools among other existing well known software tools. The arrangement of these components will be explained in FIG. 3A.

As the system is a search and retrieval system of paths in a predefined space, we should incorporate a location system compatible with that space and capable of identifying a location or locus in that space through logically-coded elements such as postcodes or coordinates.

The system is based firstly on the service provider's structured data input of information associated with available transportation-related capabilities or transportation paths in the form of data groups or more specifically path data groups, which populate a path data group set in a path database and a series of indexes that are to be searched. This input generally includes in the case of transport operations, itinerary information, pick up and delivery associated areas, temporal information, capacity information and price information among other typical transport topical information.

This input can be enabled through various mechanisms, first through website online forms that capture the service provider's input directly to the system and secondly through small applications distributed to the service providers, designed to input or import data directly or from other sources and to send this data directly through email or other network connections to the system.

With the path and related database indexes populated by the service provider's transport paths representing available transportation-related capabilities, a service user can enter a structured data request for the analysis of capabilities for the same activity as that represented by the stored path data groups, typically a transport path search to fulfil a required transportation-related capability. This transportation-related capability requirement is defined also by a structured data input into the system, this time by the service user. This input generally includes in the case of transport operations, a first location such as an origin and a second location such as a destination of the load, and optionally associated areas around these points, temporal information, load type information and load dimensional information among other typical transport topical information. In alternative embodiments, the input can also include instead of a fixed second location, a parameter determining a reach or catchment area from the first location This service user structured input can be enabled mainly though a structured online interface such as a form on an internet website, or in the case of large scale service users, also through distributed small applications, designed to input or import data directly or from other sources and to send this data directly through email or other network connections to the system.

The system can also be a networked, or can be a non-networked standalone system where input by the service provider and input by the service user is performed at the same location and/or maybe by the same person, for example in the case of transport brokers, researchers, or even large companies using the system as an internal system.

The system will as a result of a service user input and request, search all the paths representing available transportation-related capabilities of service providers capable of fulfilling the transportation-related request, that fall within all conditions imposed by both parties, and produce a path data group subset.

This path data group subset includes a plurality of sequentially-combinable path data groups arranged in sequential combination that in fact represent sequentially-combinable available transportation-related capabilities, which when arranged in combination can fulfil the transportation-related request. These may be for example, combinations of complete transport paths or combinations of partial transport paths or both, i.e. a combination of a plurality of legs corresponding to two or more service providers.

The results can be grouped and displayed according to different or combined criteria, including speed, price, quality and value.

If an adequate option is found this can be optionally selected as another path data group subset and then reserved and paid for through a reservation and transaction system The service user can also communicate indirectly with the selected service providers to ensure that details that are beyond the capability of the system can be catered for and solved. This communication system is designed to be able to partially conceal the identity of both parties.

The Construction of Paths

FIG. 1A shows vectors defined by a Starting Waypoint or node 031 and a Finishing Waypoint or node 033. These Waypoints have associated areas, which are defined by the system by default or preferably by the Service provider, as operational areas, i.e. areas where they can perform a pick up or delivery of a load, or establish a connection, combination or transfer with another service provider. There are various possible ways of defining those areas, the most common being a circumference 030 around the Starting Waypoint 031 or a circumference 032 around the Finishing Waypoint 033, both generally defined by a radius in miles, kilometers or other units, from the waypoint.

The associated area can be defined by other geometrical shapes around a waypoint including, for example, a rectangle 034 and a polygon 035, also determined by length units relative to the waypoint.

More complex associated areas that are familiar in the art of Geographical Information Systems (G.I.S.) are irregular shapes such as isochrones, obtained by calculating the distances a vehicle can travel at average, simulated or real time traffic conditions through routes or combinations of routes that connect to the waypoint, in a certain unit of time. A practical case of this type of associated area would be the geographical area reachable by car, at noon, though main roads from the Empire Estate Building in New York in one hour. Other curves encompassing associated areas that are familiar in the art of G.I.S. are isodistances, or curves determining the points or equal travel distance through a given network, in our case a transport network. One such example of this type of function is an irregular shape 036. Irregular shapes like shape 036 do not necessarily have to be created by a predefined function; They can also be created according to random, intuitive, emotional or rational instructions conveyed through system data input means such as, for example, drawing with the aid of a pointer device on a map interface, using alternatively other means such as those mentioned for data input within the input/output 053.

The associated area can also be an associated space identified by a boundary surface, typically a used defined locus such as shapes of user-defined-radii, shapes of user-defined dimensions, user-defined isochrones, user-defined isodistances and also 3D shapes obtained by interactive user design.

Functions such as these also include options of selecting types of road, minimum or maximum widths of road, routes with no bridges, tunnels or other limitations and routes which have average speeds between certain limits, among other conditions.

Other associated area functions known in the art of G.I.S. are regular or irregular "donut" type shapes, where the associated area is within "greater than" and "lesser than" magnitudes. An example of this is a regular "donut" type shape 037.

These areas have great applications in transport, one of which is the definition of pick up and delivery points limited to the proximities of orbital highways or motorways around cities such as London or Paris, which are defined as a waypoint. More often than not, many long haul carriers would find it feasible to deliver or pick up a load in the outskirts of London, maybe along its orbital M25 motorway, while more often than not, they would find it would be unfeasible to deliver to Central London locations.

The waypoint or nodes as well as the associated areas or spaces should be spatially locatable in a location system 060

Figure 1B:
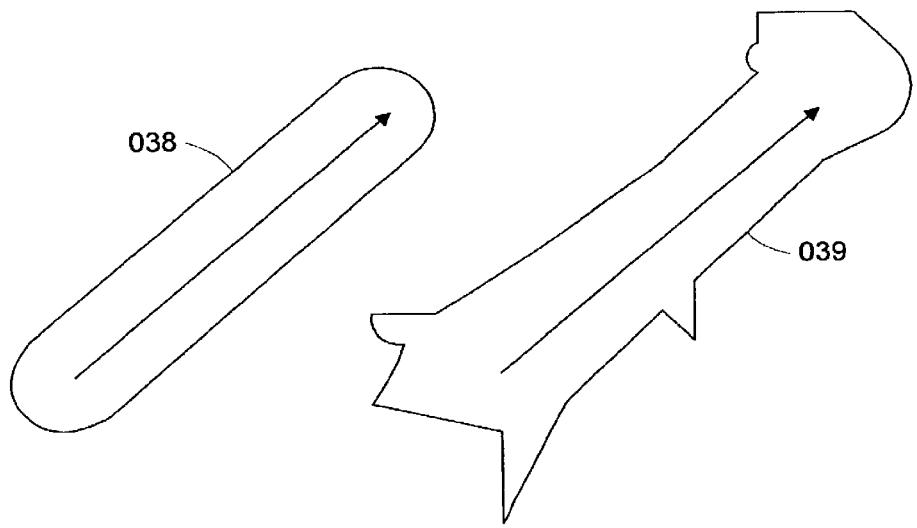

FIG. 1B shows a vector with an associated area 038 that is not related only to the end waypoints, but to all the intermediate points that form the vector and has a radius of a certain length. These areas are typically called line buffers.

An associated area 039 is also related to intermediate points of the vector and is similar to associated areas that are related to a function of the type mentioned for the associated area 036. Practical applications of these areas, are carriers able to pick up or deliver all along the way, or within a certain travel time from their way between two waypoints.

This area nevertheless has to be related to at least a waypoint. In practice a plurality of areas divisions within the buffer area could be related to a plurality of intermediate waypoints created by the system.

Although a person skilled in the art will be able to implement all these area functions for the definition of pick up and delivery areas, the system will be described using the circumference associated areas 030 and 032 throughout.

Figure 2A:
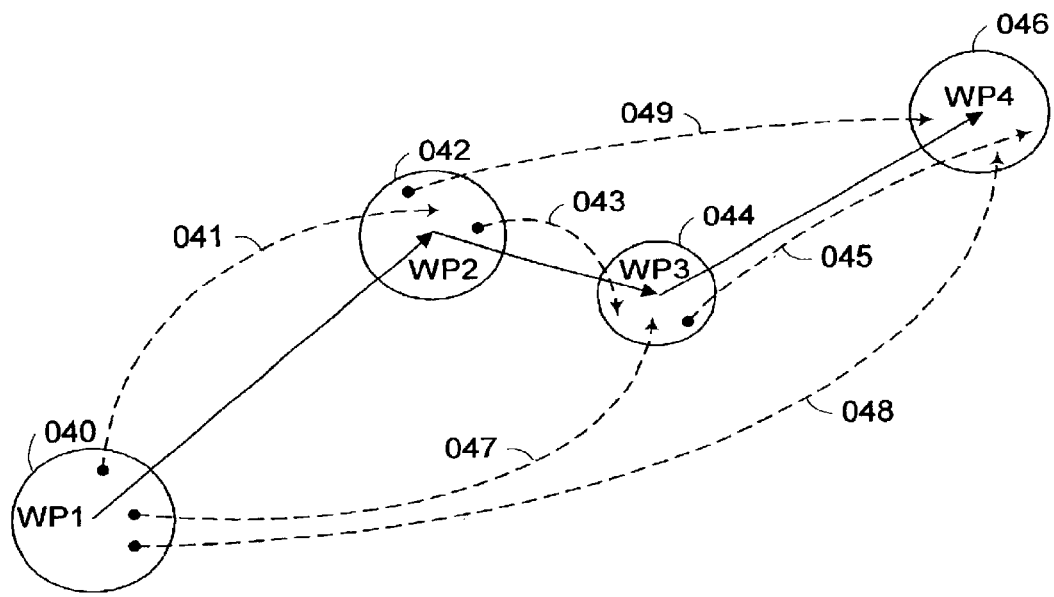
FIG. 2A—Shows a transportation-related path representing an available transportation-related capability, defined in this case by four waypoints and associated areas, as well as the transport possibilities it offers.

FIG. 2A Shows a Transportation-related Path, defined by four waypoints and associated areas 040, 042, 044 and 046. Associated areas 042 and 044 belong to intermediate waypoints. Intermediate waypoints are shared to incoming and outgoing vectors and the same waypoint is a finishing waypoint for one vector and a starting waypoint for the next vector.

Current Transportation postcode matching methods that involve origin and destination of a transport route matching the origin-destination pair of the load provide poor matching possibilities for any one-transportation-related path.

When enhancing match possibilities by providing a transportation-related path with intermediate waypoints and associated areas generated by G.I.S. we can substantially increase the matching possibilities.

When before, only a load 036 with an origin-destination pair falling in areas 040 and 046 would be matched by the origin-destination pair of the transport route, a G.I.S. enhanced transportation-related path can be matched to:
(a) a load 041 with origin-destination pair falling in areas 040 and 042,
(b) a load 043 with origin-destination pair falling in areas 042 and 044,
(c) a load 047 with origin-destination pair falling in areas 040 and 044,
(d) a load 045 with origin-destination pair falling in areas 044 and 046. and
(e) a load 049 with origin-destination pair falling in areas 042 and 046.

The possibilities would further increase if we used the continuous associated areas such as that described in FIG. 1B.

Figure 2B:
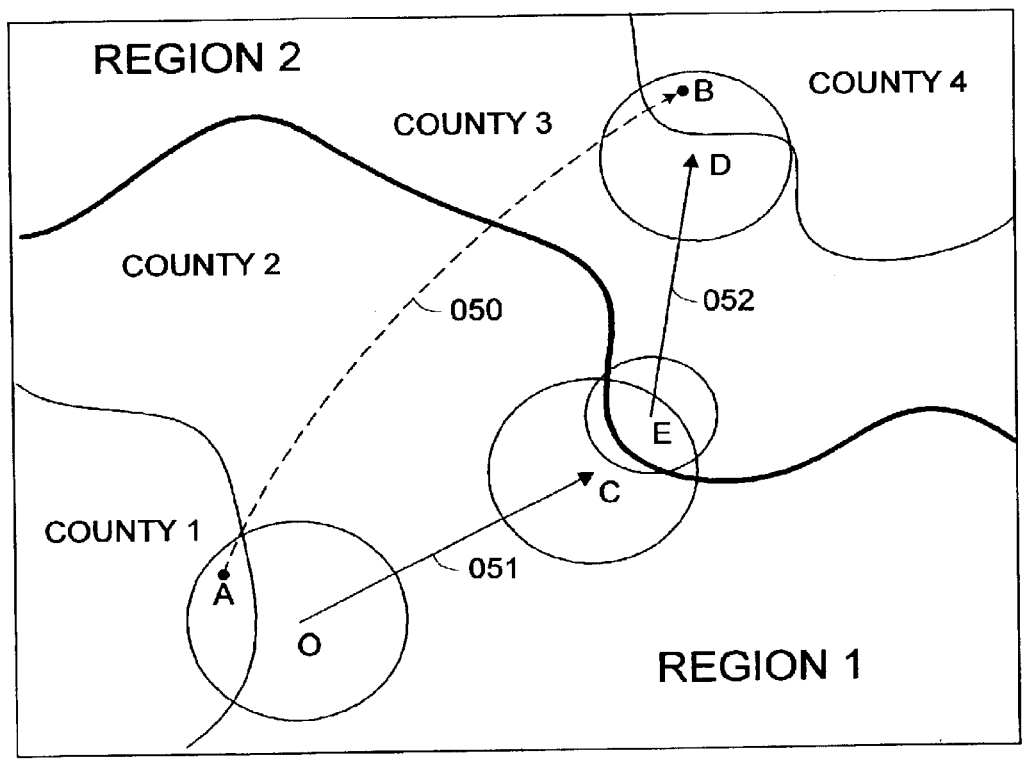
FIG. 2B—shows a typical example of the application and advantages of a transportation-related paths representing available transportation-related capabilities as proposed in the invention.

FIG. 2B shows how through the system object of the present invention, a load 050 that has to be carried from point A in County 1 to point "B" in County 4, can be matched not only by a carrier that may have those points as part of their Transport Path, but also by a combination of carriers represented by a path 051 going from an area around waypoint O to an area around waypoint C and a path 052 departing from an area around waypoint E to an area around waypoint D. The combination can be possible if the associated area around waypoint O includes the load origin point A, the associated area around waypoint D includes the load destination point "B" and if at least one of the associated areas around waypoints E and C, include the other carrier's waypoints C or E respectively.

In this combination of two carriers at least the geographical conditions of the transport paths for carrying the load have been met. For a real combination possibility, the system has also to check the remaining parameters of the transport path, as time, space availability, type of service among other constraints and rules.

This FIG. 2B also shows the relative advantages of using a G.I.S. system for the definition of associated areas. Former transport matching systems define associated areas through national postcode systems or administrative boundaries such as counties, provinces or states. Postcode systems vary between countries and more often than not their area coverage is not only different but also unsuitable for describing a pick up and delivery area. It is believed that the handling of postcode areas also becomes more difficult as the scope of the transport route becomes international. Freight companies that would normally plan a route with the aid of a map, would have to research waypoint surrounding areas and their postcodes, or settle to the next available administrative division, in a somewhat cumbersome and time-consuming procedure.

The example in the figure where the load 050 has to be taken from point A in County 1 to point "B" in County 4, might pass completely undetected by a system using post code or county associated areas, as transport path 051 starts in a waypoint O located in County 2 and transport path 052 finishes in waypoint D located in County 3.

The use of G.I.S. also reduces the number of match results to the specifically relevant, as we see in this case, where a system with County or Region associated areas may produce many irrelevant results in a search. The use of G.I.S. allows the freight company to design their transport path with tailor made pick up and delivery associated areas, to suit their needs and convenience.

The matches produced will be, therefore, more in the interest of the freight company and most probably more convenient than existing matching systems based on postcode and administrative areas.

The System Components

The system includes a combination of hardware and software components compatible and executable by the hardware provided.

The hardware components on which the software components can be executed vary from state-of-the-art high availability, resilient, multi-tier systems designed for mission critical internet service such as those described in the mentioned ECO structure™ document, to a general purpose standalone computer with sufficient memory to store and manage the amount of data resulting from the geographical/spatial areas involved, the amount of transport paths loaded and all the information associated with those paths and the information associated with the service providers defining them.

This hardware would be used to hold the relevant information and run the main database-based applications as well as the other applications, which will be mentioned below.

Other hardware, of course, are the input and output devices and the specific hardware related to enabling the communications in the communication subsystem which is well known in the art of communication.

The system is described in terms of components or subsystems, most of which are a combination of software applications executed on the relevant compatible hardware mentioned and middleware adapted to enable compatible data communication.

Figure 3A:
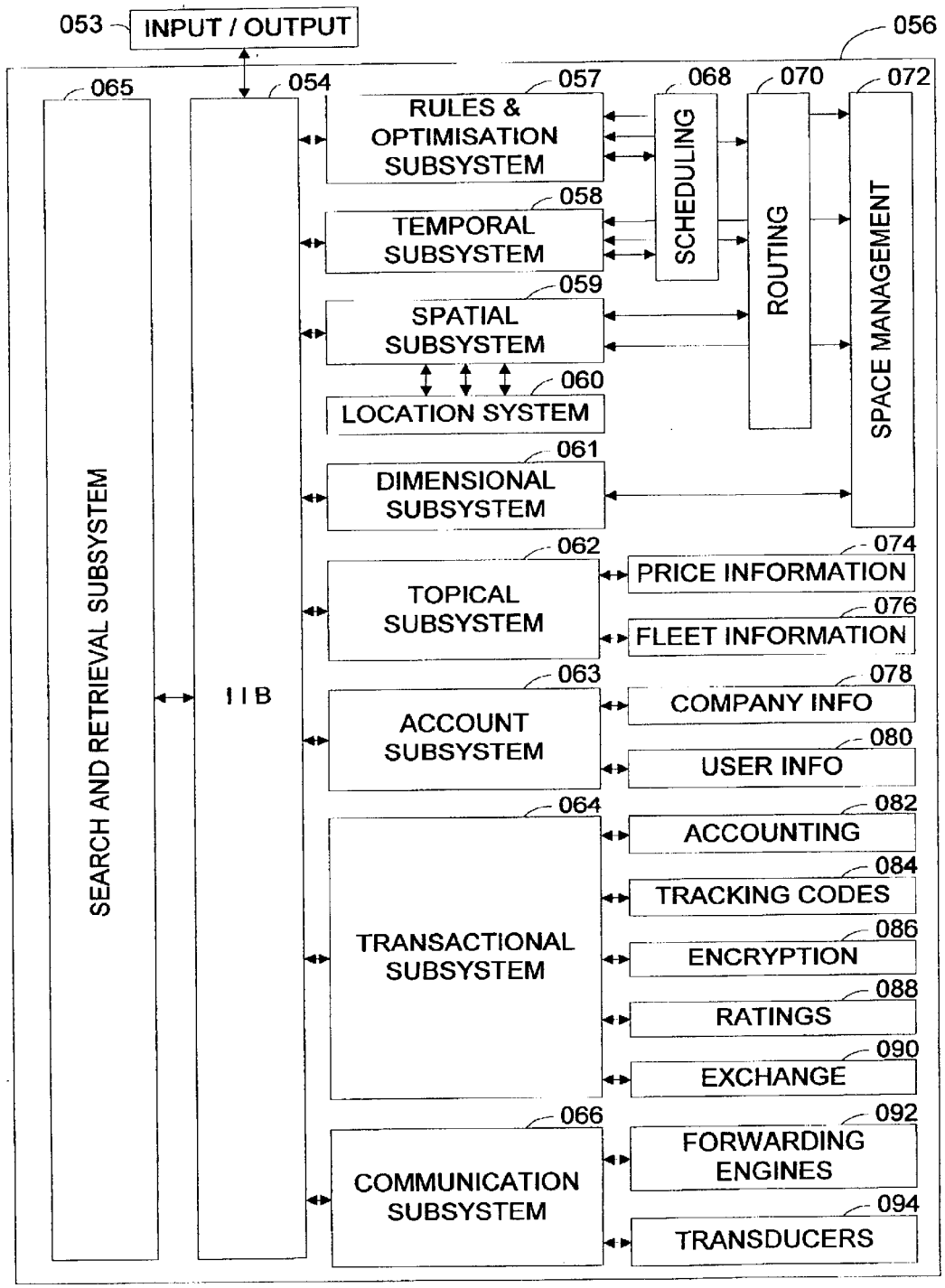
FIG. 3A—shows the structure of the system with all basic and auxiliary components.

FIG. 3A is a block diagram laying out the major components of the novel search and retrieval system of transportation-related paths including the components enabling the reservation facilities.

Most of the subsystems are likely to be combined with or based partially or totally on an application and in some cases the operations on the databases will be very demanding. One provider of databases for very demanding environments is Oracle™ Corporation of Redwood Shores, Calif., U.S.A.

The system is based on the information provided by service providers, mainly carriers, logistics providers, transport networks, brokers, arbitrageurs among other providers and service users, transport brokers, arbitrageurs, shippers, passengers and other end users.

The data is provided by the above parties and input to the system 056 via within the input/output 053 connected to a Network, which may be private or public such as the Internet, or connected to a data input interface device such as a keyboard, a pointing device, a voice recognition system, a virtual reality input/output devices, an interactive graphic user interface, a telephone, mobile phone, fax, screen, computer, handheld personal digital assistant (PDA), interactive television and multimedia devices, to transducers for the input and conversion of system related information, including Electronic Data Interchange (EDI) systems, and/or adaptors, also known as "middleware", that are connected to other proprietary transport-related information and administration systems.

The input/output 053 connects to an interface and interaction bus module 054 which generally represents the systems processes for user-controlled sequencing, variable integration, processing and selective accumulation of relevant search and retrieval sequences, temporal, geographic or spatial, dimensional topical, account, transactional, communication, rules and optimisation information in response to transport service provider input and user input related to transport related enquiries. In advanced or fully articulated system implementations, the interface and interaction bus 054 also manages integrated and/or automated operations. Integrated operations include the transfer of characteristic system data, database parameters and/or software commands, while automated operations entail prescribed sequences of transport related information operations, including software "scripts" or batch files, multi-step processes, data structuring and file conversion. For the purposes of this invention we can assume that other basic software instructions as the complementary memory storage necessary to perform the operations can be also incorporated in module 054.

The search and retrieval subsystem 065 is also connected to the interface and interaction bus 054 and through this connected to all the other subsystems. The search and retrieval subsystem 065 includes all software instructions for the pre-classification and organization of the path elements into various indexing and database structures as described in FIGS. 11A to 11J and exemplified in FIGS. 24A and 24B. It also includes all software instructions for the organization and structuring of user requests as exemplified in FIGS. 12A to 12D, as well as the main search and retrieving process described in FIGS. 6A to 6ZD which also involve all the processes described between FIG. 14A and FIG. 23.

The interface and interaction bus 054 is connected to the main subsystems, which comprise a Rules and Optimisation Engine subsystem 057 for checking the compliance of many rules and parameters in the least time possible using algorithms known in the art of Operational Research. The utilization of the Optimisation Engine in subsystem 057 is optional but recommended, to solve the complex problems involved in the minimum convenient time and in the most convenient efficient way. One company building this type of applications and the related subsystems is ILOG S.A. headquartered in Gentilly, France (www.ilog.com).

The interaction bus 054 is also connected to a Temporal subsystem, with has one or more clocks and is capable of handling representative gauges of time, such as chronological measures, and processing chronologically related information. It includes features and functionalities such as a calendar for every vehicle or carrier, including time windows, maximum and minimum times of departure and arrival, load time constraints and contract time data.

The Temporal subsystem 058 and the Rules and Optimization Engine subsystem 057 interact with a Scheduling Subsystem 068, which uses their data to produce the possible time sequencing of loads, time sequencing of vehicles, and time schedules of each carrier or vehicle. Scheduling systems are well known in the art of transport dispatch operations and they are constructed to address years, dates, times, chronological arrays pertaining to events, time periods, appointments, actual happenings or postulated time occurrences.

The interaction bus is further connected to a Spatial subsystem 059 which is a geographic or spatial database application, typically a spatial information system or a Geographic Information System (G.I.S.) generally incorporating a location system 060 and including means for discrete storage, retrieval, manipulation, mapping, correlation and computation of spatial or geographic data related to spatial or geographical coordinates. The subsystem can process files of place names or loci referenced with their corresponding coordinates, postcodes or other logically-coded elements in a predefined coordinate or location system, waypoints along routes, geocoding functions and other cross-references with further geographical attributes, as well as the creation of the waypoint associated areas through functions or interactive drafting. The Geographic sub-system can also include all manner of map or mappable point, vector, raster or regional data locatable more or less precisely at actual, estimated or proposed spatial positions by geographical coordinates, such as latitude and longitude (lat/long), UTM, other map grid references, and/or equivalent surface or spatial means. Geographic Data is preferably stored in, and retrieved or selected from, one or more databases, or geographic information systems (G.I.S.) including many scales and levels or resolutions or detail, spanning national or global areas, with regional map information, or even closer scale neighbourhood. The geographic subsystem information input and output is preferably managed with the aid of map displays or other means of digital cartography, but additionally or instead, the invention also inputs, stores, retrieves, processes, transmits and/or outputs geographic information or data apart from maps, such as point, line or vector data, location related textual, graphic, audio or multimedia information.

The Location system 060 is typically a coordinate system and in transport-related embodiments the coordinate system is generally a geographical coordinate system (lat/long) or (lat/long/alt). The system could also use other location systems including Euclidean coordinate systems, polar coordinate systems and spatial coordinate systems as well as feature based locations systems such as postcode systems and location systems based on geopolitical divisions or geographic features.

The Temporal subsystem 058, the Rules and Optimization Engine subsystem 057 and the Spatial subsystem 059 interact with a Routing Subsystem 070 which uses known methodologies for the manipulation and calculation of data comprised of vectors, line segments or sets of geographically located points or line intersections sequenced in temporal order or order of occurrence of events related to travel or motion in geographic space. Routing subsystem 057 can process the calculation of mileage and time for different types of route, from a specified point to another specified point.

Routing systems are well known in the art of G.I.S. and Transport optimisation applications and they are capable of finding fastest routes, least travelled distance routes, most economical routes, only main road routes and routes with other types of constraints. It provides the invention with means of finding the approximate distance and time that the carrier will take to pick up or deliver a load from the nearest waypoint. Providers of these systems include CAPS Logistics, Inc. of Atlanta, Ga., U.S.A. (www.caps.com) and ESRI™ of Redland, Calif., U.S.A. (www.esri.com).

Service providers will be able to define among other parameters a Maximum Time of Arrival (MTA), so as to prevent the system from producing commercial engagements that would produce undesired delays. A routing application can be implemented to make the calculations in the background to assess the time cost of the pick-up or delivery deviations in order to accept them or reject them.

Some type of functions performed by the routing subsystem during a search, would be for example, the case of a service provider having defined the departure time, as 16.00 hrs, $14^{th}$ of Jul. 2002, and specified the maximum time of arrival MTA as 7.00 hrs, $15^{th}$ of Jul. 2002.

If the standard travel time for this operation is 10 hrs, according to service provider experience or to the routing subsystem calculation, the provider has only a surplus time of 3 hrs in order to comply with his committed MTA.

If he was requested to pick up a consignment that was ½ hr away (return) from his route, the load had an estimated loading time of 20 minutes, and then had to deliver this load 45 minutes away from his route, with an estimated unloading time of 15 minutes. The total time dedicated to this load would be 1 hour and 50 minutes.

The service provider could certainly accept this load, as it would not make him exceed the MTA, but from then on, he could only accept loads with total dedicated times of 1 hour and 10 minutes or less.

The calculation of the times required to pick up or deliver in normal conditions in these cases is also calculated by the routing system according to the distance and conditions involved.

The interaction bus is further connected to a Dimensional subsystem 061, which is a system capable of the processing and administration of dimension units. In its most basic form it can be a spreadsheet type unit reservation system and, in the preferred embodiment, it is a multidimensional spatial system capable of handling the three dimensions of a physical object, i.e. the width, length and height and the coordinate position within a predetermined space, for example a container. Systems that perform this type of task are common to those familiar in the art of three-dimensional modelling and Computer Aided Design (C.A.D.). A system as Cube IQ™ developed by MagicLogic Optimization, Inc. of Vancouver, Canada (www.magiclogic.com) involving also rules and optimisation elements, can also take account of the possible positions in which it may be stored for transport, i.e. upright, on its side, the weight, the stacking order and other attributes or constraints, that are useful to the accurate administration of load space.

These types of applications can make a mathematical model of the required transport capacities such as the loads, as well as of the available transport capacities such as the cargo containers, in order to substantially simulate the loading conditions within the containing space.

Apart from performing loading operations and optimisations, this type of application can be used or easily adapted for the sole simple use of determining availability of space or capacity, for a new required transport capacity, i.e. to check if a load can conveniently fit in a transporting container that is empty or partially full with other loads.

The data of the load and the cargo containers can be input by selecting representative geometrical shapes with corresponding dimensions or also by selection of predefined standardized units such as euro pallets or standard 12 ft containers. These are converted to substantially simulated three-dimensional models, allowing for a substantially simulated environment of the real conditions within the service provider carrier unit.

The Rules and Optimization Engine subsystem 057, the Temporal subsystem 058, the Spatial subsystem 059 and the Dimensional subsystem 061 interact with a Space Management Subsystem 072 which will be able to administrate the spatial load conditions for every vector corresponding to a transport path segment, with their temporal conditions and constraints. In this sort of space management system for example, the containers (trucks, pallets, crates) can either be rectangular, or have a non-flat roof or floor (like with sliced-off corners of airline containers. An overall weight limit is taken into account, and the system handles axle weight limits. There are options for the correct positioning of the centre of gravity.

Boxes must be rectangular, with cylinder and 'sofa' (3D L-shapes) loading also available. Box options include switches for 'turnable', 'allowed on its side', 'allowed on its end', 'bottom-only', and 'top-only' (possibly in maximum number of layers). Box weight is taken into account. The software supports loading and stacking rules for each orientation of the package separately. This allows you to set up more complex loading rules, such as 'flat only if on top' (for large, but flat boxes), and 'straight up unless on top' (for boxes that can only support other boxes if they are loaded upright).

Volume and weight capacity utilization for all loaded containers, and for each loaded package the container number and, within that container, the 3-D loading coordinates. The software can also is available with a graphics window in which you can see the container as loaded. The pictures can be rotated, and build up one block of boxes at the time. Other loading features available are First-In, Last-Out loading. Packages can be loaded with bottom support on one side only, if leaning against the container wall on the other side.

Packages can be loaded with bottom support on one side higher than on the other side (that is, slightly tilted).

Also various rules can be provided on how to spread the boxes over multiple containers. The Space management system 072 can also be capable of calculating optimum loading procedures, including those according to maximum space utilization, or minimum loading and unloading time within defined constraints. Functions as these are also known to those familiar to the art of transport space administration and some examples are Visual Load™ developed by August Design, Inc. of Ardmore, Pasadena (www.august-design.com), Truckfill™ developed by Cape Systems, Inc. of Dallas, Tex., U.S.A. (www.capesystems.com) and Cube IQ™ developed by MagicLogic Optimization, Inc. of Vancouver, Canada (www.magiclogic.com). As a result of combining the dimensional subsystem 061 with the temporal subsystem 058 and the spatial subsystem 059, the Space management system 072 can perform the management of capacity in a substantially simulated multi-dimensional environment, i.e. the three-dimensional environment with constraints of the shaped spatial capacity handled by the dimensional subsystem 061, the temporal dimension added by the temporal subsystem 058 and the at least two dimensions added by the location system 060 corresponding to the spatial subsystem 059.

The interaction bus is further connected to a Topical subsystem 062, which processes and administrates all topical information regarding vehicles, fleet composition, service types, load types, price structures, vector linking conditions, preferences, rules and comments. The topical subsystem can also incorporate a variety of domestic and international freight transport related information as customs regulations, codes and taxes among other data facilitating global trade, such as data provided by services such as Nextlinx™ of Silver Spring, Md., U.S.A. (www.nextlinx.com).

The Topical subsystem 062 is directly linked to a Price Information 074 subsystem that holds and processes information regarding the price structures of the service providers and the specific vehicles, and a Fleet Information subsystem 076, holding and processing information on all service provider vehicles including their characteristics, their allowable type of consignments, their allowable type of operations, and their relationship within the fleets. The subsystems 074 and 076 can both be optionally be considered as part of the Topical subsystem 062.

The interaction bus is further connected to an Account subsystem 063, which handles all relevant information on the accounts of the carriers or service providers and the shippers or users. These include, but are not restricted to, Addresses, Telephone contact and fax numbers, email addresses, system assigned telephones and email addresses, Ratings, Bank information, passwords and system identification codes The Account subsystem can also hold information related to Customer Relationship Management (C.R.M.) and relevant statistics.

The Account subsystem 063 is directly linked to a service provider Company Information component 078 and a User component 080, both of which could optionally be considered as part of the account subsystem 063.

The interaction bus is further connected to a Transactional subsystem 064 which performs all duties related to, or equivalent to, an electronic commerce (e-commerce) system, is well known in the art of electronic transactions, accounting and stock control systems.

The Transaction system 064 is connected a main accounting system 082, which performs all transaction accounting for service providers and users, including validation and account settlement of other payment systems.

Similarly it is connected to a tracking code system 084, which generates common tracking codes for the administration of load visibility and control, within a single, or within multiple service providers.

The Transaction system 064 is also connected to an encryption system 086 which is used to safeguard all critical information exchange and storage. At present this encryption system would preferably be of the public-key cryptography type, developed and marketed by RSA Data security, Inc. of Bedford, Mass., U.S.A. (www.rsasecurity.com) as well as by PGP™ Security of Santa Clara, Calif., U.S.A. (www.pgp.com)

The Transaction system 064 is further connected to a ratings subsystem 088 that averages the post-transaction ratings of individual users on the different service providers and also the ratings of the individual service providers on the different users. The average ratings are then sent to the account subsystem to form part of the users' and service provider's relevant information.

Finally the Transaction system 064 is optionally connected to an electronic exchange system 090 as to complement, under a common compatible system, the matching opportunities provided by the search system of the present invention, with the unique advantages of the exchange environment for the tendering of transport contracts. Examples of these industry specific exchanges are produced by IBM™ Corporation of Armonk, N.Y., U.S.A. and Oracle™ Corporation of Redwood Shores, Calif., U.S.A.

The interaction bus is further connected to a Communication subsystem 066 to handle all forms of communication between the service providers and users, as well as between these and the main system. The subsystem 066 can include email servers, telephone and fax exchanges, automated mail services, as well as forms of multimedia communication including video links and video conference systems.

The Communication subsystem 066 can be used to communicate the results of a search in case the answer is not available in real time due to lack of computing power or other reasons. The Communication subsystem 066 is connected to a subsystem of forwarding engines 092 that include functions as re-direction of email messages, diversion of telephone calls and video, or re-addressing of mail and that are well known in the art of network management in general, and email forwarding, telephone and broadband exchanges as well as post office administration, in particular. The communication subsystem 066 would administrate accounts such as system-assigned email accounts and telephone numbers as well as the real accounts provided by the users of the system and can be configured to use the forwarding engines 092 so that communication directed to the system-assigned accounts can be re-directed through the forwarding engines to the real user accounts. Communication arriving to a first system-assigned account from a second real user account can be masked replacing the second real user account appearing as sender or caller, with the second system-assigned account, so i.e. only system-assigned accounts appear as the identification of senders or callers.

The Communication subsystem 066 is further connected to a subsystem of transducers 094, which can convert communication data including voice, written word and digital files into different digital files and vice-versa.

Examples of these transducers are multimedia recognition systems, including voice and video recognition, Optical Character Recognition, recorders, scanners, printers, speakers, microphones, smart screens, pointer devices such as mouse and pen pads, physical signal converters such as sensors and detectors and file-to-file converters.

Alternatively, the temporal 058, spatial 059, dimensional 060, topical 062, account 063, transactional 064, communication 066 and rules and optimisation 057 subsystems and their above mentioned subsystems and components can be utilized "one-step-at-a-time" or manually (i.e. with user intervention after each and every step or subsystem). The above mentioned subsystems and components could also be arranged in different order, or in different groups and be modified by merging or further de-merging of the different subsystems and components, whilst performing the same basic functions.

Subsystems and components could also either be simplified or eliminated for "scaled down" versions with more limited functionality and/or a lesser degree of accuracy, security, confidentiality or certainty, as well as for "dumbed down" versions which may provide more user friendly interfaces and operation and faster results, through the use of fewer parameters and/or the use of more default-parameters.

The data, information and operations produced by the system 056 are delivered via an output within the input/output 053 that may be connected directly, or through a Network, which may be private, or public such as the Internet, either through cable or wireless connections, to a basic or intelligent interface device, including devices as those mentioned for input within the input/output 053, such as a telephone, mobile phone, fax, screen, computer, hand-held personal digital assistant (PDA), interactive television and multimedia devices, to transducers, including Electronic Data Interchange (EDI) systems, and/or adaptors, also known as "middleware", that are connected to other proprietary transport related information and administration systems.

Figure 3B:
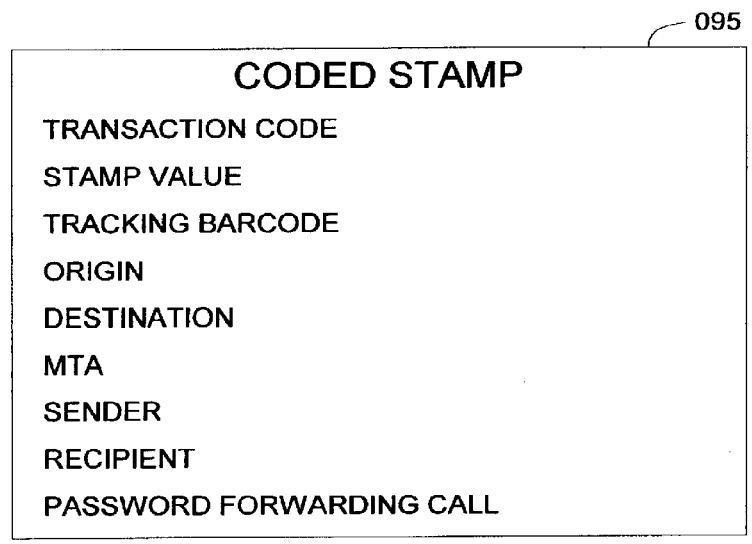
FIG. 3B—shows a layout example of a coded stamp 095 for attaching to the cargo, that the system would produce for the administration, control and certification FIG. 3C—shows the system set up and examples of possible implementations of the exterior connections of the system.

FIG. 3B—This figure shows a layout example of a coded stamp 095 that the system would produce for the administration and control of cargo among either one or various carriers, much in the same way as the post office produces a stamp for the delivery of mail to a destination, either to the same county, or to a foreign country, therefore involving two or more postal systems.

The coded stamp will include some form of graphic coding such as a bar code, useful for tracking the cargo at different stages.

Other information would include a transaction code, produced by the transaction subsystem, which would have a relation with the bar code, in order to double check the authenticity of the stamp.

The stamp would also have a stamp value which would relate to the transaction value produced by the transaction subsystem, data relative to the Origin and Destination of the load produced by the geographical and account subsystems, a maximum time of arrival produced by the scheduling and temporal subsystems, sender and recipient information drawn from the account subsystem and some type of key countersign feature, such as a password forwarding call, produced by the transaction and account subsystems.

This password forwarding call feature is one for example, such as a system-generated telephone number printed on the stamp that the service provider has to call before load delivery. On reception of the call on this system-generated number, the system recalls the specific account and transaction data of the coded stamp and automatically forwards through immediate communication, which can include phone or fax, a password to the recipient. Upon the reception of the cargo in good order, the recipient, along with the usual signature on the reception note, also releases the password to the service provider.

If the service provider is then able to communicate the correct password to the system, it is proof that he has delivered the cargo to the correct place and in good order; therefore the system initiates instructions for carrier payment release.

As the system acts as an independent broker and payment holder, for all types of service providers, this feature is a further contribution to prevent fraud possibilities that could arise with a signature only based verification system.

Figure 3C:
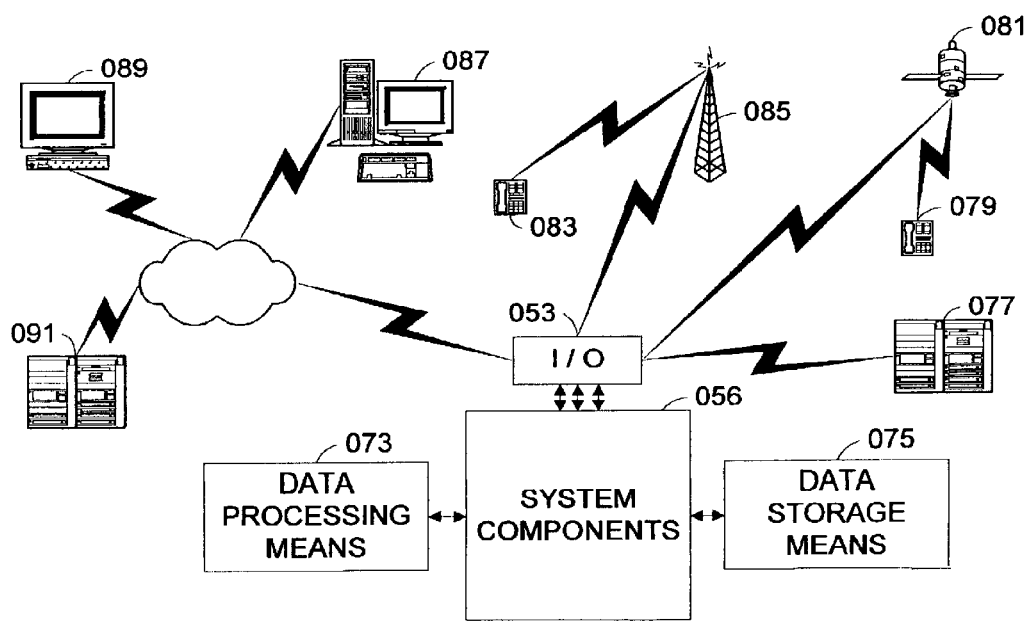

FIG. 3C—shows the basic system set up comprising subsystem components 056, the data processing means 073, the data storage means 075 and the input/output means 053 connected examples of a variety of possible implementations.

The Data processing means and the data storage means 075 could be exemplified by a single PC or workstation with adequate memory to hold all relevant data and serve the subsystems, which could even be a stand alone unit typically used for analysis, information brokerage, consulting and internal organization purposes. In this case input/output 053 is interacted directly by an operator.

On the other hand, it could also be exemplified by a multiple server high availability, resilient, multi-redundant cluster computing and storage platform connected to large networks such as the internet, and which are described in blueprints as the mentioned ECO structure™ document showing example architectures of high availability e-commerce systems with disaster recovery facilities. Other suitable data processing and data storage solutions as well as middleware solutions can be envisaged by skilled information technology system architects and are beyond the scope of this invention.

If the system is networked, some examples showing possible connections are:

(a) a cable or wireless connection of a Service Provider enterprise system 077, which can be connected directly or through middleware in order to share information with internal applications (b) a wireless connection of a telephone, mobile phone, PDA of a Service Provider through a satellite communication system 081

(c) a cable or wireless connection of a telephone, mobile phone, PDA or minicomputer of a Service Provider through a terrestrial communication system 085

(d) a cable or wireless connection of a Terminal, PC or Workstation 087 of a Service Provider through a network system such as for example the internet (e) a cable or wireless connection of a Terminal, PC or Workstation 089 of a Service User through a network system such as for example the internet (f) a cable or wireless connection to a Service User enterprise system 091, which can be connected directly or through middleware in order to share information with internal applications Many other connections or combinations of the above could be envisaged or developed. Examples of portable communication systems have been shown for Service Providers, as these may be more likely to upload information to the system, sometimes when they are "on the move". Nevertheless the same communication systems used by the service providers can be used or adapted for use by the service users, as well as vice-versa.

Operation of the Invention

Data Structures

Figure 4A:
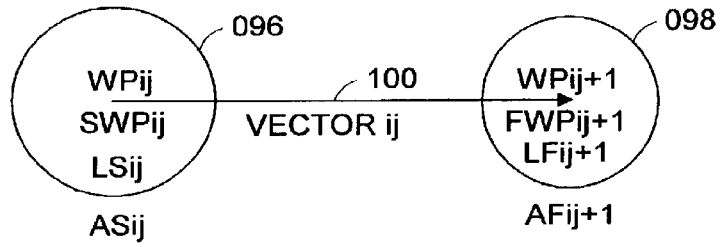
FIGS. 4A to 4B—show the nomenclature that is used to internally process the transportation-related paths that are input into the system by the service providers.

FIG. 4A shows a nomenclature that is used to internally process the transport paths that are input into the system by the transport service providers. As explained before this system uses a transport path definition based on waypoints and associated areas among other attributes. This nomenclature is used to internally process, identify and classify the waypoints and the vectors defined by them, as well as the vector attributes.

A vector ij 100 would be defined by two waypoints (WP) on each end, a waypoint ij (WPij) on the starting end and a waypoint ij+1 (WPij+1) on the finishing end.

In this case "i" is representing the path the element belongs to, and "j" the position of the element within the path, starting from the origin.

The vector ij 100 is then identified by the system as belonging to a transport path i and within that path, the vector in the position j, starting form the origin of the path.

A waypoint, if intermediate (i.e. not origin or destination, of transport path) will be shared by two vectors, the one arriving to it and the one departing from it.

Therefore the same waypoint will be a finishing waypoint for one vector and a starting waypoint for the next vector.

Because of the fact that the attributes relating to an intermediate waypoint might be different whether the service provider is arriving or departing to the waypoint, we will create two names for the same waypoint to represent these arriving or departing conditions.

We will introduce these as attributes to the vector ij 100, a starting waypoint ij (SWPij) coincidental with WPij, and a finishing waypoint ij+1 (FWPij+1) coincidental with WPij+1. These are functional-order waypoint attributes that define a waypoint's parameter sequence-related role respect to other adjacent waypoint parameters in the same path.

Starting waypoint SWPij will have a starting associated area Asij 096 and Finishing waypoint FWPij+1 will have a finishing associated area AFij+1 098. These are also functional-order waypoint attributes.

Furthermore, Starting waypoint SWPij will have a starting linking condition LSij and Finishing waypoint FWPij+1 will have a finishing linking condition Lfij+1.

Linking conditions are conditions set by the service provider and/or by the system to ensure that the linkage between service providers, in order to provide multimodal or multicarrier solutions, is suitable, feasible, convenient and agreed.

Examples of these, are options regarding places of pick up or delivery, such as ports, airports, depots, private yards, other service providers premises, as well as options regarding types of load, type of service provider and facilities for load handling to ensure that at least one of the service providers involved in the combination has the means or facilities, for the loading and unloading of cargo to perform the trans-shipment.

The lining conditions although represented by a parameter, could involve one or more variables, which would need to be checked by the system to produce the suitable and preferred combinations according to the combination criteria, set out by the system and/or the service providers.

Figure 4B:
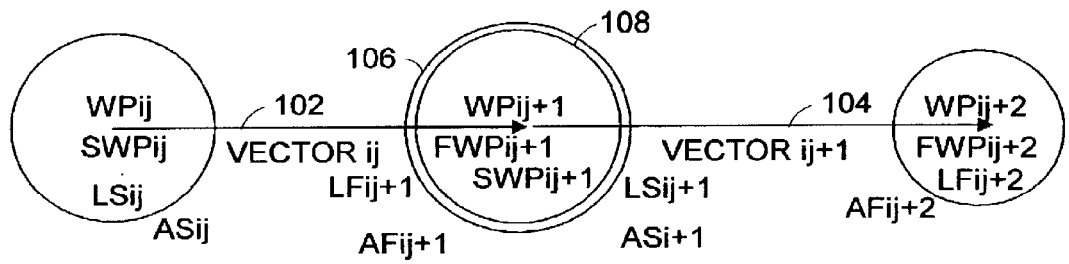

FIG. 4B—shows a path "i" comprised of a vector ij 102 and a vector ij+1 104, defined by waypoints WPij, WPij+1 and WPij+2.

Vector ij 102 has as starting waypoint SWPij, which in fact is WPij and a finishing waypoint FWPij+1, which in fact is WPij+1.

Vector ij+1 104 has a starting waypoint SWPij+1, which in fact is also WPij+1 as this is an intermediate waypoint and a finishing waypoint FWPij+2, which in fact is WPij+2.

Using this nomenclature to that relates waypoints to the vectors in accordance with their position in respect to each other, we can clearly separate arriving and departing conditions on the same waypoint, naming them as "finishing and "arriving" vector attributes respectively.

At intermediate waypoint WPij+1 the "finishing" vector attributes of vector ij 102 are finishing waypoint FWPij+1, a finishing associated area AFij+1 106 and finishing linking conditions LFij+1 and the "starting" vector attributes of vector ij+1 104 are starting waypoint SWPij+1, a starting associated area Asij+1 108 and starting linking conditions LSij+1.

The starting and arriving attributes for a waypoint may be the same, or be different as is the case for the associated areas 106 and 108.

These differences might be reflected practically in the example case of a service provider planing to arrive at a designated waypoint late in the night and departing the next morning. The service provider might choose not to perform any delivery or pick up on arrival as he may be tired and/or has very limited time, so he would reduce his "finishing" associated pick up and delivery area to a very small one, or even zero, but at the same time he might be able to perform pick-ups or deliveries on the new leg, the next morning, once he has rested, has more time or more favourable conditions and therefore he will accommodate the size of the "starting" associated and delivery area to suit his needs.

The starting and finishing linking conditions may also be the same or different the same waypoint.

A practical example of this is a service provider willing to interact with other service providers in a cargo hub, at night upon arrival, when there is little traffic and waiting times are short and, not at all in the morning upon departure, when the waiting times are much longer at the hub. At the same time, upon departure, the service provider might prefer to deliver to private addresses or specific types of service providers' premises. In this case the service provider will enable hub and/or port link types on the finishing waypoint and disable them on the starting waypoint, allowing only links to selectable locations or to specified service types On the other hand, other service providers may be arriving and departing in the middle of the day, keeping the same linking preferences and therefore will specify equal linking conditions for the finishing and starting attributes on the waypoint.

In an environment such as the one described in FIG. 4B all elements can be directly or indirectly related between each other by means such as of pointers or relational tags. For the purposes of this disclosure we will consider immediately or directly related, i.e. with direct pointers, the following relations.

All starting attributes (Sij) on a waypoint WPij, to all other starting attributes on the same waypoint (any other Sij), to the waypoint itself (WPij), to the vector itself (Vij).

All finishing attributes (Fij+1) on a waypoint WPij+1, to all other finishing attributes on the same waypoint (any other Fij+1), to the waypoint itself (WPij+1), to the vector itself (Vij).

All waypoints (WPij+1), to adjacent existing vectors (Vij and/or Vij+1) and to all starting and finishing attributes on the waypoint (all Fij+1 and/or Sij+1).

All vectors (Vij), to their defining waypoints (WPij and WP ij+1), to their starting attributes (all Sij) and to all their finishing attributes (all Fij+1).

By indirect relations, non-adjacent preceding or succeeding elements or attributes of a path can be retrieved, as well as complete paths.

All the elements of a complete path can also be retrieved directly by recalling all elements with the same "i" in an "ij" classification.

A skilled database programmer can construct alternative relations involving more or less direct or indirect relations, allowing for database designs that may be more efficient, but that is beyond the scope of this disclosure. Therefore, the term "immediately related", immediately associated" or "directly related" will be used to emphasize "what" information is to be retrieved, rather than "how" it is retrieved.

Figure 4C:
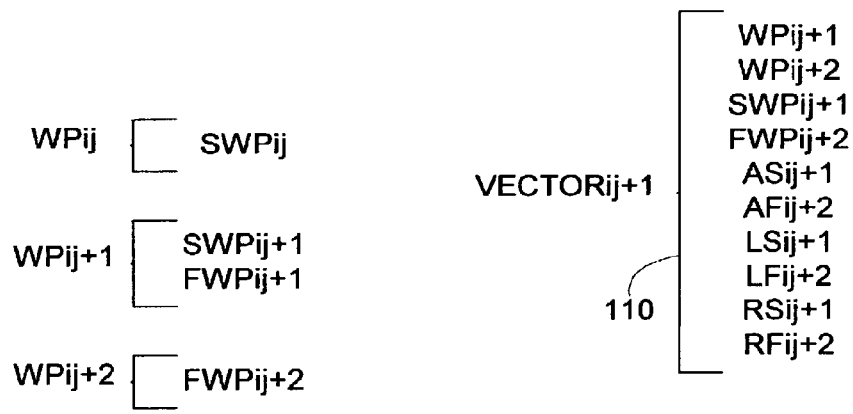
FIG. 4C—shows the relations and possible data structures used to define the elements of a transport path similar to that shown in FIG. 4B.
Figure 4C:
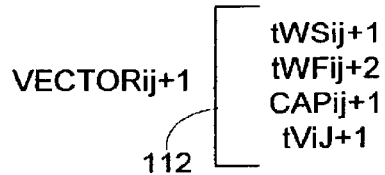

FIG. 4C shows the relations and data structures used to define the elements of a transport path similar to that shown in FIG. 4B On the left, waypoint WPij is only related to SWPij, as WPij is an Origin waypoint of the transport path, contributing to the definition of only one vector, namely vector ij 102.

Waypoint WPij+1 is related to FWPij+1 and to SWP ij+1, as WPij+1 is an intermediate waypoint of the transport path, contributing to the definition of two vectors, namely vector ij 102 and vector ij+1 104.

Waypoint WPij+2 is only related to FWPij+2, as WPij+2 is a Destination waypoint of the transport path, contributing to the definition of only one vector, namely vector ij+1 104.

On the right, vector ij+1 is shown with a set of relations 110, including the defining waypoints WPij+1 and WPij+2 and all other vector ij+1 attributes explained above, except for Starting Rules RSij+1 and Finishing Rules RFij+2.

The rules are vector attributes that further provide a working framework for the combination of different service providers or carriers.

Many rules can be set up to solve "what if?" scenarios and conflicts of interest arising from the combination of service providers. Some typical cases of these scenarios will be described in FIG. 5.

The set of relations 110 is a set of relations substantially handled by subsystems such as the Geographical and the Rules and Optimization.

Vector ij+1 is also shown with another set of relations 112, including leg starting time window tWSij+1, leg finishing time window tWFij+2, leg capacity CAPij+1 and leg time tVij+1.

Leg starting time windows, leg finishing time windows and leg time are initially set by the service provider, but later updated basically by the geographical and temporal subsystems and their scheduling and routing modules, preferably assisted by the rules and optimisation subsystem. Leg Capacity is also initially set by the service provider, but later basically updated by the dimensional subsystem and its space management module, preferably assisted by the rules and optimisation subsystem.

The set of relations 112 is a set of relations substantially handled by subsystems such as the Dimensional, the Temporal, the Spatial and the Rules and Optimization, as also their related module.

Figure 5A:
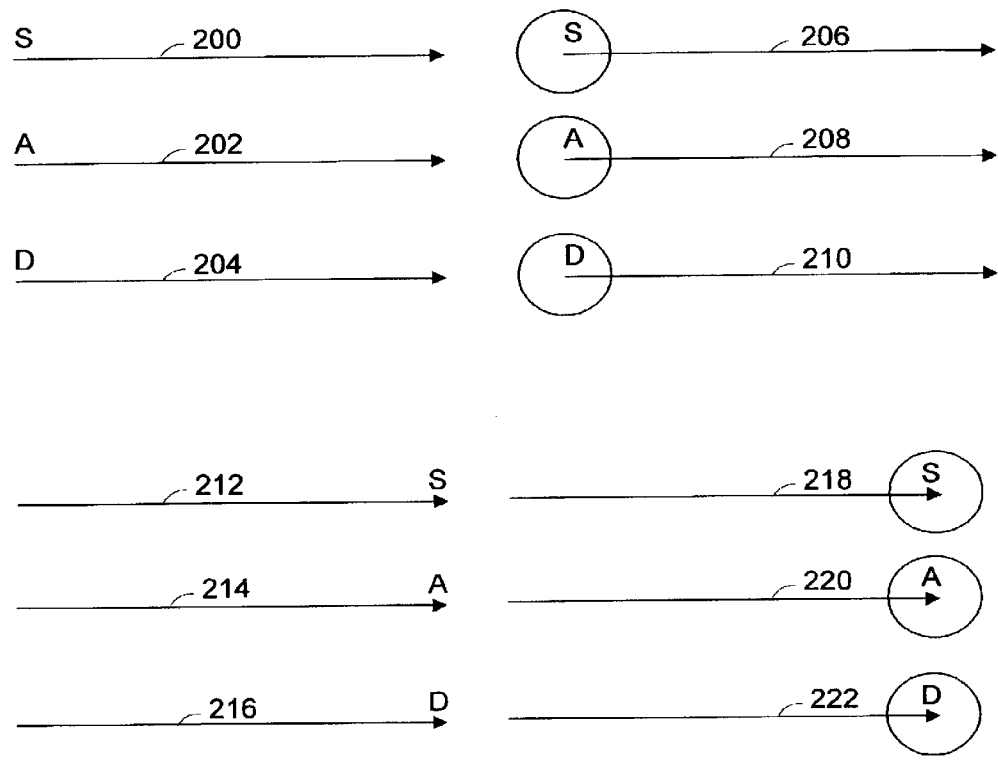
FIG. 5A—shows some of the different cases of settings for associated areas and link types.

FIG. 5A—Shows some of the different cases of settings for associated areas and links. Although this embodiment only shows a few examples of setting types, many others can be implemented to suit improved or different applications.

A letter "S" is used to represent an instant link type, i.e. a type of link that will only pick up from or deliver to a fixed location, provided the recipient, sender or another service provider will be ready at the exact location, within the time window allocated to the waypoint A letter "A" is used to represent a fixed Address link type. i.e. a type of link that will only pick up from or deliver to a specific address, such as that of an institution, a company a home or any other enclosed designated facility not necessarily counting with loading or unloading facilities.

A letter "D" is used to represent a Depot link type. i.e. a type of link that will only pick up or deliver to or from a Depot type facility such as that of a freight company headquarters, a hub, a port or a warehouse with proper loading or unloading facilities.

These types of links can be assigned to a starting or finishing waypoint, either individually or in combination.

Among many options we can see a vector 200 with a link type "S" on the starting tip, limited only to the waypoint, thus meaning that before the start of this leg, the service provider will only pick up from, or deliver to, the stated location within a stated time window and that a combination of service providers is only possible if the other prospective service provider goes to the designated location and is ready, within the time window, to perform the operation. This type of link provides very narrow opportunities and is only intended for very precise arrangements, for example, to assist in the combination of two service providers in a truck stop.

Also represented is the case of a vector 202 with a link type "A" on the starting tip limited only to the waypoint, thus meaning that before the start this leg, that the service provider will only pick up from, or deliver to the stated address and therefore, a combination of service providers is only possible, if the other prospective service provider goes to the designated address to perform the operation and has its own means of loading or unloading, if the cargo is heavy.

A vector 204 with a link type "D" on the starting tip, represents the case of a provider that is stating a Depot facility as his waypoint and before starting his leg, he is able to pick up or deliver from the Depot itself This means that the other service providers would have to deliver to this Depot before, or pick up from it after the designated starting time, but would not necessarily need to have unloading or loading facilities of their own.

Also shown is a vector 206 that is similar to the vector 200, except that the starting tip has an associated area, thus meaning that a the start of this leg, the service provider would be able to pick up from, or deliver to any location within the associated area, if the recipient, sender or another service provider is at the location within the time window stated on that waypoint.

Following is a vector 208 that is similar to the vector 202, except that the starting tip has an associated area, thus meaning that at the start of this leg, that the service provider will with his own means, pick up from, or deliver to any address within the associated area.

Finally in the first group is a vector 210 that is similar to the vector 204, except that the starting tip has an associated area, thus meaning that at the start of this leg, that the service provider will be able to, without his own means, pick up from, or deliver to, the Depot type facility and pick up or deliver to areas within the associated area.

A group of vectors 212 to 222 are similar cases to the group of vectors 200 to 210, with the difference that instead of the starting tips, the link types apply to the finishing tips and pick up and deliveries occur at the finish of the leg, instead of at the start, or after the finish, instead of before the start.

EXAMPLES OF PATH APPLICATIONS

Figure 5B:
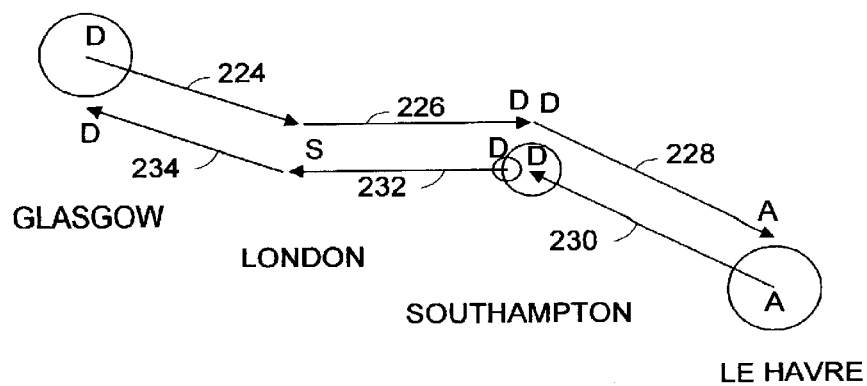
FIG. 5B—shows an example of what could be the definition of a typical transport-related path.

FIG. 5B—shows an example of what could be the definition of a typical transport path.

The service provider is headquarted in Glasgow and has Depot type facilities there and shared Depot type premises in Southampton. The Service provider plans a trip to Le Havre with a consignment that fulfils 75 percent of the vehicle's capacity on the outbound route and a consignment fulfilling 30 percent of the capacity for the inbound route. There is therefore spare capacity that can be offered on both routes, so links in both directions are activated.

The service provider start at his depot in Glasgow and states he can pick up or deliver up to 25 percent of his capacity within an associated area at the starting waypoint (depot) of his first leg, represented by a vector 224. The service provider later continues defining his route through a waypoint in London, probably a truck stop, with no associated area, as he will be there only 15 minutes and has no intention of deviating from his route, he will later define the next leg, represented by vector 226. By defining the next waypoint in Southampton which is also a depot type facility where he may drop off or pick up load, but with no associated area, maybe because he does not want to deviated or to lose time. The final outbound leg is represented by a vector 228 and defined by a waypoint on an Address in Le Havre, which would be generally the recipient address of the main consignment that originated the route and does not define any associated area, as the main delivery must be as soon as possible.

However the service provider has time to pick up or deliver on the starting leg of the return route, represented by a vector 230, so he defines an associated area there. He initially has a reasonable time to pick up or deliver on the finishing part of this leg to Southampton, as he has to wait for a ship to arrive with cargo, defining therefore a finishing associated area around the depot. On the start of the next leg, represented by a vector 232, he has loaded the cargo from the ship and only manages to pick up or deliver to places a few minutes away, designating therefore a very small starting associated area.

The service provider passes through the London waypoint, but has no intention of deviating or losing time, either at the finish of this leg, or the start of the next leg, represented by a vector 234 which finishes at the company's depot and which is the only place where he has decided to deliver the cargo.

A transport path like this will mainly be able to match loads that need to go from Glasgow to Le Havre and also from Le Havre to Southampton. The other waypoints allow for very narrow possibilities, but more often than not, this may be all the service provider is interested in, as his trip substantially covered by the main loads initially contracted.

One of such narrow possibilities is for example a load that needs to go from the proximities of Glasgow to Portsmouth and may be dropped in to the Southampton depot on the outbound route, provided the system finds another suitable service provider or carrier for picking up the load at the Southampton depot and delivering it to Portsmouth in due time.

Figure 5C:
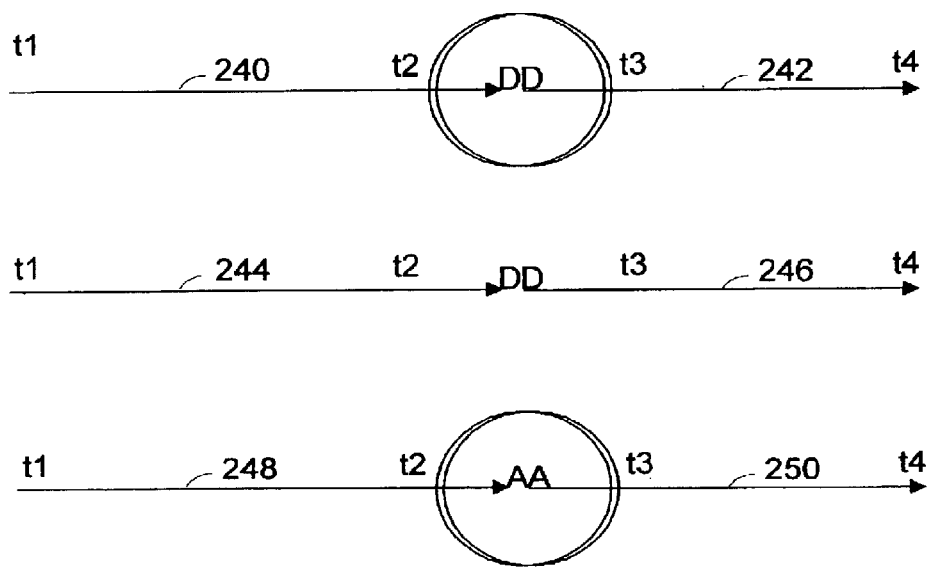
FIG. 5C—shows examples of the definition of some attributes in a two-vector path.

FIG. 5C shows examples of the definition of some attributes in a two-vector path.

The top path is comprised of a vector 240 with starting time or time window t1 and finishing time or time window t2, finishing depot type link "D" and a finishing associated area, followed by a vector 242 with starting associated area, starting link type "D", starting time or time window t3 and finishing time or time window t4.

In this case the intermediate waypoint has substantially the same associated areas and link type "D" for the finishing point of vector 240 and the starting point of vector 242, this need not be always the case.

The middle path shows a path similar to the top one, with the exception that the path is comprised of a vector 244 with no finishing associated area and a vector 246 with no starting associated area.

The bottom path shows a path similar to the top one, with the exception that the path is comprised of a vector 248 with finishing link type "A" and a vector 246 with a starting link type "A".

Figure 5D:
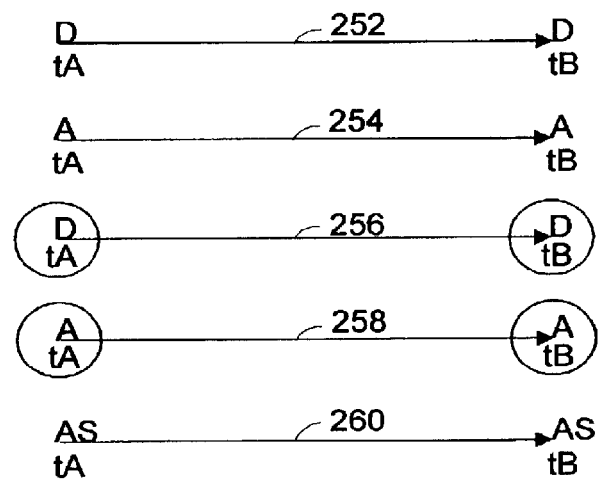
FIG. 5D—shows a variety of vectors 252 to 260 representing the most typical combination of link types, associated areas and time windows.

FIG. 5D—shows a variety of vectors 252 to 260 representing the most typical combination of link types, associated areas and time windows, that are likely to be encountered as a result of the process of a transport path definition, according to the system of the present invention.

Figure 5E:
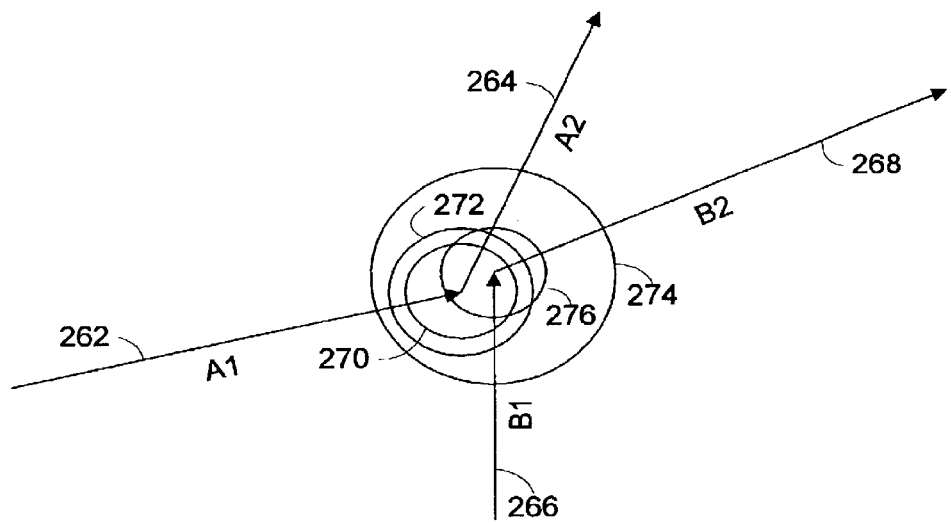
FIG. 5E—shows example cases of how combination opportunities for the matching of two service providers vary according to the associated areas of the two transport paths defined.

FIG. 5E—Shows example cases of how combination opportunities for the matching of two service providers vary according to the associated areas of the two transport paths defined.

A first transport path A is defined by a vector A1 262, followed by vector A2 264, which have a finishing associated area 270 and a starting associated area 272 respectively. Both the areas 270 and 272 in this example happen to be different, with the arriving area 270 being smaller.

A second transport path "B" is defined by a vector B1 266, followed by vector B2 268, which have a finishing associated area 274 and a starting associated area 276 respectively. The both areas 274 and 276 in this example also happen to be different, but the arriving area 274 this time being the larger of both.

This example, shows the possible combination of the two transport paths A and B, by first analysing the geographic attributes.

The intermediate waypoints of the two transport paths, in this case, are both encompassed by all four associated areas 270 to 276.

It can be seen that both transport paths can either pick up from, or deliver to, the other, either on their finishing legs, in the case of vectors A1 262 and B1 266, or on their starting legs, in the case of vectors A2 264 and B2 268.

Accounting, in this case, only for the geographical attributes, the possibilities of combination for the two service providers, represented by transport paths A and B, entail eight different matches, namely vectors 262 with 266, 262 with 268, 264 with 266, 264 with 268 and vectors 266 with 262, 266 with 264, 268 with 262, 268 with 264.

Further attributes will decide which of these, if any, of all match possibilities could be feasible.

Figure 5F:
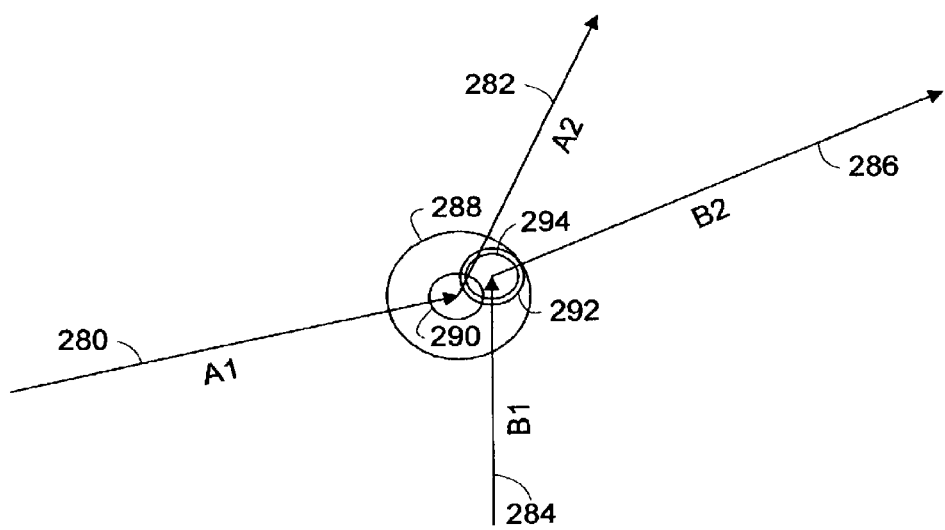
FIG. 5F—shows further sample cases of how combination opportunities for the matching of two service providers vary according to the associated areas of the two transport paths defined.

FIG. 5F—Shows further sample cases of how combination opportunities for the matching of two service providers vary according to the associated areas of the two transport paths defined.

A first transport path is defined by a vector A1 280, followed by vector A2 282, which have a finishing associated area 288 and a starting associated area 290 respectively. The both areas 288 and 290 in this example happen to be different, with the arriving area 288 being larger.

A second transport path is defined by a vector B1 284, followed by vector B2 286, which have a finishing associated area 292 and a starting associated area 294 respectively. The both areas 292 and 294 in this example happen to be just slightly different, or maybe equal.

This example, shows the possible combination of two transport paths, by first analysing the geographic attributes.

The intermediate waypoint of transport path A, represented by vectors A1 and A2, in this case, is not encompassed by associated areas 294 or 292, belonging to transport path B, represented by vectors B1 and B2.

Also in this case the intermediate waypoint of transport path "B" is encompassed only by the associated area 288, belonging to transport path A and more specifically to vector A1 280.

It can be seen then that, in this case, only the service provider represented by transport path A, can pick up from, or deliver to, service provider represented by transport path "B" and that service provider represented by transport path A, can only do so on the finishing part of a first leg, represented by vector A1 280.

Accounting in this case, then, only for the geographical attributes, the possibilities of combination for the two service providers, represented by transport paths A and B, entail two different matches, namely, vectors 280 with 284 and 280 with 286.

Further attributes will decide which of these two, if any, of the match possibilities could be feasible.

Figure 5G:
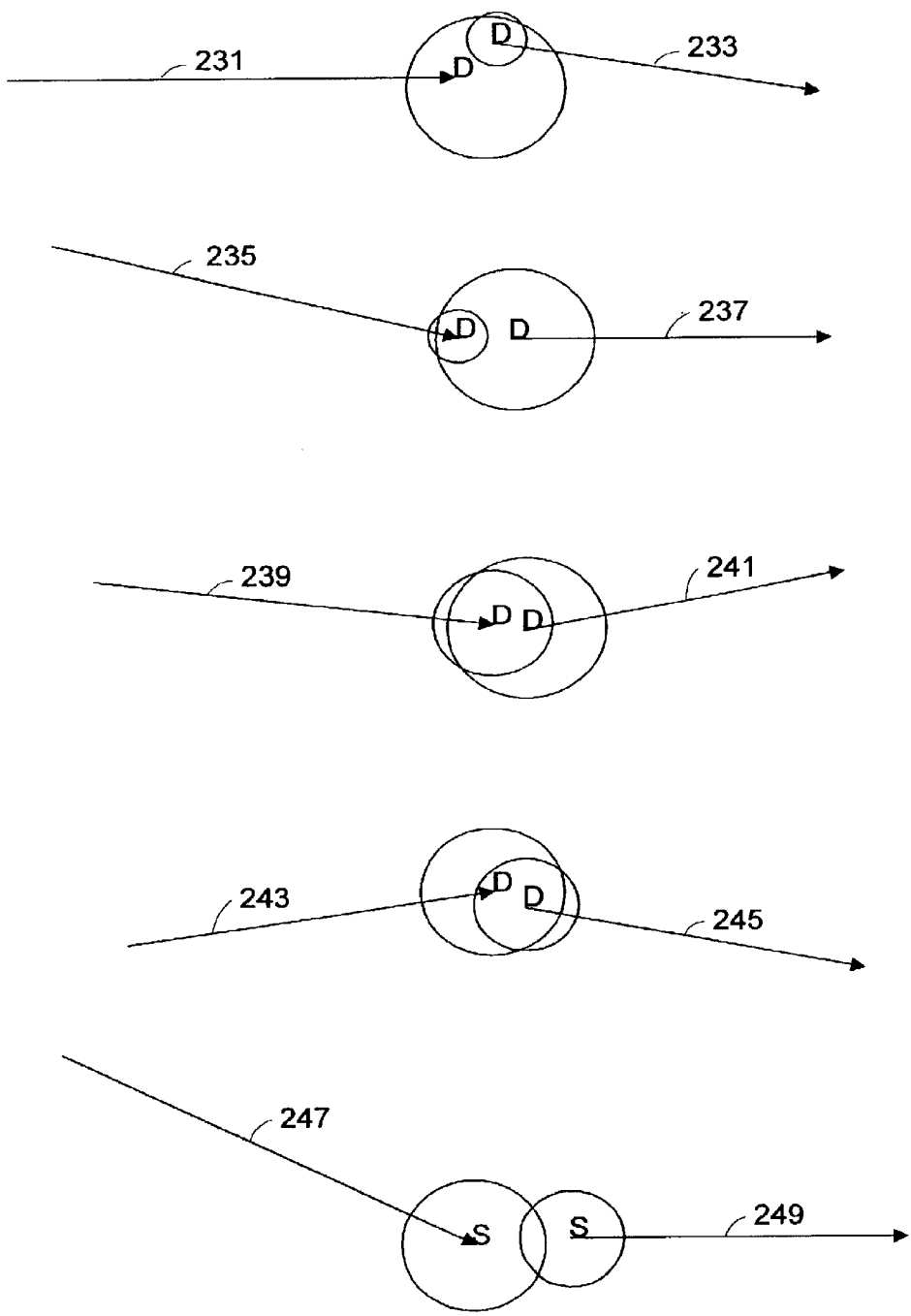
FIG. 5G—shows sample cases of how combination opportunitites for the matching of two service providers vary according to the associated areas and the link ability conditions of the two transport paths defined.

FIG. 5G shows further typical examples of combination possibilities for two transport paths. For the sake of clarity, each transport path in this figure is represented by only one vector and analysis of attributes is done only on one of their waypoints.

According to the associated areas, a transport path 231 with finishing link type "D" can pick up from, or deliver to a depot facility stated by transport path 233 with starting link type "D", while the opposite is not possible According to the associated areas, a transport path 235 with finishing link type "D" cannot pick up from, or deliver to a depot facility stated by transport path 237 with starting link type "D", while the opposite is possible.

According to the associated areas, A transport path 239 with finishing link type "D" can pick up from, or deliver to a depot facility stated by transport path 241 with starting link type "D", but the opposite is also possible and maybe more adequate, as the associated area of transport path 241 is larger and/or encompasses with more ease the waypoint of transport path 239

According to the associated areas, A transport path 247 with finishing link type "S" cannot pick up from, or deliver to a specific location stated by transport path 249 also with starting link type "S" and opposite is not possible either.

The only solution to this last case, would be to introduce a "meeting in no man's land" feature, with the exact point worked out automatically by the G.I.S. subsystem which would try to find suitable exchange locations, such as a truck stop, within the common shared area, defined by the convergence of the associated areas of the transport paths 247 and 249.

This suitable location, instead of being system assigned, could also be arranged between the two possible service providers through means of communication provided by, or facilitated by the system object of the invention It is worth mentioning that this "meeting in no man's land" feature will most probably be only feasible, when the link types involved, are such that have strict time window attributes, as in the case of the instant link type "S" defined, this is so mainly because, unlike as in the Depot facility, where the transport paths need to be sequential, but do not necessarily have to meet in time together, in this case the service providers have to meet together in time and as in any other business meeting, punctuality is more often than not, important and time often scarce.

Figure 5H:
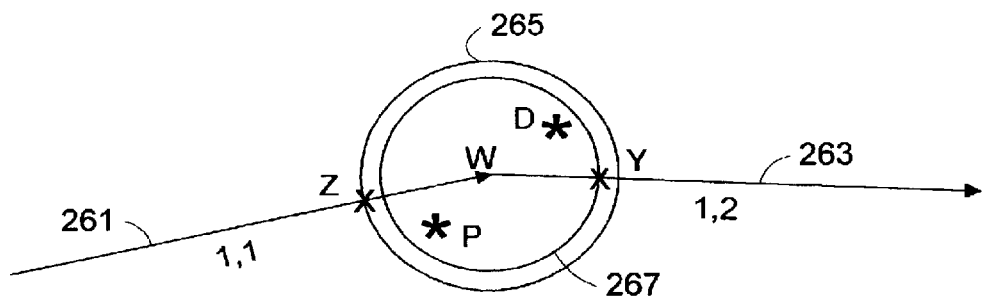
FIGS. 5H to 5J—shows possible basic optimisation techniques for assigning tasks to two sequential vectors having a common waypoint and different associated spaces.

FIG. 5H—Shows a transport path 1 which includes a vector "1,1" 261 with a finishing associated area 265 having a border intercepting the vector at point "Z" and a following vector "1,2" 263 with a starting associated area 267 having a border intercepting the vector 263 at point "Y".

If in this example, the service provider represented by the transport path 1, must deliver a load to point "D" and pick up a load from point "P" and because the associated areas 265 and 267 both encompass the pick up and delivery points, there are various ways the system could assign these operations to the vectors 261 and/or 263, namely, vector 261 performing pick-up and delivery, vector 261 performing pick-up followed by vector 263 performing delivery, vector 261 performing delivery followed by vector 263 performing pick-up and vector 263 performing pick-up and delivery.

Of all the cases just mentioned in this example, the second case, i.e. vector 261 performing pick up at point "P" vector 263 performing delivery at point "D" is the one that would typically prove to be most efficient if the loads did not have any special time window priority.

Figure 5I:
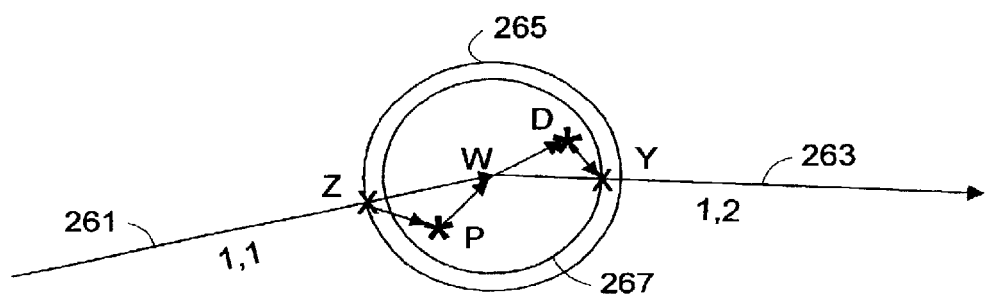

FIG. 5I shows the likely most efficient case of an example substantially similar to that of FIG. 5H. In order to work out the likely most efficient case, the G.I.S. subsystem could define points "Z" and "Y" and measure the magnitudes of distances "Z" to "P" and "Y" to "P", compare them and find the smallest, which in this case would be "Z" to "P". Pick up of point "P" will then be associated the vector 261 to which "Z" belongs.

Similarly the subsystem would compare the distances "Z" to "D" and "Y" to "D" to find in this case, "Y" to "D" as the smallest and so assigning to vector 263, the delivery to point "D". Further vector attributes would be used to check whether this likely most efficient case is also feasible. If not, the slightly lesser efficient cases, classified for example, by total distance employed to perform the two operations, would be checked for feasibility.

If still none of the cases proved to be feasible, one of the two operations, typically the less valuable to the service provider, would be cancelled or delayed. If this also proved not to be feasible, just one operation, the typically less valuable, would be tested for feasibility, canceling or delaying the remaining. Concepts of valuable or less valuable can be defined by the system or optionally by the service provider, by decision making algorithms which could include individually or in combination, cost of contract, type of loading facilities at point, pick up or delivery distances to main route, standardization of load, palletization, compatibility with vehicle, compatibility with other transported cargo, volume, weight, rating of user and rating of service provider among other load and transport related attributes.

Figure 5J:
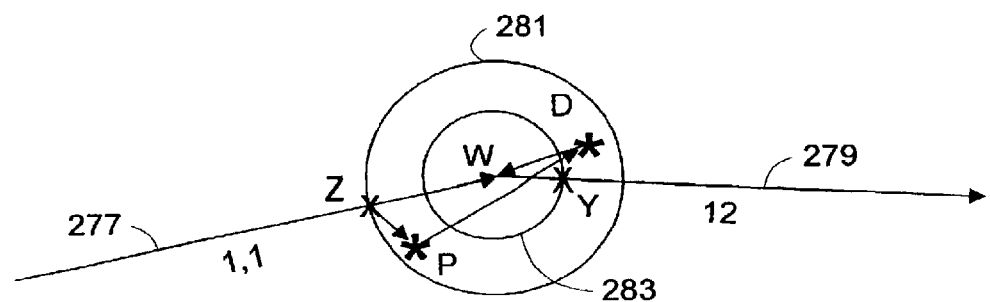

FIG. 5J shows a transport path 1 which includes a vector "1,1" 277 with a finishing associated area 281 having a border intercepting the vector at point "Z" and a following vector "1,2" 279 with a starting associated area 283 having a border intercepting the vector 279 at point "Y".

In this example, the service provider represented by the transport path 1, must deliver a load to point "D" and pick up a load from point "P" and because only associated area 281 encompasses the pick up and delivery points, the operations can only be assigned to vector 277, which would performing pick up and delivery at points "P" and "D" respectively, before finishing at waypoint W.

Working out the most likely efficient order to route the points, which may be more than two, is well known in the art of Operational Research. This task would be handled by the G.I.S. subsystem, assisted by the rules and optimisation subsystem, which basically form the routing module.

Figure 5K:
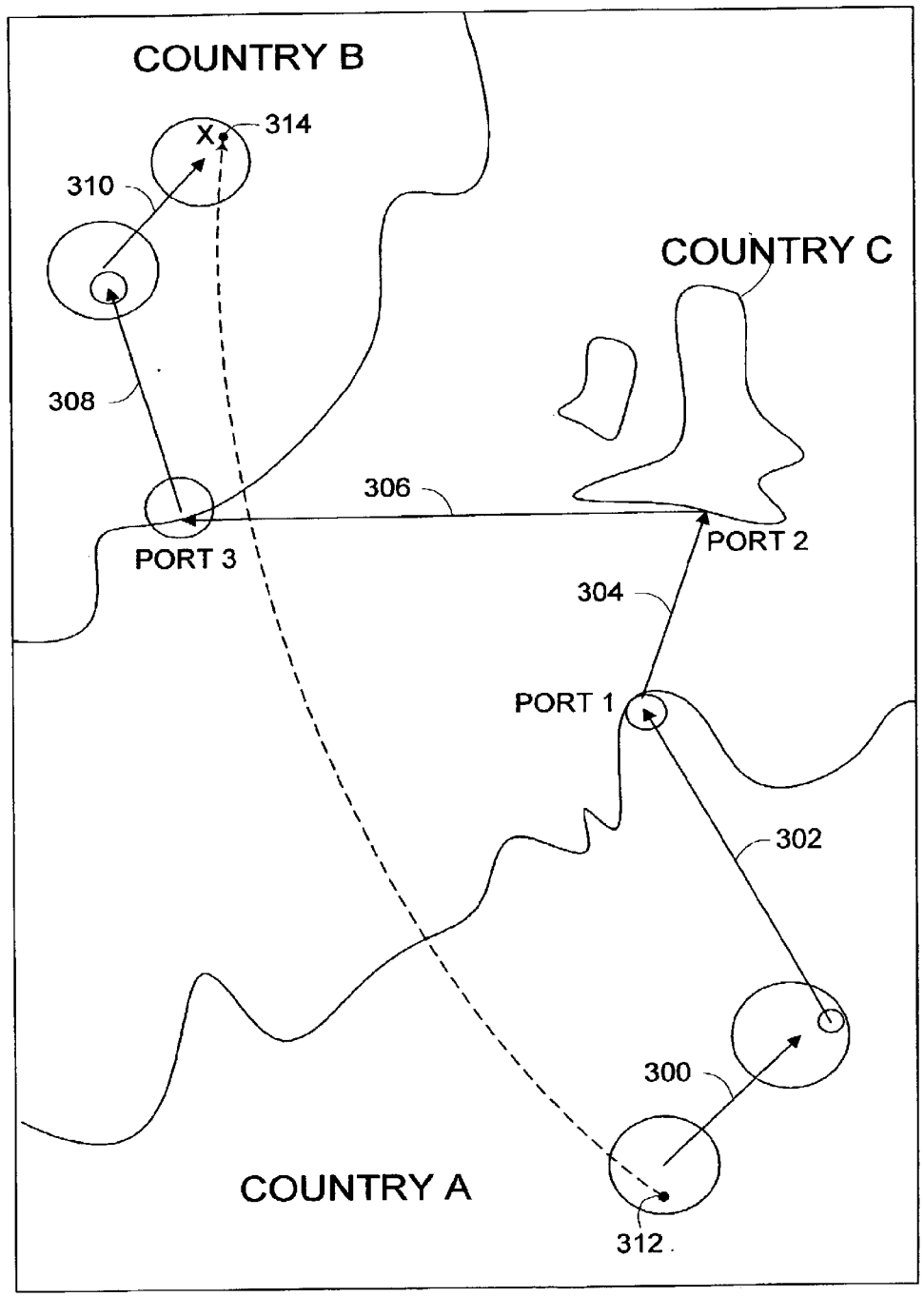
FIG. 5K—shows an example of one of the most complex transport arrangements that are likely to be performed by the invention, a multimodal, multi-leg transport operation using up to six transportation service providers.

FIG. 5K—Shows an example of one of the most complex transport arrangements that the system object of the invention, is likely to perform.

Supposing a user of the system, for example a shipper, needs to send a transcontinental load of 10 pallets of French handmade terracotta tiles to the state of Colorado (U.S.A.). The user specifying the origin of the cargo an address in Limoges (France) and the destination as an address in Boulder, Colo. (U.S.A.). More often than not it is very unlikely that one mode of transport alone, could, at a competitive price, perform the operation. Even maybe the most likely direct operation, would involve three legs, namely road freight to airport, air freight and road freight to final destination and although maybe the fastest, more often than not, this would not result in the most economical form of transport for this type of cargo.

A multimodal, road, sea, road transport operation would also involve at least three legs and the system may be able to find single "global" service providers offering this service, or up to three independent service providers that in combination may complete the transport task.

Still, this may not always be the case, nor always the best value or the most convenient.

If the Origin 312 and Destination 314 of the load are not important nodes of transport, a multimodal operation from France to U.S.A. is likely to involve between four and six legs. FIG. 5J shows the case of six legs 300 to 310, for example the load at 312, being picked up by a road freight service provider 300, which combines with a rail freight service provider 302 that takes the cargo to a sea freight service provider at a main Port 1 as Le Havre (France). Sea freight service provider 304 takes the cargo to a second main Port 2 as Southampton (United Kingdom). Cargo is transferred then to another sea freight service provider 306 going to a main port 3 as New York (U.S.A.). At New York port, cargo is picked up by road freight service provider 308 to a transport node or hub, where it is picked up by a regional road freight service provider 310 that takes the load to the final destination 314.

The whole combination in this case, is favoured, by the flexibility of the two "regional" road freight providers 300 and 310, which have significant pick up and delivery areas. Provider 302 is very limited to the Rail Freight station surroundings and 308, is either a long haul road freight provider with little flexibility, or also may be a rail freight provider. Providers 304 and 306 are sea freight providers, with no pick up or delivery facilities outside the port area.

The G.I.S subsystem can find cross-border situations, between two or more countries and in combination with load data and a with a customs topical information system, analyse import-export related matters, including taxes, paperwork, clearance times and regulations.

Cases involving multiple service providers or even multiple modes are not necessarily restricted to transcontinental transport operations and they could also often include and be applicable to international, national or regional transport operations.

An intercity operation may well include a local delivery service, an intercity service and a second local delivery service and in fact this is the way in which many transport networks, such as the postal service and express delivery services often perform their operations.

The Search Process

Figure 6A:
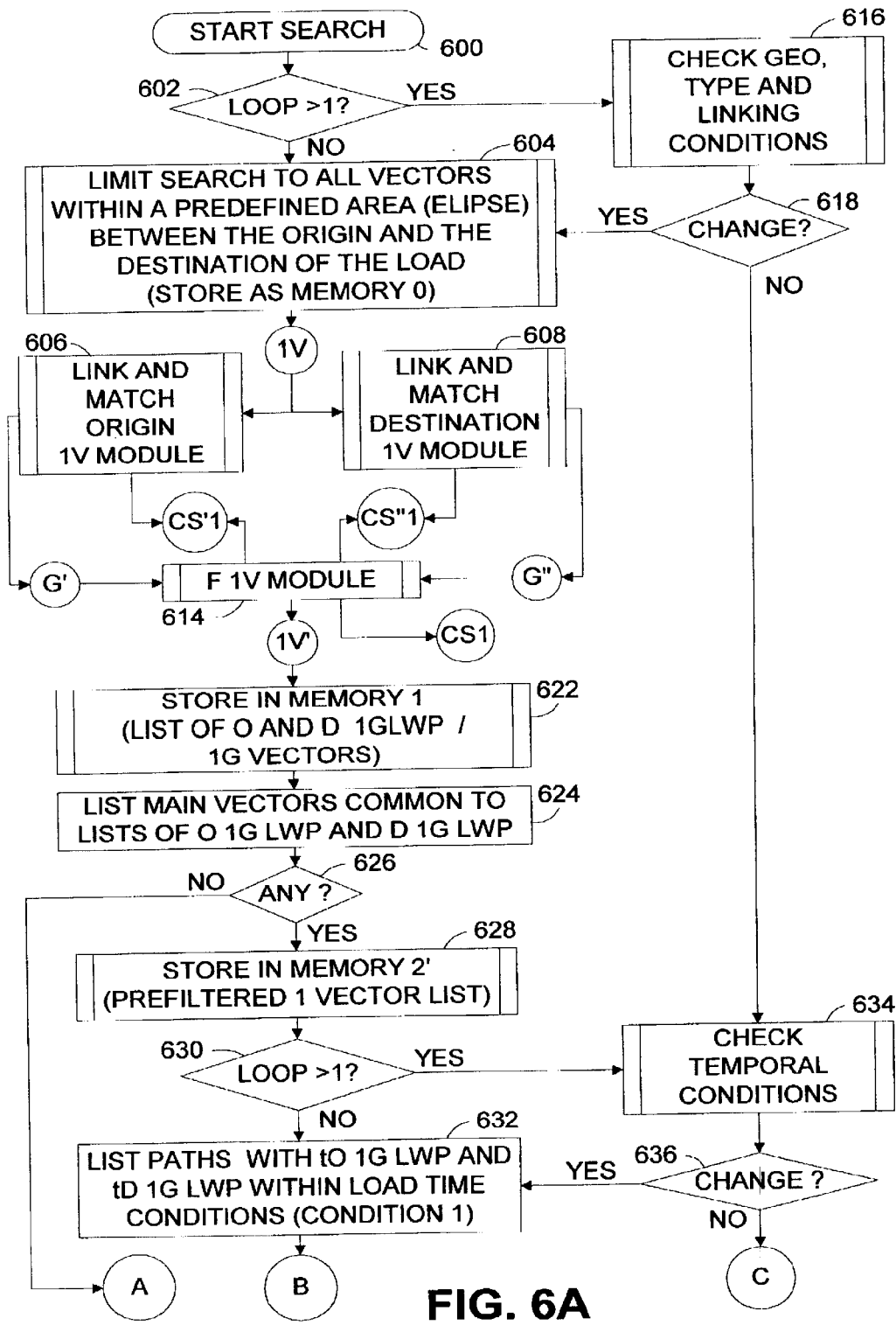
FIGS. 6A to 6Z—show a flowchart describing the different stages of the search process.
Figure 6B:
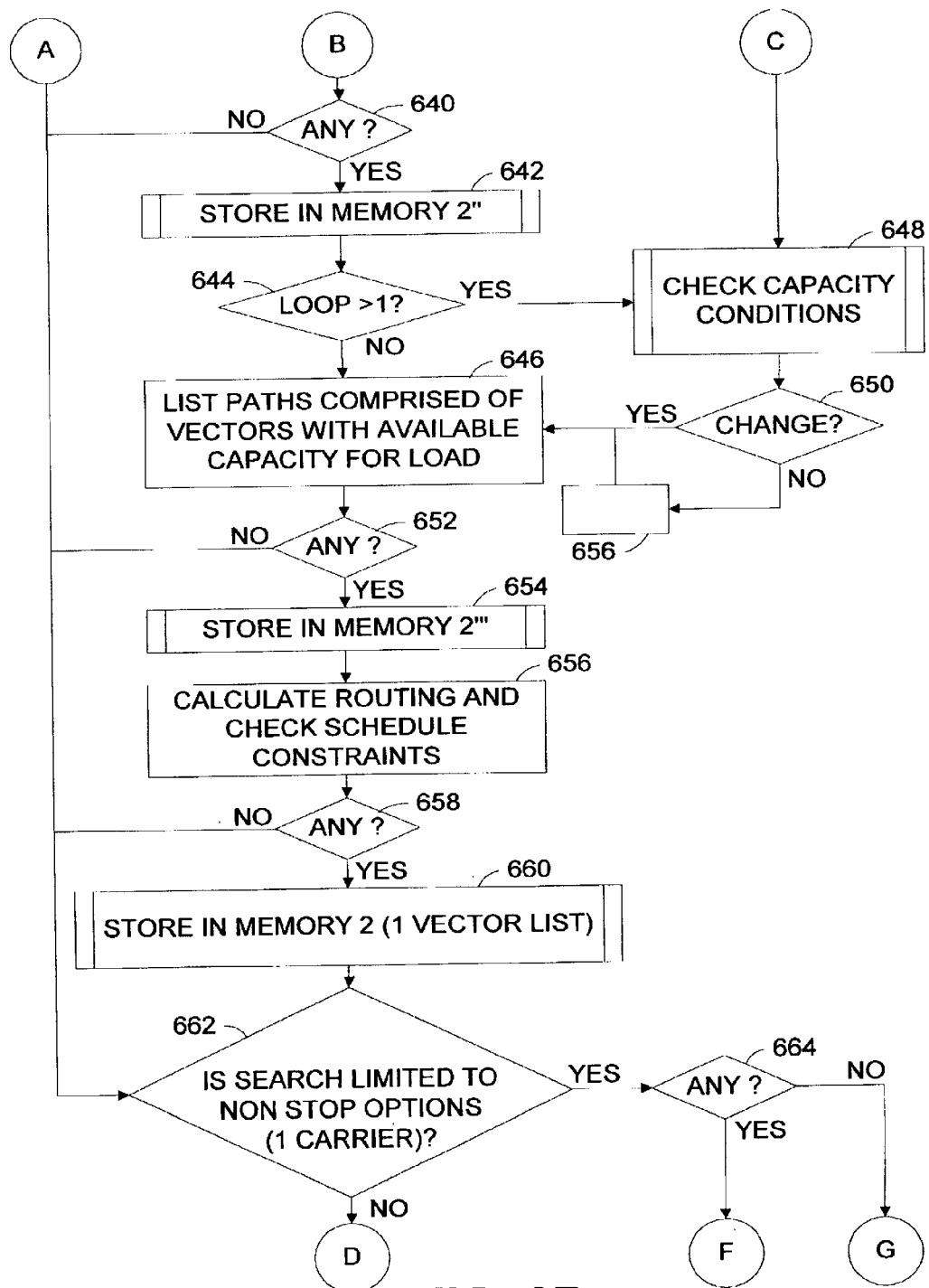
Figure 6C:
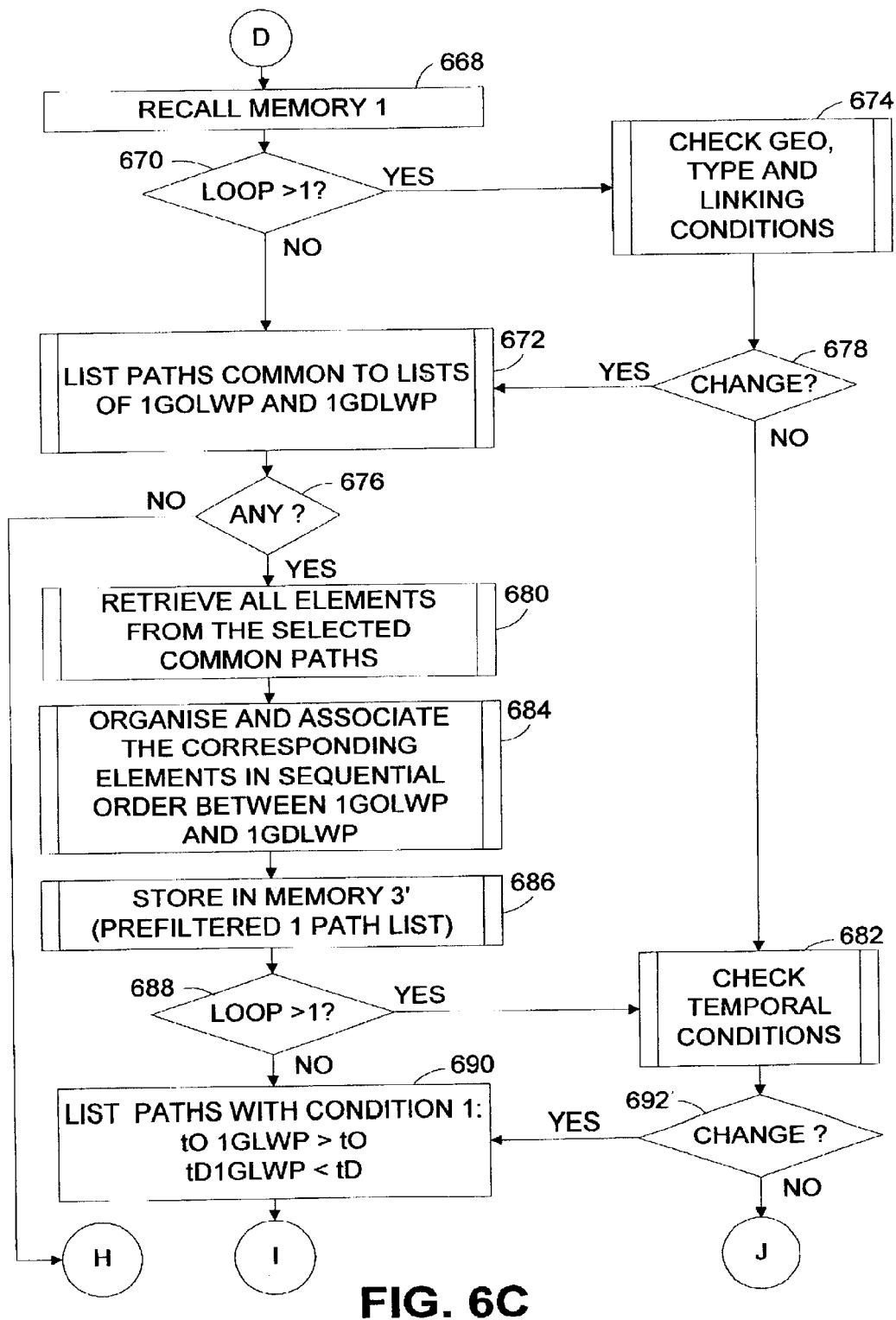
Figure 6D:
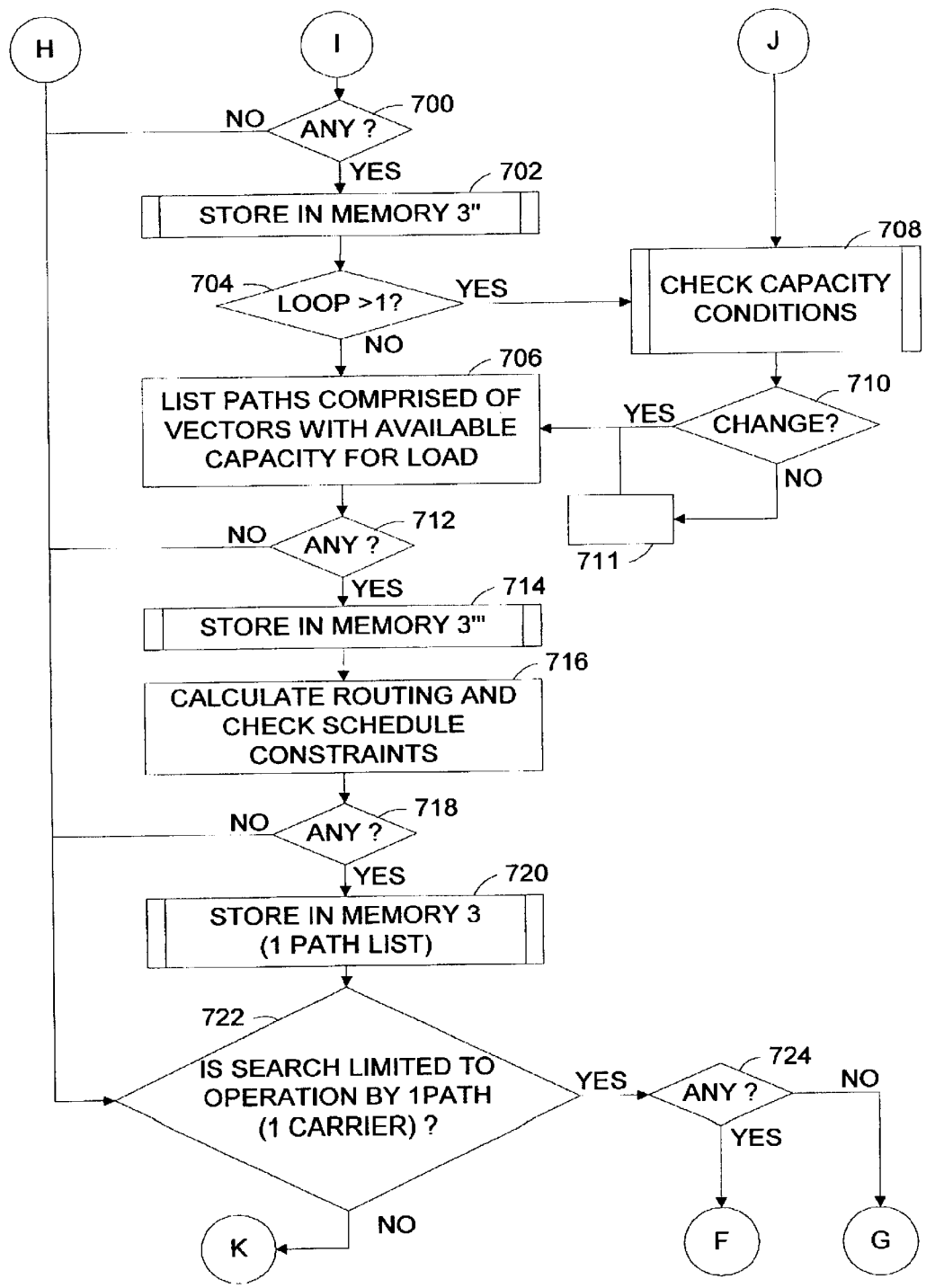
Figure 6E:
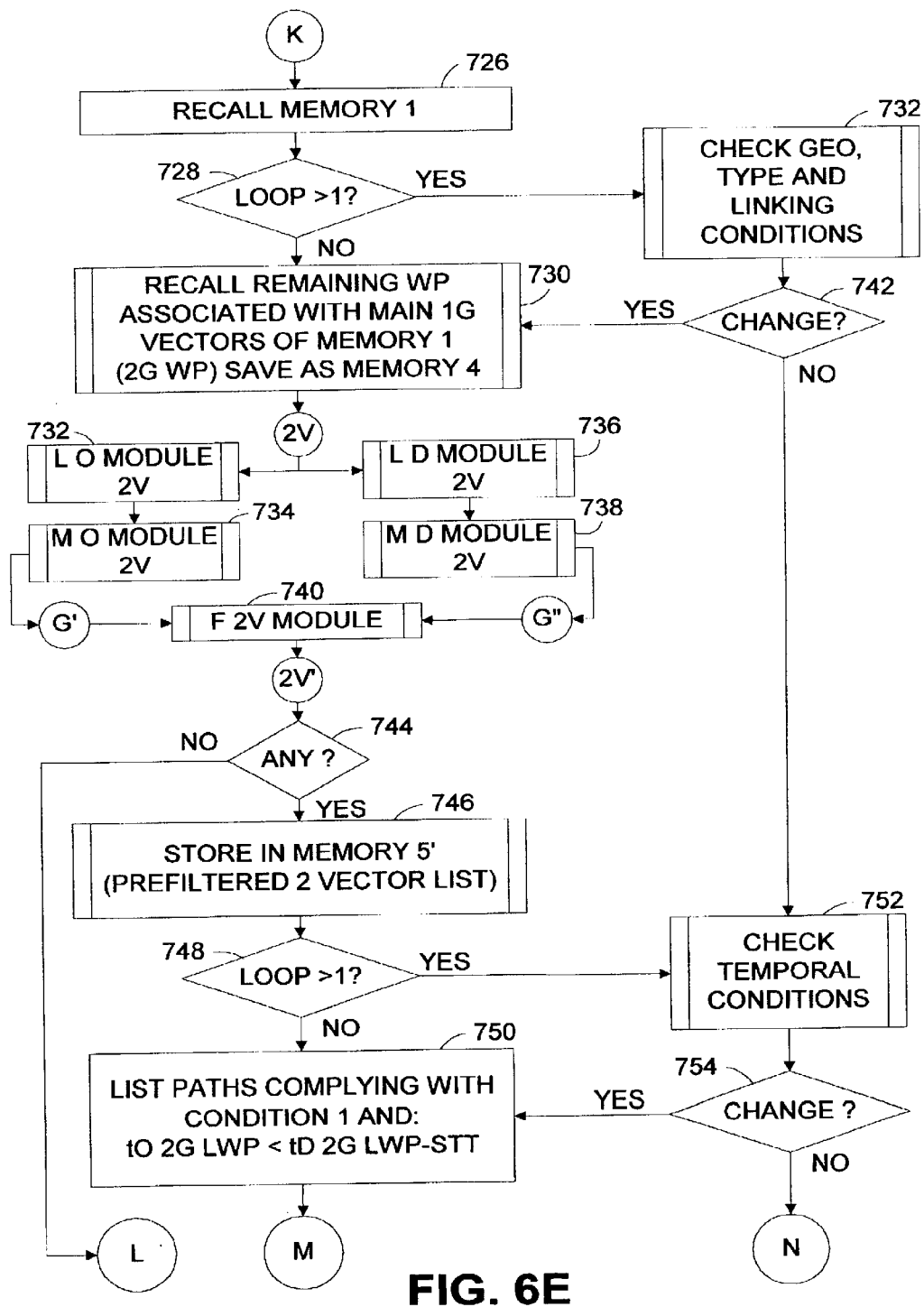
Figure 6F:
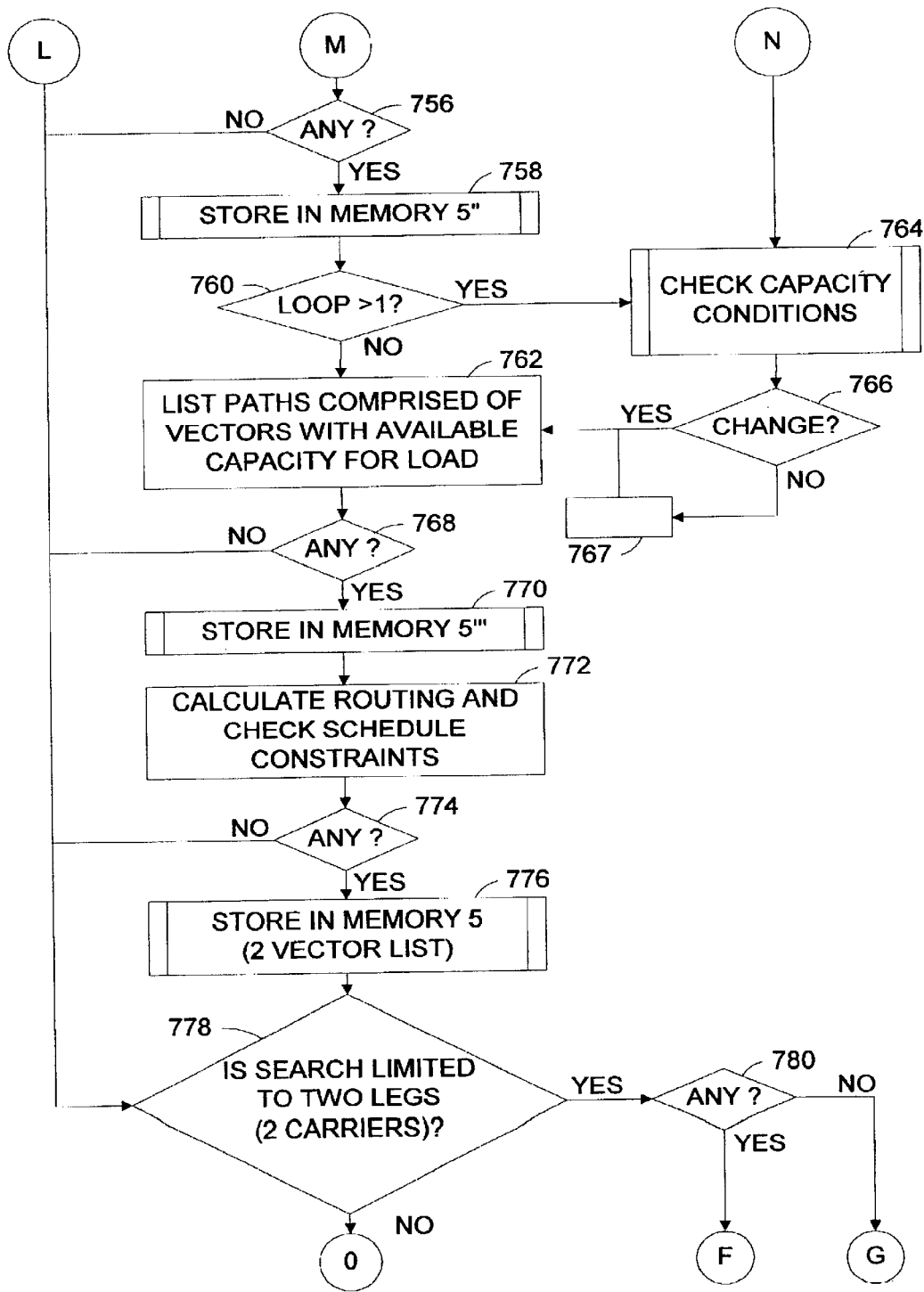
Figure 6G:
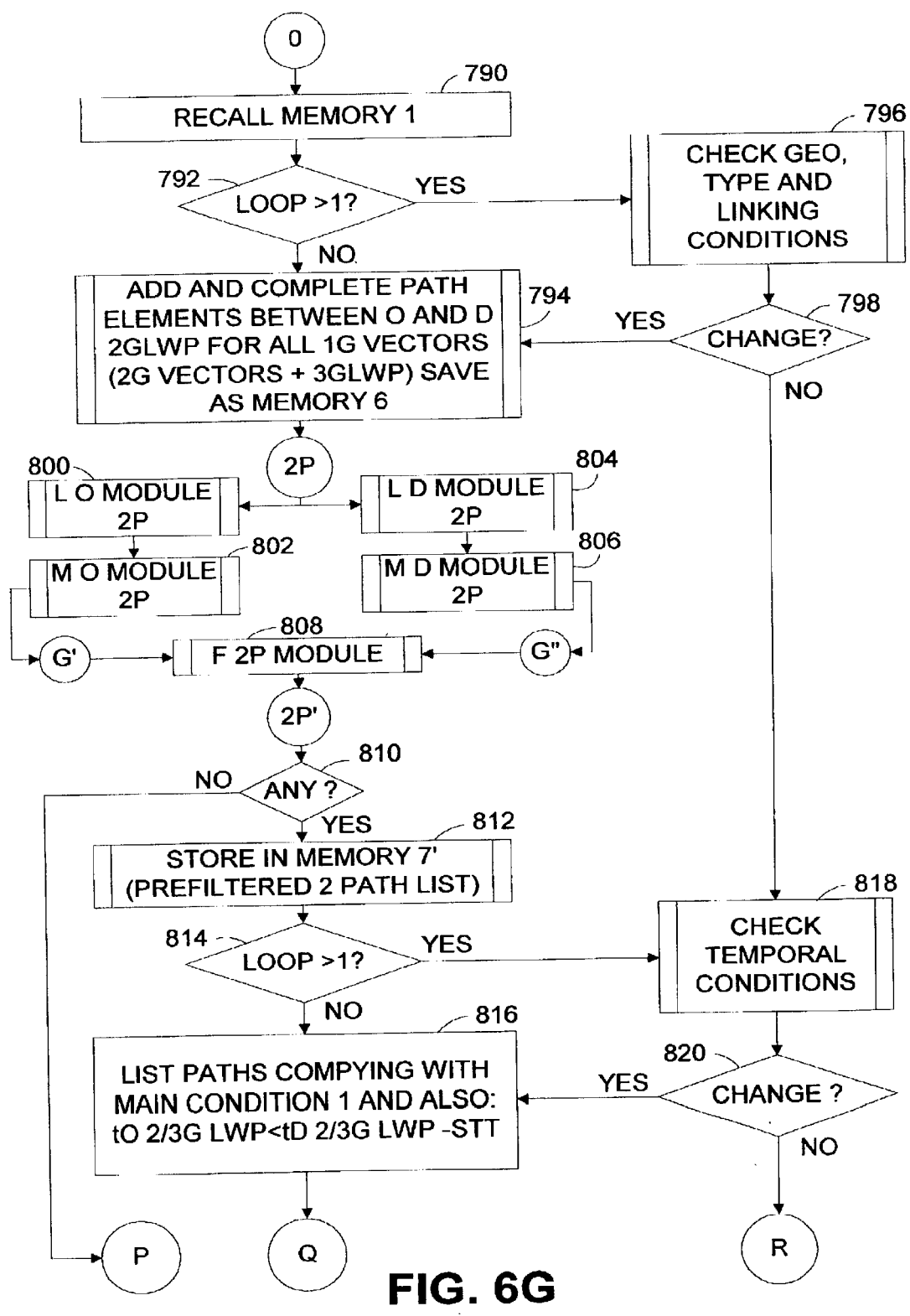
Figure 6H:
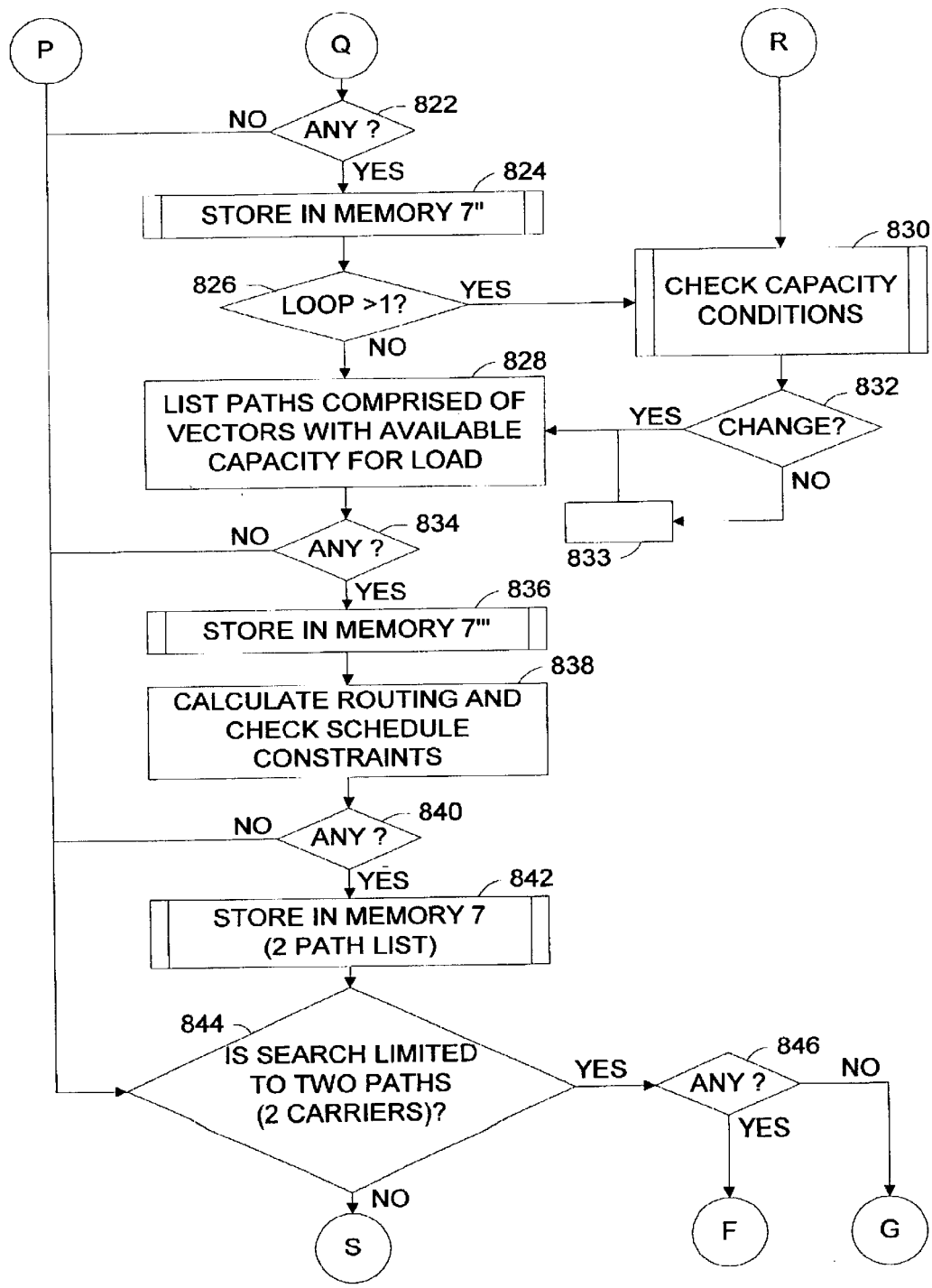
Figure 6I:
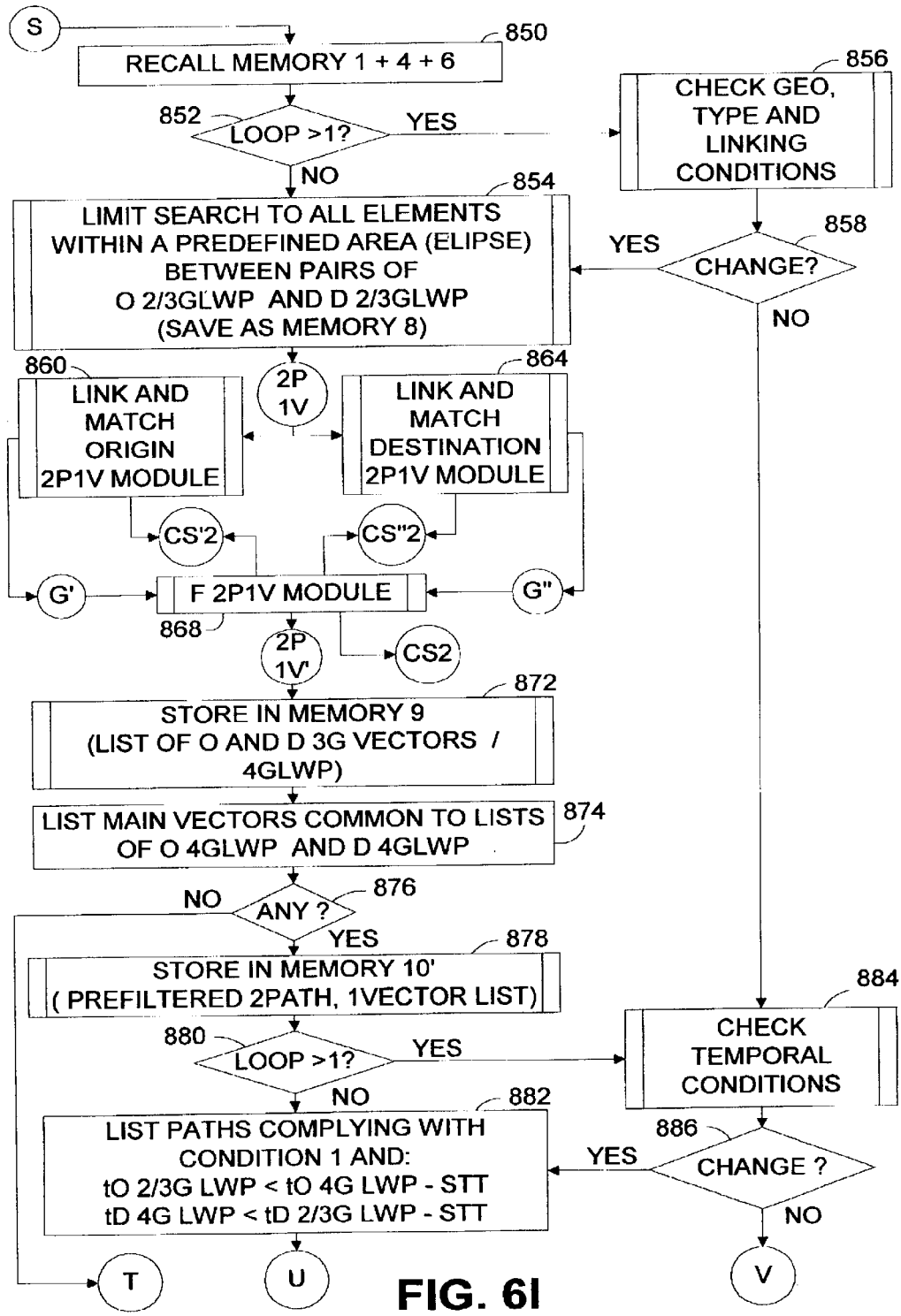
Figure 6J:
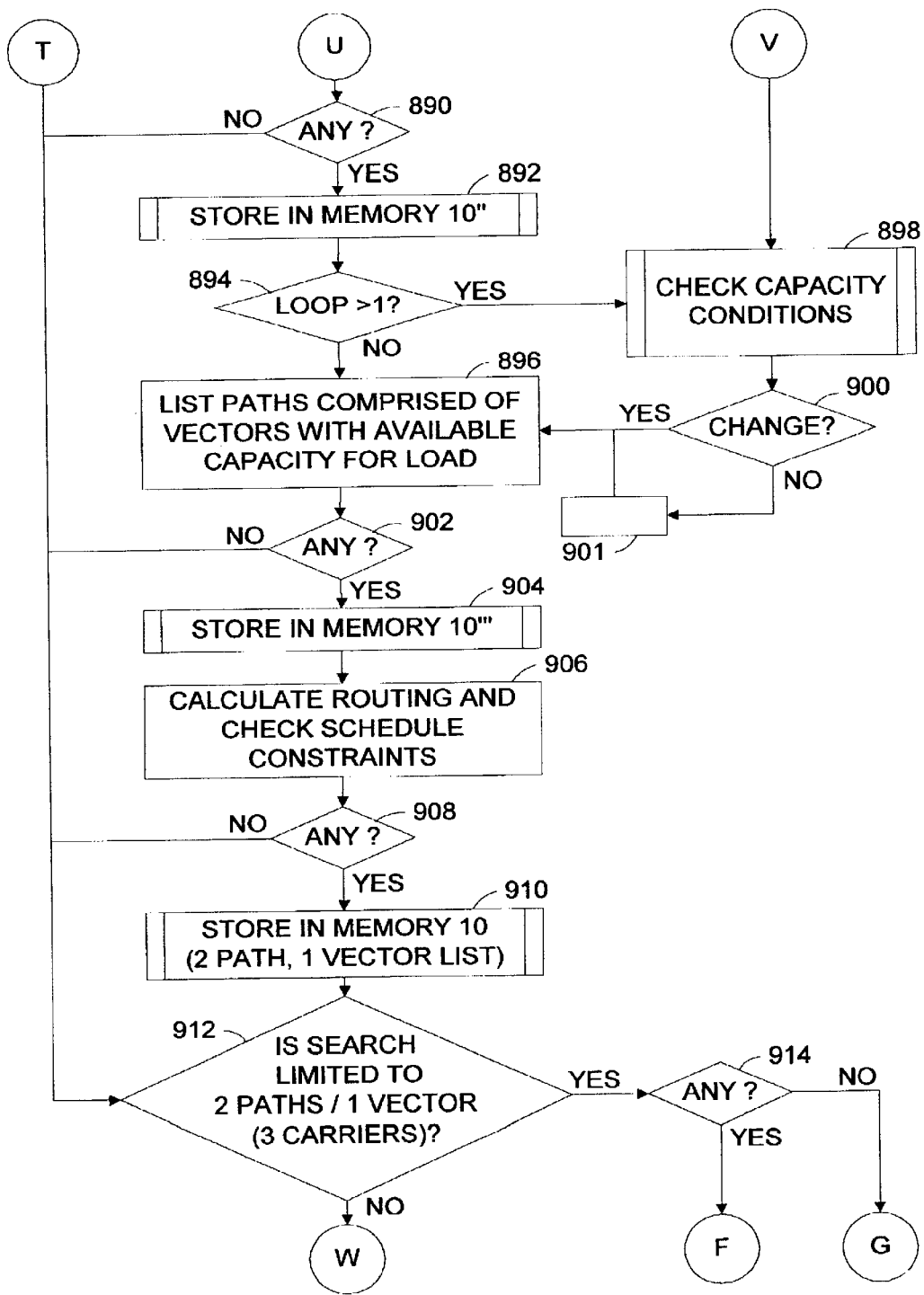
Figure 6K:
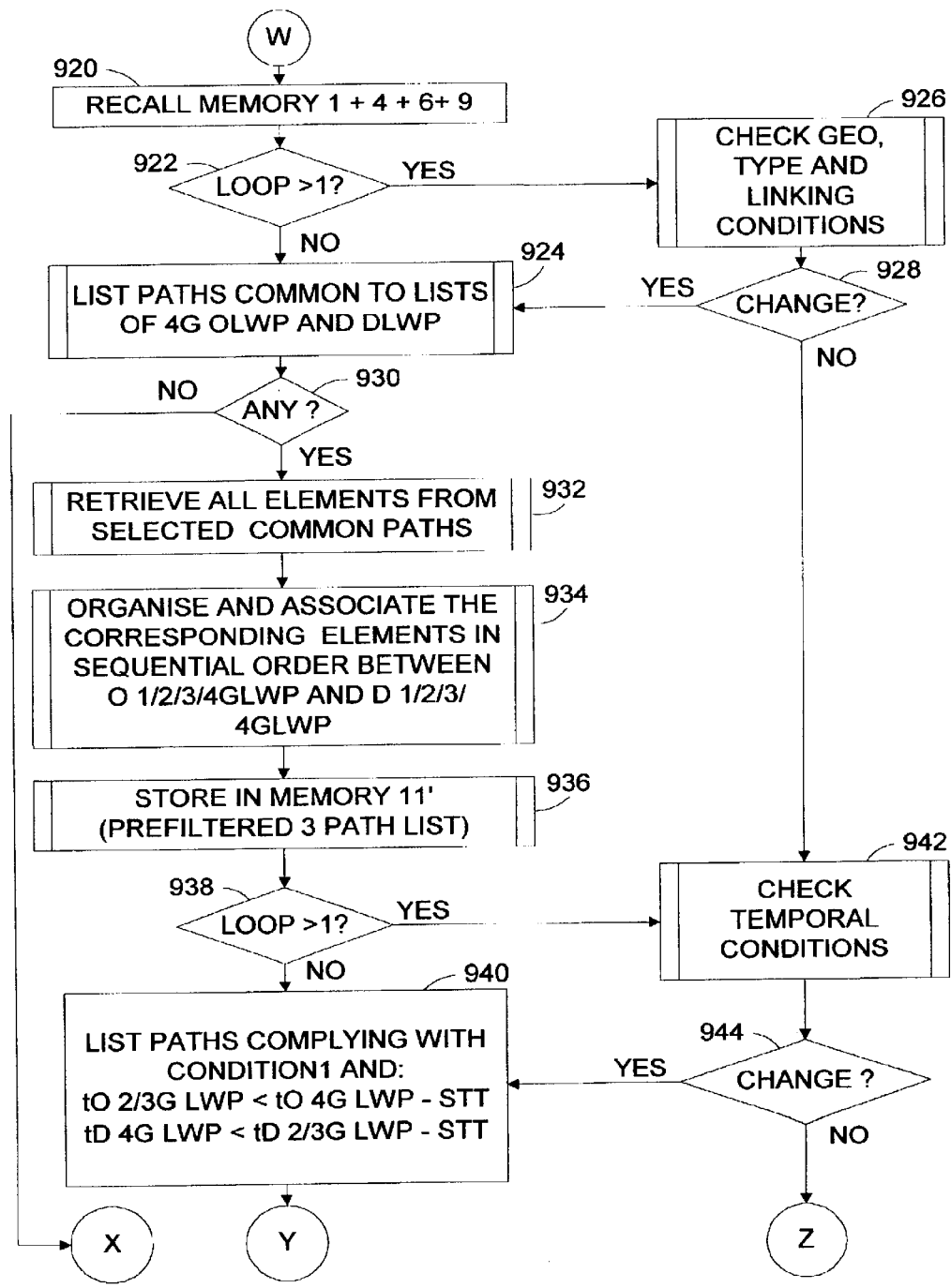
Figure 6L:
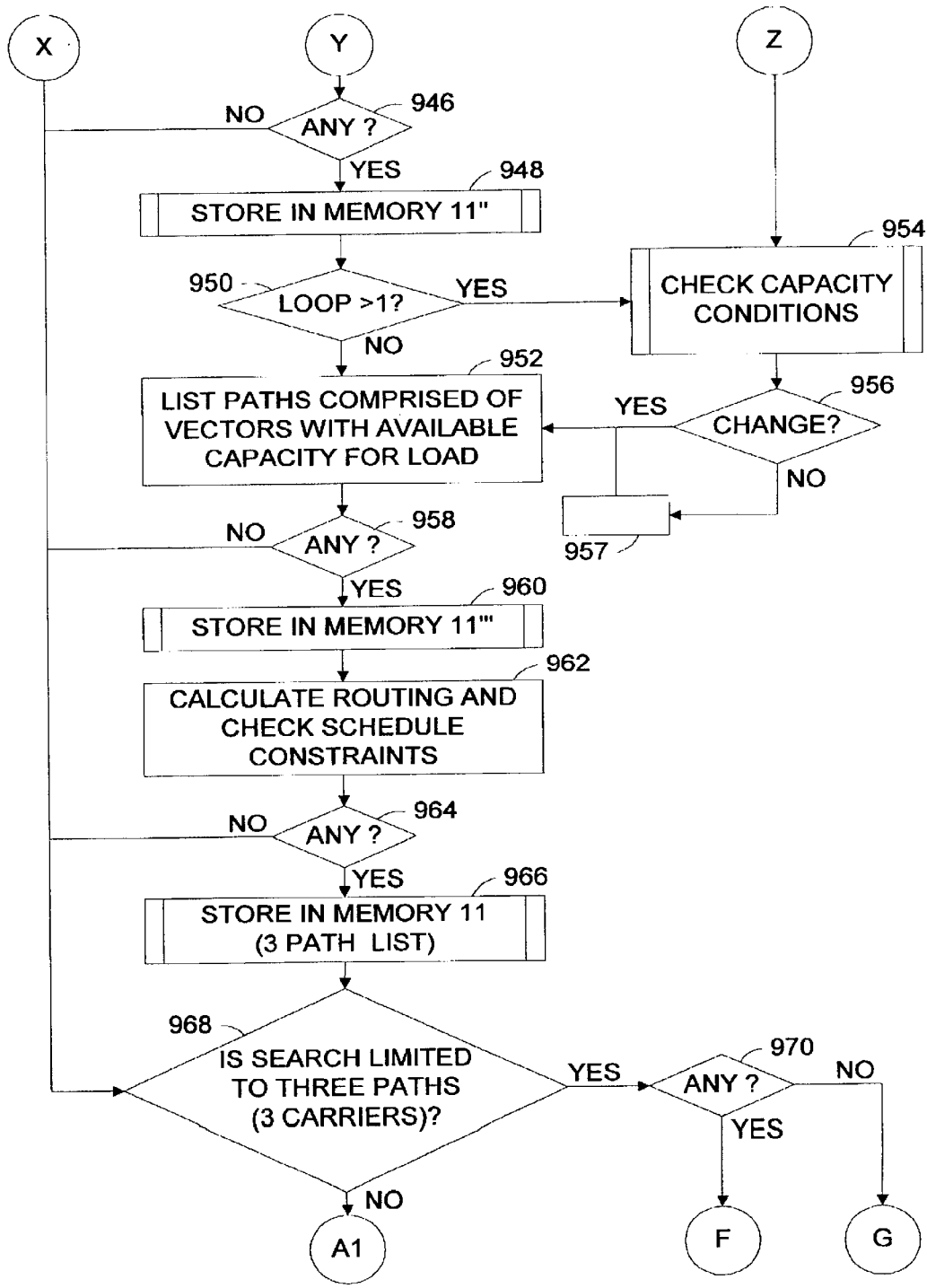
Figure 6M:
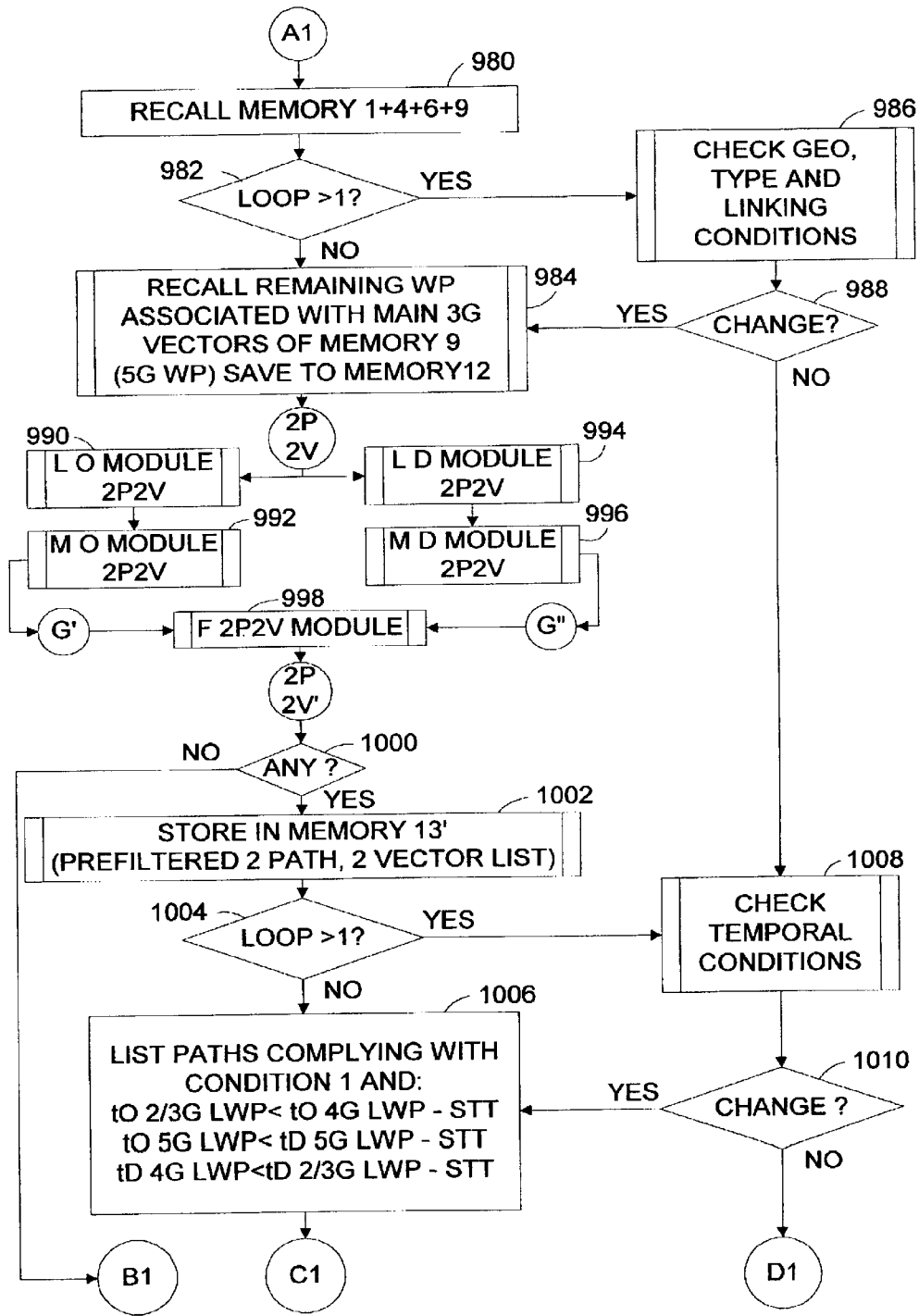
Figure 6N:
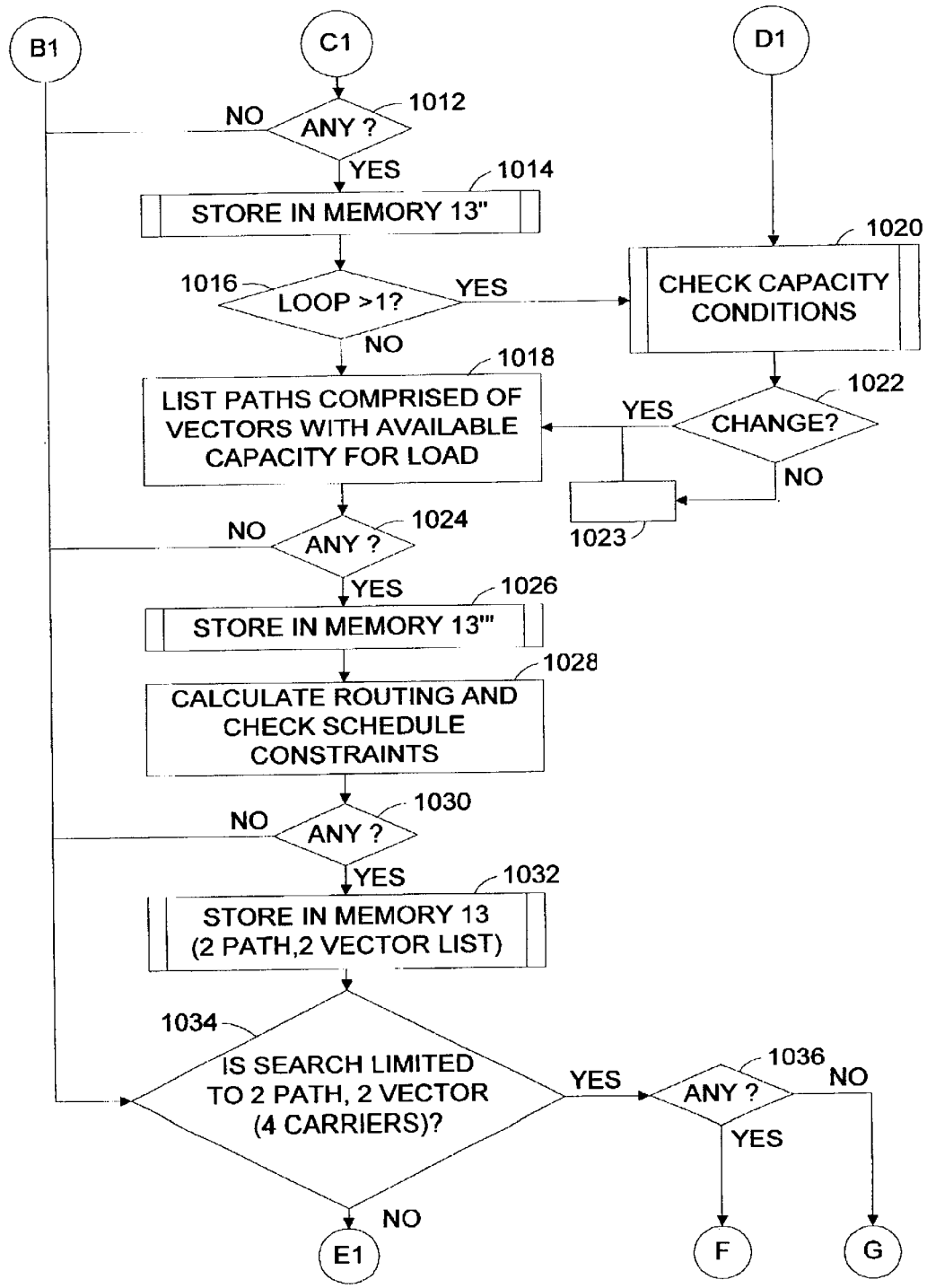
Figure 6O:
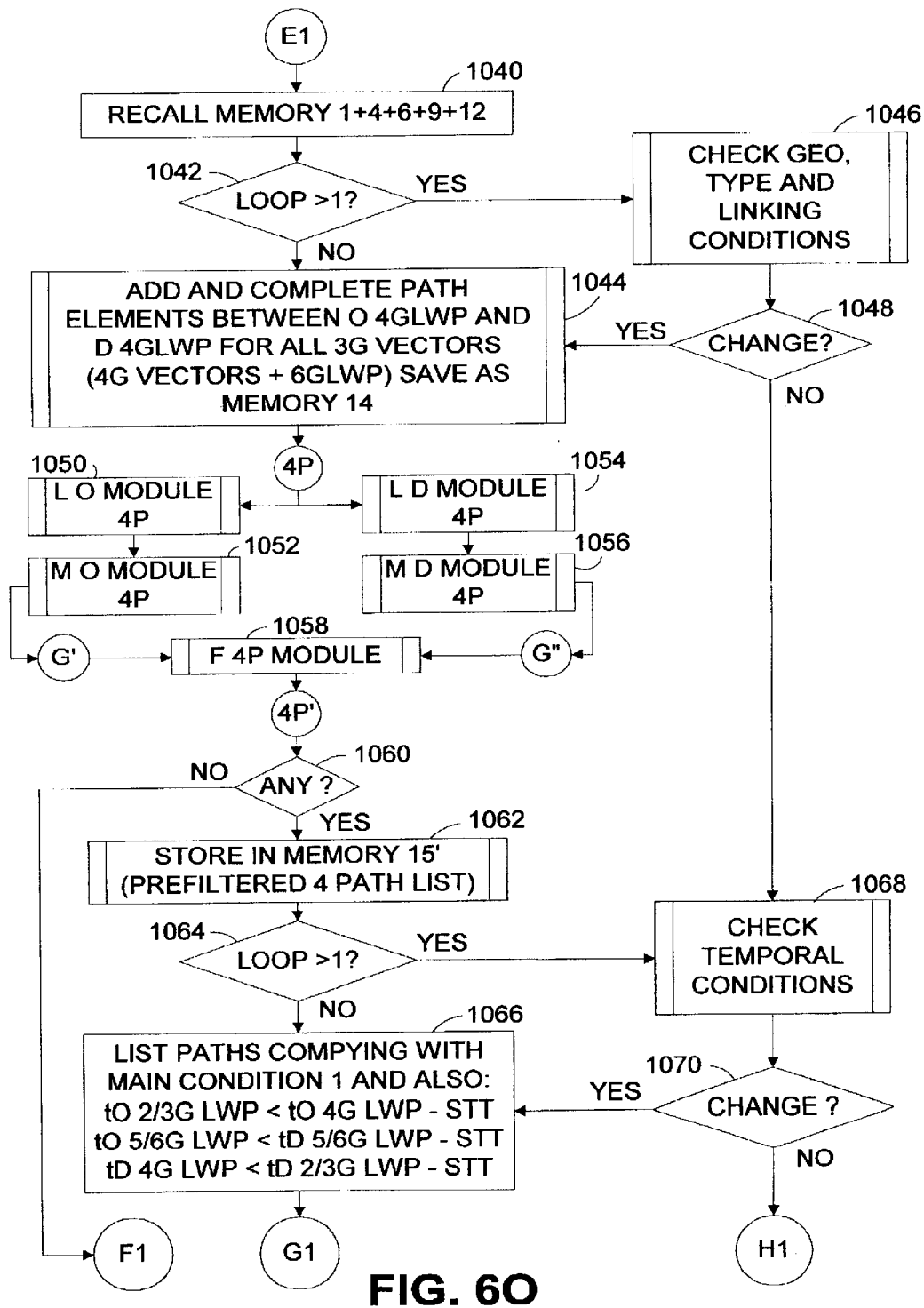
Figure 6P:
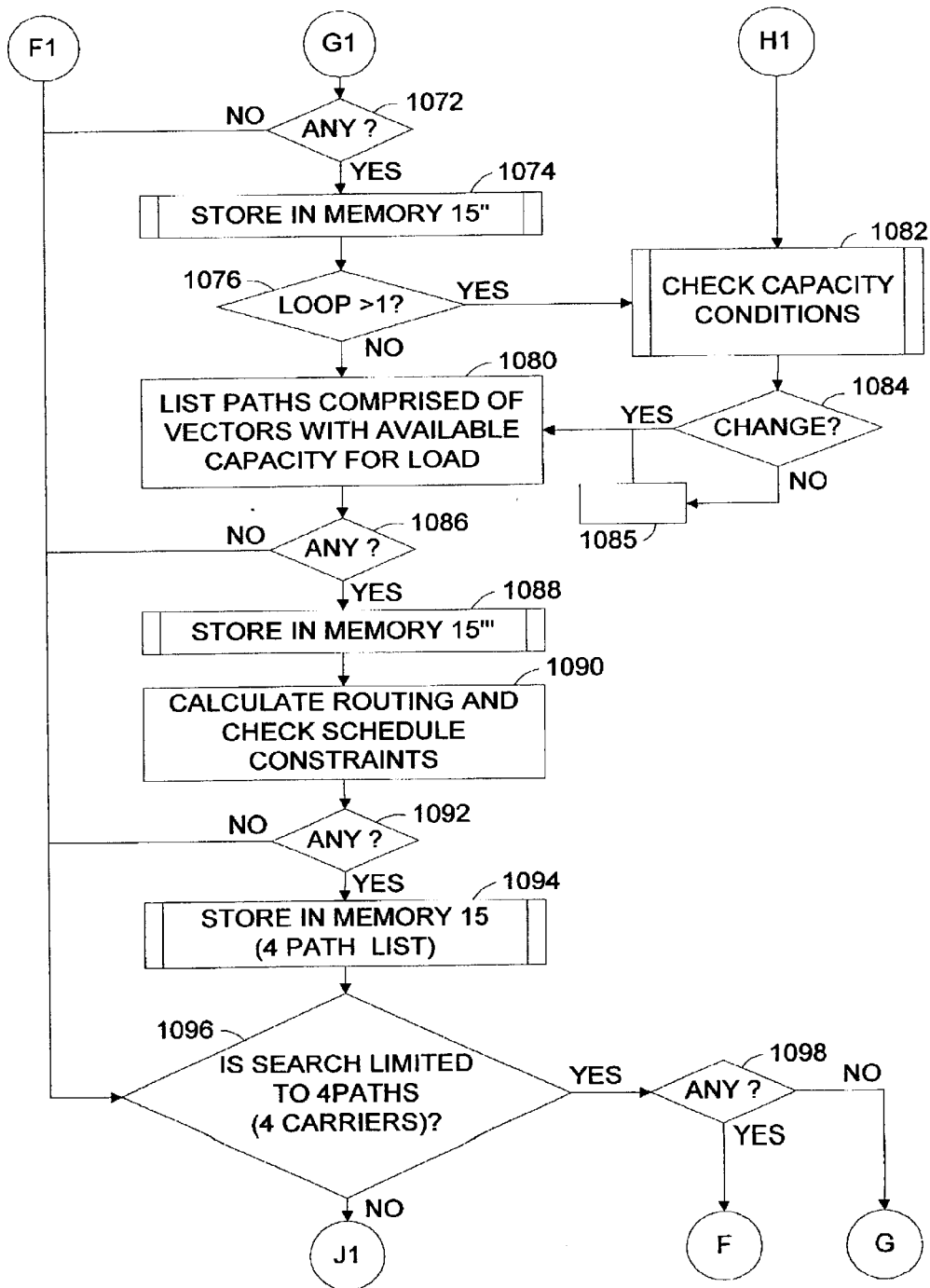
Figure 6Q:
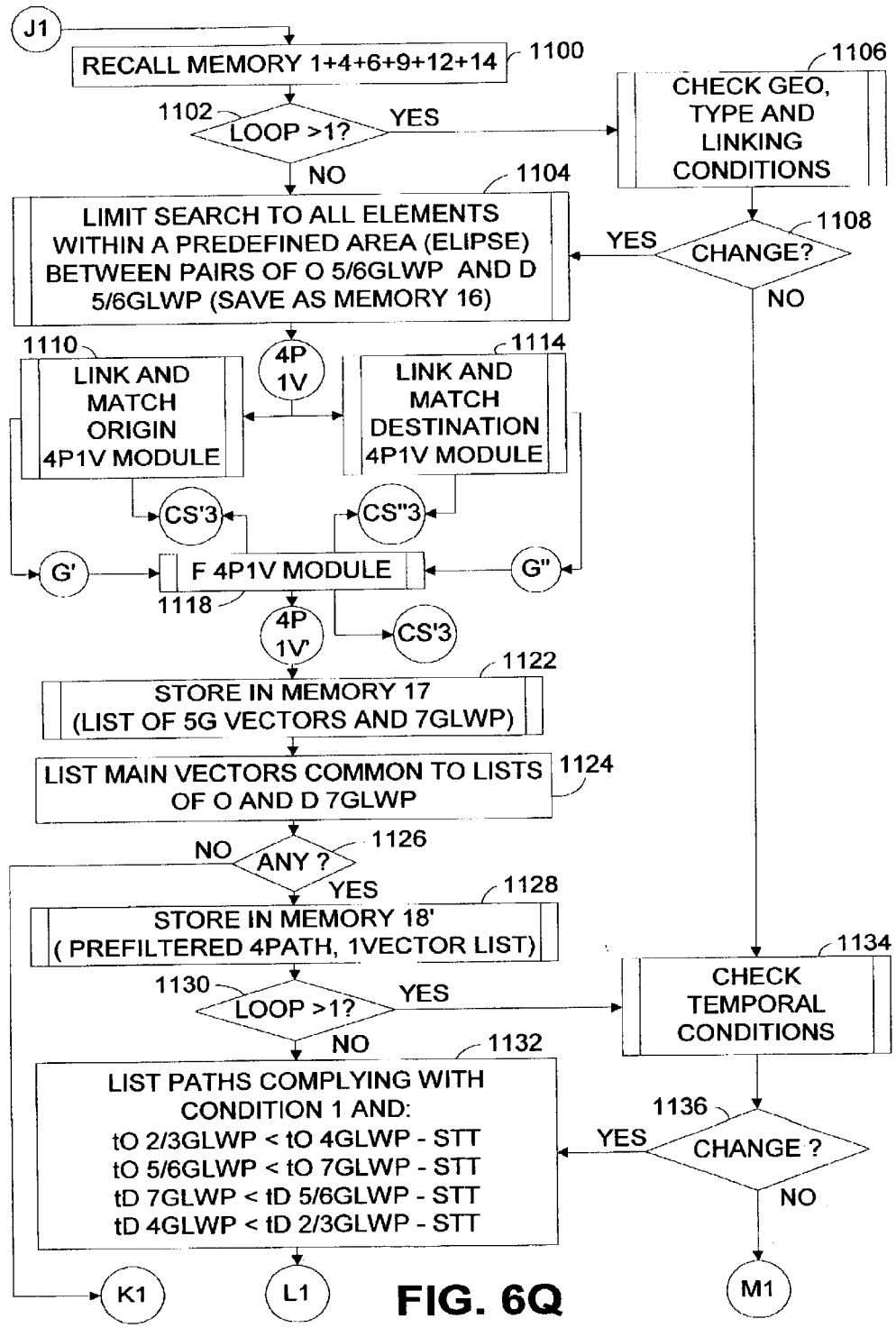
Figure 6R:
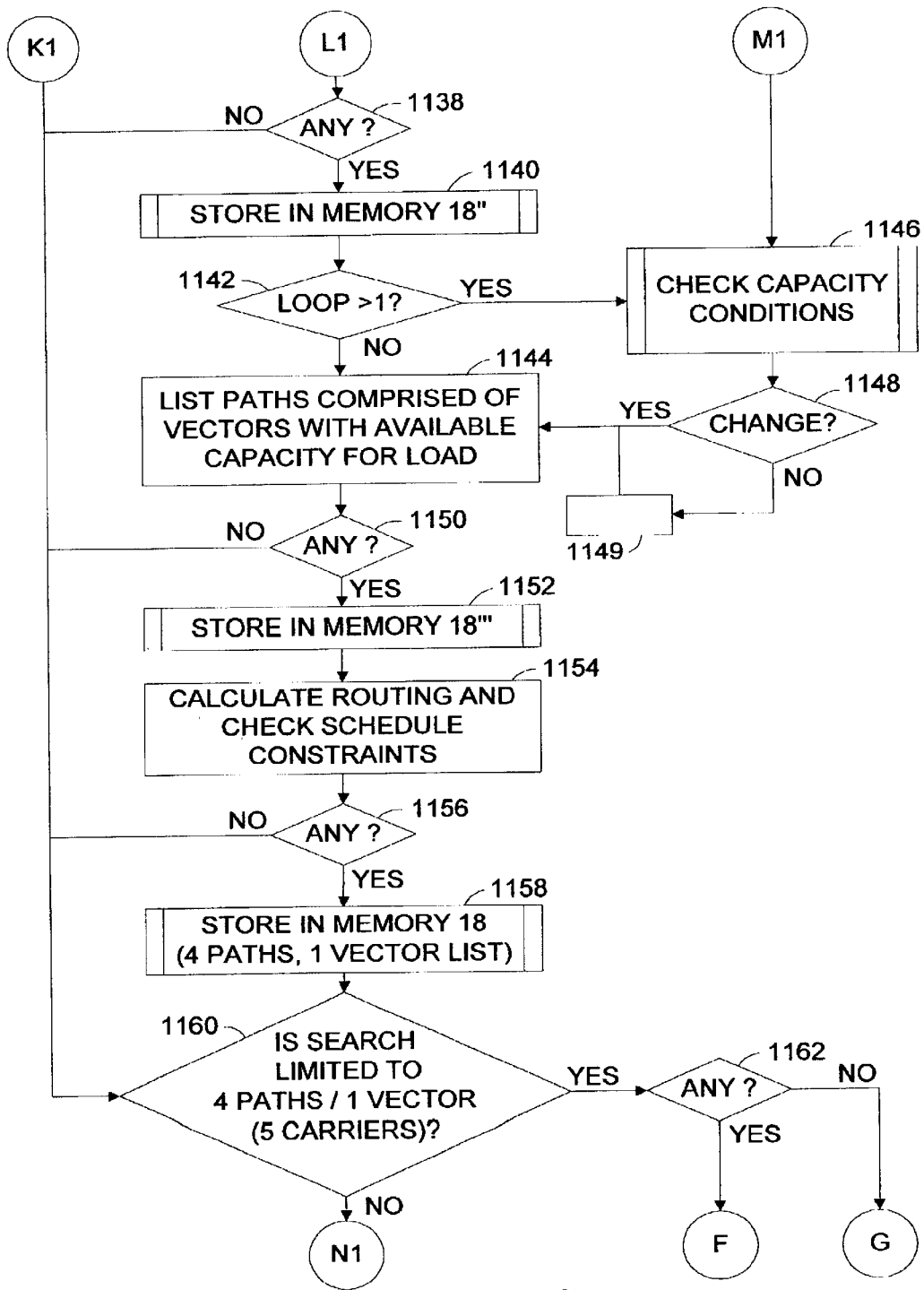
Figure 6S:
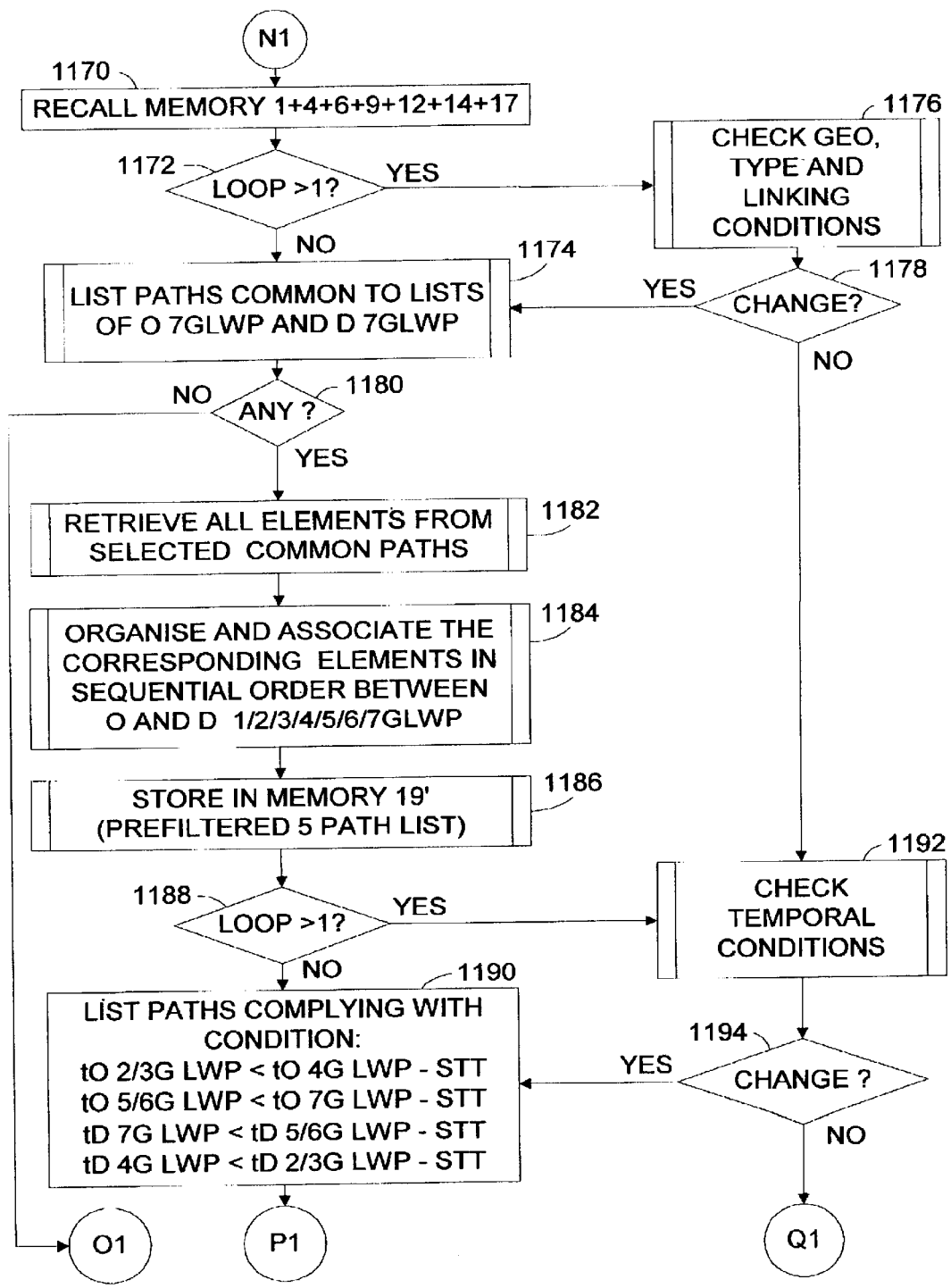
Figure 6T:
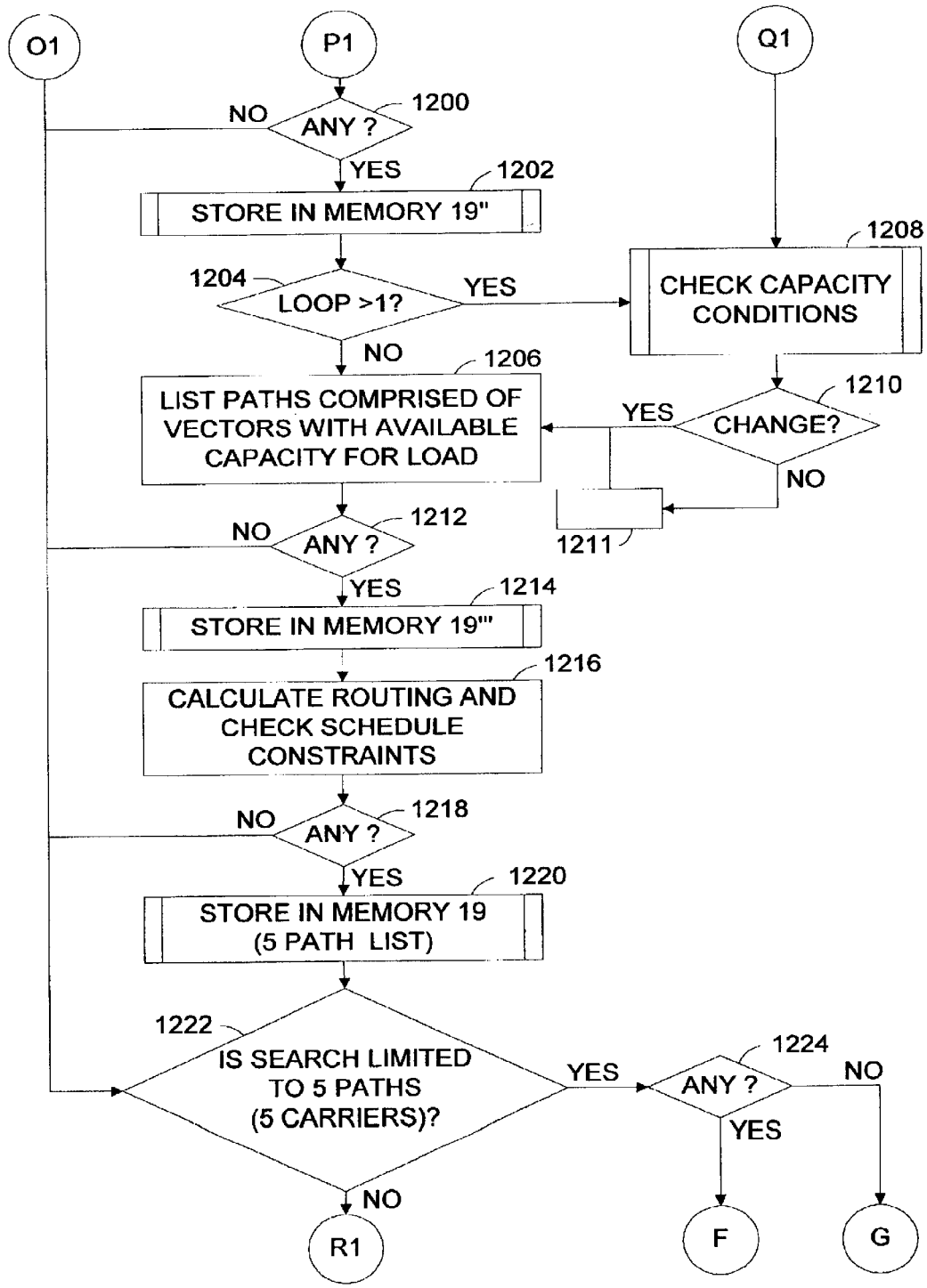
Figure 6U:
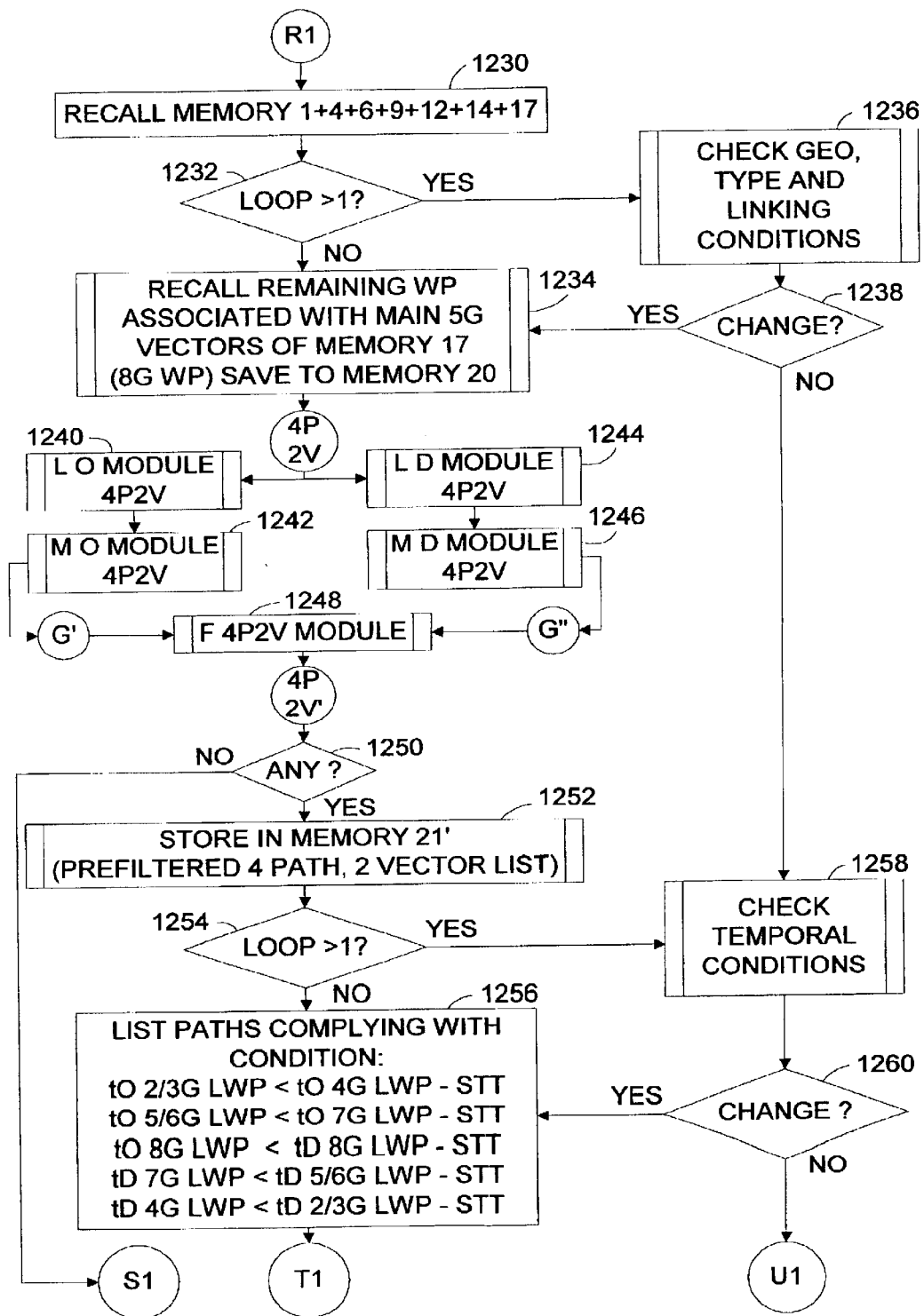
Figure 6V:
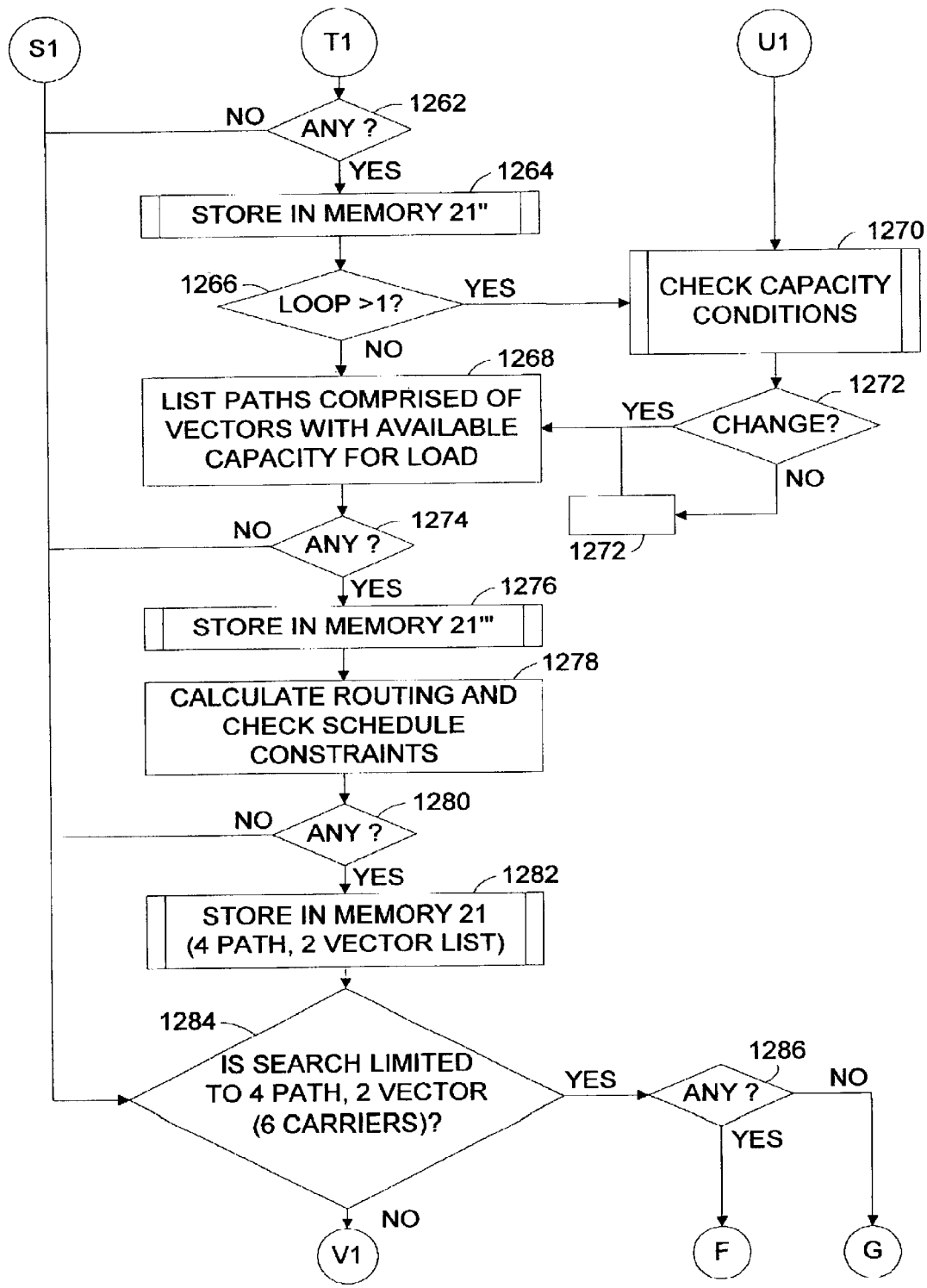
Figure 6W:
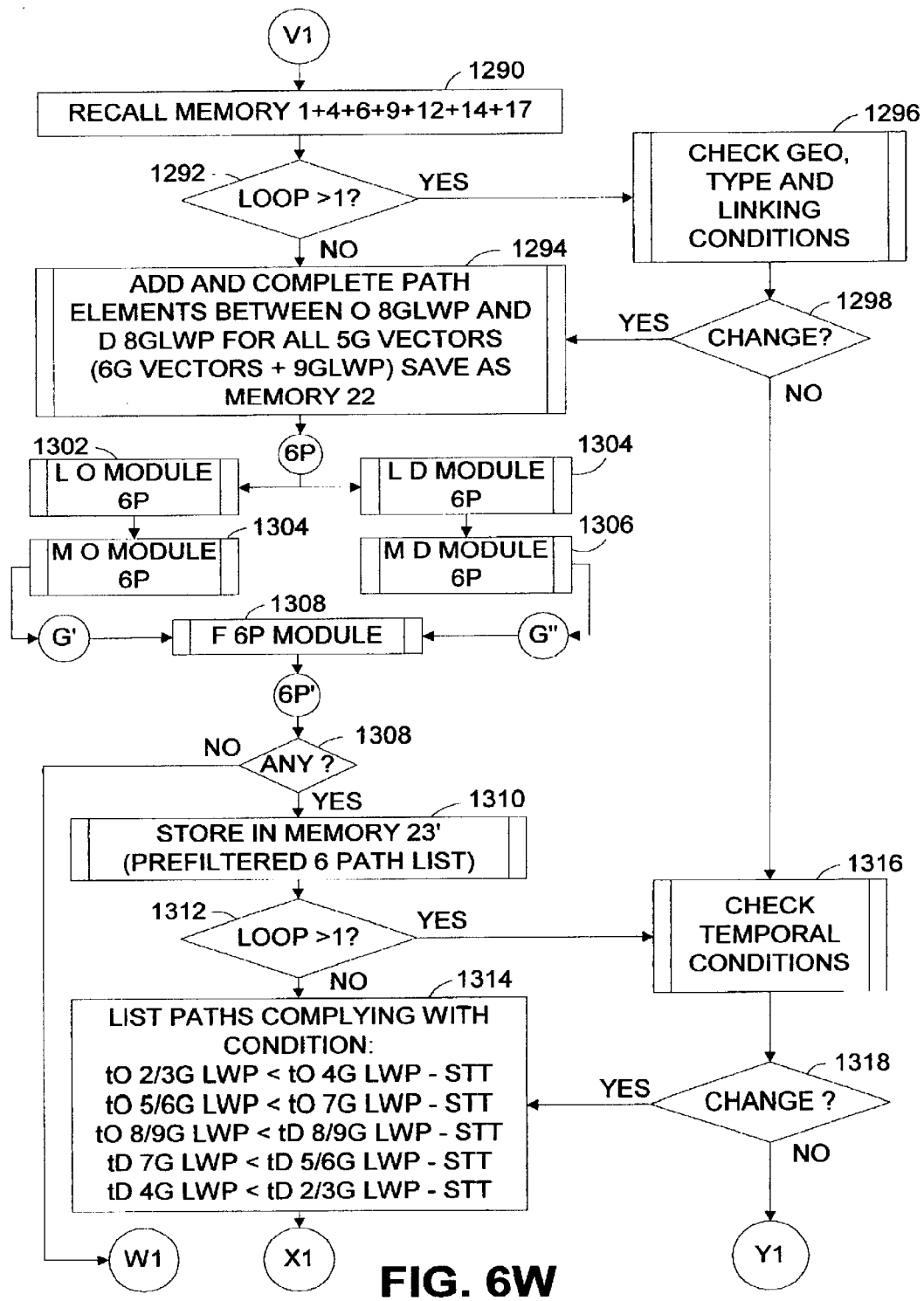
Figure 6X:
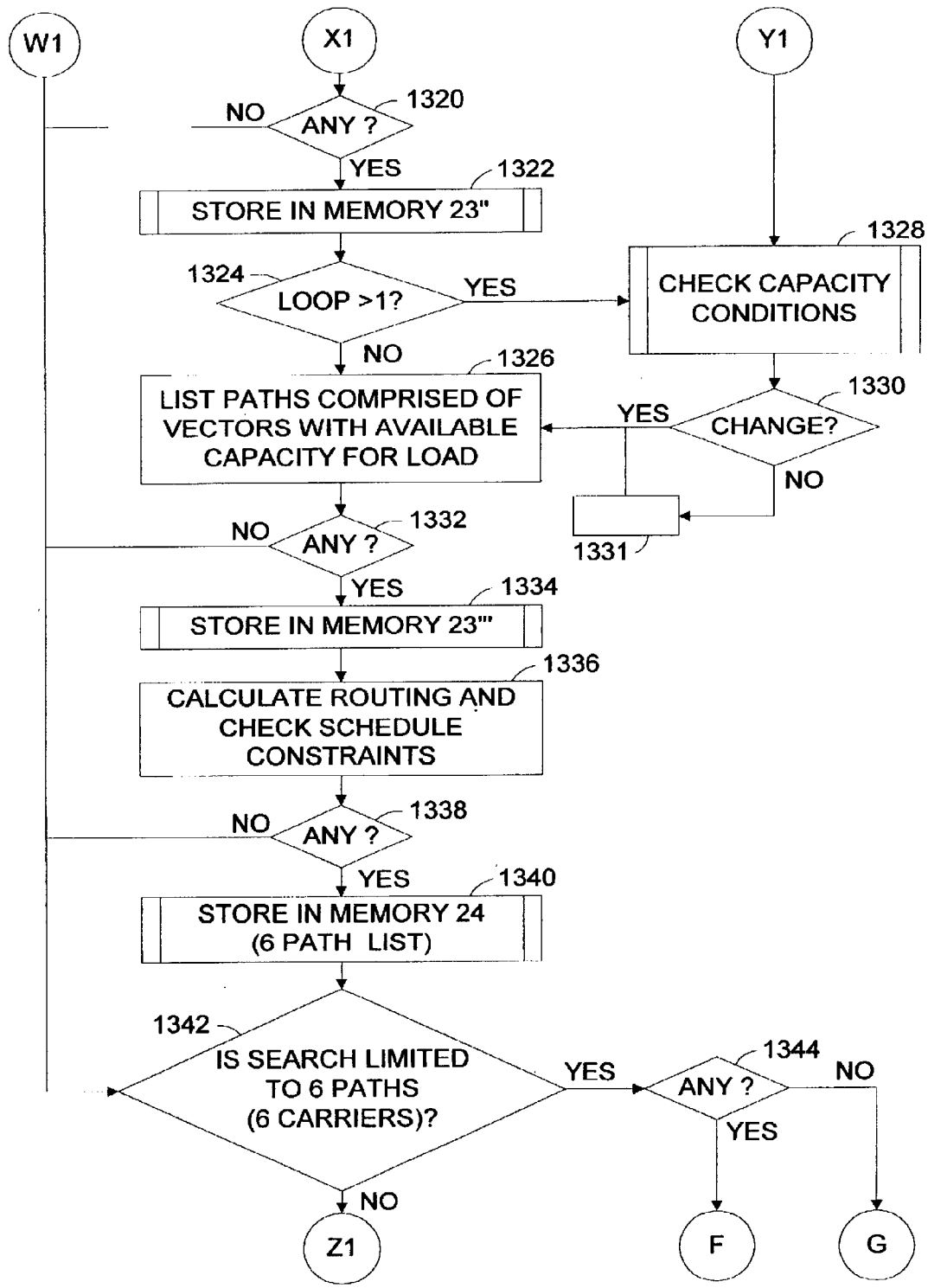
Figure 6Y:
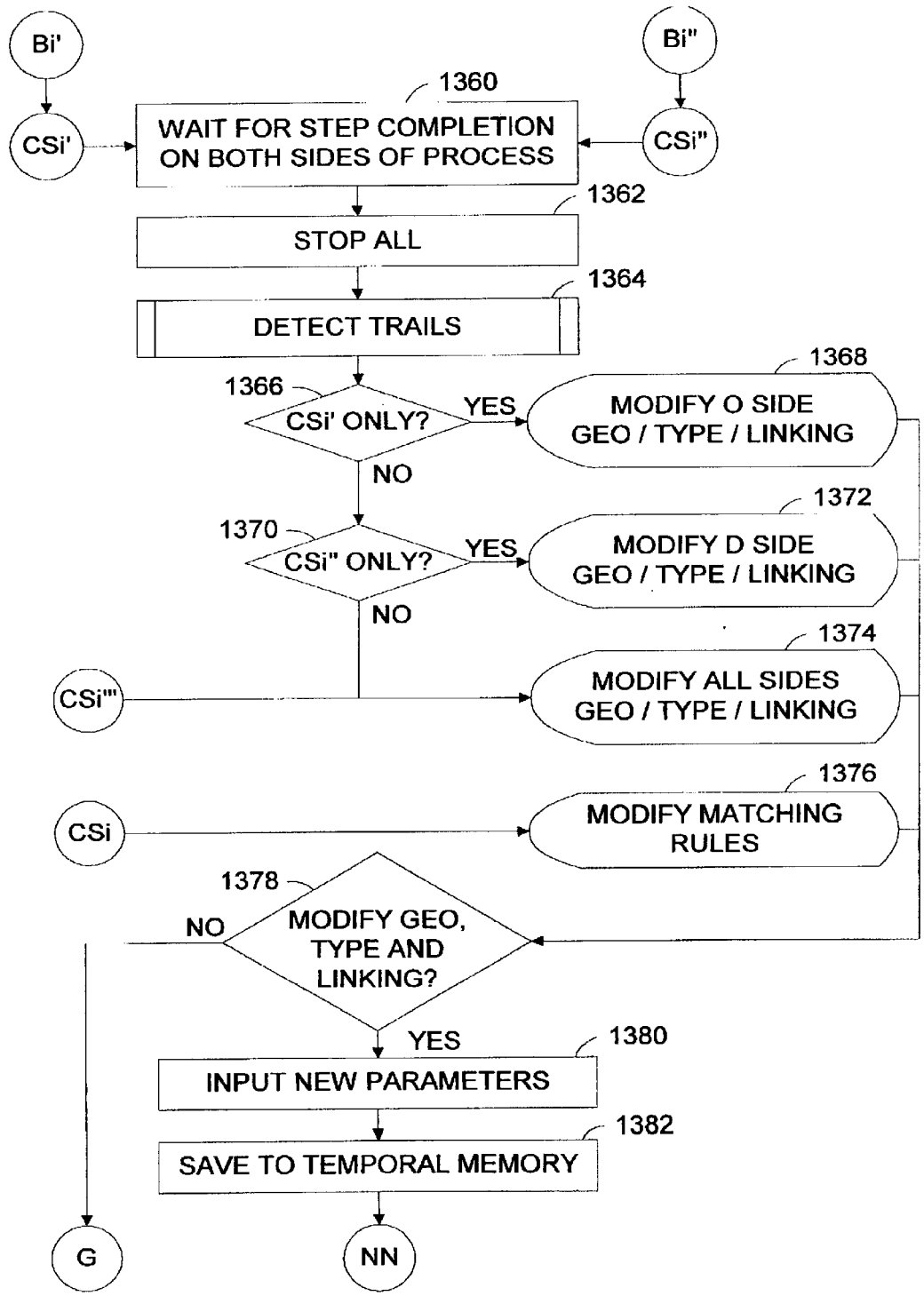
Figure 6Z:
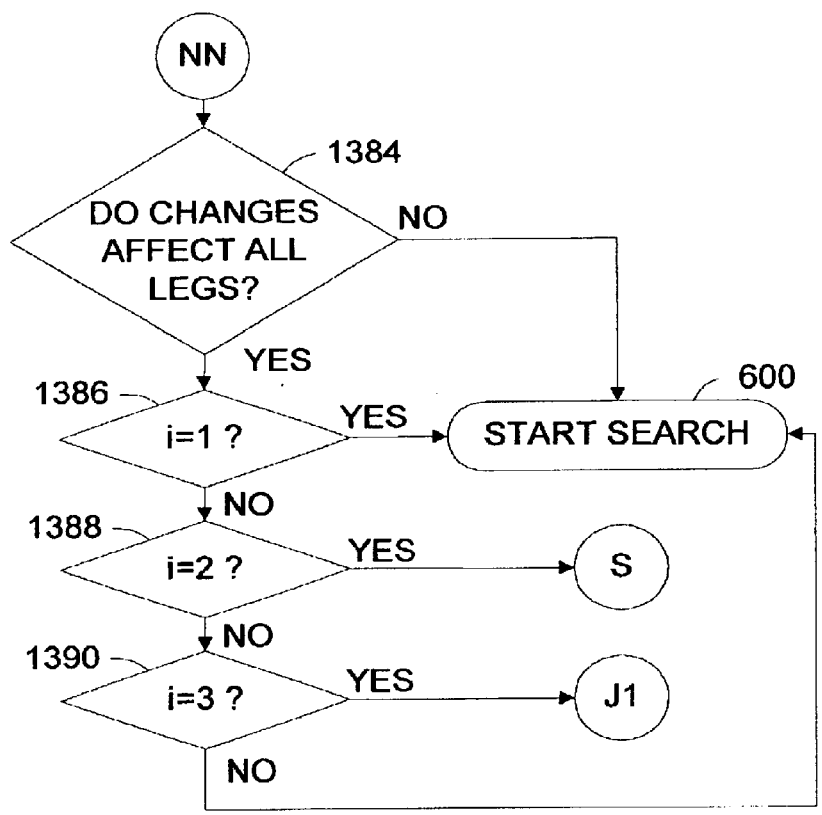
Figure 6Z:
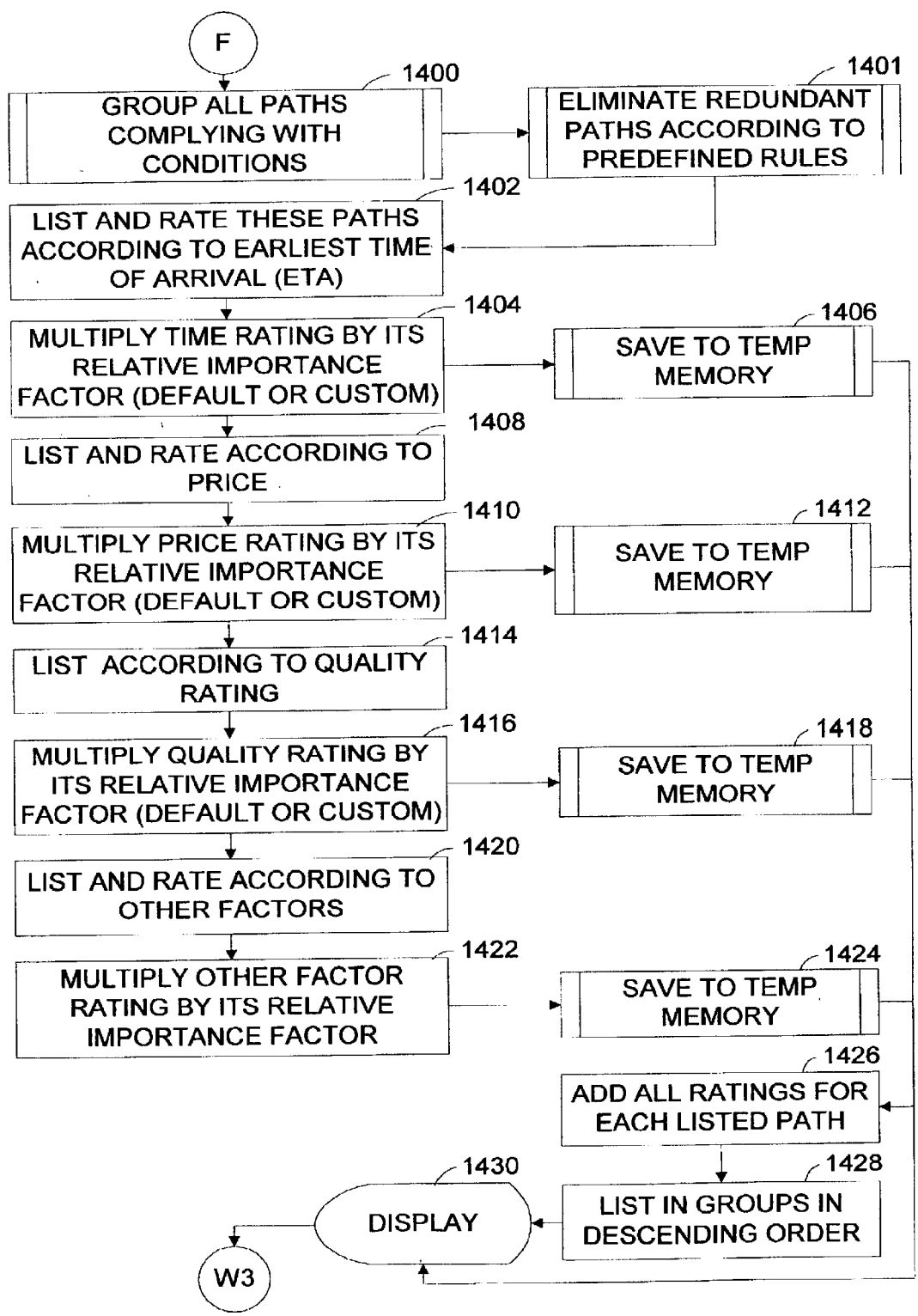
Figure 6Z:
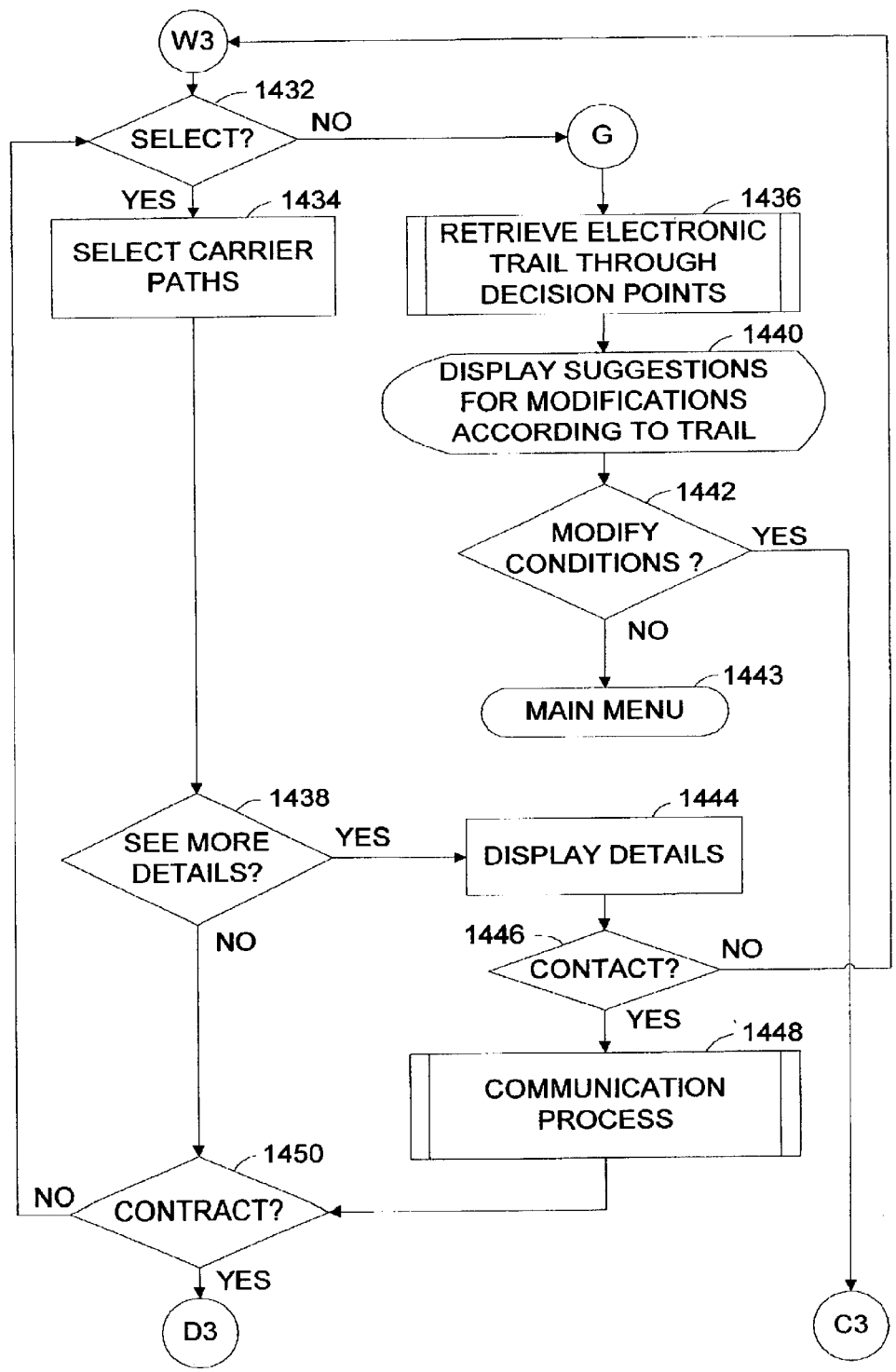
Figure 6Z:
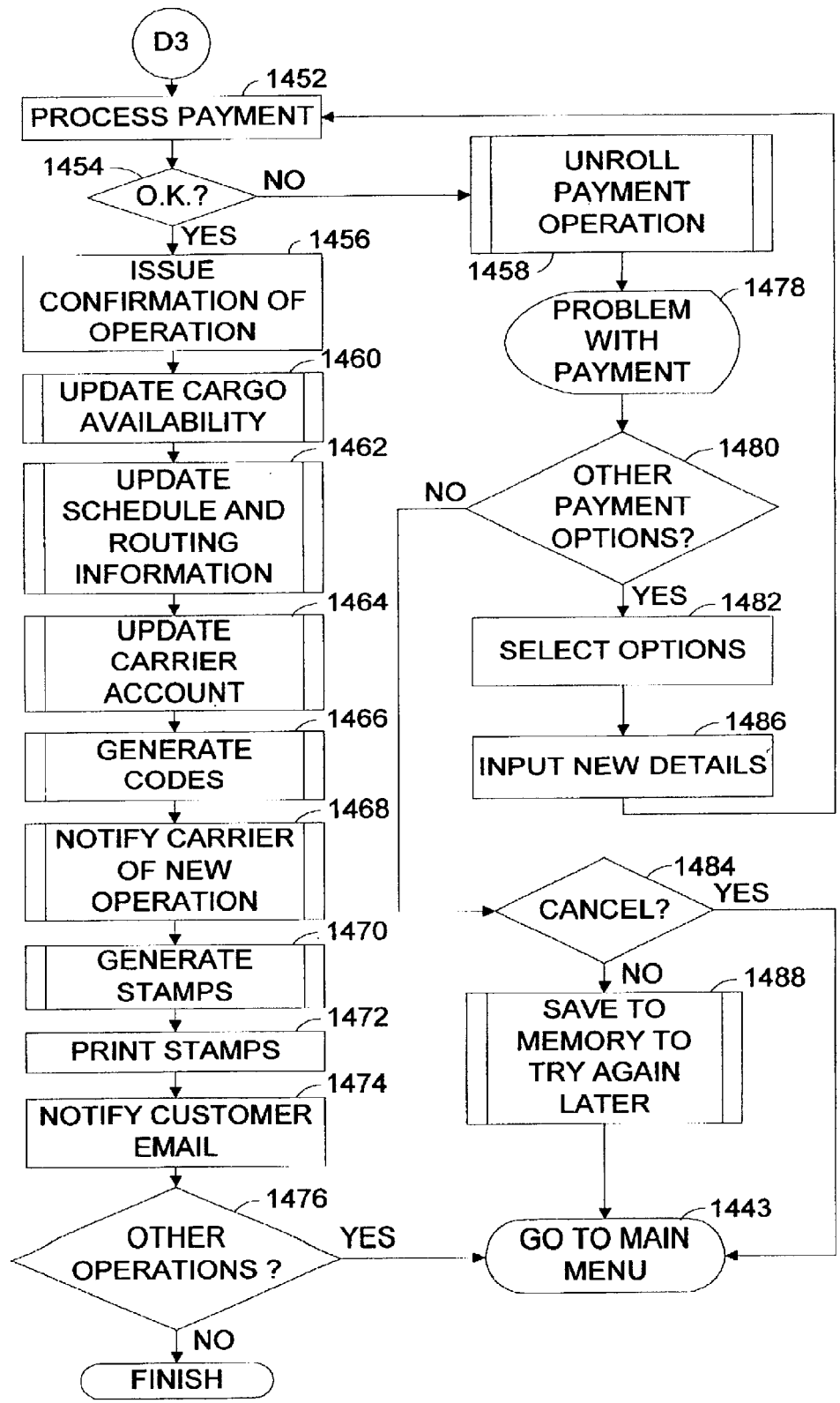
Figure 6Z:
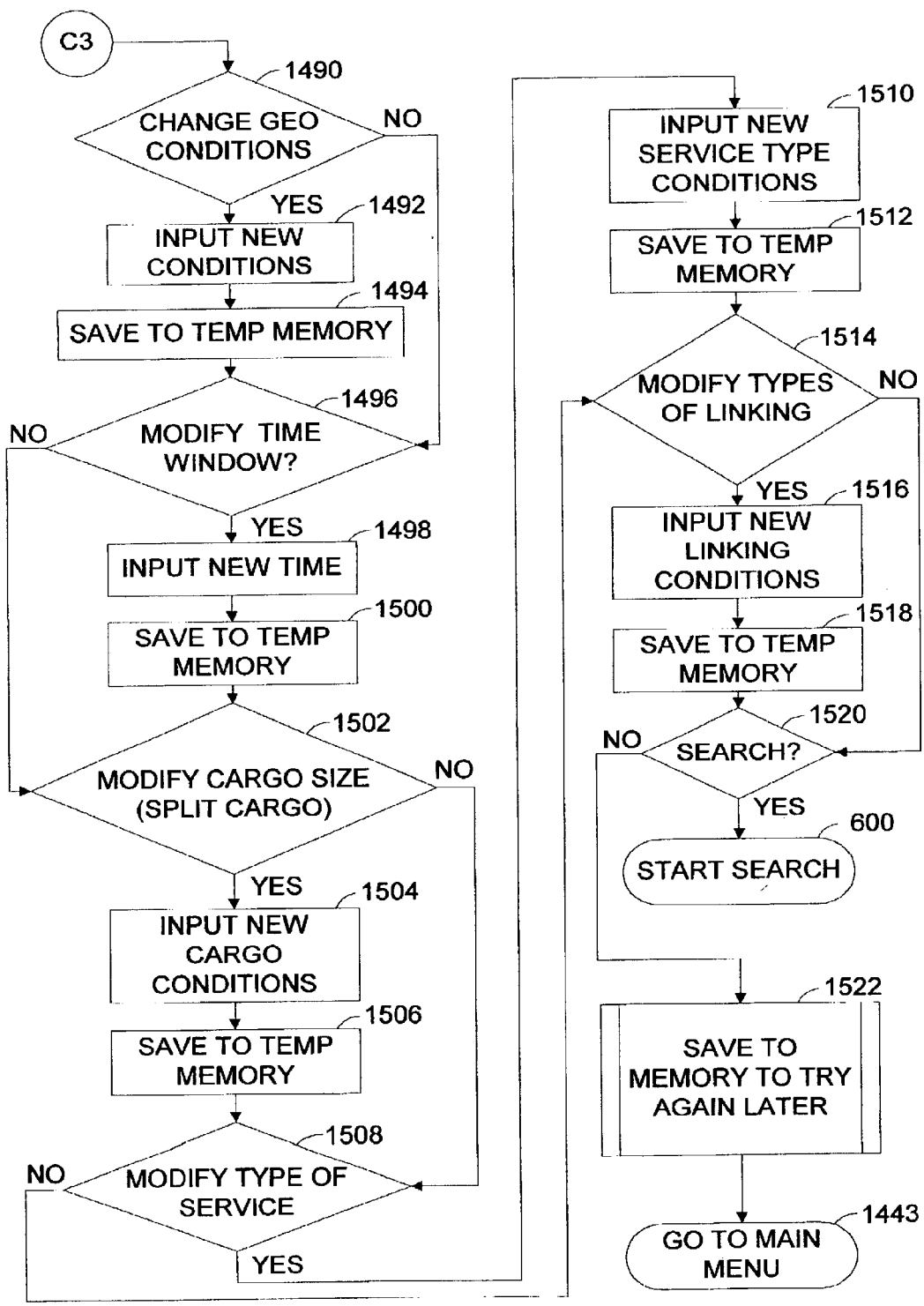

FIGS. 6A to 6Z—Is a flowchart showing the first stage of a service provider search process, which involves the search of service providers which can perform the transport operation in one leg.

For the purposes of this disclosure, we will refer to the terms "save to memory" as storage of information to a memory allocation and/or a form of indexing, classifying or organizing information with the purpose of retrieval or more efficient retrieval of that information. Assuming the user, likely to be a shipper, arbitrageur, clearing house, freight broker or a transport related information seeker has already input the load data, including attributes such as origin, destination, associated areas, type, dimensions, weight and time constraints through menu driven interfaces such as those shown in FIG. 12A, the process will start with a "start search" command 600 on FIG. 6A.

The search process then decides at 602 if this is the first enquiry related to a load, or if it is a modified enquiry related to a load searched immediately before.

In the first case, which would be the initial run through the flowchart, is defined as "loop=1", so the next step is a filtering module 604 that limits the search process to all path elements within a predefined area of interest encompassing the origin and destination of the load, in order to rule out any substantially offset transport paths. This area is usually an imperfect ellipse in the preferred embodiment, but any shape constructed to limit the search of path elements to a desired scope in relation to the origin and destination points is also possible. In a geographical system that organizes different geographic areas through grids and tiles, in a comparable manner as atlas books break down geographic areas into different pages which are themselves divided through a page grid system into page tiles typically identifiable by alpha-numeric characters, like for example zone C-5 representing the tile produced by the intersection of the column C and the row 5 in a grid system where the different columns are identified by alphabetically ascending letters to the left and the different rows by ascending numbers from top to bottom.

In a geographic system as the one mentioned above, the area of interest could also be limited at filtering module 604 by selecting relevant tiles between the two points. One simple example for two points, one falling in tile C-5 and the other in tile S-20, would be to select the area of interest as the square which has these two tiles as vertices, i.e. the square defined by tiles C-5, C-20, S-5 and S-20, and therefore selecting all tiles with this square as the relevant area. Many algorithms could be developed to select relevant areas that span through different pages or that have different or more sophisticated shapes including the above-mentioned imperfect ellipse.

All the path elements found within this area are set aside for more efficient immediate retrieval and stored as Memory 0.

The next step of the flowchart is to continue simultaneously to an origin-matching module 606 and a destination-matching module 608, both followed by a filtering module 614. These modules are explained in detail in FIG. 14, but a brief description will be given here.

The purpose of the origin module 606 is to find vectors that have link types that are compatible with the load attributes and associated areas encompassing the origin point.

The purpose of the destination module 608 is to find vectors that have link types that are compatible with the load attributes and associated areas encompassing the destination point.

The purpose of the filtering module 614 is filtering the matched elements according to their various rules including their link compatibility arising from the type of waypoint service link, such as those mentioned in FIG. 5A and to organise and associate the relevant remaining path elements of each of the matched elements.

The flowchart continues then with a "save to memory" module 622, which stores for future recall, two lists, one of all filtered vectors and waypoints that may be successfully associated for pick up from the origin point of the load and another for delivery to the destination point of the load.

The first list would be the group of vectors having a linkable waypoint LWP with an associated area that encompasses the load origin.

The second list would be a group of vectors having a linkable waypoint LWP with an associated area that encompasses the load destination.

We call these vectors "first generation vectors" or 1GV and their relevant waypoints, i.e. the waypoints that have associated areas encompassing origin and/or destination points, will be termed "first generation linkable waypoints" or 1GLWP. An "O" or "D" preceding these terms defines whether they refer to the Origin or the Destination points. For example, the Origin's group of first generation vectors would be referred to as "O 1GV" and the Destination's group of first generation linkable waypoints, would be referred to as "D 1GLWP".

Furthermore, the vectors departing from the nearby area of origin and the vectors arriving to the nearby area of the destination, i.e. the O 1GV having a starting 1GLWP and the D 1GV having a finishing D 1GLWP, will be termed MAIN 1GV's and the remaining will be termed AUXILIARY 1GV's.

The flowchart now continues to a next step 624, which is the first attempt to find a solution for matching the load path, with a service provider path.

In this step 624 the two lists mentioned above are compared to see if there is any single vector that is common to both lists, which would be a vector likely to be able to pick up at the origin and deliver to the destination of the load, in a single leg.

If the answer is "yes", at a next decision point 626, we have one or many possible solutions which we call "One vector" solutions, referring to their single leg characteristics, which we then store at a next step 624 in memory 2' as a pre-filtered "One Vector" list.

If the answer is "no" at decision point 626, then no "One Vector" solutions are available and the flow continues to a decision point of FIG. 6B, which checks if the search is limited to non-stop single leg solutions, i.e. One vector solutions, to start searching for the next possible alternatives. At a decision point 630 the flow is checked to see the status of the enquiry, whether it is the original, or a modification of the original. If the enquiry is the original, the path "no" is followed to a next filtering module 632, which checks the time compatibility of the vector and waypoints of list stored at 622 with the requirements of the load.

The filtering module checks for the compatibility of load time attributes with vector time attributes including the times for start and finish windows at the first generation waypoints related to Origin and Destination, represented by tO 1GLWP and tD 1GLWP.

The list is reduced to the origin related vectors with tO 1GLWP falling within the load's minimum and maximum time of departure and the destination related vectors with tD 1GLWP falling within the minimum and maximum allowable time of arrival.

If there are any vectors remaining after the temporal filtering 632, then after a next step at decision point 640 of FIG. 6B, they are stored in memory 2" at 642.

At a decision point 644 the flow is checked to see the status of the enquiry, whether it is the original, or a modification of the original. If the enquiry is the original, the path "no" is followed to a next filtering module 646.

The module 646 checks the load capacity of vectors stored in 642, against the load's dimensional attributes.

This task is done by the dimensional subsystem preferably aided by the rules and optimising subsystem and the space management module.

If there are any vectors remaining after the dimensional filtering 646, then after a next step at decision point 652 of FIG. 6B, they are stored in memory 2''' at 654.

The next step is a last filtering module 656 which checks if temporal constraints, not only of the load in question, but also of the service provider's remaining load consignments, can still be met, when including the deviation route to pick up and deliver the load.

This task is performed by the Temporal, Geographic and Rules & Optimization subsystems and essentially their routing and scheduling modules.

If there are any vectors remaining after the routing and schedule constraints filtering 656, then after a next step at decision point 658 of FIG. 6B, they are stored in memory 2 at 660.

The list of vectors remaining after the former filtering stages is stored in memory 2 as a final "One vector" list 660 and this is a first set of results to be processed.

The next step leads to a decision point 662 of FIG. 6B, which checks whether the search is limited to non-stop single leg solutions, i.e. One vector solutions, in order to start searching for the next possible alternatives. The same decision point 662 is reached if no results are available after the filtering modules at decision points 640, 652 and 658.

If the search is limited to non-stop single leg solutions at 662, the next step checks if any solutions are available, i.e. if there are any vectors in the "one vector" list of 660, in which case the next step follows on to "F" on FIG. 6ZA a module that sums up all final results for classification according to system default or user defined criteria.

If no results are available at 664 the next step follows on to "G" on FIG. 6ZB, a module suggesting possible modifications or leading to the main menu.

In case of modifications, and with the object of skipping unnecessary recalculation and filtering, the second, third or further modified enquiry will be tagged as a second run through the flowchart, which will be defined as "loop>1", so the next step will be a module 616 that checks whether there have been any changes regarding Geographical, service type, or linking type attributes. If there have been changes at this level, for example changing the origin point to another city, or taking the load to a depot facility nearby, at decision point 618, this will be reflected by returning to the filtering module 604 with the new conditions. On the other hand, if there haven't been changes at this level, a module 634 further checks whether the load's temporal attributes have changed. If there have been changes at this level, for example, increasing the maximum time of arrival of the load, at decision point 636, this will be reflected by recalling the original, or modified, pre-filtered "one-vector" list (memory 2') and filtering these paths with the new time constraints at module 632. On the other hand, if there haven't been changes at temporal level; a module 648 checks for changes in the dimensional conditions of the load and if there have been changes at this level, for example, splitting a load in two smaller ones, at a decision point 650 this would be reflected recalling the original, or modified, vector list of memory 2'' at 642 and filtering these paths with the new dimensional constraints at module 646. If there have been changes at a temporal level detected at 634 and no dimensional changes detected at 648, in order to improve efficiency of the dimensional filtering, the system can find the common vectors between the original and the new modified memory 2'' at 642 and store them straight to memory 2''' at 654 in addition to filtering the remaining non-common vectors of the new modified memory 2'' at 642 and adding them also to the memory 2''' storage at 654, saving therefore having to re-filter the original vectors complying with the new temporal conditions.

If the search is not limited to non-stop single-leg solutions, the next step after decision point 662 is to explore further possibilities in the shape of single carrier multi-leg solutions, which leads to the next step 668 of FIG. 6C, recalling the two lists of origin and destination first generation vectors 1GV along with the first generation linkable waypoints 1GLWP, previously saved to memory 1.

The next step at decision point 670 is to check whether the enquiry is original or modified and if original would follow on to a module 672 that endeavours to find all paths common to both lists. As the vector and waypoint nomenclature already includes the path to which it belongs, i.e. the "i" in Vij or WPij, it is very easy to find origin related elements and destination related elements, belonging to the same path.

If there are any paths found as a result, at the decision point 676, the process will continue to a module 680, which will retrieve all elements belonging to the respective common paths, for example as a search for all elements with matching "i" on an "ij" nomenclature.

This is followed by a next module 684 which organizes and associates all the corresponding elements of each path retrieved in step 680 in sequential order between the O 1G LWP and the D 1G LWP, noting that apart from all intermediate MAIN vectors between these waypoints, the AUXILIARY vectors finishing at a O 1G LWP and the vectors starting at a D 1G LWP will also be included if they existed, because each waypoint is related to its starting and finishing waypoints, which are directly related to their respective associated areas and vectors. This is done to increase opportunities in the case of vectors starting at O 1G LWP, or finishing at D 1G LWP, that cannot perform the pick up or delivery, in which case the duty might be performed before by the preceding vector, or after by the succeeding vector respectively.

The organization and association of the elements is accomplished by means well known in the art of databases as well as operational research.

The groups of path elements are then stored to memory 3' as a pre-filtered One path list 686.

The process from decision point 690 of FIG. 6C to module 720 of FIG. 6D is a filtering process similar to the previous filtering process between decision point 630 of FIG. 6A and module 660 of FIG. 6B. A final One-path list, if any, would be stored to memory 3 at module 720.

The next step at decision point 688 is to check whether the enquiry is original or modified. If the enquiry is the original, the path "no" is followed to a next filtering module 690, which checks the time compatibility of the path elements stored at 686 with the requirements of the load.

The filtering module checks for the compatibility of load time attributes with vector time attributes including the times for start and finish windows at the first generation waypoints related to Origin and Destination, represented by tO 1GLWP and tD 1GLWP.

The list is reduced to the origin related vectors with tO 1GLWP falling within the load's minimum and maximum time of departure and the destination related vectors with tD 1GLWP falling within the minimum and maximum allowable time of arrival.

We will call these conditions, "condition one".

If there are any vectors remaining after the temporal filtering 690, then after a next step at decision point 700 of FIG. 6D, they are stored in memory 3'' at 702.

At a decision point 704 the flow is checked to see the status of the enquiry, whether it is the original, or a modification of the original. If the enquiry is the original, the path "no" is followed to a next filtering module 706.

The module 706 checks the load capacity of vectors stored in 702, against the load's dimensional attributes.

This task is done by the dimensional subsystem preferably aided by the rules and optimising subsystem and the space management module.

If there are any vectors remaining after the dimensional filtering 706 then after a next step at decision point 712 FIG. 6D, they are stored in memory 3' at 714.

The next step is a last filtering module 716 which checks whether temporal constraints, not only of the load in question, but also of the service provider's remaining load consignments, can still be met, when including the deviation route to pick up and deliver the load.

This task is performed by the Temporal, Geographic and Rules & Optimization subsystems and essentially their routing and scheduling modules.

If there are any vectors remaining after the routing and schedule constraints filtering 716, then after a next step at decision point 718 of FIG. 6D, they are stored in memory 3 at 720.

The list of vectors remaining after the former filtering stages is stored in memory 3 as a final "One vector" list 720 and this is a second set of results to be processed.

The next step takes to a decision point 722 of FIG. 6D, which checks whether the search is limited to multi-leg single carrier solutions, i.e. One path solutions, in order to start searching for the next possible alternatives. The same decision point 722 is reached if no results are available after the filtering modules at decision points 676, 700, 712 and 718.

If the search is limited to multi-leg single carrier solutions at 722, the next step checks whether any solutions are available, i.e. whether there are any vectors in the "one path" list of 720, in which case the next step follows on to "F" on FIG. 6ZA a module that sums up all final results for classification according to system default or user defined criteria.

If no results are available at 724 the next step follows on to "G" on FIG. 6ZB, a module suggesting possible modifications or leading to the main menu.

In case of modifications, and with the object of skipping unnecessary recalculation and filtering, the second, third or further modified enquiry will be tagged as a second, run through the flowchart, which will be defined as "loop>1", so the next step will be a module 674 that checks whether there have been any changes regarding Geographical, service type, or linking type attributes. If there have been changes at this level, for example, changing the origin point to another city, or taking the load to a depot facility nearby, at decision point 678, this will be reflected by returning to the filtering module 672 with the new conditions. On the other hand, if there haven't been changes at this level, a module 682 further checks if the load's temporal attributes have changed. If there have been changes at this level, for example increasing the maximum time of arrival of the load, then at decision point 692, this will be reflected by recalling the original, or modified, pre-filtered "one path" list (memory 3') and filtering these paths with the new time constraints at module 690. On the other hand, if there haven't been changes at temporal level; a module 708 checks for changes in the dimensional conditions of the load and if there have been changes at this level, for example, by splitting a load in two smaller ones and at a module 711 after decision point 710 this would be reflected recalling the original or the modified path list of memory 3" at 702 and filtering these paths with the new dimensional constraints at module 706.

If there have been changes at a temporal level detected at 682 and no dimensional changes detected at 708, in order to improve efficiency of the dimensional filtering, the system can find the common vectors between the original and the newly modified memory 3" at 702 and store them straight to memory 3''' at 714, in addition to filtering the remaining non-common paths of the new modified memory 3" at 702 and adding them also to the memory 3''' storage at 714, saving therefore, having to re-filter the original paths complying with the new temporal conditions.

If the search is not limited to single carrier multi-leg solutions, the next step after decision point 722 is to explore further possibilities in the shape of two carrier single-leg solutions, i.e. two vectors, which leads to the next step 726 of FIG. 6E, recalling the two lists of origin and destination first generation vectors 1GV along with the first generation linkable waypoints 1GLWP, previously saved to memory 1.

The next step at decision point 728 is to check whether the enquiry is original or modified and, if original, the process continues to a module 730, which first filters the two lists of 1GV's of memory 1, to two lists including only the MAIN 1GV's of memory 1.

All vectors are defined by two waypoints; the module further retrieves the remaining waypoints of the MAIN 1GV's, which are complementary to the 1GLWP's.

These waypoints will be termed second-generation waypoints or 2GWP and along with these, the remaining attributes of the 2GWP, including the associated areas, will also be retrieved and stored in memory 4.

Employing the outlined nomenclature, or a suitable alternative classification, the construction of a module capable of performing these tasks is well known in the art of electronic databases.

The next step of the flowchart is to continue simultaneously to a origin related elements link filtering module 732 followed by an origin related matching module 734 and a destination related link filtering module 736 followed by a destination matching module 738, both followed by a filtering module 740. These modules are explained in detail in FIG. 15, but a brief description will be given here.

The purpose of the origin related module 732 is to find vectors that have link types that are compatible with the load attributes, i.e. linkable waypoints O 2G LWP, and that of origin related module 734, is to find vectors with O 2G LWP associated areas encompassing the opposite D 2G LWP resulting from 736.

Conversely, the purpose of the destination related module 736 is to find vectors that have link types that are compatible with the load attributes, i.e. linkable waypoints D 2G LWP, and that of destination related module 738, is to find vectors with D 2G LWP associated areas encompassing the opposite O 2G LWP resulting from 732.

The purpose of the filtering module 740 is filtering the matched elements according to their various rules, including their link compatibility arising from the type of waypoint service link, such as those mentioned in FIG. 5A and to organise and associate the relevant remaining path elements of each of the matched elements.

The flowchart continues then with a "save to memory" module 746, which stores for future recall, two lists, one of all filtered Destination related 1GV vectors and D 2G LWP waypoints that may be successfully associated for pick up from the origin related O 2G LWP and another of all filtered Origin related 1GV and O 2G LWP for delivery to the destination related D 2G LWP The first list would be a group of O 1GV vectors having a linkable waypoint O 2G LWP with an associated area that encompasses the D 2G LWP.

In practice this would mean there is a possibility that having picked up a load, a first service provider or carrier, on a single leg is able to deliver to a second carrier, which on one leg is able to deliver the load to the final destination.

The second list would be the group of D 1GV vectors having a linkable waypoint D 2G LWP with an associated area that encompasses the O 2G LWP.

In practice this would mean there is a possibility that a second service provider or carrier, is able to pick up from a first carrier which has picked up a load in a single leg and deliver also in one leg the load to the final destination.

If there are results in either of both lists at decision point 744, the next step stores the results in memory 5' as a pre-filtered "two vector" list 746.

The next step at decision point 748 is to check whether the enquiry is original or modified. If the enquiry is the original, the path "no" is followed to a next filtering module 750, which checks the time compatibility of the path elements stored at 746 with the requirements of the load and the time compatibility of the two vectors that may be involved in a "two vector" combination.

The list is reduced to the origin related vectors with tO 1GLWP falling within the load's minimum and maximum time of departure and the destination related vectors with tD 1GLWP falling within the minimum and maximum allowable time of arrival, formerly stated as "condition one".

The filtering module then further checks for the compatibility of origin related vector time attributes with destination related vector time attributes including the times for start and finish windows at the second generation waypoints related to Origin and Destination, represented by tO 2GLWP and tD 2GLWP.

This condition is expressed in the module as:

$$tO\ 2G\ LWP < tD\ 2G\ LWP - STT$$

where STT stands for specific transfer time.

In practise this means that the time window of arrival of the first service provider or carrier is earlier than the time window of departure of the second carrier, at least in an amount of time equal to the specific transfer time, which is user defined, system defined according to parameters including type of service, length of leg, size and type of cargo, loading facilities, depot opening times, industry best practice, or a standard time set by the system, according to industry best practice recommendation in type of service involved.

The process from decision point 756 to module 776 of FIG. 6F is a filtering process similar to the previous filtering process between decision point 700 and module 720 of FIG. 6D, with the difference that two sequential vectors are filtered instead of single path. As a result, a final "two vector" list, i.e. a list of logically-linked sequences of two vectors, which are sequentially combinable, if any, would be stored to memory 5 at module 776 of FIG. 6F.

The next step takes to a decision point 778, which checks if the search is limited to two carrier single-leg solutions, i.e. "two vector" solutions, in order to start searching for the next possible alternatives. The same decision point 778 is reached if no results are available after the filtering modules at decision points 744, 756, 768 and 774.

If the search is limited to two carrier single-leg solutions at 778, the next step checks if any solutions are available, i.e. if there are any vectors in the "two vector" list of 776, in which case the next step follows on to "F" on FIG. 6ZA a module that sums up all final results for classification according to system default or user defined criteria.

If no results are available at 780 the next step follows on to "G" on FIG. 6ZB, a module suggesting possible modifications or leading to the main menu.

In case of modifications, an with the object of skipping unnecessary recalculation and filtering, the second, third or further modified enquiry will be tagged as a second, run through the flowchart, which will be defined as "loop>1", so the next step will be a module 732 that checks if there have been any changes regarding Geographical, service type, or linking type attributes. If there have been changes at this level, for example changing the origin point to another city, or taking the load to a depot facility nearby, at decision point 742, this will be reflected by returning to the filtering module 672 with the new conditions. On the other hand, if there haven't been changes at this level, a module 752 further checks if the load's temporal attributes have changed. If there have been changes at this level, for example increasing the maximum time of arrival of the load, then at decision point 754, this will be reflected by recalling the original, or modified, pre-filtered "two vector" list (memory 5') and filtering these paths with the new time constraints at module 750. On the other hand, if there haven't been changes at temporal level; a module 764 checks for changes in the dimensional conditions of the load and if there have been changes at this level, for example for example splitting a load in two smaller ones and at a module 767 after a decision point 766 this would be reflected recalling the original, or modified, path list of memory 5" at 758 and filtering these paths with the new dimensional constraints at module 762.

If there have been changes at a temporal level detected at 722 and no dimensional changes detected at 764, in order to improve efficiency of the dimensional filtering, the system can find the common vectors between the original and the newly modified memory 5" at 758 and store them straight to memory 5'" at 770 in addition to filtering the remaining non-common paths of the new modified memory 5" at 758 and adding them also to the memory 5'" storage at 770, saving therefore having to re-filter the original paths complying with the new temporal conditions.

If the search is not limited to two carrier single-leg solutions, the next step after decision point 778 is to explore further possibilities in the shape of two carrier multi-leg solutions, i.e. two paths, which leads to the next step 790 of FIG. 6G, recalling the two lists of origin and destination first generation vectors 1GV along with the first generation linkable waypoints 1GLWP, previously saved to memory 1.

The next step at decision point 792 is to check whether the enquiry is original or modified and if original, the process continues to a module 794, which retrieves all path elements succeeding MAIN O 1GV vectors and all path elements preceding MAIN D1GV vectors.

The vectors and waypoints retrieved following this procedure will be termed "second generation vectors" 2GV and "third generation waypoints" 3GWP respectively.

Please note that the Vij/WPij nomenclature refers to the real identity of the path elements, while the "Generation" nomenclature refers to the organization of path elements according to the order of retrieval done by this system, in the process of generating a double tree in specific sequences, to find a solution for a defined origin-destination pair.

The second-generation vectors 2GV and third generation waypoints 3G WP along with the remaining attributes of the 3G WP, including the associated areas, will also be retrieved and stored in memory 6.

The next step of the flowchart is to continue simultaneously to a origin related elements link filtering module 800 followed by an origin related matching module 802 and a destination related link filtering module 804 followed by a destination matching module 806, both followed by a filtering module 808. These modules are explained in detail in FIG. 16, but a brief description will be given here.

The purpose of the origin related module 800 is to find vectors that have link types that are compatible with the load attributes, i.e. linkable waypoints O 2G LWP and/or O 3G LWP and that of origin related module 802, is to find the O 2G LWP and/or O 3G LWP of 800 which have associated areas encompassing the opposite D 3G LWP resulting from 804.

Conversely, the purpose of the destination related module 804 is to find vectors that have link types that are compatible with the load attributes, i.e. linkable waypoints D 2G LWP and/or D 3G LWP and that of destination related module 806, is to find the D 2G LWP and/or D 3G LWP of 804 which have associated areas encompassing the O 3G LWP resulting from 800.

The purpose of the filtering module 808 is filtering the matched elements according to their various rules including their link compatibility arising from the type of waypoint service link, such as those mentioned in FIG. 5A and to organise and associate the relevant remaining path elements of each of the matched elements.

If there are any results at decision point 810, the flowchart continues then with a "save to memory" module 812, which stores for future recall, two lists.

The first list would be a group of O 2GV vectors having a linkable waypoint 2G LWP or 3GLWP with an associated area that encompasses the D 2G LWP.

In practice this would mean there is a possibility that having picked up a load, a first service provider or carrier, on a journey is able to deliver to a second carrier, which on a journey is able to deliver the load to the final destination.

The second list would be the group of D 2GV vectors having a linkable waypoint 2G LWP or 3G LWP with an associated area that encompasses the O 2G LWP.

In practice this would mean there is a possibility that a second service provider or carrier, is able to pick up from a first carrier which has picked up a load on a journey and deliver also in a journey the load to the final destination.

The lists which will include also all relevant path elements and attributes of the waypoints involved, are stored in memory 7' as a pre-filtered "two path" list 812

The next step at decision point 814 is to check whether the enquiry is original or modified. If the enquiry is the original, the path "no" is followed to a next filtering module 816, which checks the time compatibility of the path elements stored at 812 with the requirements of the load and the time compatibility of the two paths that may be involved in a "two path" combination.

The list is reduced to the origin related vectors with tO 1GLWP falling within the load's minimum and maximum time of departure and the destination related vectors with tD 1GLWP falling within the minimum and maximum allowable time of arrival, formerly stated as condition 1.

The filtering module then further checks for the compatibility of origin related vector time attributes with destination related vector time attributes including the times for start and finish windows at the second and/or third generation waypoints related to Origin and Destination, represented by tO 2G LWP, tO 3G LWP and tD 2G LWP, tD 3G LWP.

This condition is expressed in the module as:

$tO\ 2/3G\ LWP < tD\ 2/3G\ LWP - STT$ where STT stands for the specified transfer time explained before.

tO 2/3G LWP versus tD 2/3 GLWP stand for three matching cases, namely:

tO 2G LWP<tD 3G LWP tO 3G LWP<tD 3G LWP tO 3G LWP<tD 2G LWP as the case of tO 2G LWP versus tD 2G LWP was already covered in module 750 of FIG. 6E.

The process from decision point 822 to module 842 of FIG. 6H is a filtering process similar to the previous filtering process between decision point 756 and module 776 of FIG. 6F, with the difference that two sequential paths are filtered instead of two sequential vectors. As a result, a final "two path" list, i.e. a list of logically-linked sequences of two paths, which are sequentially combinable if any, would be stored to memory 7 at module 842 of FIG. 6H.

The next step takes to a decision point 844, which checks if the search is limited to two carrier multi-leg solutions, i.e. "two path" solutions, in order to start searching for the next possible alternatives. The same decision point 844 is reached if no results are available after the filtering modules at decision points 810, 822, 834 and 840.

If the search is limited to two carrier single-leg solutions at 844, the next step checks if any solutions are available, i.e. if there are any vectors in the "two path" list of 842, in which case the next step follows on to "F" on FIG. 6ZA a module that sums up all final results for classification according to system default or user defined criteria.

If no results are available at 846 the next step follows on to "G" on FIG. 6ZB, a module suggesting possible modifications or leading to the main menu.

In case of modifications, the process from module 796 to module 836 is similar to that described before from module 732 to module 770.

By now the first five stages of the process of generating a double tree in specific sequences, for finding a solution to a specific origin—destination pair, have been represented basically by a first stage of wide search of vector elements matching origin and destination by proximity in modules 606 to 622, a second stage of identifying among these "one vector" solutions in modules 624 to 660, a third stage of identifying among these "one path" solutions in modules 672 to 720, a fourth stage of matching between each other the vectors obtained in the first step in order to obtain "two vector" solutions in modules 730 to 776 and a fifth stage of completing the paths of the vectors obtained in the first stage and matching between each other the completed paths, i.e. through matching of their respective elements, in order to obtain "two path" solutions in modules 794 to 842.

These first five stages allow for the assembly of single or multiple path elements, which belong to either one or two service provider paths, in order to perform the construction of a virtual bridge or connection, between the origin and the destination of the load.

We call these first origin-related and destination-related completed paths, first generation paths or "1GP" and more specifically O 1GP and D 1GP respectively.

The waypoints on these paths are termed, first generation path waypoints "1GP WP", a term that comprises first, second and third generation waypoints 1G WP, 2G WP and 3G WP, or if the waypoints also happen to be linkable "1GP LWP" a term which also comprises 1GLWP, 2G LWP and 3G LWP. Further, according to the paths they belong to, the first generation path waypoints 1GP WP are divided into O 1GP WP and D 1GPWP, which, if linkable, into O 1GP LWP and D 1GP LWP respectively. In this preferred embodiment, the 1G LWP waypoints of the 1GP paths are not considered for matching purposes with opposite-related 1GP paths, although they can be considered in alternative embodiments.

In this case, for each different pair of origin related paths O 1GP and destination related paths D 1GP, obtained in module 794 and within these, for each different pair of origin related waypoints O 1GP WP with destination related waypoints D 1GP WP, the process explores the possibility of constructing a bridge or connection in the same way it did before in the first five stages, in order to bridge or connect the origin and the destination of the load.

For each individual pair, the scope of the vectors involved in the solution could either be limited by the main scope area encompassing origin and destination as performed at step 604 of FIG. 6A, or limited to a generally smaller area obtained by applying a limiting scope function, for example an imperfect elliptical shape or a rectangle encompassing the distinct waypoint pair O 1GP WP-D 1GP WP, instead of the original origin-destination pair of the load.

The first five stages are now done for every distinct waypoint pair obtained from the O 1GP and D 1GP paths of module 794. The pairs comprise O 2G LWP-D 2G LWP, O 2G LWP-D 3G LWP, O 3GLWP-D 2GLWP and O 3GLWP-D 3GLWP type pairs.

The type pairs involving the first generation linkable waypoints O 2GLWP-D 1GLWP, O 1G LWP-D 2G LWP, O 3GLWP-D 1GLWP, O 1GLWP-D 3G LWP, O 1GLWP-D 1 GLWP will be used only if provisions are made, allowing the service providers to state if they are willing to accept "transfer" consignments, i.e. transport of a load only within a single waypoint associated area, along with an extra set of conditions governing the terms of acceptance of "transfer" consignments, a task performed by the Rules & Optimization, Topical and Account Subsystems.

Depending on the area selected by a service provider the "transfer" consignment will usually be a local or regional delivery, as opposed to a long haul intercity transport.

If for example, the service provider is in the long haulage sector and the vehicle performing the transport path is a large heavy ground vehicle, more often than not, it is unlikely that the service provider will have the time or interest in performing a "transfer" consignment, unless that this task would carry a high premium compared to his standard rates in order to make it more attractive, or that the "transfer" consignment happened to be delivered to the service provider's depot, which had among other services, local or regional delivery services through possibly smaller vehicles, in which case the extra business might be welcome.

On the other hand, we may have the case of local or regional delivery companies that input only a same waypoint as origin and destination, and an associated area as their path, maybe even on an everyday basis, in order be able to attract service requests that include courier services, parcel deliveries, taxis, regional removals and "transfer" consignments, among many other usually short distance transport services.

Global express parcel services such as FeDex™ Corporation of Memphis, Tenn., U.S.A. UPS™ of Atlanta Ga., U.S.A. or trans-national transport networks such as TNT™ of Amsterdam, Netherlands, that may also use different types of path definition to represent the global or national coverage of their networks to attract service requests for the services they can offer, which may include depending on the size, also a "transfer" consignment.

If the search is not limited to two carrier multi-leg solutions, Further results can be obtained when constructing a virtual bridge or connection between origin-related and destination-related completed paths obtained in module 794 of FIG. 6G. The next step then after decision point 844 is to explore further possibilities in the shape of "three carrier, two multi-leg plus one single leg" solutions, i.e. two paths— one vector, which leads to the next step 850 of FIG. 6I, recalling all O 1GP and D 1GP elements, i.e. the two lists of origin and destination first generation vectors 1GV along with the first generation linkable waypoints 1G LWP, previously saved to memory 1, the second generation 2G LWP waypoints, previously saved to memory 4 and the 3G LWP waypoints and 2GV vectors previously saved to memory 6.

The search process then decides at 852 if this is the first enquiry related to a load, or if it is a modified enquiry related to a load searched immediately before. If it is an original enquiry the process continues to a filtering module 854 where all the path elements within all the imperfect elliptic areas, are set aside for more efficient immediate retrieval and stored as Memory 8.

The next step of the flowchart is to continue simultaneously to an origin-related matching module 860 and a destination-related matching module 864, both followed by a filtering module 868. These modules are explained in detail in FIG. 17, but a brief description will be given here.

The purpose of the origin related module 860 is to find vectors that have link types that are compatible with the load attributes and associated areas encompassing the O 1GP WP waypoints.

The purpose of the destination related module 864 is to find vectors that have link types that are compatible with the load attributes and associated areas encompassing the D 1GP WP waypoints.

The purpose of the filtering module 868 is filtering the matched elements according to their various rules including their link compatibility arising from the type of waypoint service link, such as those mentioned in FIG. 5A and to organise and associate the relevant remaining path elements of each of the matched elements.

The flowchart continues then with a "save to memory" module 872, which stores for future recall, two lists, one of all filtered vectors and waypoints that may be successfully associated for pick up from the an O 1GP LWP waypoint and another for delivery to the a D 1GP LWP waypoint.

The first list would be the group of vectors having a linkable waypoint LWP with an associated area that encompasses an O 1GP LWP waypoint.

The second list would be a group of vectors having a linkable waypoint LWP with an associated area that encompasses a D 1GP LWP waypoint.

The vectors obtained in the first list are called origin-related third generation vectors O 3GV and the waypoints are called origin-related fourth generation linkable waypoints O 4G LWP The vectors obtained in the second list are called destination-related third generation vectors D 3GV and the waypoints are called destination-related fourth generation linkable waypoints O 4G LWP.

The flowchart now continues to a next step 874, which is the fifth attempt to find a solution for matching the load path, with service providers' paths.

In this step 874 the two lists mentioned above are compared to see if there is any single vector that is common to both lists, which would be a vector likely to be able to pick up at an O 1GP LWP waypoint and deliver to a D 1GP LWP waypoint in a single leg.

If the answer is "yes", at a next decision point 876, we have one or many possible solutions that we call "two-path, one-vector" solutions, referring to the single leg characteristics of the bridge or connection, used to connect two different paths.

All the relevant elements of the paths matched to the vectors of list 874 are then organized and stored along with the connecting vectors at a next step 878 in memory 10' as a pre-filtered "two-path, one vector" list.

At a decision point 880 the flow is checked to see the status of the enquiry, whether it is the original, or a modification of the original. If the enquiry is the original, the process continues to a temporal filtering module 882.

The list is filtered to condition 1, i.e. to the origin related vectors with tO 1G LWP falling within the load's minimum and maximum time of departure and the destination related vectors with tD 1G LWP falling within the minimum and maximum allowable time of arrival.

The filtering module then further checks for the time compatibility of each of the matched path-vector-path combinations of the list 878, the first being the origin-related O 1GP LWP waypoints matched with the origin-related O 4G LWP waypoints and the second being the destination-related D 4G LWP waypoints matched with the destination-related D 1GP LWP, so that they are all sequential in time, even including a time safety margin STT.

These conditions will be stated as:

tO 1GP LWP<tO 4G LWP-STT tD 4G LWP<tD 1GP LWP-STT

In these cases, when matching with a 4G LWP waypoint, the 1G LWP of the 1GP paths will only be enabled if the "transfer consignment" option is enabled.

The process from decision point 890 to module 912 of FIG. 6J is a filtering process similar to the previous filtering process between decision point 822 and module 842 of FIG. 6H, with the difference that a path followed sequentially by a vector followed sequentially by a path, are filtered instead of two sequential paths. As a result, a final "two path, one vector" list, i.e. a list of logically-linked sequences of a path, a vector and a path, which are sequentially combinable, if any, would be stored to memory 10 at module 910 of FIG. 6J.

The next step takes to a decision point 912, which checks if the search is limited to "three carrier, two multi-leg plus one single leg" solutions, i.e. "two path" solutions, in order to start searching for the next possible alternatives. The same decision point 912 is reached if no results are available after the filtering modules at decision points 876, 890, 902 and 908.

If the search is limited to "three carrier, two multi-leg plus one single leg" solutions at 912, the next step checks if any solutions are available, i.e. if there are any vectors in the "two path, one vector" list of 910, in which case the next step follows on to "F" on FIG. 6ZA a module that sums up all final results for classification according to system default or user defined criteria.

If no results are available at 914 the next step follows on to "G" on FIG. 6ZB, a module suggesting possible modifications or leading to the main menu.

In case of modifications, the process from module 856 to module 904 is similar to that described before from module 796 to module 836.

If the search is not limited to three carrier, two multi-leg one single leg solutions, the next step then after decision 912 is to explore further possibilities in the shape of "three carrier multi-leg" solutions, i.e. three paths, which leads to the next step 920 of FIG. 6K, recalling all O 1GP and D 1GP elements, i.e. the two lists of origin and destination first generation vectors 1GV along with the first generation linkable waypoints 1GLWP, previously saved to memory 1, the second generation 2G LWP waypoints, previously saved to memory 4 and the 3G LWP waypoints and 2GV vectors previously saved to memory 6, plus the 4G LWP waypoints and 3GV vectors previously saved to memory 9.

The search process then decides at 922 if this is the first enquiry related to a load, or if it is a modified enquiry related to a load searched immediately before. If it is an original enquiry the process continues next to a module 924, which is the sixth attempt to find a solution for matching the load path, with service providers' paths.

The module 924, similar to that of 672 of FIG. 6C identifies and lists paths, which are common to O 4G LWP and D 4G LWP waypoints.

If there are any results at the decision point 930 the next step of the process is a module 932 that retrieves all relevant path elements from the paths listed at 924, followed by a module 934 that organizes and associates elements, not only of the paths listed at 924, but also of the O 1GP and D 1GP paths that are connected to each path listed at 924. i.e. organizing in sequential order all relevant elements between, O 1G LWP, O 2G LWP, O 3G LW, O 4G LWP, D 4G LWP, D 3G LW, D 2G LWP and D 1G LWP waypoints also represented as all relevant elements between O 1/2/3/4G LWP and D 1/2/3/4G LWP.

The flowchart continues then with a "store to memory" module 936, which stores for future recall the list of three combined paths, that may be successfully associated for a pick up from the origin and a delivery to the destination of the load, termed pre-filtered "three path" list to memory 11'.

The search process then decides at 938 if this is the first enquiry related to a load, or if it is a modified enquiry related to a load searched immediately before. If it is an original enquiry the process continues to a temporal filtering module 940.

The list is filtered to condition 1, i.e. to the origin related vectors with tO 1GLWP falling within the load's minimum and maximum time of departure and the destination related vectors with tD 1GLWP falling within the minimum and maximum allowable time of arrival.

The filtering module then further checks for the time compatibility of each of the matched three path combinations of the list 936, the first match being the origin-related O 1GP LWP waypoints matched with the origin-related O 4G LWP waypoints and the second being the destination-related D 4G LWP waypoints matched with the destination-related D 1GP LWP, so that they are all sequential in time, even including a time safety margin STT.

These conditions will be stated as:

tO 1GP LWP<tO 4G LWP-STT tD 4G LWP<tD 1GP LWP-STT

In these cases, when matching with a 4G LWP waypoint, the 1G LWP of the 1GP paths will only be enabled if the "transfer consignment" option is enabled.

The process from decision point 946 to module 968 of FIG. 6J is a filtering process similar to the previous filtering process between decision point 890 and module 912 of FIG. 6J, with the difference that, three sequential paths are filtered, instead of a path followed sequentially by a vector followed sequentially by a path. As a result, a final "three path" list, i.e. a list of logically-linked sequences of three paths, which are sequentially combinable, if any, would be stored to memory 11 at module 966 of FIG. 6L.

The next step takes to a decision point 968, which checks if the search is limited to "three carrier multi-leg" solutions, i.e. "three path" solutions, in order to start searching for the next possible alternatives. The same decision point 968 is reached if no results are available after the filtering modules at decision points 938, 946, 958 and 964.

If the search is limited to "three carrier multi-leg" solutions at 968, the next step checks if any solutions are available, i.e. if there are any vectors in the "three path" list of 966, in which case the next step follows on to "F" on FIG. 6ZA a module that sums up all final results for classification according to system default or user defined criteria.

If no results are available at 970 the next step follows on to "G" on FIG. 6ZB, a module suggesting possible modifications or leading to the main menu.

In case of modifications, the process from module 926 to module 960 is similar to that described before from module 856 to module 904.

If the search is not limited to three carrier multi-leg solutions, the next step then after decision 968 is to explore further possibilities in the shape of "four carrier, two multi-leg, two single leg" solutions, i.e. "two paths, two vectors" solutions, which leads to the next step 980 of FIG. 6M, which recalls the O 1GP and D 1GP elements, i.e. the two lists of origin and destination first generation vectors 1GV along with the first generation linkable waypoints 1G LWP, previously saved to memory 1, the second generation 2G LWP waypoints, previously saved to memory 4 and the 3G LWP waypoints and 2GV vectors previously saved to memory 6, plus the 4G LWP waypoints and 3GV vectors previously saved to memory 9.

The search process then decides at 982 if this is the first enquiry related to a load, or if it is a modified enquiry related to a load searched immediately before. If it is an original enquiry the process continues next to a module 984, which is the seventh attempt to find a solution for matching the load path, with service providers' paths.

The module 984 recalls the remaining waypoints associated to the MAIN 3GV vectors from the ones previously saved to memory 9 at 872. The remaining waypoints are termed fifth generation waypoints 5G WP and they are obtained in a similar way as we obtained the 2G WP waypoints for the 1GV vectors. The O 5G WP and the D 5G WP are stored to memory 12.

The next step of the flowchart is to continue simultaneously to a origin related elements link filtering module 990 followed by an origin related matching module 992 and a destination related link filtering module 994 followed by a destination matching module 996, both followed by a filtering module 998. These modules are explained in detail in FIG. 18, but a brief description will be given here.

The purpose of the origin-related module 990 is to find vectors that have link types that are compatible with the load attributes, i.e. linkable waypoints 5G LWP and the purpose of origin-related module 992, is to find vectors with O 5G LWP associated areas encompassing the opposite D 5G LWP resulting from 994.

Conversely, the purpose of the destination related module 994 is to find vectors that have link types that are compatible with the load attributes, i.e. linkable waypoints 5G LWP and that of destination-related module 996, is to find vectors with D 5G LWP associated areas encompassing the opposite O 5G LWP resulting from 990.

The purpose of the filtering module 998 is filtering the matched elements according to their various rules including their link compatibility arising from the type of waypoint service link, such as those mentioned in FIG. 5A and to organise and associate the relevant remaining path elements of each of the matched elements.

The module 998 retrieves all relevant path elements from the matched paths obtained at module 998 and organizes and associates elements of the O 1GP and D 1GP paths that are connected to each 3GV vector matched at 998, i.e. organizing in sequential order all combined relevant elements between, O 1G LWP, O 2G LW, O 3G LWP, O 4G LWP, O 5G LWP, D 5G LWP, D 4G LWP, D 3G LW, D 2G LWP and D 1G LWP waypoints also represented as all relevant elements between O 1/2/3/4/5G LWP and D 1/2/3/4/5G LWP.

If there are any results at the decision point 1000 the process continues then with a "store to memory" module 1002, which stores for future recall the list of two paths combined through two vectors, that may be successfully associated for a pick up from the origin and a delivery to the destination of the load, termed pre-filtered "two path, two vector" list to memory 13'.

The search process then decides at 1004 if this is the first enquiry related to a load, or if it is a modified enquiry related to a load searched immediately before. If it is an original enquiry the process continues to a temporal filtering module 1006.

The list is filtered to condition 1, i.e. to the origin related vectors with tO 1GLWP falling within the load's minimum and maximum time of departure and the destination related vectors with tD 1GLWP falling within the minimum and maximum allowable time of arrival.

The filtering module then further checks for the time compatibility of each of the triple matched path-vector-vector-path combinations of the list 1002, the first match being the origin-related O 1GP LWP waypoints matched with the origin-related O 4G LWP waypoints and the second being the origin-related O 5G LWP with the destination-related D 5G LWP and the third being the destination-related D 4G LWP with the destination-related D 1GP LWP waypoints, so that they are all sequential in time, even when including a time safety margin STT.

These conditions will be stated as:

$$tO\ 1GP\ LWP < tO\ 4G\ LWP - STT$$

$$tO\ 5G\ LWP < tD\ 5G\ LWP - STT$$

$$tD\ 4G\ LWP < tD\ 1GP\ LWP - STT$$

In these cases, when matching with a 4G LWP waypoint, the 1G LWP of the 1GP paths will only be enabled if the "transfer consignment" option is enabled.

The process from decision point 1012 to module 1032 of FIG. 6N is a filtering process similar to the previous filtering process between decision point 946 and module 966 of FIG. 6L, with the difference that a path followed sequentially by a vector followed sequentially by a vector followed sequentially by a path are filtered, instead of three sequential paths. As a result, a final "two path, two vector" list, i.e. a list of logically-linked sequences of one path, two vectors and a path, which are sequentially combinable, if any, would be stored to memory 13 at module 1032 of FIG. 6N.

The next step takes to a decision point 1032, which checks if the search is limited to "four carrier, two multi-leg plus two single leg" solutions, i.e. "two path, two vector" solutions, in order to start searching for the next possible alternatives. The same decision point 1032 is reached if no results are available after the filtering modules at decision points 1000, 1012, 1024 and 1030.

If the search is limited to "four carrier, two multi-leg plus two single leg" solutions at 1034, the next step checks if any solutions are available, i.e. if there are any vectors in the "two path, two vector" list 1032, in which case the next step follows on to "F" on FIG. 6ZA a module that sums up all final results for classification according to system default or user defined criteria.

If no results are available at 1036 the next step follows on to "G" on FIG. 6ZB, a module suggesting possible modifications or leading to the main menu.

In case of modifications, the process from module 986 to module 1026 is similar to that described before from module 926 to module 960.

If the search is not limited to four carrier, two multi-leg plus two single leg solutions, the next step then after decision 1034 is to explore further possibilities in the shape of "four carrier multi-leg" solutions, i.e. "four path" solutions, which leads to the next step 1040 of FIG. 6O, which recalls the O 1GP and D 1GP elements, i.e. the two lists of origin and destination first generation vectors 1GV along with the first generation linkable waypoints 1GLWP, previously saved to memory 1, the second generation 2GLWP waypoints, previously saved to memory 4 and the 3G LWP waypoints and 2GV vectors previously saved to memory 6, plus the 4G LWP waypoints and 3GV vectors previously saved to memory 9, plus the 5G WP previously saved to memory 12.

The search process then decides at 1042 if this is the first enquiry related to a load, or if it is a modified enquiry related to a load searched immediately before. If it is an original enquiry the process continues next to a module 1044, which is the eighth attempt to find a solution for matching the load path, with service providers' paths.

This module 1044 retrieves all path elements succeeding MAIN O3GV vectors and all path elements preceding MAIN D3GV vectors.

The vectors and waypoints retrieved following this procedure will be termed "fourth generation vectors" 4GV and "sixth generation waypoints" 6G WP respectively.

The fourth generation 4GV vectors and sixth generation 6G WP waypoints along with the remaining attributes of the 6G WP waypoints, including the associated areas, will be retrieved and stored in memory 14.

We can now define as a second generation path 2GP, the group of all 4G WP, 5G WP and 6G WP with their associated areas and attributes, plus the 3GV and 4GV vectors, that belong to a same transport path. Furthermore the term second-generation path vector 2GP V will include the 3GV and 4GV vectors and the term second-generation path waypoint 2GP WP will include any of, or all 4G WP, 5G WP and 6G WP waypoints. A similar nomenclature will be used for the linkable waypoints, replacing LWP for WP. In the present embodiment, the 4G LWP waypoint of the 2GP path will not be considered for matching purposes with an opposite-related 2GP, although it can be considered in an alternative embodiment.

A further classification is made for origin-related and destination-related paths and elements and as before they are preceded by the "O" and "D" characters respectively to indicate where they relate to.

The next step of the flowchart is to continue simultaneously to a origin-related elements link filtering module 1050 followed by an origin related matching module 1052 and a destination related link filtering module 1054 followed by a destination matching module 1056, both followed by a filtering module 1058. These modules are explained in detail in FIG. 22, but a brief description will be given here.

The purpose of the origin-related module 1050 is to find O 2GP V vectors that have O 2GP WP waypoint links that are compatible for combination with other D 2GP V vectors that have D 2GP WP waypoints i.e. linkable waypoints O 2GP LWP which include any of 4G LWP, 5G LWP and/or 6GLWP.

The purpose of origin-related module 1052, is to find the O 2GP LWP of 1050 which have associated areas encompassing the opposite D 2GP LWP waypoints resulting from 1054. Conversely, the purpose of the destination related module 1056 is to find the D 2GP LWP of 1054 which have associated areas encompassing the opposite D 2GP LWP waypoints resulting from 1050.

In these cases the 1G LWP of the 1GP LWP and the 4G LWP of the 2GP LWP will only be enabled if the "transfer consignment" option is enabled.

Also, when considering O 2GP LWP vs. D 2GP LWP the option of O 5G LWP as a O 2GP LWP will not be considered simultaneously with the option of D 5G LWP as a D 2GP LWP as this condition was considered already at the previous temporal filtering module 1006.

The purpose of the filtering module 1058 is filtering the matched elements according to their various rules including their link compatibility arising from the type of waypoint service link, such as those mentioned in FIG. 5A and to organise and associate the relevant remaining path elements of each of the matched elements.

The module 1058 retrieves all relevant path elements from the matched paths obtained and organizes and associates elements also of the O 1GP and D 1GP paths that are connected to the matched O 2GP and D 2GP paths, i.e. organizing in sequential order all combined elements between, O 1G LWP, O 2G LW, O 3G LWP, O 4G LWP, O 5G LWP, 6G LWP, D 6G LWP, D 5G LWP, D 4G LWP, D 3G LW, D 2G LWP and D 1G LWP waypoints also represented as all elements between O 1/2/3/4/5/6G LWP and D 1/2/3/4/5/6G LWP.

If there are any results at the decision point 1060 the process continues then with a "store to memory" module 1062, which stores for future recall the list of two paths, combined through two further paths, that may be successfully associated for a pick up from the origin and a delivery to the destination of the load, termed pre-filtered "four path" list to memory 15'.

The search process then decides at 1064 if this is the first enquiry related to a load, or if it is a modified enquiry related to a load searched immediately before. If it is an original enquiry the process continues to a temporal filtering module 1066.

The list is filtered to condition 1, i.e. to the origin related vectors with tO 1G LWP falling within the load's minimum and maximum time of departure and the destination related vectors with tD 1G LWP falling within the minimum and maximum allowable time of arrival.

The filtering module then further checks for the time compatibility of each of the triple matched path-path-path-path combinations of the list 1062, the first match being the origin-related O 1GP LWP waypoints matched with the origin-related O 4G LWP waypoints and the second being the origin-related O 2GP LWP with the destination-related D 2GP LWP and the third being the destination-related D 4G LWP with the destination-related D 1GP LWP waypoints, so that they are all sequential in time, even when including a time safety margin STT.

These conditions will be stated as:

$$tO\ 1GP\ LWP < tO\ 4G\ LWP - STT$$

$$tO\ 2GP\ LWP < tD\ 2GP\ LWP - STT$$

$$tD\ 4G\ LWP < tD\ 1GP\ LWP - STT$$

In these cases, when matching with another 2GP path, the 1G LWP of the 1GP paths will only be enabled if the "transfer consignment" option is enabled and similarly for the 4G LWP of the 2GP paths, when matching with another opposite-related 2GP path.

Also, when considering tO 2GP LWP<tD 2GP LWP−STT, the option of O 5G LWP as a O 2GP LWP will not be considered simultaneously with the option of D 5G LWP as a D 2GP LWP as this condition was considered already at the previous temporal filtering module 1006

The process from decision point 1072 to module 1094 of FIG. 6P is a filtering process similar to the previous filtering process between decision point 1012 and module 1032 of FIG. 6L, with the difference that four sequential paths are filtered instead of a path followed sequentially by a vector followed sequentially by a vector followed sequentially by a path. As a result, a final "four path" list, i.e. a list of logically-linked sequences of four paths, which are sequentially combinable, if any, would be stored to memory 15 at module 1094 of FIG. 6P.

The next step takes to a decision point 1096, which checks if the search is limited to "four carrier multi-leg" solutions, i.e. "four path" solutions, in order to start searching for the next possible alternatives. The same decision point 1096 is reached if no results are available after the filtering modules at decision points 1060, 1072, 1086 and 1092.

If the search is limited to "four carrier multi-leg" solutions at 1096, the next step checks if any solutions are available, i.e. if there are any vectors in the "four path" list 1094, in which case the next step follows on to "F" on FIG. 6ZA a module that sums up all final results for classification according to system default or user defined criteria.

If no results are available at 1098 the next step follows on to "G" on FIG. 6ZB, a module suggesting possible modifications or leading to the main menu.

In case of modifications, the process from module 1046 to module 1088 is similar to that described before from module 986 to module 1026.

By now the second five stages of the process of generating a double tree in specific sequences, for finding a solution to a specific origin—destination pair, have been represented basically by a sixth stage of wide search of vector elements matching 1GP LWP by proximity in modules 860 to 872, a seventh stage of identifying among these "two path, one vector" solutions in modules 874 to 878, an eighth stage of identifying among these "three path" solutions in modules 924 to 966, a ninth stage of matching between each other the vectors obtained in the sixth stage in order to obtain "two path, two vector" solutions in modules 984 to 1002 and a tenth stage of completing the paths of the vectors obtained in the sixth stage and matching between each other the completed paths, i.e. through matching of their respective elements, in order to obtain "four path" solutions in modules 1044 to 1094.

These second five stages allow for the assembly of single or multiple path elements, which belong to either one or two service provider paths, in order to perform with 2GP elements the construction of a virtual bridge or connection, between the waypoints O 1GP LWP and the D 1GP LWP of the first generation paths.

In the next steps, for each different pair of origin related paths O 2GP and destination related paths D 2GP, obtained in module 1044 and within these, for each different pair of origin-related waypoints O 2GP WP with destination-related waypoints D 2GP WP, the process explores the possibility of constructing a bridge or connection in the same way it did before in the second five stages, in order to bridge or connect the O 1GP LWP the D 1GP LWP waypoints.

For each individual pair, the scope of the vectors involved in the solution could either be limited by the main scope area encompassing origin and destination as performed at step 604 of FIG. 6A, by the usually smaller area obtained by applying a limiting scope function, for example an imperfect elliptical shape encompassing the distinct waypoint pair O 1GP WP-D 1GP WP, instead of the original origin-destination pair of the load as performed at step 854, or by the usually even smaller area obtained by further applying the limiting scope to a shape encompassing the distinct waypoint pair O 2GP WP-D 2GP WP, instead of the O 1GP WP-D 1GP WP pair.

The third five stages will now be done for every distinct waypoint pair obtained from the O 2GP and D 2GP paths of module 1044. The pairs comprise O 5G LWP-D 5G LWP, O 5G LWP-D 6G LWP, O 6G LWP-D 5G LWP and O 6G LWP-D 6G LWP type pairs.

The type pairs involving the fourth generation linkable waypoints O 5G LWP-D 4G LWP, O 4G LWP-D 5G LWP, O 6G LWP-D 4G LWP, O 4G LWP-D 6G LWP, O 4G LWP-D 4G LWP will be used only if provisions are made, allowing the service providers to state if they are willing to accept "transfer" consignments, i.e. transport of a load only within a single waypoint associated area, along with an extra set of conditions governing the terms of acceptance of "transfer" consignments, a task performed by the Rules & Optimization, Topical and Account Subsystems.

If the search is not limited to four carrier multi-leg solutions, Further results can be obtained when constructing a virtual bridge or connection between origin-related O 2GP and destination-related 2GP completed paths obtained in module 1044 of FIG. 6O. The next step then after decision point 1096 is to explore further possibilities in the shape of "five carrier, four multi-leg plus one single leg" solutions, i.e. four paths—one vector, which leads to the next step 1100 of FIG. 6Q, recalling all O 1GP and D 1GP elements, i.e. elements saved to memory 1, memory 4 and memory 6 as well as recalling all O 2GP and D 2GP elements, i.e. elements saved to memory 9, memory 12 and memory 14.

The search process then decides at 1102 if this is the first enquiry related to a load, or if it is a modified enquiry related to a load searched immediately before. If it is an original enquiry the process continues to a filtering module 1104 where all the path elements within all the imperfect elliptic areas, are set aside for more efficient immediate retrieval and stored as Memory 16.

The next step of the process is to continue simultaneously to an origin-related matching module 1110 and a destination-related matching module 1114, both followed by a filtering module 1118. These modules are explained in detail in FIG. 20, but a brief description will be given here.

The purpose of the origin related module 1110 is to find vectors that have link types that are compatible with the load attributes and associated areas encompassing the O 2GP WP waypoints.

The purpose of the destination related module 1114 is to find vectors that have link types that are compatible with the load attributes and associated areas encompassing the D 2GP WP waypoints.

The purpose of the filtering module 1118 is filtering the matched elements according to their various rules including their link compatibility arising from the type of waypoint service link, such as those mentioned in FIG. 5A and to organise and associate the relevant remaining path elements of each of the matched elements.

The process continues then with a "save to memory" module 1122, which stores for future recall to memory 17, two lists, one of all filtered vectors and waypoints that may be successfully associated for pick up from the an O 2GP LWP waypoint and another for delivery to the a D 2GP LWP waypoint.

The first list would be the group of vectors having a linkable waypoint LWP with an associated area that encompasses an O 2GP LWP waypoint.

The second list would be a group of vectors having a linkable waypoint LWP with an associated area that encompasses a D 2GP LWP waypoint.

The vectors obtained in the first list are called origin-related fifth generation vectors O 5GV and the waypoints are called origin-related seventh generation linkable waypoints O 7G LWP The vectors obtained in the second list are called destination-related fifth generation vectors D 5GV and the waypoints are called destination-related seventh generation linkable waypoints O 7G LWP.

The flowchart now continues to a next step 1124, which is the ninth attempt to find a solution for matching the load path, with service providers' paths.

In this step 1124 the two lists mentioned above are compared to see if there is any single vector that is common to both lists, which would be a vector likely to be able to pick up at an O 2GP LWP waypoint and deliver to a D 2GP LWP waypoint in a single leg.

If the answer is "yes", at a next decision point 1126, we have one or many possible solutions that we call "four-path, one-vector" solutions, referring to the single leg characteristics of the bridge or connection, used to connect two different 2GP paths.

All the relevant elements of the paths matched to the vectors of list 1124 are then organized and stored along with the connecting vectors at a next step 1128 in memory 18' as a pre-filtered "four-path, one vector" list.

At a decision point 1130 the flow is checked to see the status of the enquiry, whether it is the original or a modification of the original. If the enquiry is the original, the process continues to a temporal filtering module 1132.

The list is filtered to condition 1, i.e. to the origin related vectors with tO 1G LWP falling within the load's minimum and maximum time of departure and the destination related vectors with tD 1G LWP falling within the minimum and maximum allowable time of arrival.

The filtering module then further checks for the time compatibility of each of the quadruple matched path-path-vector-path-path combinations of the list 1128, the first being origin-related O 1GP LWP waypoints matched with origin-related O 4G LWP waypoints, the second being origin-related O 2GP LWP waypoints matched with origin-related O 7G LWP waypoint, the third being destination-related D 7G LWP waypoints matched with destination-related D 2GP LWP and the fourth being destination-related D 4G LWP waypoints matched with the destination-related D 1GP LWP so that they are all sequential in time, even including a time safety margin STT.

These conditions will be stated as:

$tO\ 1GP\ LWP < tO\ 4G\ LWP - STT$ $tO\ 2GP\ LWP < tO\ 7G\ LWP - STT$ $tD\ 7G\ LWP < tD\ 2GP\ LWP - STT$ $tD\ 4G\ LWP < tD\ 1GP\ LWP - STT$

In these cases, when matching with another 2GP path, the 1G LWP of the 1GP paths will only be enabled if the "transfer consignment" option is enabled and similarly for the 4G LWP of the 2GP paths, when matching with a 7G LWP waypoint.

The process from decision point 1138 to module 1158 of FIG. 6R is a filtering process similar to the previous filtering process between decision point 1072 and module 1094 of FIG. 6P, with the difference that a two sequential paths followed sequentially by a vector followed sequentially by two further sequential paths, are filtered instead of four sequential paths. As a result, a final "four path, one vector" list, i.e. a list of logically-linked sequences of two paths, a vector and two paths, which are sequentially combinable, if any, would be stored to memory 18 at module 1158 of FIG. 6R.

The next step takes to a decision point 1160, which checks if the search is limited to "five carrier, four multi-leg plus one single leg" solutions, i.e. "four path, one vector" solutions, in order to start searching for the next possible alternatives. The same decision point 1160 is reached if no results are available after the filtering modules at decision points 1126, 1138, 1150 and 1156.

If the search is limited to "five carrier, four multi-leg plus one single leg" solutions at 1160, the next step checks if any solutions are available, i.e. if there are any vectors in the "four path, one vector" list of 1158, in which case the next step follows on to "F" on FIG. 6ZA a module that sums up all final results for classification according to system default or user defined criteria. If no results are available at 1162 the next step follows on to "G" on FIG. 6ZB, a module suggesting possible modifications or leading to the main menu.

In case of modifications, the process from module 1106 to module 1152 is similar to that described before from module 1046 to module 1088.

If the search is not limited to five carrier, two multi-leg one single leg solutions, the next step then after decision 1096 is to explore further possibilities in the shape of "five carrier multi-leg" solutions, i.e. five paths, which leads to the next step 1170 of FIG. 6S, recalling all 1GP and 2GP elements, i.e. the elements saved to memory 1, memory 4, memory 6, memory 9, memory 12 and memory 14 plus the list of 5GV vectors and 7G WP waypoints saved to memory 17.

The search process then decides at 1172 if this is the first enquiry related to a load, or if it is a modified enquiry related to a load searched immediately before. If it is an original enquiry the process continues next to a module 1174, which is the tenth attempt to find a solution for matching the load path, with service providers' paths.

The module 1174, similar to that of 924 of FIG. 6K and of 672 of FIG. 6C, identifies and lists paths, that are common to O 7G LWP and D 7G LWP waypoints.

If there are any results at the decision point 1180 the next step of the process is a module 1182 that retrieves all relevant path elements from the paths listed at 1174, followed by a module 1184 that organizes and associates elements, not only of the paths listed at 1174, but also of the O 1GP and D 1GP paths that are connected to O 2GP and D 2GP which in turn are connected to each path listed at 924. i.e. organizing in sequential order all relevant elements between, O 1G LWP, O 2G LWP, O 3G LWP, O 4G LWP, O 5G LWP, O 6G LWP, O 7G LWP, D 7G LWP, D 6G LWP, D 5G LWP, D 4G LWP, D 3G LW, D 2G LWP and D 1G LWP waypoints also represented as all relevant elements between O 1/2/3/4/5/617G LWP and D 1/2/3/41516/7G LWP.

The flowchart continues then with a "store to memory" module 1186, which stores for future recall the list of five combined paths, that may be successfully associated for a pick up from the origin and a delivery to the destination of the load, termed pre-filtered "five path" list to memory 19'.

The search process then decides at 1188 if this is the first enquiry related to a load, or if it is a modified enquiry related to a load searched immediately before. If it is an original enquiry the process continues to a temporal filtering module 1190.

The list is filtered to condition 1, i.e. to the origin related vectors with tO 1G LWP falling within the load's minimum and maximum time of departure and the destination related vectors with tD 1G LWP falling within the minimum and maximum allowable time of arrival.

The filtering module then further checks for the time compatibility of each of the quadruple matched five path combinations of the list 1186, the four matches being similar to those for the path combinations of the list 1128.

These conditions will be stated as:

tO 1GP LWP<tO 4G LWP−STT tO 2GP LWP<tO 7G LWP−STT tD 7G LWP<tD 2GP LWP−STT tD 4G LWP<tD 1GP LWP−STT

In these cases, when matching with another 2GP path, the 1G LWP of the 1GP paths will only be enabled if the "transfer consignment" option is enabled and similarly for the 4G LWP of the 2GP paths, when matching with a 7G LWP waypoint.

The process from decision point 1200 to module 1220 of FIG. 6T is a filtering process similar to the previous filtering process between decision point 1138 and module 1158 of FIG. 6R, with the difference that, five sequential paths are filtered, instead of a two sequential paths followed sequentially by a vector followed sequentially by two sequential paths. As a result, a final "five path" list, i.e. a list of logically-linked sequences of five paths, which are sequentially combinable, if any, would be stored to memory 19 at module 1220 of FIG. 6T.

The next step takes to a decision point 1222, which checks if the search is limited to "five carrier multi-leg" solutions, i.e. "five path" solutions, in order to start searching for the next possible alternatives. The same decision point 1222 is reached if no results are available after the filtering modules at decision points 1180, 1200, 1212 and 1218.

If the search is limited to "five carrier multi-leg" solutions at 1222, the next step checks if any solutions are available, i.e. if there are any vectors in the "five path" list of 1220, in which case the next step follows on to "F" on FIG. 6ZA a module that sums up all final results for classification according to system default or user defined criteria.

If no results are available at 1224 the next step follows on to "G" on FIG. 6ZB, a module suggesting possible modifications or leading to the main menu.

In case of modifications, the process from module 1176 to module 1214 is similar to that described before from module 1106 to module 1152.

If the search is not limited to five carrier multi-leg solutions, the next step then after decision 1222 is to explore further possibilities in the shape of "six carrier, four multi-leg, two single leg" solutions, i.e. "four paths, two vectors" solutions, which leads to the next step 1230 of FIG. 6U, which recalls all 1GP and 2GP elements, i.e. the elements saved to memory 1, memory 4, memory 6, memory 9, memory 12 and memory 14 plus the list of 5GV vectors and 7G WP waypoint saved to memory 17.

The search process then decides at 1232 if this is the first enquiry related to a load, or if it is a modified enquiry related to a load searched immediately before. If it is an original enquiry the process continues next to a module 1234, which is the eleventh attempt to find a solution for matching the load path, with service providers' paths.

The module 1234 recalls the remaining waypoints associated to the MAIN 5GV vectors from the ones previously saved to memory 17 at 1122. The remaining waypoints are termed eighth generation waypoints 8G WP and they are obtained in a similar way as we obtained the 2G WP waypoints for the 1GV vectors and the 5G WP for the 3GV vectors. The O 8G WP and the D 8G WP are stored to memory 20.

The next step of the process is to continue simultaneously to an origin-related elements link filtering module 1240 followed by an origin-related matching module 1242 and a destination-related link filtering module 1244 followed by a destination-related matching module 1246, both followed by a filtering module 1248. These modules are explained in detail in FIG. 21, but a brief description will be given here.

The purpose of the origin-related module 1240, is to find vectors that have link types that are compatible with the load attributes, i.e. linkable waypoints O 8G LWP and the purpose of origin-related module 1242, is to find the vectors with O 8G LWP associated areas encompassing the opposite D 8G LWP resulting from 1244.

Conversely, the purpose of the destination related module 1244 is to find vectors that have link types that are compatible with the load attributes, i.e. linkable waypoints D 8G LWP and that of destination-related module 1246, is to find the vectors with D 8G LWP associated areas encompassing the opposite O 8G LWP resulting from 1240.

The purpose of the filtering module 1248 is filtering the matched elements according to their various rules including their link compatibility arising from the type of waypoint service link, such as those mentioned in FIG. 5A and to organise and associate the relevant remaining path elements of each of the matched elements.

The module 1248 retrieves all relevant path elements from the matched paths obtained and organizes and associates elements of the O 2GP and D 2GP paths that are connected to each 5GV vector matched at 1248 and also of the O 1GP and D 2GP paths that are connected to these O 2GP and D 2GP respectively, i.e. organizing in sequential order all combined elements between, O 1G LWP, O 2G LW, O 3G LWP, O 4G LWP, O 5G LWP, O 6G LWP, O 7G LWP, O 8G LWP, D 8G LWP, D 7G LWP, D 6G LWP, D 5G LWP, D 4G LWP, D 3G LW, D 2G LWP and D 1G LWP waypoints also represented as all relevant elements between O 1/2/3/4/5/6/7/8G LWP and D 1/2/3/4/5/6/7/8G LWP.

If there are any results at the decision point 1250 the process continues then with a "store to memory" module 1252, which stores for future recall the list of two paths combined through two vectors with two other paths, that may be successfully associated for a pick up from the origin and a delivery to the destination of the load, termed pre-filtered "four path, two vector" list to memory 21'.

The search process then decides at 1254 if this is the first enquiry related to a load, or if it is a modified enquiry related to a load searched immediately before. If it is an original enquiry the process continues to a temporal filtering module 1256.

The list is filtered to condition 1, i.e. to the origin related vectors with tO 1G LWP falling within the load's minimum and maximum time of departure and the destination related vectors with tD 1G LWP falling within the minimum and maximum allowable time of arrival.

The filtering module then further checks for the time compatibility of each of the quintuple matched path-path-vector-vector-path-path combinations of the list 1252, the first match being the origin-related O 1GP LWP waypoints matched with the origin-related O 4G LWP waypoints and the second being the origin-related O 2GP LWP with the origin-related O 7G LWP, the third match being with the origin-related O 8G LWP with the destination-related D 8G LWP, the fourth match the destination-related D 7G LWP with the destination-related D 2GP LWP and the fifth being the destination-related D 4G LWP with the destination-related D 1GP LWP waypoints, so that they are all sequential in time, even when including a time safety margin STT.

These conditions will be stated as:

tO 1GP LWP<tO 4G LWP−STT tO 2GP LWP<tO 7G LWP−STT tO 8G LWP<tD 8G LWP−STT tD 7G LWP<tD 2GP LWP−STT tD 4G LWP<tD 1GP LWP−STT

In these cases, when matching with another 2GP path, the 1G LWP of the 1GP paths will only be enabled if the "transfer consignment" option is enabled and similarly for the 4G LWP of the 2GP paths, when matching with a 7G LWP waypoint.

The process from decision point 1262 to module 1282 of FIG. 6V is a filtering process similar to the previous filtering process between decision point 1200 and module 1220 of FIG. 6T, with the difference that a two sequential paths, followed by two sequential vectors, followed by two sequential paths, are filtered, instead of five sequential paths. As a result, a final "four path, two vector" list, i.e. a list of logically-linked sequences of two paths, two vectors and two paths which are sequentially combinable, if any, would be stored to memory 21 at module 1282 of FIG. 6V.

The next step takes to a decision point 1284, which checks if the search is limited to "six carrier, four multi-leg plus two single leg" solutions, i.e. "four path, two vector" solutions, in order to start searching for the next possible alternatives. The same decision point 1284 is reached if no results are available after the filtering modules at decision points 1250, 1262, 1274 and 1280.

If the search is limited to "six carrier, two multi-leg plus two single leg" solutions at 1284, the next step checks if any solutions are available, i.e. if there are any vectors in the "four path, two vector" list 1282, in which case the next step follows on to "F" on FIG. 6ZA a module that sums up all final results for classification according to system default or user defined criteria.

If no results are available at 1286 the next step follows on to "G" on FIG. 6ZB, a module suggesting possible modifications or leading to the main menu.

In case of modifications, the process from module 1236 to module 1276 is similar to that described before from module 1176 to module 1214.

If the search is not limited to six carrier, four multi-leg plus two single leg solutions, the next step then after decision 1284 is to explore further possibilities in the shape of "six carrier multi-leg" solutions, i.e. "six path" solutions, which leads to the next step 1290 of FIG. 6W, which recalls all 1GP and 2GP elements, i.e. the elements saved to memory 1, memory 4, memory 6, memory 9, memory 12 and memory 14 plus the list of 5GV vectors and 7G WP waypoint saved to memory 17.

The search process then decides at 1292 if this is the first enquiry related to a load, or if it is a modified enquiry related to a load searched immediately before. If it is an original enquiry the process continues next to a module 1294, which is the twelfth attempt to find a solution for matching the load path, with service providers' paths.

The module 1294 retrieves all path elements succeeding MAIN O 5GV vectors and all path elements preceding MAIN D 5GV vectors.

The vectors and waypoints retrieved following this procedure will be termed "sixth generation vectors" 6GV and "ninth generation waypoints" 9G WP respectively.

The sixth generation vectors 6GV and ninth generation waypoints 9G WP along with the remaining attributes of the 9G WP, including the associated areas, will be retrieved and stored in memory 22.

We can now define as a third generation path 3GP, the group of all 7G WP, 8G WP and 9G WP with their associated areas and attributes, plus the 5GV and 6GV vectors, that belong to a same transport path. Furthermore the term third generation path vector 3GP V will include the 5GV and 6GV vectors and the term third generation path waypoint 3GP WP will include any of, or all 7G WP, 8G WP and 9G WP waypoints. A similar nomenclature will be used for the linkable waypoints, replacing LWP for WP. In the preferred embodiment the 7G LWP waypoints of the 3Gppath will not be considered for matching purposes with the opposite-related 3GP paths, although it can be considered in an alternative embodiment.

A further classification is made for origin-related and destination-related paths and elements and as before they are preceded by the "O" and "D" characters respectively to indicate where they relate to.

The next step of the flowchart is to continue simultaneously to an "origin-related elements" link filtering module 1302 followed by an origin-related matching module 1304 and a destination-related link filtering module 1304 followed by a destination matching module 1306, both followed by a filtering module 1308. These modules are explained in detail in FIG. 22, but a brief description will be given here.

The purpose of the origin-related module 1302 is to find O 3GP V vectors that have O 3GP WP waypoint lines that are compatible for combination with other D 3GP V vectors that have D 3GP WP waypoints i.e. linkable waypoints O 3GP LWP which include any of 7G LWP, 8G LWP and/or 9G LWP.

The purpose of origin-related module 1304, is to find the O 3GP LWP of 1302 which have associated areas encompassing the opposite D 2GP LWP waypoints resulting from 1304. Conversely, the purpose of the destination-related module 1306 is to find the D 3GP LWP of 1304 which have associated areas encompassing the opposite D 3GP LWP waypoints resulting from 1302.

In these cases, when matching against an opposite-related same generation path, the 1G LWP of the 1GP paths, the 4G LWP of the 2GP paths and the 7G LWP of the 3GP paths will only be enabled if the "transfer consignment" option is enabled.

Also, when considering O 3GP LWP vs. D 3GP LWP the option of O 8G LWP as a O 3GP LWP will not be considered simultaneously with the option of D 8G LWP as a D 3GP LWP as this condition was considered already at the previous modules 1240 to 1248.

The purpose of the filtering module 1308 is filtering the matched elements according to their various rules including their link compatibility arising from the type of waypoint service link, such as those mentioned in FIG. 5A and to organise and associate the relevant remaining path elements of each of the matched elements.

The module 1308 retrieves all relevant path elements from the matched paths obtained and organizes and associates elements of the O 2GP and D 2GP paths that are connected to each of the matched 3GP paths and also of the O 1GP and D 2GP paths that are connected to these O 2GP and D 2GP respectively, i.e. organizing in sequential order all combined relevant elements between, O 1G LWP, O 2G LW, O 3G LWP, O 4G LWP, O 5G LWP, O 6G LWP, O 7G LWP, O 8G LWP, O 9G LWP, D 9G LWP, D 8G LWP, D 7G LWP, D 6G LWP, D 5G LWP, D 4G LWP, D 3G LW, D 2G LWP and D 1G LWP waypoints also represented as all relevant elements between O 1/2/3/4/5/6/7/8/9G LWP and D 1/2/3/4/5/6/7/8/9G LWP.

If there are any results at the decision point 1308 the process continues then with a "store to memory "module 1310, which stores for future recall the list of four paths, combined through two further paths, that may be successfully associated for a pick up from the origin and a delivery to the destination of the load, termed pre-filtered "six path" list to memory 23'.

The search process then decides at 1312 if this is the first enquiry related to a load, or if it is a modified enquiry related to a load searched immediately before. If it is an original enquiry the process continues to a temporal filtering module 1314.

The filtering module then further checks for the time compatibility of each of the quintuple matched path-path-path-path-path-path combinations of the list 1310, the first match being the origin-related O 1GP LWP waypoints matched with the origin-related O 4G LWP waypoints and the second being the origin-related O 2GP LWP with the origin-related O 7G LWP, the third match being with the origin-related O 3GP LWP with the destination-related D 3GP LWP, the fourth match the destination-related D 7G LWP with the destination-related D 2GP LWP and the fifth being the destination-related D 4G LWP with the destination-related D 1GP LWP waypoints, so that they are all sequential in time, even when including a time safety margin STT.

These conditions will be stated as:

tO 1GP LWP<tO 4G LWP−STT tO 2GP LWP<tO 7G LWP−STT tO 3GP LWP<tD 3GP LWP−STT tD 7G LWP<tD 2GP LWP−STT tD 4G LWP<tD 1GP LWP−STT

In these cases, when matching with another opposite-related path of the same or the next generation, the 1G LWP of the 1GP paths will only be enabled if the "transfer consignment" option is enabled and similarly for the 4G LWP of the 2GP paths and the 7G LWP of the 3GP paths Also, when considering tO 3GP LWP<tD 3GP LWP−STT, the option of O 8G LWP as a O 3GP LWP will not be considered simultaneously with the option of D 8G LWP as a D 3GP LWP as this condition was considered already at the previous temporal filtering module 1256

The process from decision point 1320 to module 1340 of FIG. 6X is a filtering process similar to the previous filtering process between decision point 1262 and module 1282 of FIG. 6V, with the difference that six sequential paths are filtered instead of a two sequential paths followed by two sequential vectors followed by two sequential paths. As a result, a final "six path" list, i.e. a list of logically-linked sequences of six paths, which are sequentially combinable, if any, would be stored to memory 24 at module 1340 of FIG. 6X.

The next step takes to a decision point 1342, which checks if the search is limited to "six carrier multi-leg" solutions, i.e. "six path" solutions, in order to start searching for the next possible alternatives if available at Z1. The same decision point 1342 is reached if no results are available after the filtering modules at decision points 1308, 1320, 1332 and 1338.

If the search is limited to "six carrier multi-leg" solutions at 1342, the next step checks if any solutions are available, i.e. if there are any vectors in the "six path" list 1340, in which case the next step follows on to "F" on FIG. 6ZA a module that sums up all final results for classification according to system default or user defined criteria.

If no results are available at 1344 the next step follows on to "G" on FIG. 6ZB, a module suggesting possible modifications or leading to the main menu.

In case of modifications, the process from module 1296 to module 1334 is similar to that described before from module 1236 to module 1276.

While this system has been described in detail for up to "six path" cases linking up to six carriers or service providers in order to allow for the transport or connection, of an entity, for example a load, to be transported, connected or linked, from one point to another point, for example from an origin to a destination, it is possible to expand the system at Z1 of FIG. 6X, for cases entailing further paths and vectors to perform similar functions, by repeating the first four cycles or stages applied to the origin-destination pair on successive pairs of $N^{th}$ generation path waypoints O NGP LWP-D NGP LWP, as we have done here opposite-related pairs of 1GP, 2GP and 3GP LWP waypoints in twelve cycles or stages, i.e. four stages, for each generation of paths.

At the same time similar results could be obtained by either compressing or expanding these four stages, for example eliminating the "one vector", "two path, one vector" and four paths, one vector" stages, which are particular cases of the more general "one path", three path" and "five path" stages respectively and similarly eliminating the "two vector", "two path, two vector" and "four path, two vector" stages, which are particular cases of the more encompassing "two path", "four path" and "six path" stages respectively.

On the other hand, the progress of reconstructing a relevant path from one vector to completed relevant path, could also be done in more steps, than the just two generations of vectors we are allowing for each path generation, i.e. in the case of the 1GP path, a first relevant vector or 1GV vector and the remaining relevant vectors of the path or 2GV vectors.

In fact, the remaining relevant vectors of a path could be recalled one step at a time, therefore producing many more generations of vectors for each path than just two and with the system also checking for matches with relevant opposite-related vectors at each generation step.

The Retrieval and Reservation Process

FIGS. 6ZA to 6ZD continued from FIGS. 6A to 6Z.

Once all the possible transport paths complying with the conditions imposed on them, have been obtained by the system i.e., the paths, if any, previously saved to memories 2, 3, 5, 7, 10, 11, 13, 15, 18, 19, 21 and 24 at modules 666, 720, 776, 842, 910, 966, 1032, 1094, 1158, 1220, 1282 and 1340 respectively, they are retrieved, grouped into categories according to the number of combined carriers or service providers and listed at module 1400 of FIG. 6ZA. After all paths are grouped, a module 1401 eliminates redundant paths according to predefined rules.

The next step at module 1402 lists and rates all enabled categories of transport paths according to earliest "estimated time of arrival" ETA, with rating being preferably of a percentile type between the maximum and minimum ETA times. Maximum values would preferable assigned to the earliest ETA times.

In order to aid a user decision making process, these ratings are multiplied at a next step 1404 by an ETA relative importance factor, which may be one defined by the user, for example as a value between one and five, or one automatically set by the system.

In case of being set by the system, the factor can be user specific, calculated by customer relationship or intelligence management systems, or a general default value based on a suitable compromise according to parameters such as type of cargo or origin-destination pair distance.

The list accompanied by values resulting from the multiplication of the ETA rating with the relative ETA importance factor, is simultaneously stored to a temporary memory 1406.

The next step at module 1408 lists and rates all enabled categories of transport paths according to total combined price, with rating being preferably of a percentile type between the maximum and minimum total combined prices. Maximum values would preferably be assigned to the lowest prices.

These ratings are also multiplied at a next step 1410 by a price relative importance factor, which may be one defined by the user, or one automatically set by the system.

The list accompanied by values resulting from the multiplication of the price rating with the relative price importance factor, is simultaneously stored to a temporary memory 1412.

The next step at module 1414 lists and rates all enabled categories of transport paths according to total combined service provider quality rating, with average rating being preferably of a percentile type between the maximum and minimum average quality ratings. Maximum values would preferably be assigned to the highest quality ratings. Quality ratings are assigned to carriers or service providers according to industry intelligence and to the average input of previous system users that have engaged with the specific service providers in commercial transactions through the system object of the invention.

These ratings are also multiplied at a next step 1416 by a quality rating relative importance factor, which may be one defined by the user, or one automatically set by the system.

The list accompanied by values resulting from the multiplication of the quality rating with the relative quality rating importance factor, is simultaneously stored to a temporary memory 1418.

The next step at module 1420 is an optional expandable module that lists and rates all enabled categories of paths according to other factors including those related with travel, transport, connections, combinations or links, using similar criteria to the steps above.

These ratings are also multiplied at a next step 1422 by the "other factors'" relative importance factor, which may be defined by the user, or one automatically set by the system.

The list accompanied by values resulting from the "other factors" rating with the relative "other factor" importance factor, is simultaneously stored to a temporary memory 1424.

All the values for each combined path, stored at the temporal memories 1406, 1412, 1418 and 1424, are added for each combined path at step 1426 and all the combined paths are then listed in descending value order at 1428 showing at display step 1430 the list of all single and combined transport paths in descending order starting with what is assumed to be, according to the relative importance factors, the best compromise of price, quality and time delay, among other customisable factors.

The user can of course also choose to view, examine or review at 1430, any individual transport path list obtained in steps 1402 to 1422, either of absolute values or relative ratings, in ascending or descending order.

Once the transport path options are viewed the next step of the process is at the decision point 1432 regarding the selection of a transport path or some of its components, or not. If the user decides not to select a carrier or service provider the process continues to connector "G", which also can receive input from decision points 664, 724, 780, 846, 914, 970, 1036, 1098, 1162, 1224, 1286 and 1344 and after to a module 1436 that retrieves the electronic trial of the process through all the decision point gateways and through simple algorithms and rules is capable of making "intelligent" suggestions for modifications according to the trial of the whole search process. These suggestions are displayed at 1440, followed by a decision point 1442 regarding an option to modify conditions, which if accepted would take the process to module for modifying conditions which starts at decision point 1490 of FIG. 6ZD and if not accepted would lead the process to the main menu 1443.

If the user decides to select a carrier or service provider transport path at decision point 1432, the process continues to a selection step 1434 normally on the same interface as the displayed list. This is followed by another decision point 1438 regarding the need to see further details of the service providers, which are displayed at 1444 if the case is affirmative. Among the details are functions that enable contact at decision point 1446 of the service provider via a communication process 1448 including communication means those such as e-mail, telephone, fax, video and manned switchboards. These communication means which are further detailed in FIG. 12D, are also capable of preserving the real identity of the participants through redirection, rerouting and/or forwarding systems.

The next step whether having seen the details or not is a decision point 1450 enquiring if the user is interested in contracting the service provider/s of the chosen transport path. If the user were not interested, the process would return to the decision point 1432 regarding selection again to see if the user is interested in choosing some other service providers, in which case the process is repeated.

If the user is interested in contracting the service provider at 1450 the process continues to a process payment stage 1452 of FIG. 6ZC, which is well known in the art of e-commerce. All details of the transport operation, payment forms, payment amounts, service information, system identification for user and service provider/s, cargo details, addresses, conditions and other transportation related and commerce related parameters are input and confirmed in this module. The process continues to a system activated decision point 1454 regarding the success of the payment process.

If the payment was successful the process continues issuing a confirmation of operation at 1456 with all operation details and in printable layout and automatically initiates a sequence involving the steps of updating cargo availability for each vehicle at each leg at 1460, updating to a new schedule and producing new routing information as a result of the addition of the new load at 1462, updating the accounts of all carrier or service providers involved in the operation with the proportional transaction value of the operation at 1464, generating codes, including password codes, user identifiers, service provider identifiers, location identifiers and optical codes or bar codes for all the stages and functions of the transport operation at 1466, starting instructions for notifying service providers of new operation through an array pre-established communication procedures, for example by e-mail, fax, mail and telephone calls at 1468 and generating printable "stamp certificates" at 1470 for attachment to load cargo, or consignment with load cargo paperwork, as a main or auxiliary transport-related information document assisting in the routing and tracking of the load, as well as an evidence, assurance or affidavit of prepayment or payment commitment and a support of data used for confirmation of identity or delivery. This "stamp certificate" performs as a Transport Allowance Certificate "TAC" between the various service providers involved in a specific transport combination and is described in further detail in FIG. 3B.

The next manual steps involve the printing of stamps by the user or shipper at 1472 followed by a step asking for the user's and the recipients e-mail address for notification as well as other communication contact details at 1474.

The next step is a decision point 1476 regarding the execution of further operations.

If none are to be performed the process finishes and if further operations are planned, the next step leads to the main menu 1443.

On the other hand, if the payment operation was unsuccessful at 1454, the process continues to a module that unrolls all payment information and operations 1458 and a ""problem with payment" message is displayed at 1478, followed by a decision point 1480 regarding further payment options, which if accepted leads to a next step for selecting the payment options 1482 and the input of the new details at 1486 followed by the reprocessing of payment at 1452.

If no other payment options are accepted at 1480, an option to cancel arises at decision point 1484, which if accepted lead to the main menu 1443 and if not accepted leads to a save to memory module 1488 of the selected transport path to try again at a later stage, followed by the main menu at 1443.

If the user is interested in modifying search conditions at 1442 the process will continue in FIG. 6ZD to the presentation of options regarding the specific conditions to be modified, including a decision point for the change of geographical conditions 1490, a decision point for the modification of time window conditions 1496, a decision point for the modification of cargo size 1502, a decision point for the modification of the type of service 1508 and a decision point for modification of the types of linking 1514.

If the user opts for modification at the decision points 1490, 1496, 1502, 1508 and 1514, the process continues to a menu facility for the input of the new or modified conditions at 1492, 1498, 1504, 1510 and 1516, after which the new values are saved to individual temporal memories at 1494, 1500, 1506, 1512 and 1518 and used to replace the relevant values on a copy of the structured user information input that is used for system search purposes. This modified structured user information input is tagged for system recognition and follows the electronic trails for Loop>1 at decision points including those such as 602 to 1324.

The next step is a decision point 1520 to continue with the search, in which case the process loops back to the "start search" step 600, or not to continue the search, in which case the modified structured user input information is saved to a memory allocation with temporal expiry 1522, in order to be able to run the search later on and the process returns to the main menu 1443 for alternative operations or exit.

Graphic Representation of the Search Process

FIG. 7 is an example of a graphic representation of the process followed by the system to match possible service providers with a load origin-destination pair, formerly described in the flowchart of FIG. 6

Figure 7A:
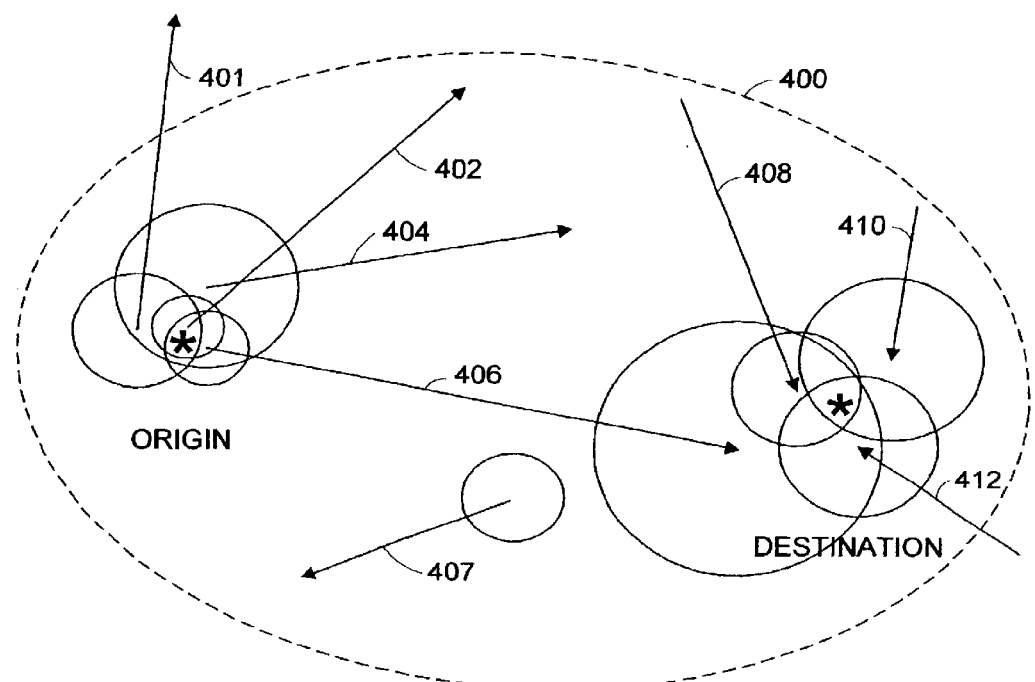
FIGS. 7A to 7F—show an example of a graphic representation of the search and retrieval process followed by the system to match possible service providers with a load origin-destination pair up to a first generation path level.

FIG. 7A shows the origin and destination coordinates of the load represented by star symbols. The imperfect elliptical area 400 is obtained by module 604 of FIG. 6A, and it excludes all vectors outside the area as well as vectors partially outside the area as for example in this case a vector 401 and a vector 412. The vectors remaining completely inside the area 400 are the group of vectors to be processed in the specific search.

As a result of matching and filtering modules 606 to 614 of FIG. 6A the process detects vectors 402, 404 and 406 with origin associated areas encompassing the origin, i.e. O 1GV vectors. The process also detects vectors 408, 406 and 410 with destination associated areas encompassing the destination, i.e. D 1GV vectors. Vector 406 is common to both groups, or lists, and is in effect a vector representing a service provider that can perform the pick up of the load at origin and the delivery of the load at destination in one leg.

Figure 7B:
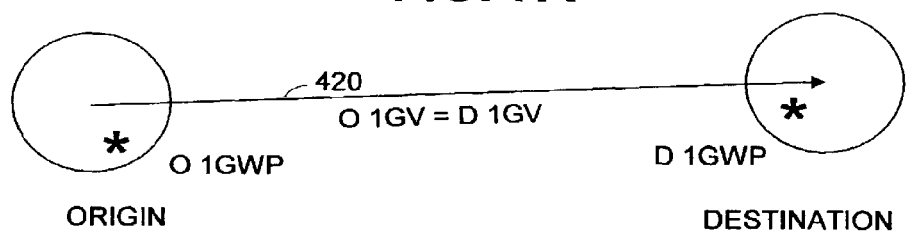

FIG. 7B shows the case of a vector 420, which is substantially similar to the case of vector 406, i.e. having an O 1G WP associated area encompassing the origin and a D 1G WP associated area encompassing the destination. As in the case of vector 406, vector 420 is an O 1GV as well as a D 1GV vector, detectable at step 624 of FIG. 6A as a possible "one-vector" solution.

Figure 7C:
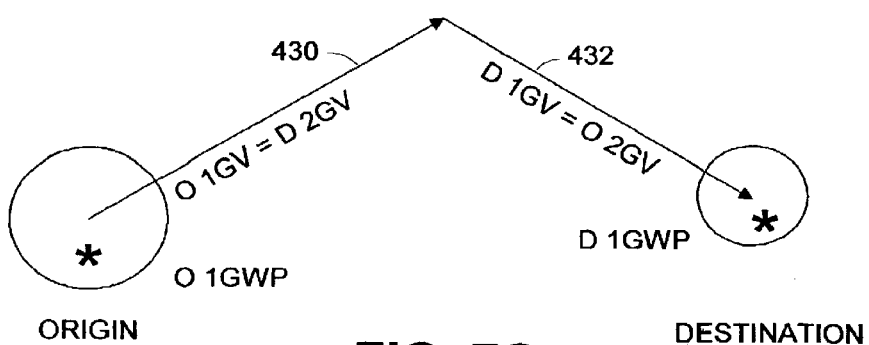

FIG. 7C shows the case of an O 1GV vector 430 and a D 1GV vector 432, which would be detected as a "one path" solution by the search process at module 672 of FIG. 6C by having the same path identification. This would also eventually be confirmed when completing path elements for each vector, i.e. the O 2GV of vector 430 would be vector 432 and the D 2GV of vector 432 would be vector 430.

Figure 7D:
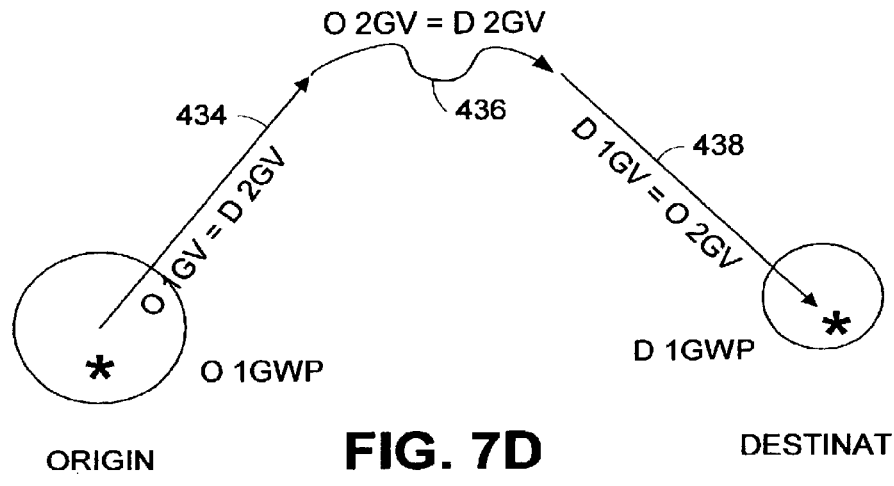

FIG. 7D shows the case of an O 1GV vector 434 and a D 1GV vector 438, which would also be detected as a "one path" solution by the search process at module 672 of FIG. 6C by having the same path identification. This would also eventually be confirmed when completing path elements for each vector, i.e. the O 2GV vectors of vector 434 would be vectors 436 and 438 and the D 2GV vectors of vector 432 would be vectors 436 and 434.

Figure 7E:
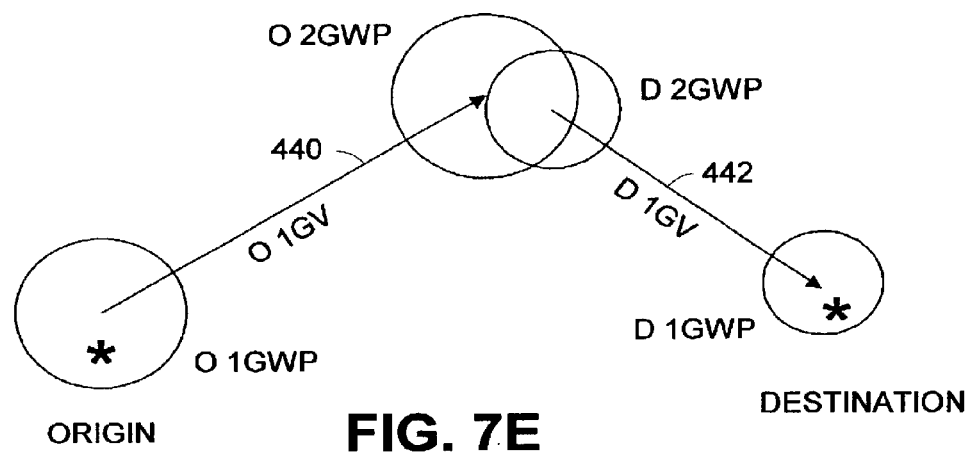

FIG. 7E shows the case of an O 1GV vector 440 and a D 1GV vector 442 that do not belong to the same path and would have not been detected as a transport path capable of transporting the load from origin to destination at steps 624 or 672.

The 2G WP and associated areas of vectors 440 and 442 would have been retrieved at step 730 of FIG. 6E as O 2G WP and D 2G WP respectively. A "two vector" match possibility between both waypoints would be detected at matching module 734 rather than at module 738, as it is the O 2G WP associated area that encompasses the D 2G WP waypoint and not vice-versa.

Figure 7F:
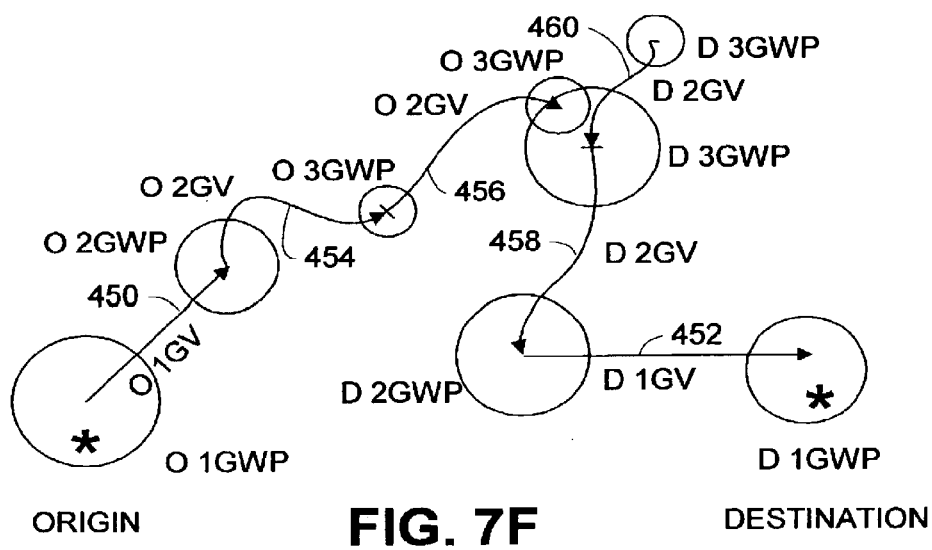

FIG. 7F shows the case of an O 1GV vector 450 and a D 1GV vector 452, which don't belong to the same path and would have not been detected as a transport path capable of transporting the load from origin to destination at steps 624,672 or at modules 734 and 738. The 2GV vectors, 3G WP waypoints and associated areas of vectors 450 and 452 would have been retrieved at step 794 of FIG. 6G as O 3G WP and D 3G WP respectively. A "two path" match possibility between waypoints would be detected at matching module 806 rather than at module 802, as in this case it is the D 3G WP associated area that encompasses the O 3G WP.

FIG. 8 shows two paths that have not been matched together by the previous attempts. In this example, one of such paths is an origin-related path comprised of an O 1GV vector 460 and two 2GV vectors 464 and 466. The other of such paths is a destination-related path comprised of only one O 1GV vector 462.

Figure 8A:
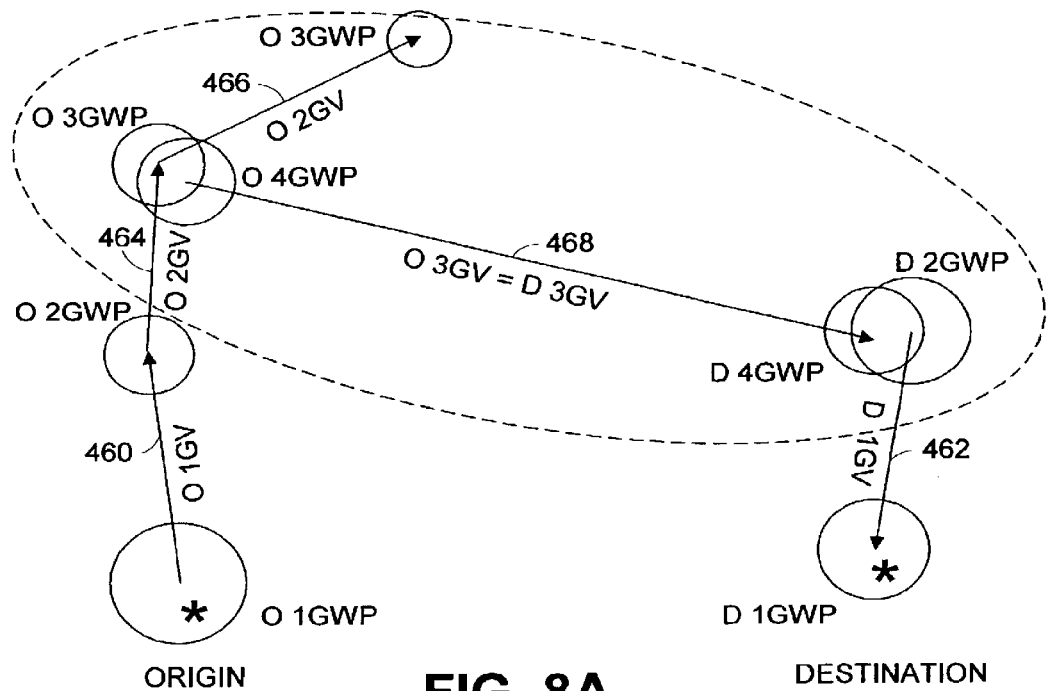
FIGS. 8A to 8D—show an example of a graphic representation of the search and retrieval process followed by the system to match possible service providers with a load origin-destination pair up to a second generation path level.

In the search to find a possible combination, the system now repeats the processes of FIG. 7 which were applied to an origin-destination pair, to every combination of origin-related first generation path waypoints with destination-related first generation path waypoints, i.e., O 1GP WP-D 1GP WP pairs, a process performed at module 854 of FIG. 6I. If the system were enabled for "transit consignments" the first generation 1G WP waypoints would be accounted for when calculating the number of possible combinations. In the case of FIG. 8A the processes will be applied to eight pair combinations, resulting of 4 waypoints on one path, times two waypoints on the other path.

If the system was not enabled for "transit consignments", the 1G WP would not be accounted for and the number of pair combinations for the same case, would be three, resulting of three waypoints on one path, times one waypoint on the other path FIG. 8A shows the case of a vector 468, which is similar to the case of FIG. 7B, having an O 4G WP associated area encompassing a O 3G WP, i.e. a O 1GP WP and a D 4G WP associated area encompassing a D 2G WP, i.e. a D 1GP WP. As in the case of vector 420, vector 468 is an O 4GV as well as a D 4GV vector, detectable at step 874 of FIG. 6I as a possible "two path, one vector" solution.

In the preferred embodiment the system performs "dual matching" or "two-way" checks for matching waypoints, i.e., not only, for example, check that a 4G WP associated area encompasses a 1GP WP waypoint, but also if a 1GP WP associated area encompasses a 4G WP waypoint. Simplified versions could check in only one direction, i.e. for example, only check whether the O 3G WP associated area encompasses an O 4G WP, in practice meaning that the system is searching an incoming service provider that can deliver to an outgoing service provider, but not searching for an outgoing service provider capable of picking up from an incoming service provider.

Figure 8B:
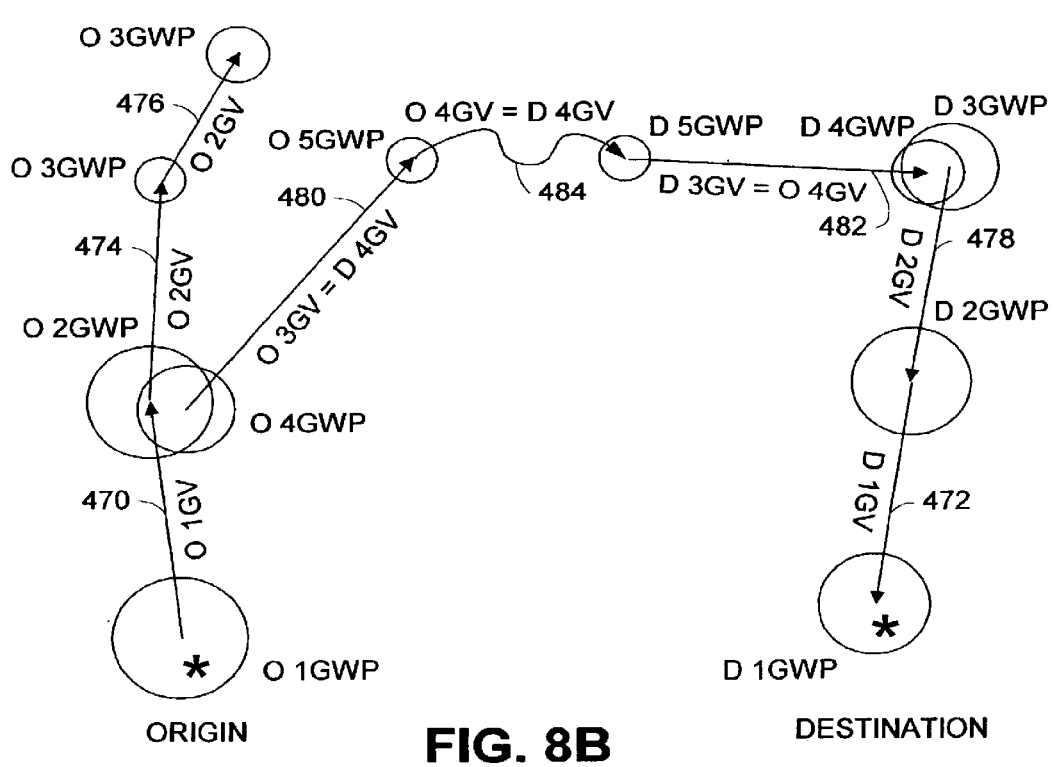

FIG. 8B shows two other paths that have not been matched together by the previous attempts. In this example, one of such paths is an origin-related path comprised of an O 1GV vector 470 and two 2GV vectors 474 and 476. The other of such paths is a destination-related path comprised of and 1GV vector 462 and a D 2GV vector 478.

As part of the process of module 854 of FIG. 6I an O 3GV vector 480 and a D 3GV vector 482 have been matched to waypoints of an origin-related O 1GP path and a destination-related D 1GP path respectively. Vectors 480 and 482 would not be common vectors to both lists, at step 874, but they would belong to the same path, comprised of vectors 480, 482 and a vector or group of vectors 484, a fact that will be recognized at step 924 of FIG. 6K, as a possible "three-path" solution.

Figure 8C:
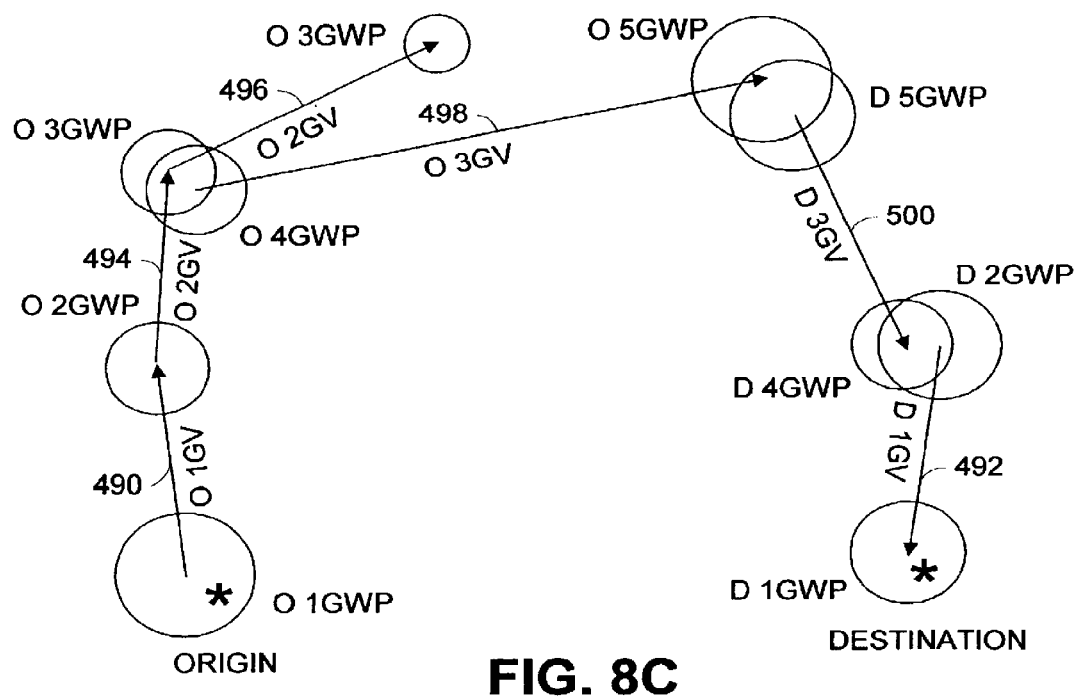

FIG. 8C shows two paths that have not been matched together by the previous attempts. In this example, one of such paths is an origin-related path comprised of an O 1GV vector 490 and two 2GV vectors 494 and 496. The other of such paths is a destination-related path comprised of only one O 1GV vector 492.

As part of the process of module 854 of FIG. 6I an O 3GV vector 498 and a D 3GV vector 500 have been matched to waypoints of an origin-related O 1GP path and a destination-related D 1GP path respectively. Vectors 498 and 500 would not be common vectors to both lists, at step 874 and they would not belong to the same path, at step 924, but they would be found to be combinable through the matching modules 984 to 998 of FIG. 6M, in which case they would be recognized as "two path, two vector" solutions, in a similar way as the vectors of FIG. 7E were matched, providing possible "two vector" solutions.

Figure 8D:
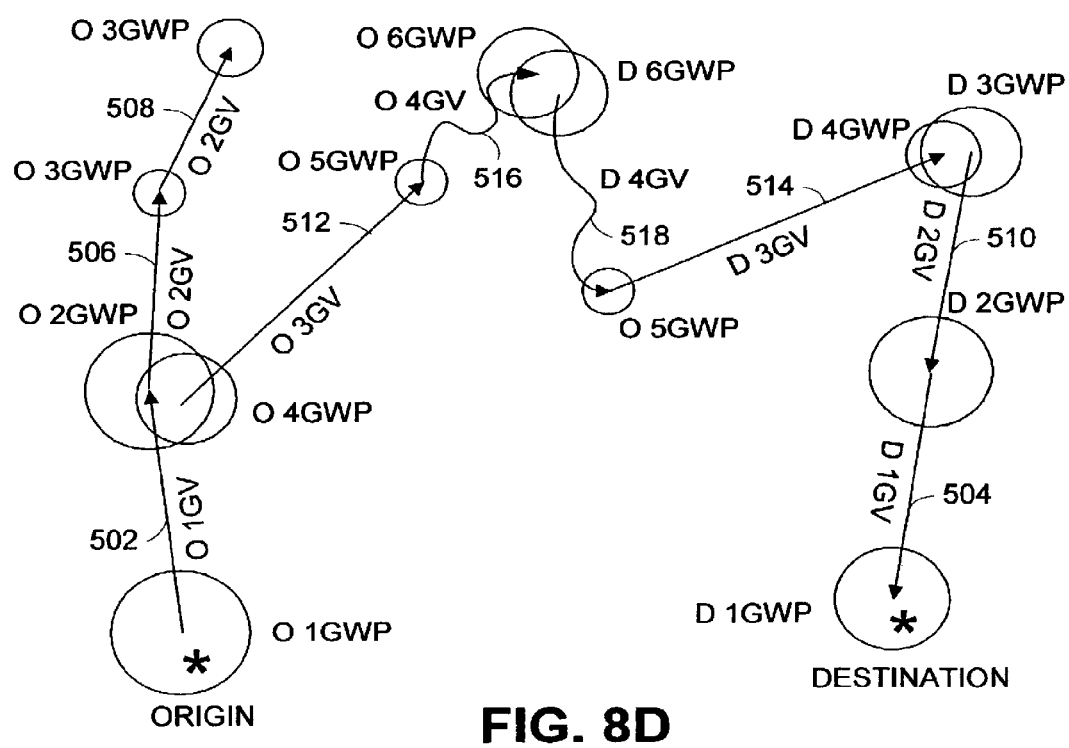

FIG. 8D shows two other paths that have not been matched together by the previous attempts. In this example, one of such paths is an origin-related path comprised of an O 1GV vector 502 and two 2GV vectors 506 and 508. The other of such paths is a destination-related path comprised of and 1GV vector 504 and a D 2GV vector 510.

As part of the process of module 854 of FIG. 6I an O 3GV vector 512 and a D 3GV vector 514 have been matched to waypoints of an origin-related O 1GP path and a destination-related D 1GP path respectively. Vectors 512 and 514 would not be common vectors to both lists, at step 874, they would not belong to the same path, at step 924 and they would not be found to be combinable through the matching modules 984 to 998, as their 5G WP are not combinable, but they would be found to be combinable through the second generation path 2GP completion module 1044 and matching modules 1050 to 1058 of FIG. 6O, in which case they would be recognized as "four path" solutions, the first path being vector 502, the second path being vector 512 followed by vector/s 516, the third path being vector/s 518 followed by vector 514 and the four path being vectors 510 and 504.

The matching of these "four path" solutions is done in a similar way as the vectors of FIG. 7F were matched, providing possible "two path" solutions.

Figure 9A:
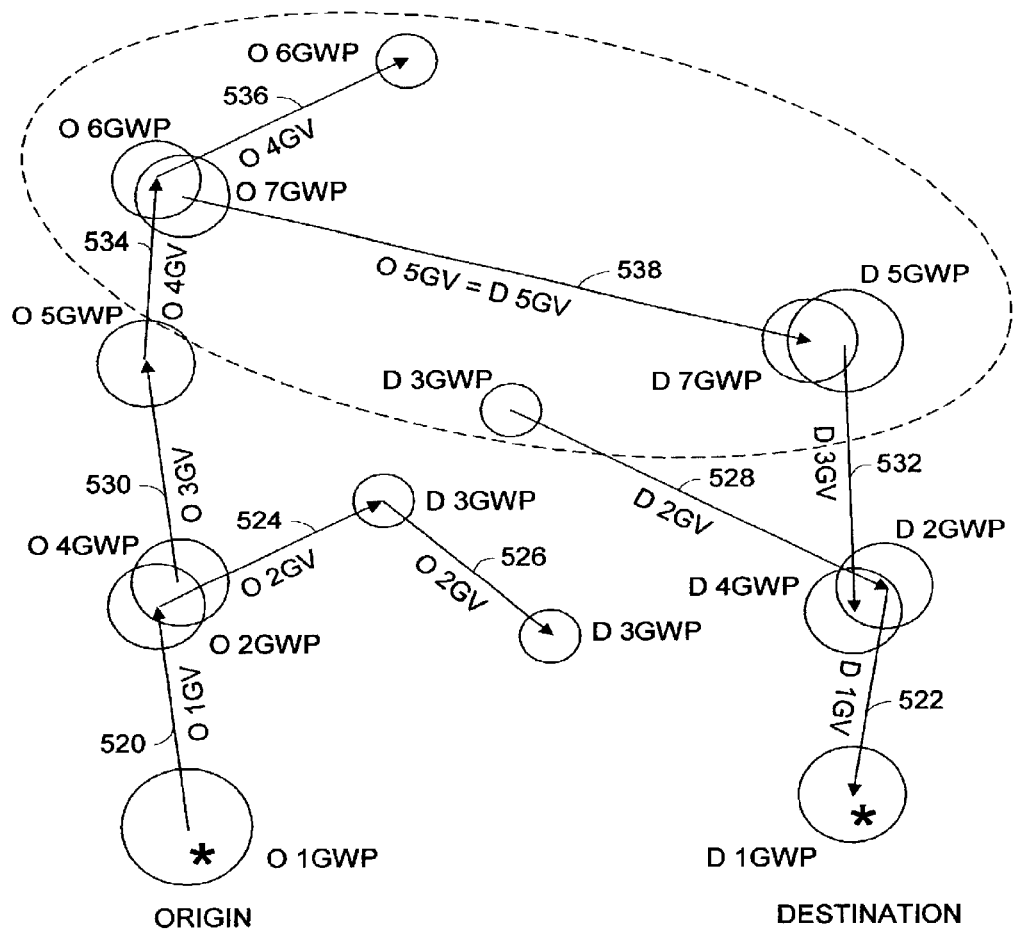
FIGS. 9A to 9D—show an example of a graphic representation of the search and retrieval process followed by the system to match possible service providers with a load origin-destination pair up to a third generation path level.

FIG. 9A shows the case of two origin-related sequentially combined paths that have not been matched together with other two destination-related sequentially combined paths by the previous system attempts.

In the search to find a possible combination, the system now repeats the four stage processes of FIG. 7 and FIG. 8 which were applied firstly to an origin-destination pair and secondly to all the different O 1GP WP-D 1GP WP pairs, this time to every different combination of origin-related second generation path waypoints with destination-related second generation path waypoints, i.e., O 2GP WP-D 2GP WP pairs, a process performed at modules 1104 to 1118 of FIG. 6Q.

If the system was enabled for "transit consignments" the fourth generation 4G WP waypoints would be accounted for, when calculating the number of possible combinations. In the case of FIG. 9A the processes will be applied to eight pair combinations, resulting of four O 2GP WP waypoints on one path, times two D 2GP WP waypoints on the other path, for this particular 2GP path pair.

If the system was not enabled for "transit consignments", the 4G WP waypoints would not be accounted for and the number of pair combinations for the same case, would be three, resulting of three O 2GP WP waypoints on one path, times one D 2GP WP waypoint on the other path.

For a specified origin-destination pair, in order to find the "four path, 1 vector" solutions, we would have to apply similar processes to those of FIG. 7 to all the 1GP WP waypoint pairs followed by applying similar processes to those of FIGS. 7A and 7B to all the 2GP WP pairs. The total number of 1GP waypoint pairs being equal to the number of all the O 1GP WP times the number of all the D 1GP WP and the total number of 2GP WP pairs being equal to the number of all O 2GP WP times the number of all D 2GP WP.

In this example, of the two origin-related sequentially combined paths, one of such paths is an origin-related O 1GP path comprised of an O 1GV vector 520 and two O 2GV vectors 524 and 526, followed by another sequential origin-related O 2GP path comprised of an O 3GV vector 530 and two O 4GV vectors 534 and 536. On the other hand, of the two destination-related sequentially combined paths one of such paths is a destination-related D 1GP path, comprised of an D 1GV vector 522 and a D 2GV vector 528 and which is sequential to a destination-related D 2GP path that precedes it, comprised of a D 3GV vector 532.

As part of the process of modules 1104 to 1118 of FIG. 6Q an O 5GV vector 538 would have been matched to a waypoint of an origin-related O 2GP path, i.e. an P 6G WP. The same D 5GV vector 538 would also have been matched to a destination-related D 2GP path waypoint, i.e. a D 5G WP.

The vector 538 would be common to both lists at step 1124 of FIG. 6Q representing a possible "four path, one vector" solution.

Figure 9B:
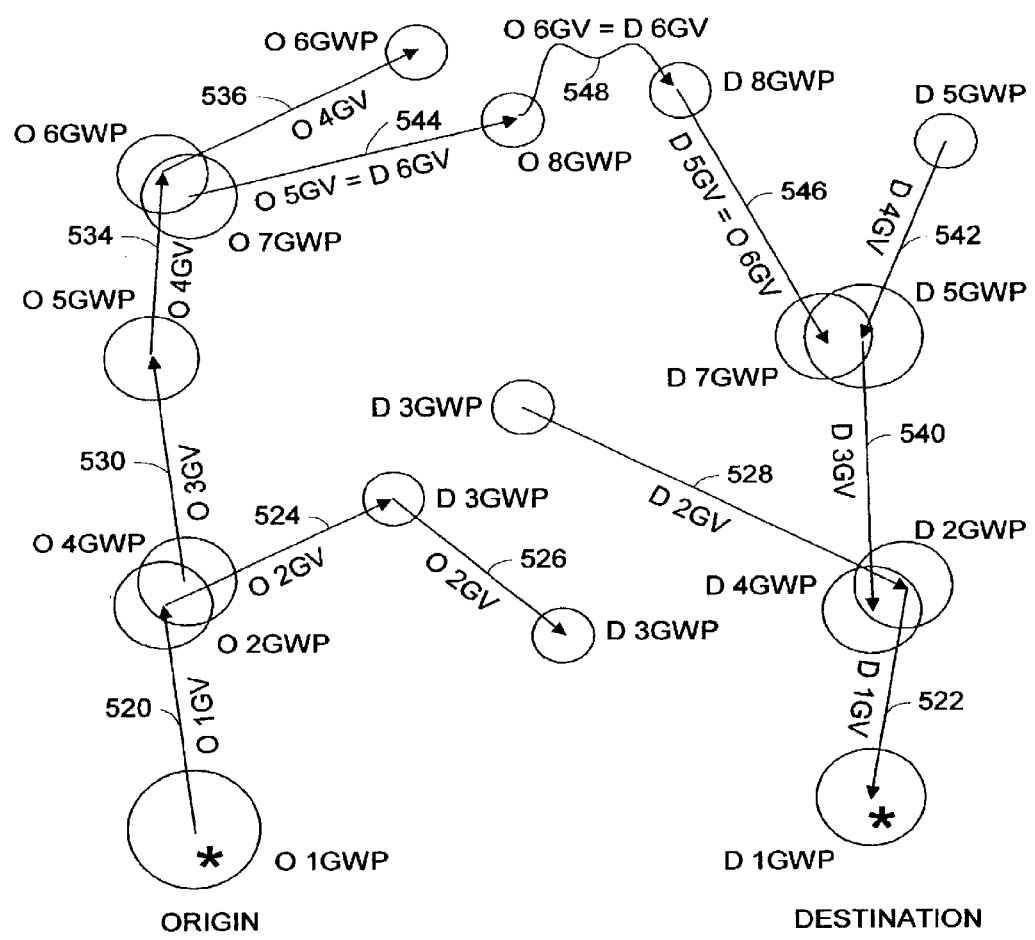

FIG. 9B shows the case of two origin-related sequentially combined paths that have not been matched together with other two destination-related sequentially combined paths by the previous system attempts, as the 5GV vectors 544 and 546 are different and would not be detected as a common vector at step 1124.

In this example, of the two origin-related sequentially combined paths, one of such paths is an origin-related O 1GP path comprised of an O 1GV vector 520 and two O 2GV vectors 524 and 526, followed by another sequential origin-related O 2GP path comprised of an O 3GV vector 530 and two O 4GV vectors 534 and 536. On the other hand, of the two destination-related sequentially combined paths one of such paths is a destination-related D 1GP path, comprised of an D 1GV vector 522 and a D 2GV vector 528 and which is sequential to a destination-related D 2GP path that precedes it, comprised of a D 3GV vector 532 and a D 4GV vector 542.

Vectors 544 and 546 would not be common vectors to both lists, at step 1124 of FIG. 6Q, but they would belong to the same path, a fact detected at step 1174 of FIG. 6S, representing possible "five path" solutions.

The path comprised of the vectors 544, 546 and possibly vector/s 548, combines the two sets of sequential 1GP and 2GP paths in a similar ways as the path of FIG. 8B combined the two 1GP paths and the path of FIG. 7D combined the origin-destination pair.

Figure 9C:
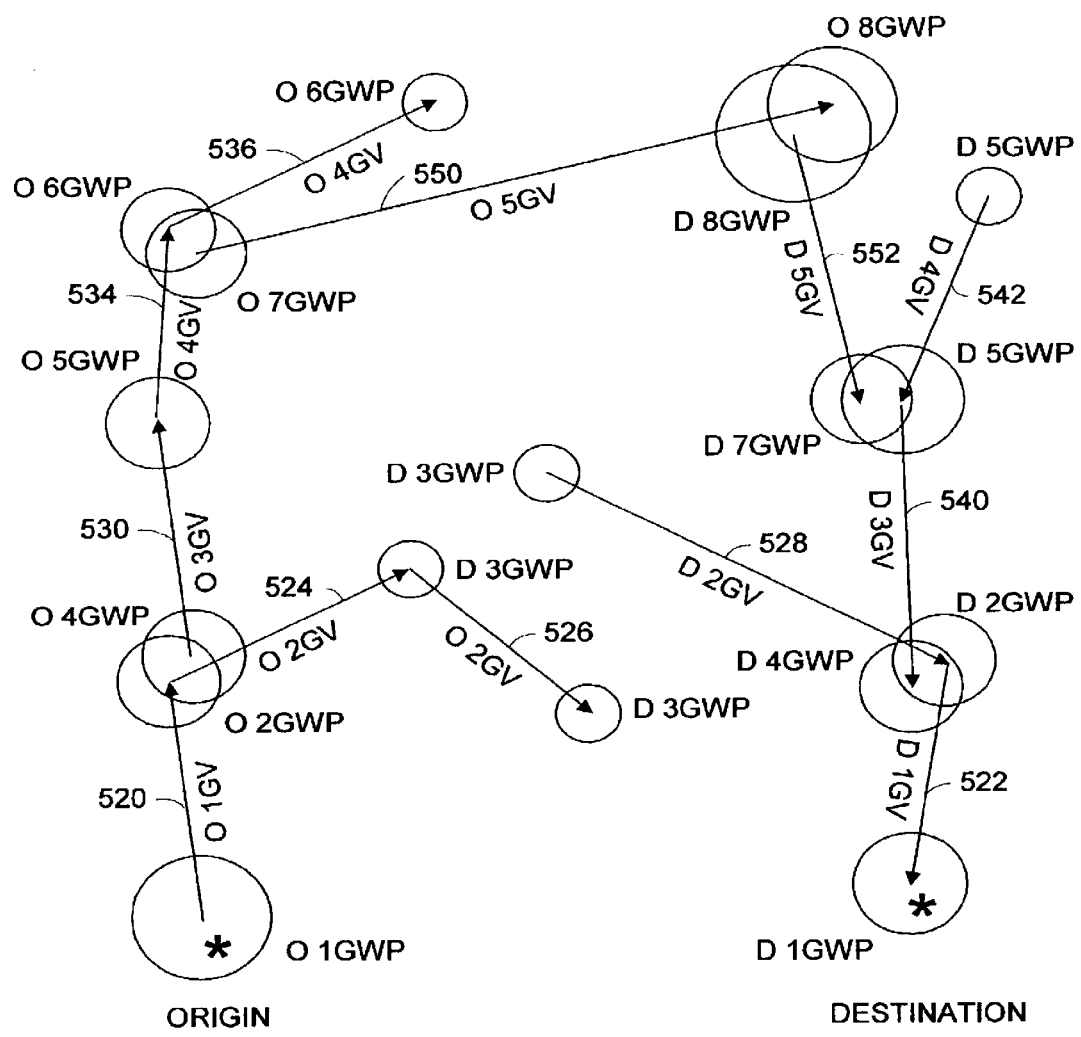

FIG. 9C shows the case of two origin-related sequentially combined paths that have not been matched together with other two destination-related sequentially combined paths by the previous system attempts, as the 5GV vectors 550 and 552 are different and would not be detected as a common vector at step 1124, neither would they be detected a belonging to a common path at step 1174.

In this example, of the two origin-related sequentially combined paths, one of such paths is an origin-related O 1GP path comprised of an O 1GV vector 520 and two O 2GV vectors 524 and 526, followed by another sequential origin-related O 2GP path comprised of an O 3GV vector 530 and two O 4GV vectors 534 and 536. On the other hand, of the two destination-related sequentially combined paths one of such paths is a destination-related D 1GP path, comprised of an D 1GV vector 522 and a D 2GV vector 528 and which is sequential to a destination-related D 2GP path that precedes it, comprised of a D 3GV vector 532 and a D 4GV vector 542.

Vectors 544 and 546 would not be common vectors to both lists, at step 1124 nor would they belong to the same path at 1174, but they would be found to be combinable through the matching modules 1234 to 1248 of FIG. 6U, in which case they would be recognized as "four path, two vector" solutions, in a similar way as the vectors of FIG. 8C and FIG. 7E were matched, providing possible "two path, two vector" and "two vector" solutions respectively.

Figure 9D:
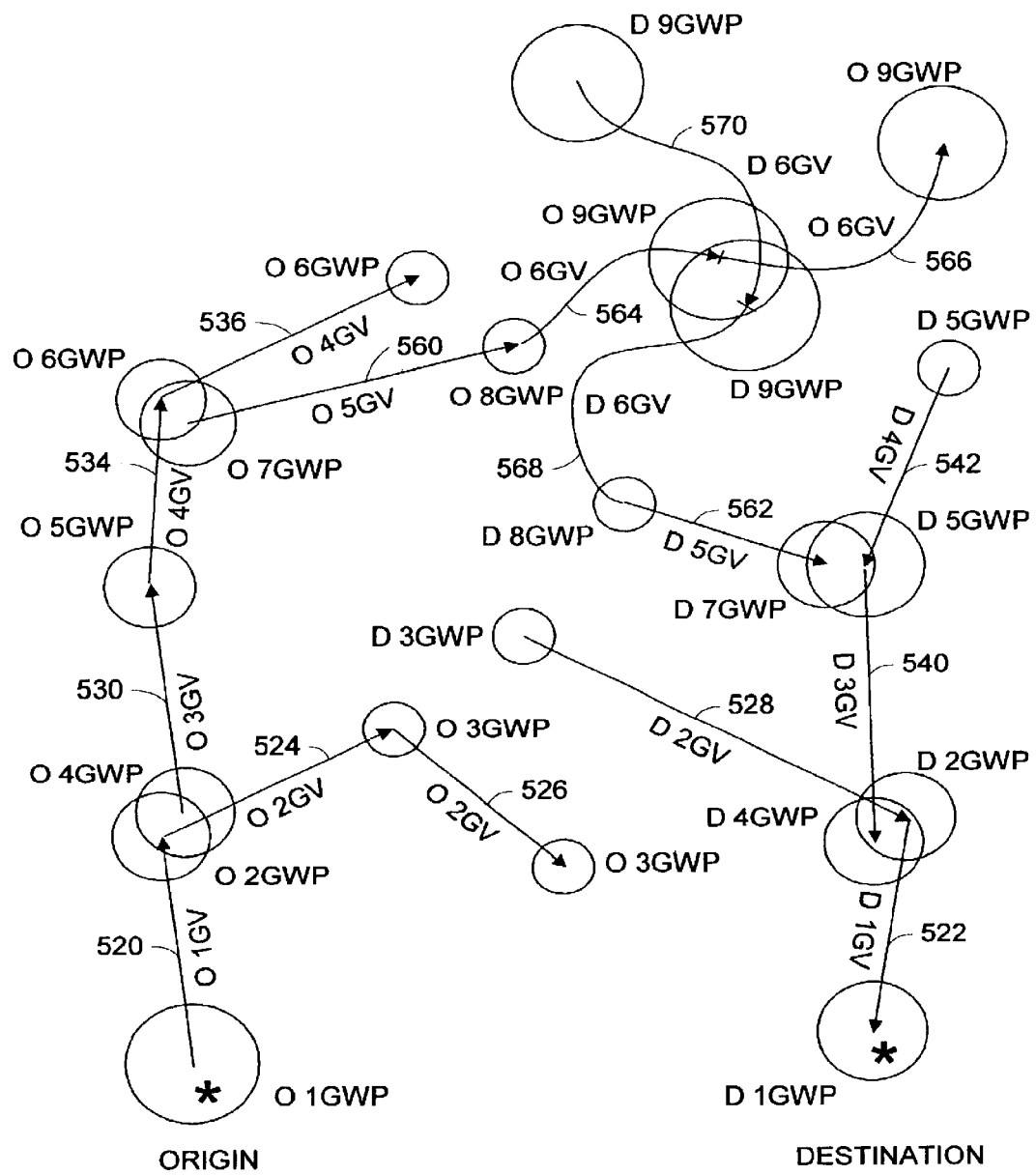

FIG. 9D shows the case of two origin-related sequentially combined paths that have not been matched together with other two destination-related sequentially combined paths by the previous system attempts, as the 5GV vectors 560 and 562 are different and would not be detected as a common vector at step 1124, they would not be detected as belonging to a common path at step 1174 and they would not be found to be combinable through the matching modules 1234 to 1248, as their 8G WP are not combinable.

In this example, of the two origin-related sequentially combined paths, one of such paths is an origin-related O 1GP path comprised of an O 1GV vector 520 and two O 2GV vectors 524 and 526, followed by another sequential origin-related O 2GP path comprised of an O 3GV vector 530 and two O 4GV vectors 534 and 536. On the other hand, of the two destination-related sequentially combined paths one of such paths is a destination-related D 1GP path, comprised of an D 1GV vector 522 and a D 2GV vector 528 and which is sequential to a destination-related D 2GP path that precedes it, comprised of a D 3GV vector 532 and a D 4GV vector 542.

The two sets of 1GP and 2GP paths would be found to be combinable through the third generation path 3GP completion module 1294 and matching modules 1302 to 1308 of FIG. 6W, in which case they would be recognized as "six path" solutions, the first path being vector 520, the second path being vector 530 followed by vector 534, the third path being vector 560 518 followed by vector/s 564, the four path being vector/s 568 followed by vector 562, the fifth path being vector 540 and the sixth path being vector 522.

The matching of these "six path" solutions is done in a similar way as the vectors of FIG. 8D and FIG. 7F were matched, providing possible "four path" and "two path" solutions respectively.

General Graphic Representation of the Double Search Tree Used

FIG. 10 shows symbolically how the first four process stages used to connect the origin-destination pair, can be further applied for connecting opposite related waypoint pairs belonging to paths of the same generation, regardless of the generation of the path, therefore extending the reach of the system not only to "six path" solutions but to solutions with a theoretically unlimited number of paths.

Figure 10A:
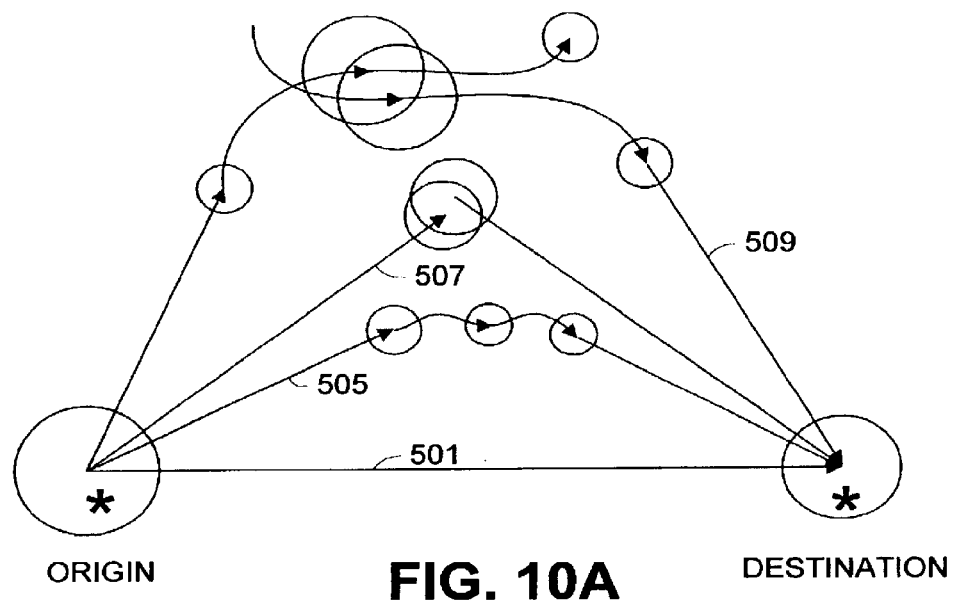
FIGS. 10A to 10D—show symbolically how the first four process stages used to connect the origin-destination pair, can be further applied for connecting opposite related waypoint pairs belonging to paths of the same generation, regardless of the generation of the path, therefore extending the reach of the system not only to "six path" solutions but to solutions with a theoretically unlimited number of paths.

FIG. 10A shows the first set of four stages of the formerly described process for connecting origin and destination, i.e. a "one vector" solution 501, a "one path" solution 505, a "two vector" solution 507 and a "two path" solution 509.

Figure 10B:
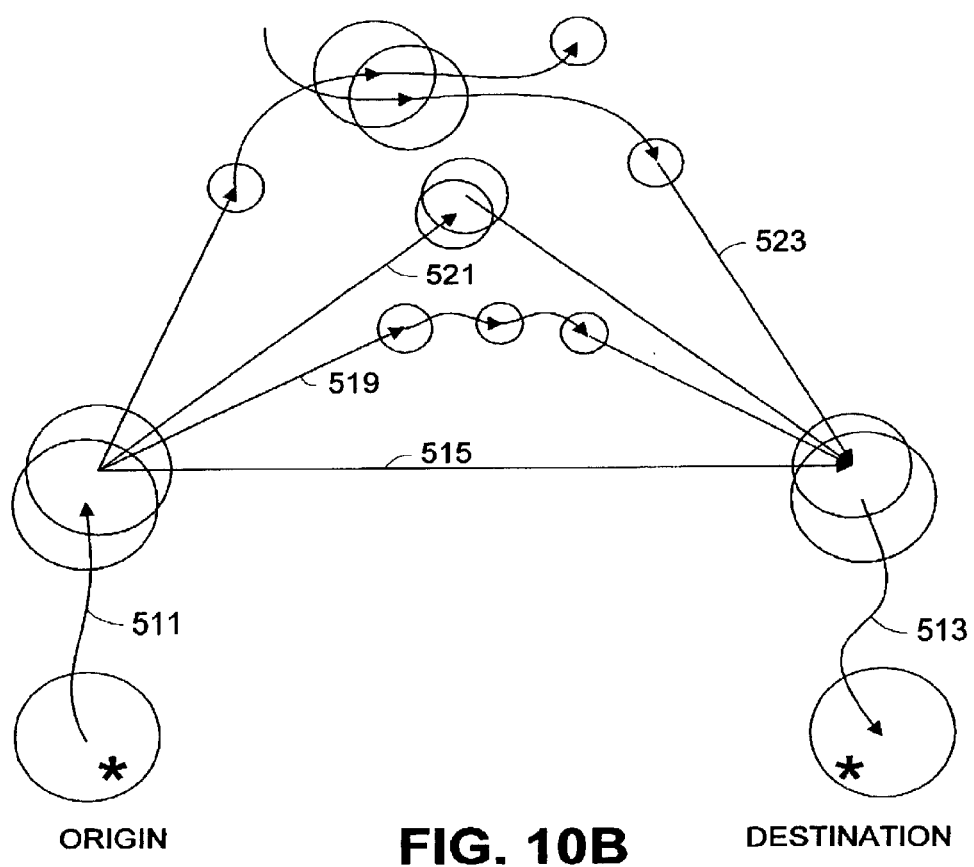

FIG. 10B shows the second set of four stages for connecting origin and destination, where similar four processes connect a waypoint of an origin-related first generation O 1GP path 511 with a waypoint of a destination-related first generation D 1GP path 513, i.e. a "two path, one vector" solution 515, a "three path" solution 519, a "two path, two vector" solution 521 and a "four path" solution 523. The process is similar to that of FIG. 10A except for the fact that it is raised in one level, which represents the 1GP path level.

Figure 10C:
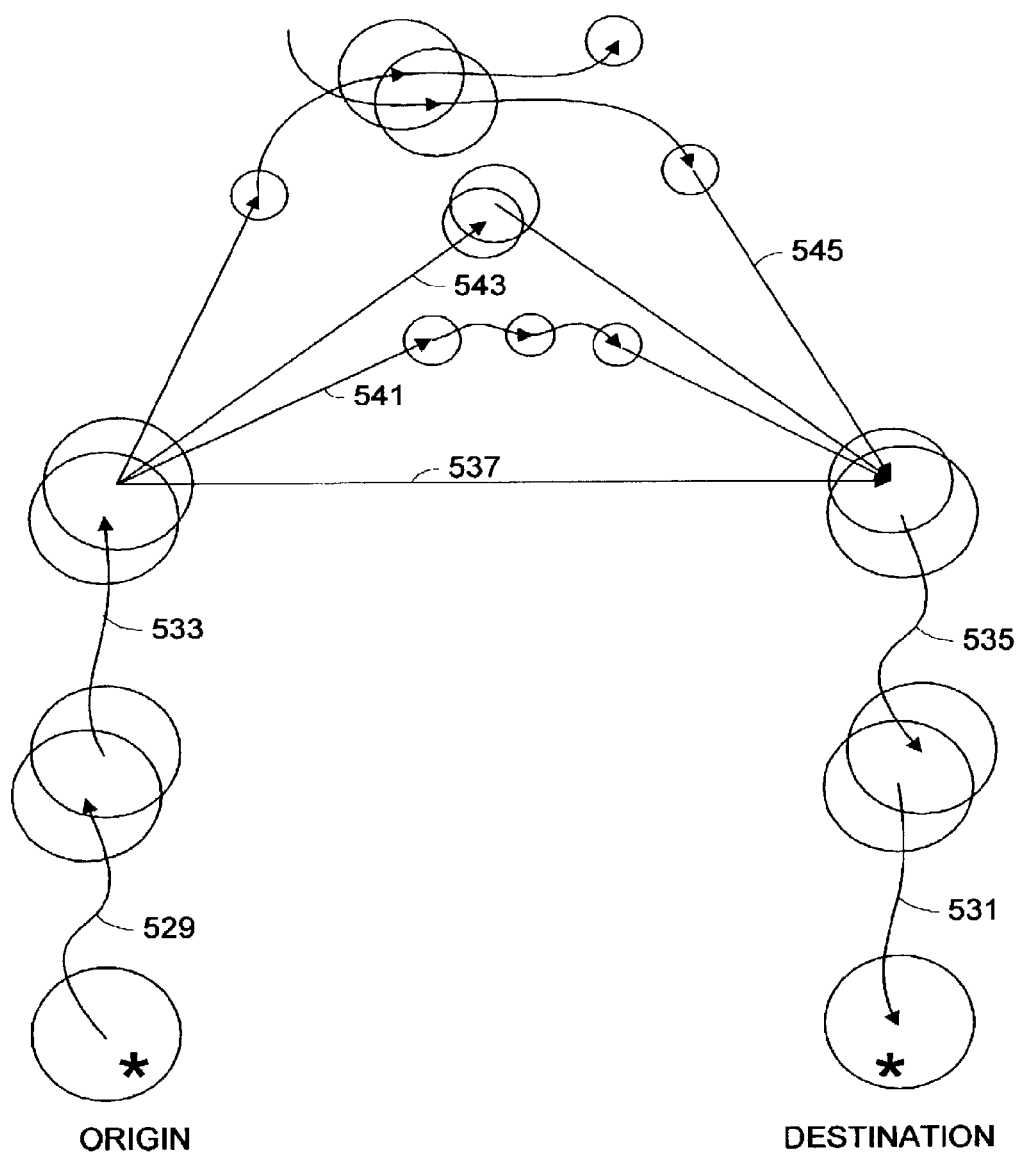

FIG. 10C shows the third set of four stages for connecting origin and destination, where similar four processes connect a waypoint of an origin-related second generation O 2GP path 533 with a waypoint of a destination-related second generation D 2GP path 535, which are further connected to an origin-related first generation O 1GP path 529 and a destination-related first generation D 1GP path respectively, i.e. a "four path, one vector" solution 537, a "five path" solution 541, a "four path, two vector" solution 543 and a "six path" solution 545. The process is also similar to that of FIG. 10A except for the fact that it is raised in two levels, which represent the 1GP path level plus the 2GP path level.

Figure 10D:
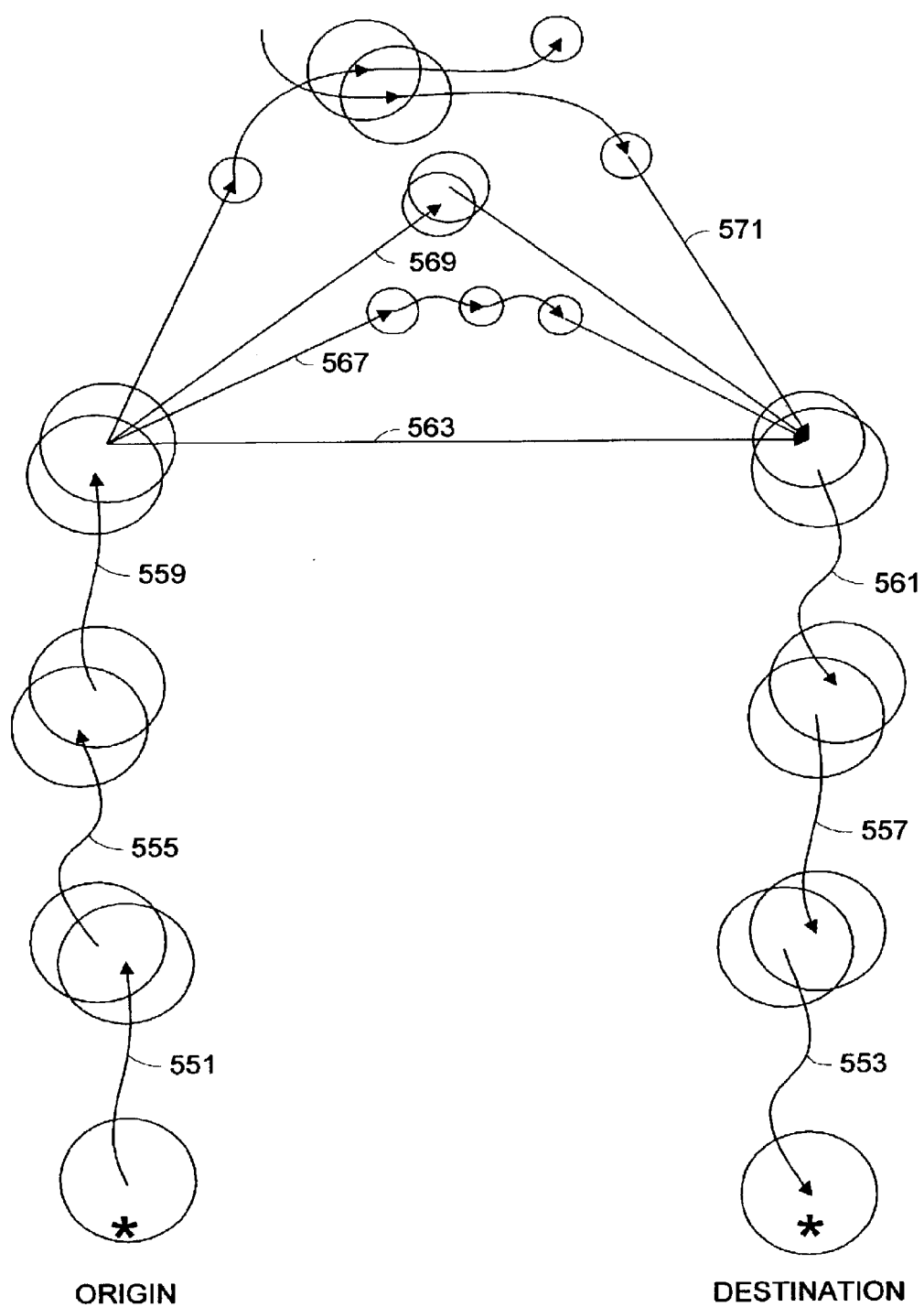

FIG. 10D shows the fourth set of four stages for connecting origin and destination, where similar four processes connect a waypoint of an origin-related third generation O 3GP path 559 with a waypoint of a destination-related third generation D 3GP path 561, which are in turn connected respectively to an origin-related second generation O 2GP path 555 further connected to an origin-related first generation O 1GP path 551 and a destination-related second generation D 2GP, further connected to a destination-related first generation D 1GP path 553, i.e. a "six path, one vector" solution 563, a "seven path" solution 567, a "six path, two vector" solution 569 and an "eight path" solution 571. The process is also similar to that of FIG. 10A except for the fact that it is raised in three levels, which represent the 1GP path level plus the 2GP path level plus the 3GP path level.

It becomes obvious that following the definition of paths given so far and using a similar staged process, with (N−1) sets of four stages for connecting origin and destination, we would have a process similar to that of FIG. 10A, but raised in "N" levels, representing "N" generations of paths, providing solutions resulting as the combinations of up to (N+2) paths, i.e., up to "N+2 path" solutions.

It is worth noting that the drawing of FIG. 10D is symbolic and a more accurate process limiting the scope of results to imperfect elliptic areas as in steps 604 of FIG. 6A, 854 of FIG. 6I and 1104 of FIG. 6Q would led, more often than not, to opposite NGP waypoint pairs getting closer to each other with each generation, on an area often not too offset around the axis determined by the specified origin and destination.

Service Provider Data Input

FIGS. 11A to 11J shows the elements of a carrier or service provider data-input interface as well as processes that are involved in updating a complete path and pre-processing information related to that path.

The data input interface can be an online secure form capable of handling basic structured information, including examples such as an html page, an online XML format page, a Flash™ format page developed by Macromedia™, Inc of San Francisco, Calif., U.S.A., a Wireless Application Protocol WAP format page, among others.

The data input interface can also be a stand alone application capable of being connected online to the system object of the invention, including examples such as a e-mail program capable of sending structured attachments and/or html files, a Macromedia™ Flash™ application with in built forms and an EDI system adapted through adequate middleware.

The data input interface can also be an automatized or manned data transducer, that inputs either automatically or manually structured data into the system, including for example a manned call centre receiving carrier data as voice and performing input of structured data to the system through keyboard, either directly or indirectly, as well as automated telephone voice recognition systems and video conferencing systems.

The process is represented as a step-by-step menu, suitable for the more basic interfaces, but it can also be presented as an interface with multiple choice and/or multiple "pull-down" sub-menus for processing a number of steps almost simultaneously, as is common on many database-enabled web-based interfaces.

The carrier or service provider data input starts at a point 2700 and the process checks for the existence of a carrier account at decision point 2702. If the carrier had no account yet, the process would show the carrier an interface module with the terms of the system service at 2704, followed by either acceptance or not acceptance at a decision point 2706. If the carrier accepts the terms, he or she will be presented with a registration interface 2710, where the carrier would input all details of the company, relevant vehicles, accounts, contact data and other topical and transport-related data. At this point the carrier would also set up a username and password, which would enable a log in at an interface module 2712.

Once logged in the carrier will start narrowing down the option for the definition of a transport path, starting for example, by defining the particular fleet to which the vehicle belongs to at an interface module 2714, supposing a carrier has different fleets, followed by defining the specific vehicle within the particular fleet at an interface module 2716.

The carrier then can define the type of service the vehicle is doing at an interface module 2718, for example "palletised cargo", "general cargo", refrigerated, "containerised cargo" among other options.

At an interface decision point 2720 the carrier is asked whether he or she is updating a formerly defined transport path. If the path is new and was not formerly defined, the answer to that question is "no" and the process continues to an interface module 2722 on FIG. 11B having al necessary tools for the definition of the transport path with the time windows involved, including the definition of waypoints, starting with the origin waypoint. The waypoint location address is then automatically correlated against an existing GIS geographical database for the elimination of errors at a module 2724. If the module 2724 does not recognize the location of the waypoint, at a system decision point 2726 no results will be found and the process automatically performs a spell check on the waypoint address data at a module 2738, which will more often than not provide alternative spelling possibilities for the waypoint location. The waypoint address may then be modified by the user according to one of these possibilities at decision point 2740, after which it is correlated again at the module 2724.

If none of the alternative spelling possibilities are suitable, no modification is done at decision point 2740 and the process asks the carrier at an interface module 2742 to try a nearby, usually more important waypoint address that may have more chances of being recognized by the GIS database, at the next step 2724.

If more than one result is produced at correlation module 2724, i.e. if there are more that one places with the same name, there would be options at decision point 2728 and the carrier would have to choose the correct option at an interface module 2730.

The process passes is trailed then through up to three decision points 2732, 2734 and 2736 to identify whether the function of the waypoint within the path is destination, intermediate or origin respectively.

If the waypoint is an origin waypoint, the carrier will input the starting radius or associated area function parameters at an interface module 2746, the starting link type at an interface module 2748, the starting rules at interface module 2750 and the starting time window at an interface module 2752.

Figure 11A:
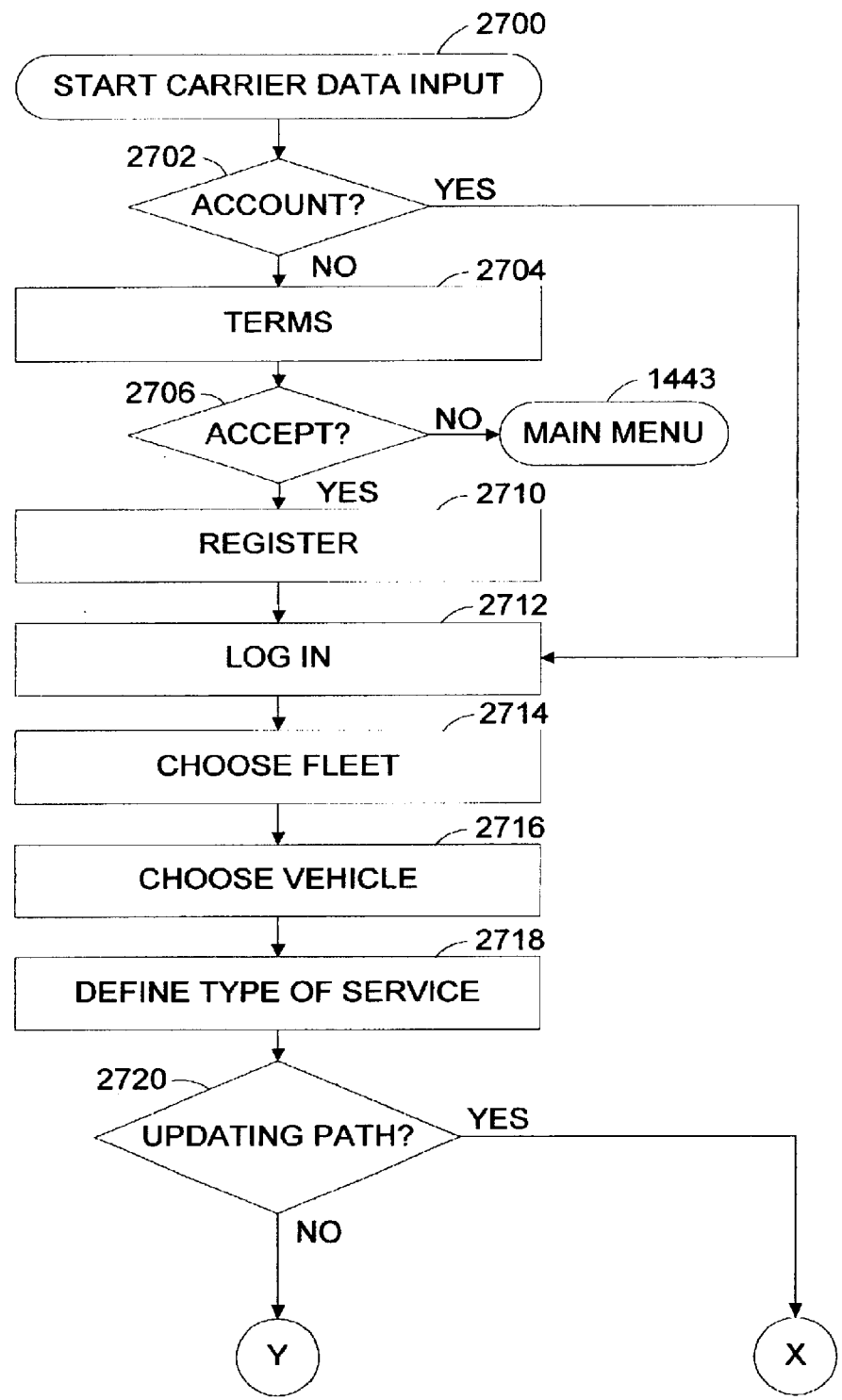
FIGS. 11A to 11J—show the elements of a carrier or service provider data-input process comprising processes that are involved in updating a complete path and pre-processing information related to that path.
Figure 11B:
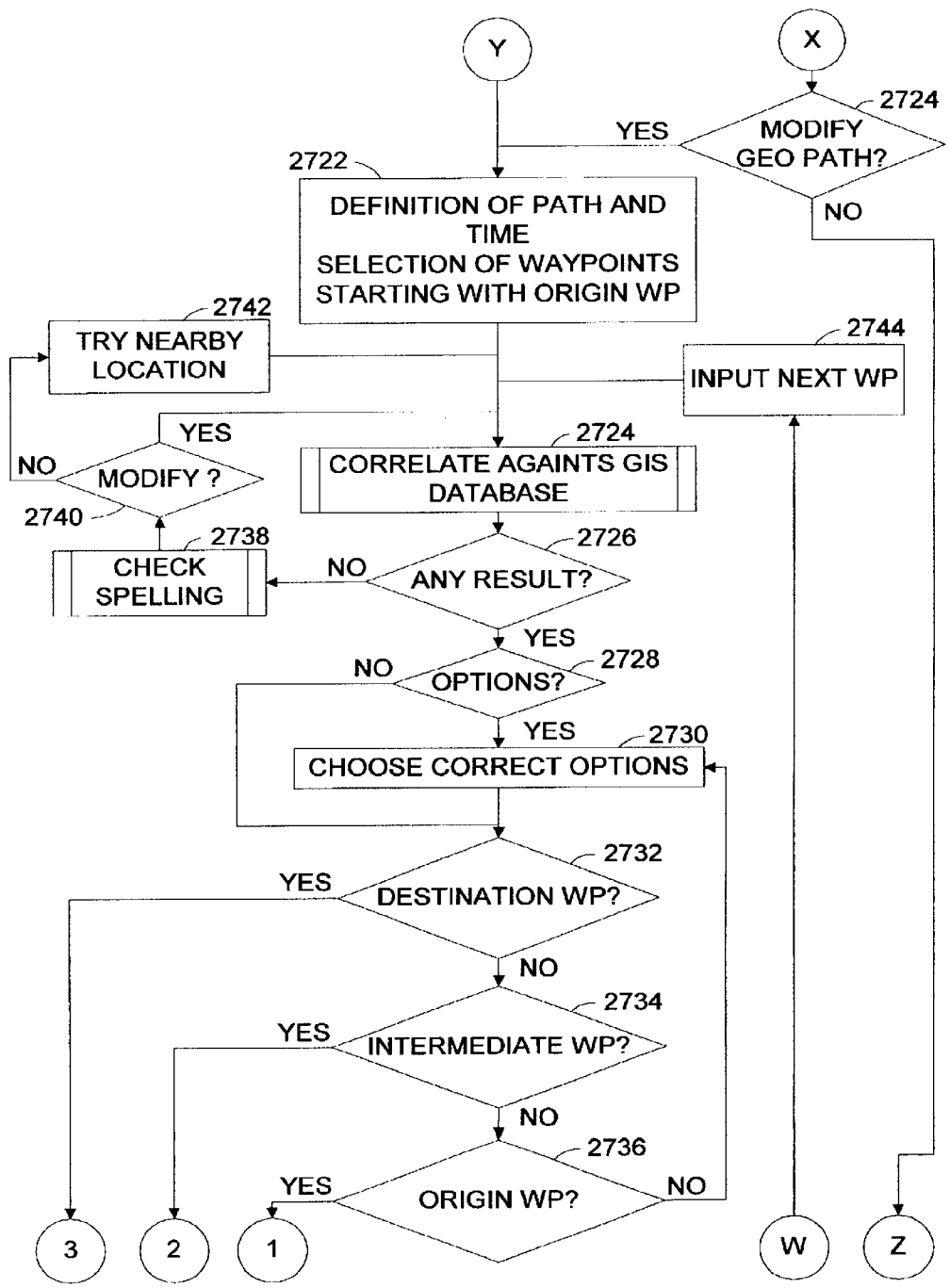
Figure 11C:
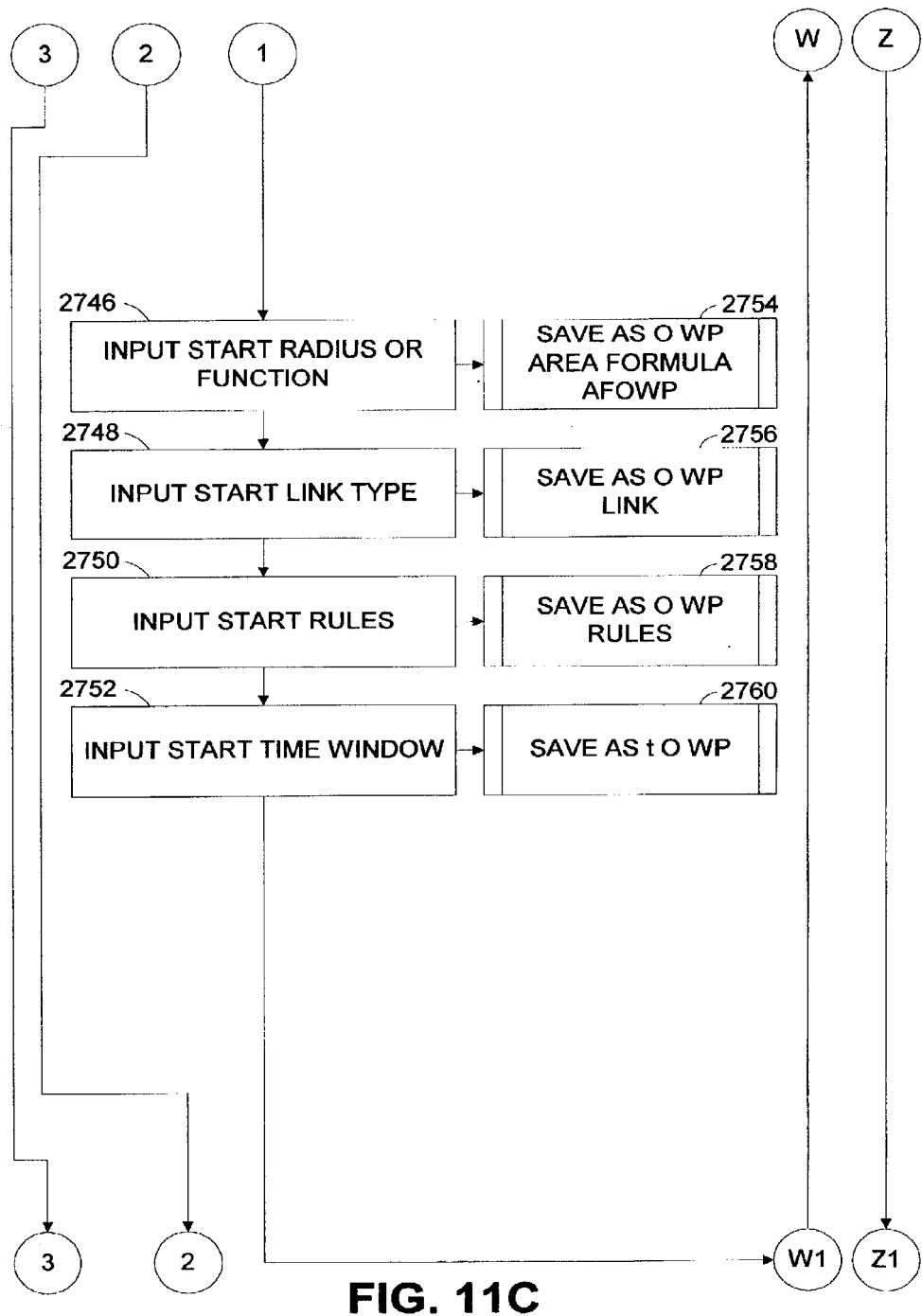

Once the information input to the standalone application or to the online interface, is actually loaded to the system, the information corresponding to input of interface module 2746 on FIG. 11C is automatically saved as the area formula AF of the Origin waypoint O WP, termed AFOWP at module 2754, the input of interface module 2748 is automatically saved as the Origin waypoint starting link type O WP LINK at module 2756, the input of interface module 2750 is automatically saved as the Origin waypoint starting rules O WP RULES at module 2758 and the input of interface module 2752 is automatically saved as the Origin waypoint O WP starting time window t O WP at module 2760.

As an example, the carrier could choose among others, radius-defined functions, isochrones or isodistances as the waypoint associated area functions at 2746, defining link types among other possibilities as "Depot", "Address" or "Instant" as defined in FIG. 5A, the time window with the aid of an integrated calendar and an organizer and specifying among others, rules for solving match redundancies such as those explained in FIGS. 5E to 5G, for example by choosing "delivery only", "pick up only", "dominant area proceeds", as well as rules for choosing or limiting the types of vehicle and link types to be matched with and rules for specifying minimum or maximum "standard transfer times" among other rules that can be used to limit and/or regulate the combination of paths or to the tailor the system to particular applications, including transport, travel distribution and transmission related applications.

The process will then continue through connector WI to an interface module 2744 for data input regarding the next waypoint and the process will eventually flow as before through up to three decision points 2732, 2734 and 2736 to identify whether the function of the waypoint within the path is destination, intermediate or origin respectively.

If the waypoint is an intermediate waypoint, each waypoint may have different characteristics and attributes whether the waypoint represents the finishing point for an arriving vector or a starting point for a departing one.

Figure 11D:
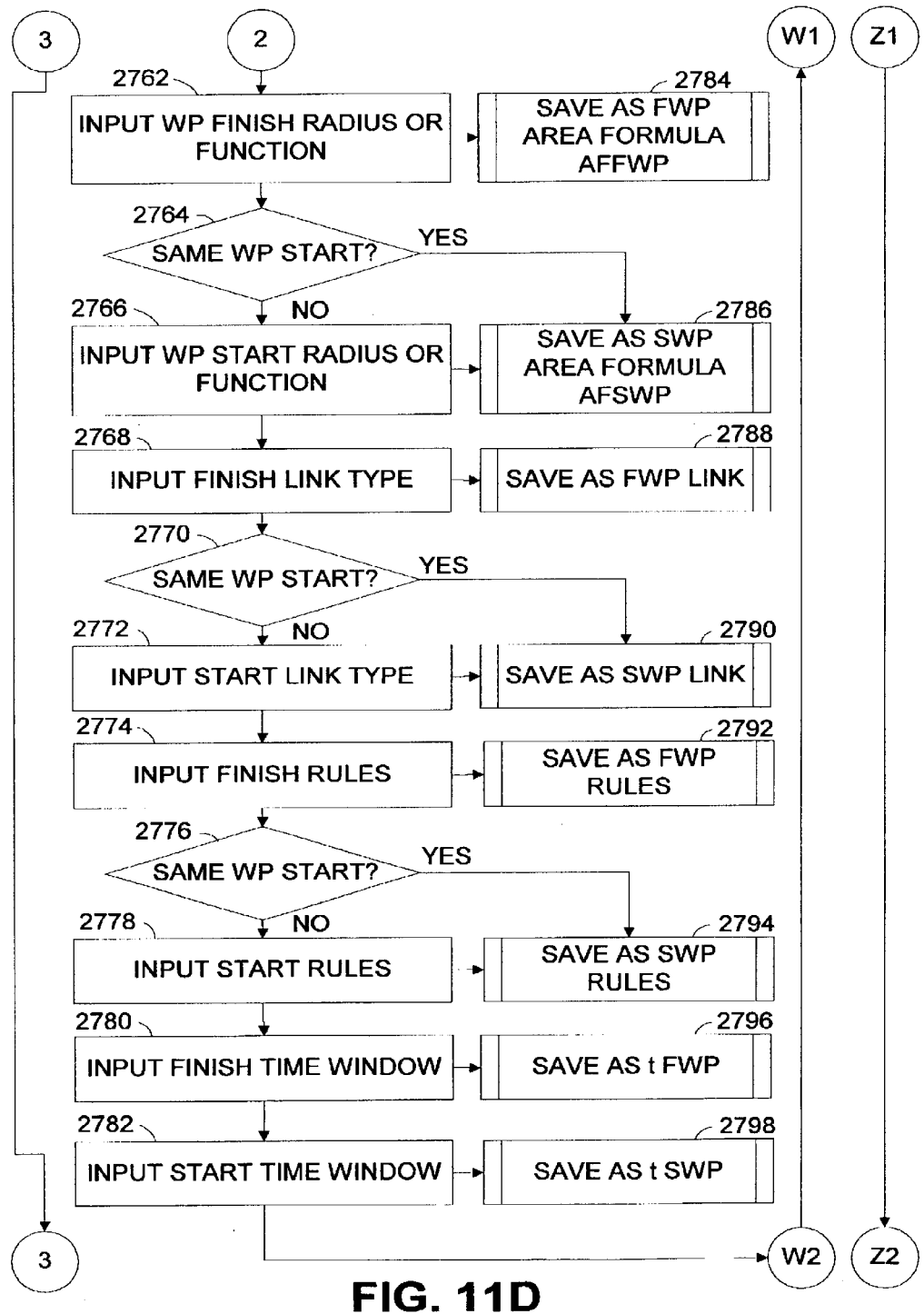

Therefore the carrier will first input a waypoint's finishing radius or associated area function at an interface module 2762 on FIG. 11D. If the waypoint's starting radius or associated area function is not the same as the finishing one, at decision point 2764, the carrier will input this starting associated area at an interface module 2766.

This is followed by the input of the waypoint's finishing link type at an interface module 2768. If the waypoint's starting link type is not the same as the finishing one, at decision point 2770, the carrier will input this starting link type at an interface module 2772.

The process continues with the carrier data input for the waypoint's finishing rules at an interface module 2774. If the waypoint's starting rules are not the same as the finishing ones, at decision point 2776, the carrier will input these starting rules at an interface module 2778.

The next steps are related to the input of the finishing time window for the waypoint at an interface module 2780 and a starting time window for that waypoint at an interface module 2782.

As before, once the information input to the standalone application, or to the online interface, is actually loaded to the system, the information corresponding to input of interface module 2762 is automatically saved as the area formula AF of the finishing attributes of the waypoint FWP, termed AFFWP at module 2784 and if the area is the same as for the starting attributes, this input is also saved as the area formula AF of the starting attributes of the waypoint SWP, termed AFSWP at module 2786.

Similarly, the information corresponding to input of interface module 2766, if any, is also automatically saved as the area formula AFSWP at module 2786.

The information corresponding to input of interface module 2768 is also automatically saved as the finishing link type attribute of the waypoint FWP LINK at module 2788 and if the link type is the same as for the starting attribute, this input is also saved as the starting link type attribute of the waypoint SWP LINK at module 2790.

Similarly, the information corresponding to input of interface module 2772, if any, is also automatically saved as the starting link type attribute SWP LINK at module 2790.

The information corresponding to input of interface module 2774 is as well, automatically saved as the finishing rules attributes of the waypoint FWP RULES at module 2792 and if the rules are the same as for the starting attributes, this input is also saved as the starting rules attributes of the waypoint SWP RULES at module 2794.

Similarly, the information corresponding to input of interface module 2778, if any, is also automatically saved as the starting rules attributes SWP RULES at module 2794.

Furthermore, the information corresponding to input of interface module 2780 is also automatically saved as the finishing time window attributes of the waypoint t FWP at module 2796, as the information corresponding to input of interface module 2782 is also automatically saved as the starting time window attributes t SWP at module 2798.

The process will then continue through connector W2 again to an interface module 2744 for data input regarding the next waypoint and the process will eventually flow as before through up to three decision points 2732, 2734 and 2736 to identify whether the function of the waypoint within the path is destination, intermediate or origin respectively.

If the waypoint is an intermediate waypoint, the process will be repeated in a similar way as before with the specific attributes of the new waypoint.

Figure 11E:
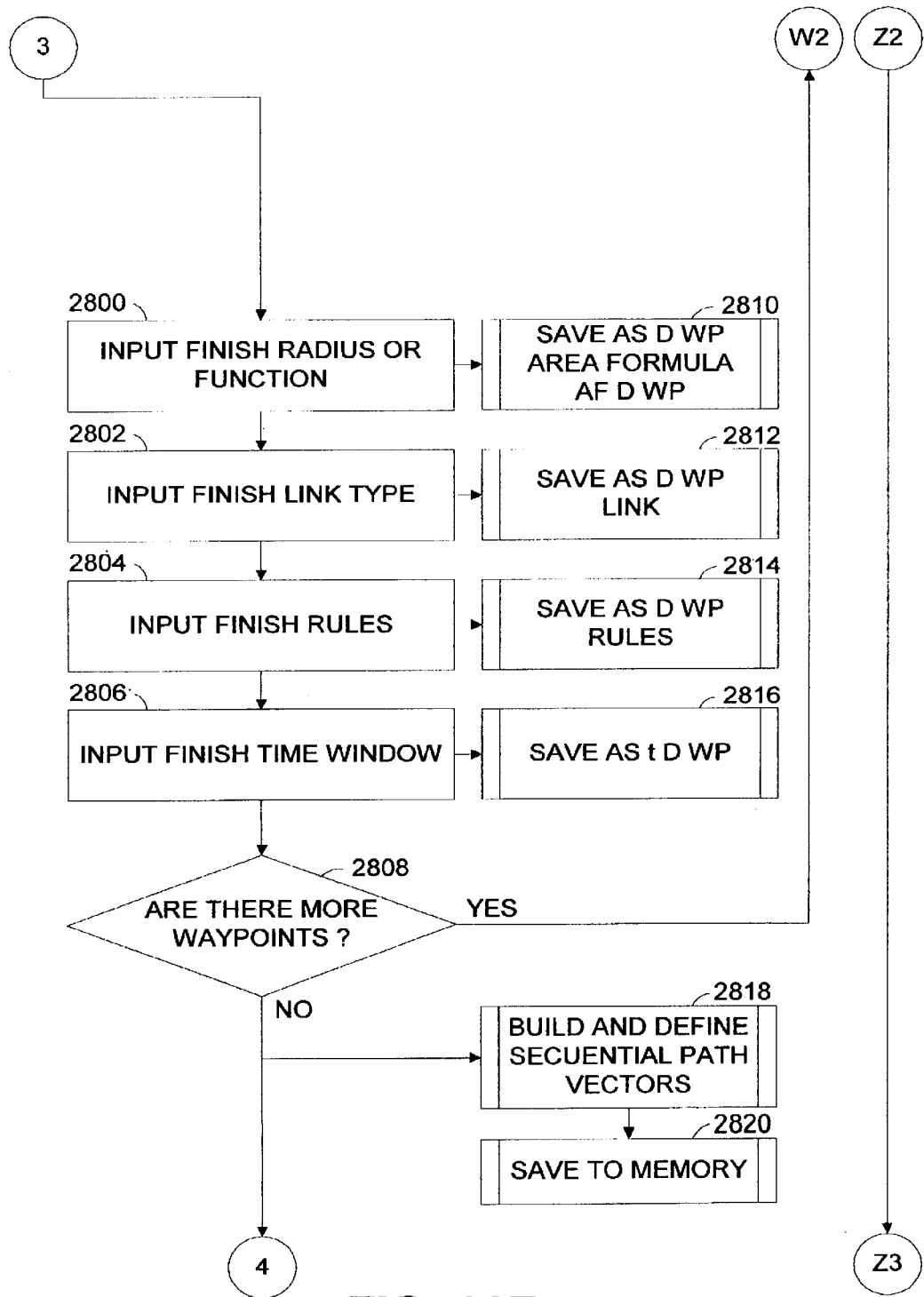

If the waypoint is a destination waypoint, the carrier will input the finishing radius or associated area function parameters at an interface module 2800 on FIG. 11E, the finishing link type at an interface module 2802, the finishing rules at interface module 2806 and the finishing time window at an interface module 2806.

As before, once the information input to the standalone application or to the online interface, is actually loaded to the system, the information corresponding to input of interface module 2800 is automatically saved as the area formula AF of the Destination waypoint D WP, termed AFDWP at module 2810, the input of interface module 2802 is automatically saved as the Destination waypoint finishing link type D WP LINK at module 2812, the input of interface module 2804 is automatically saved as the Destination waypoint finishing rules D WP RULES at module 2814 and the input of interface module 2806 is automatically saved as the Destination waypoint D WP finishing time window t D WP at module 2816.

After we have input the attributes for the destination waypoint, the process checks with the carrier for the inclusion of any more waypoints or correction of existing ones at decision point 2008, which if affirmative will loop the process back to step 2744. The correction module is not reflected but it is a normal feature to those familiar in the art of G.I.S. applications.

Once all the waypoints and their are defined and the information input to the standalone application or to the online interface, is actually loaded to the system, the system automatically builds and defines the sequential vectors and their attributes according to an adopted nomenclature system and stores this information in structured, relational format at a "save to memory" module 2820.

Figure 11F:
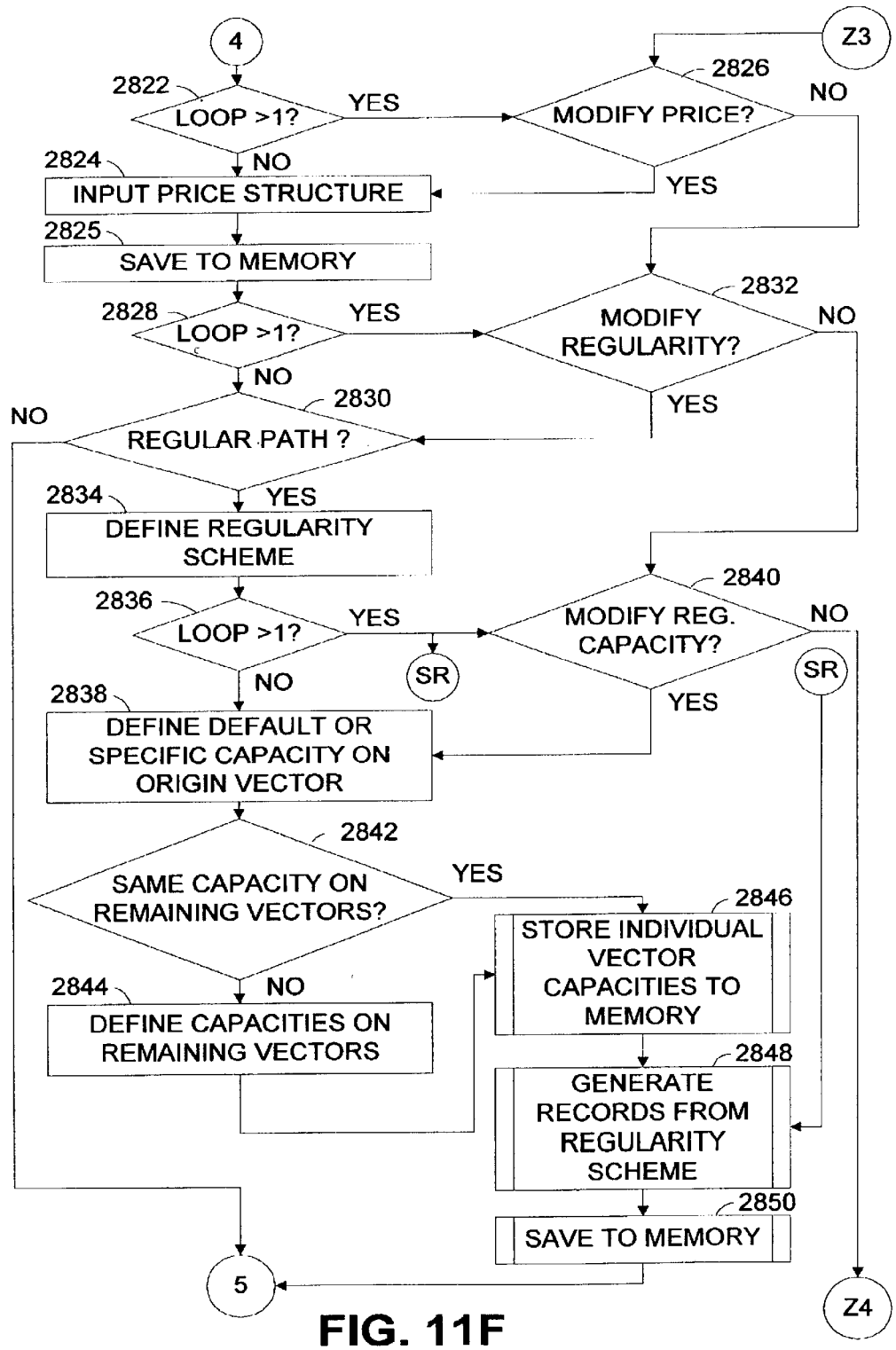

The next step of the process continues to a system decision point 2822 on FIG. 11F that checks if the path definition is the initial one represented by "loop=1", or a possible modification represented by "loop>1". If the path definition is the initial one, the process continues to an interface module 2824 for the input of the price structure information, for example different prices for different bands of weight, volume, quantity and units of distance travelled, prices per standard pallet, prices per unit of length of the vehicle, among other transport-related variables. The information is then stored by a save to memory module 2825.

The next step of the process continues to a system decision point 2828 that checks if the path definition is the initial one represented by "loop=1", or a possible modification represented by "loop>1". If the path definition is the initial one, the process continues to another decision point 2830, regarding the regularity of the path that is being defined, i.e. if the carrier is intending to do the same path, at regular intervals of time, or following a regular pattern, in which case the carrier would choose between various pre-established regularity schemes, or define his own at interface module 2834. As examples of pre-established regularity schemes, the carrier could choose between a path to be repeated every X number of days, every X day of the week, every X date of the month or as definition of a particular regularity, specific days or dates for every week or for every month and/or adding together pre-established schemes, with the possibility of saving the path for future recall, if uncertain at the time.

The next step of the process continues to a system decision point 2836 that checks if the path definition is the initial one represented by "loop=1", or a possible modification represented by "loop>1". If the path definition is the initial one, the process continues to an interface module 2838 for defining either a default or a specific capacity on the origin vector, i.e. .the first vector of the transport path, that the carrier will allow the system to manage. In this case the available capacity on a vector in the load capacity managed by the system that the carrier vehicle can carry on a single leg, in the case of cargo, capacity may be defined by an amount of weight, cubic volume, dimensional volume or any combination of these. More often than not a default capacity would be specified if the carrier was planing a regular transport path and a specific capacity would be specified of one-off transport paths, or for each individual path of the regular series. The next step is a decision point 2842 regarding the capacity of the remaining vectors of the path, in which case, if it is the same, time is saved by storing to memory the origin vector capacity to each individual vector automatically by the system at a module 2846.

If the capacities are not the same, the carrier can define the capacities of the remaining vectors at interface module 2844 which are then saved to memory at the module 2846.

If the path is regular, all the path data defined so far is then generated for each date and time according to the regularity scheme at a module 2848 and the records for each date and time saved to the system memory at a module 2850.

Figure 11G:
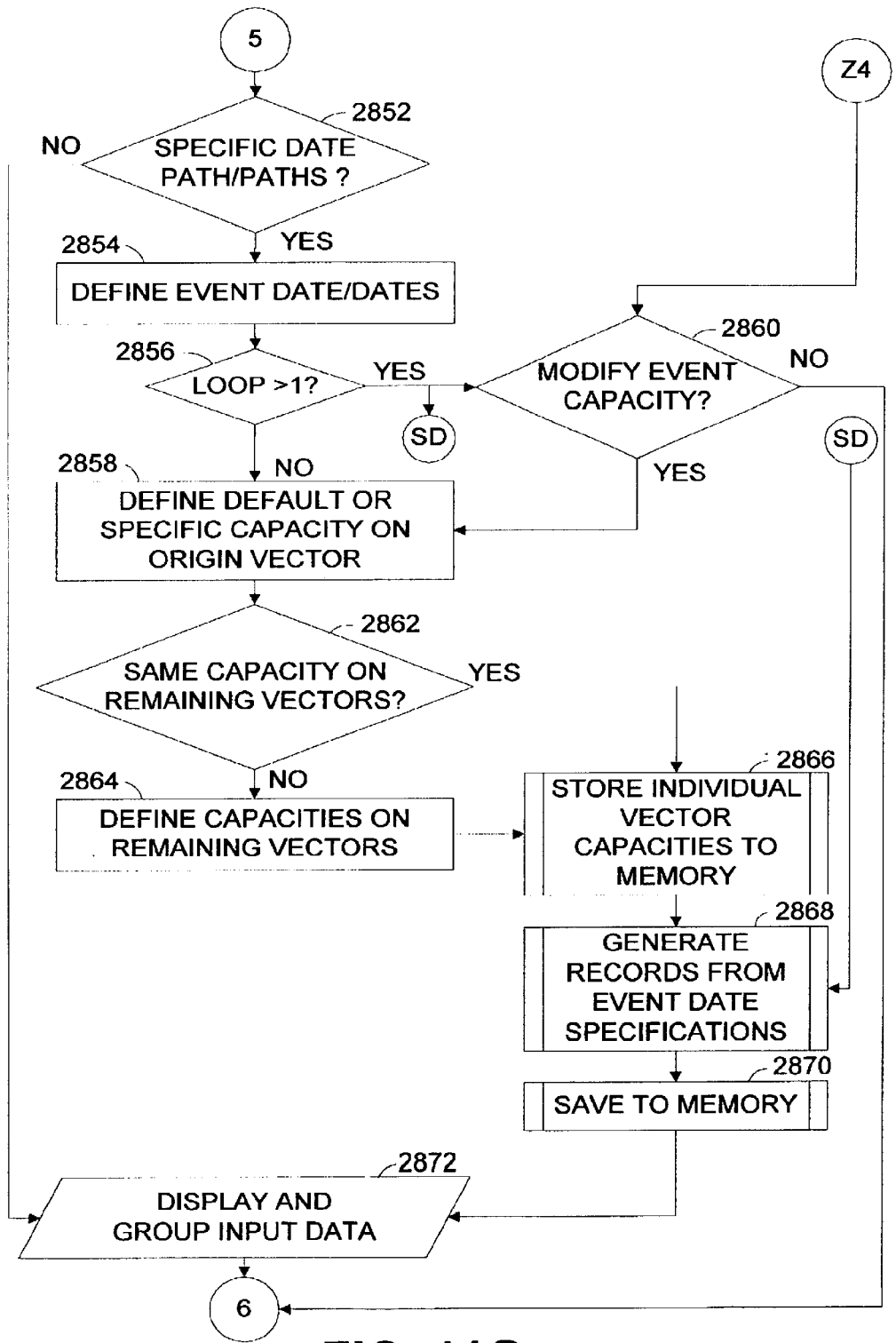

The process continues to another decision point 2852 on FIG. 11G, regarding the definition of non-regular paths to, i.e. if the carrier is intending to do the path, on specific dates, either once or at non-regular intervals of time, in which case the carrier would define the dates through a calendar/clock or organizer at interface module 2854. The next step of the process continues to a system decision point 2856 that checks if the path definition is the initial one or a possible modification. If the path definition is the initial one, the process continues to an interface module 2858 for defining either a default or a specific capacity on the origin vector, i.e. the first vector of the transport path, that the carrier will allow the system to manage.

The next step is a decision point 2862 regarding the capacity of the remaining vectors of the path, in which case, if it is the same, time is saved by storing to memory the origin vector capacity to each individual vector automatically by the system at a module 2866.

If the capacities are not the same, the carrier can define the capacities of the remaining vectors at interface module 2864 which are then saved to memory at the module 2866.

If the path is non-regular, the path data defined as such is then generated for each date and time according to the event date specifications at a module 2868 and the records for each date and time saved to the system memory at a module 2870.

The data input and stored is then grouped and displayed for evaluation and confirmation in printable format for record keeping at interface module 2872.

If the carrier is updating, i.e. modifying a transport path, then after decision point 2720 the process continues to a decision point 2724 which asks if the carrier is modifying the geographical attributes of the path. If the answer is "yes" the geographical input will be modified repeating steps from 2722 to 2822, on which the process continues to a decision point 2826, which is also reached if the answer is "no" at 2724. The decision point 2826 asks if the carrier is modifying the price structure of the transport path or its associated elements. If the answer is "yes" the price structure input would be modified at interface module 2824 and saved at step 2825, followed by decision point 2828, on which the process continues to a decision point 2832, also reached if the answer is "no" at 2826. The decision point 2832 asks if the carrier is modifying the time regularity of the transport path. If the answer is "yes" the process continues to decision point 2830, where if the path is to be regular, the time regularity input will be modified at interface module 2834 followed by decision point 2836, on which the process continues simultaneously to module 2848 through connector SR and to a decision point 2840, also reached if the answer is "no" at 2832. The decision point 2840 asks if the carrier is modifying the capacity of the regular transport paths. If the answer is "yes" the capacity input will be modified at interface module 2838 followed by steps 2842 to 2850.

If at decision point 2830, the path is not regular, the process continues to decision point 2852, where if the path is to be for specific dates, the specific dates input will be modified at interface module 2854 followed by decision point 2856, on which the process continues simultaneously to the module 2868 through connector SD and to a decision point 2860, also reached if the answer is "no" at 2840. The decision point 2860 asks if the carrier is modifying the capacity on specific date transport paths. If the answer is "yes" the specific date capacity input will be modified at interface module 2858 followed by steps 2862 to 2870, before displaying the information at interface 2872, which would also be reached if the answer were "no" at 2860.

Figure 11H:
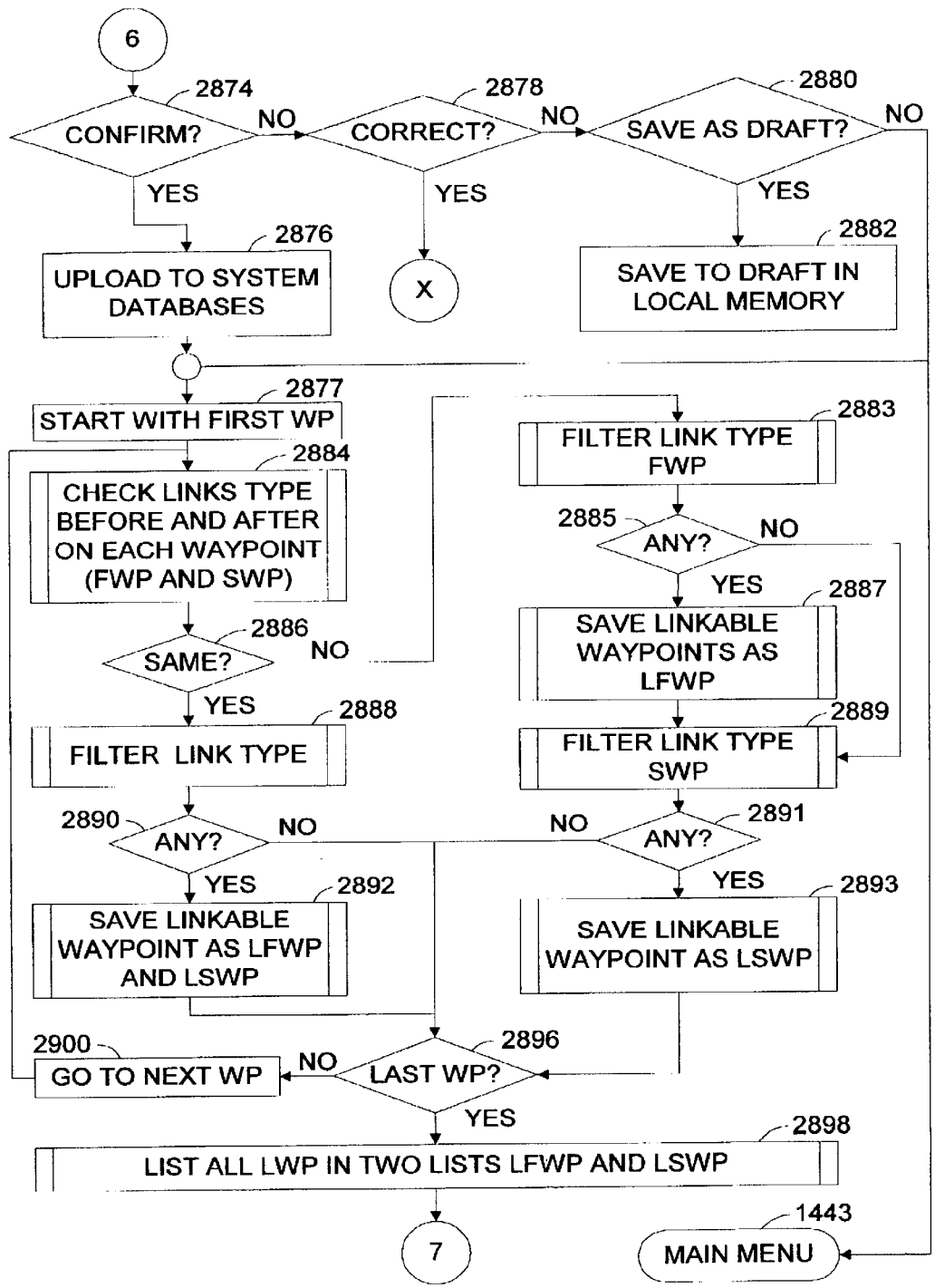

Once the input data is displayed at 2872, the process gives the options of confirming, correcting or saving as draft for later retrieval, represented by decision points 2874, 2878 and 2880 respectively on FIG. 11H. If the carrier wants to make a correction the process returns to step 2724, or if the "save as draft" option is chosen, the input data is saved to the application's local memory at module 2882. When the carrier confirms, the input is uploaded to the system at module 2876, after which further operations can be made at the main menu 1443.

From this point thereafter, which occur once the carrier or service provider have effectively loaded, input or uploaded the data into the system, the steps and modules shown, correspond to data processing of transport path information which is also a system pre-processing in relation to the search process.

The first step of this system pre-processing is a module 2877 that starts with the first waypoint followed by a module 2884 that checks and compares the link types for each waypoint, i.e. for the attributes as a finishing waypoint FWP and as a starting waypoint SWP.

If the link types are the same for both at a decision point 2886, the process continues to filtering module 2888 that eliminates the waypoints with link types that are incompatible with the type of service or the type of combination required. If any waypoint is left at decision point 2890, it is stored at a save to memory module 2892 as linkable finishing waypoint LFWP and also as linkable starting waypoint LSWP.

If the link types are not the same for both at decision point 2886, the process continues to filtering module 2883 that eliminates the waypoints with finishing link types that are incompatible with the type of service or the type of combination required. If any waypoint is left at decision point 2885, it is stored at a save to memory module 2887 as linkable finishing waypoint LFWP. After this the process continues to a filtering module 2889 that eliminates the waypoints with starting link types that are incompatible with the type of service or the type of combination required. If any waypoint is left at decision point 2891, it is stored at a save to memory module 2893.

If there are more waypoints to analyse at decision point 2896, the next waypoint is recalled at step 2900 and the process is repeated for the remaining waypoints, starting from module 2884. Once all the waypoints of the transport path have been analysed, the process organises the linkable waypoints in two lists of linkable finishing waypoints LFWP and linkable starting waypoints LSWP at a module 2898.

Once the system has reduced the transport path's waypoints to the ones that are linkable and organised them in the corresponding finishing and starting groups, the process continues with the pre-processing of the linkable waypoint's associated areas, which are also organised in finishing and starting groups.

Figure 11I:
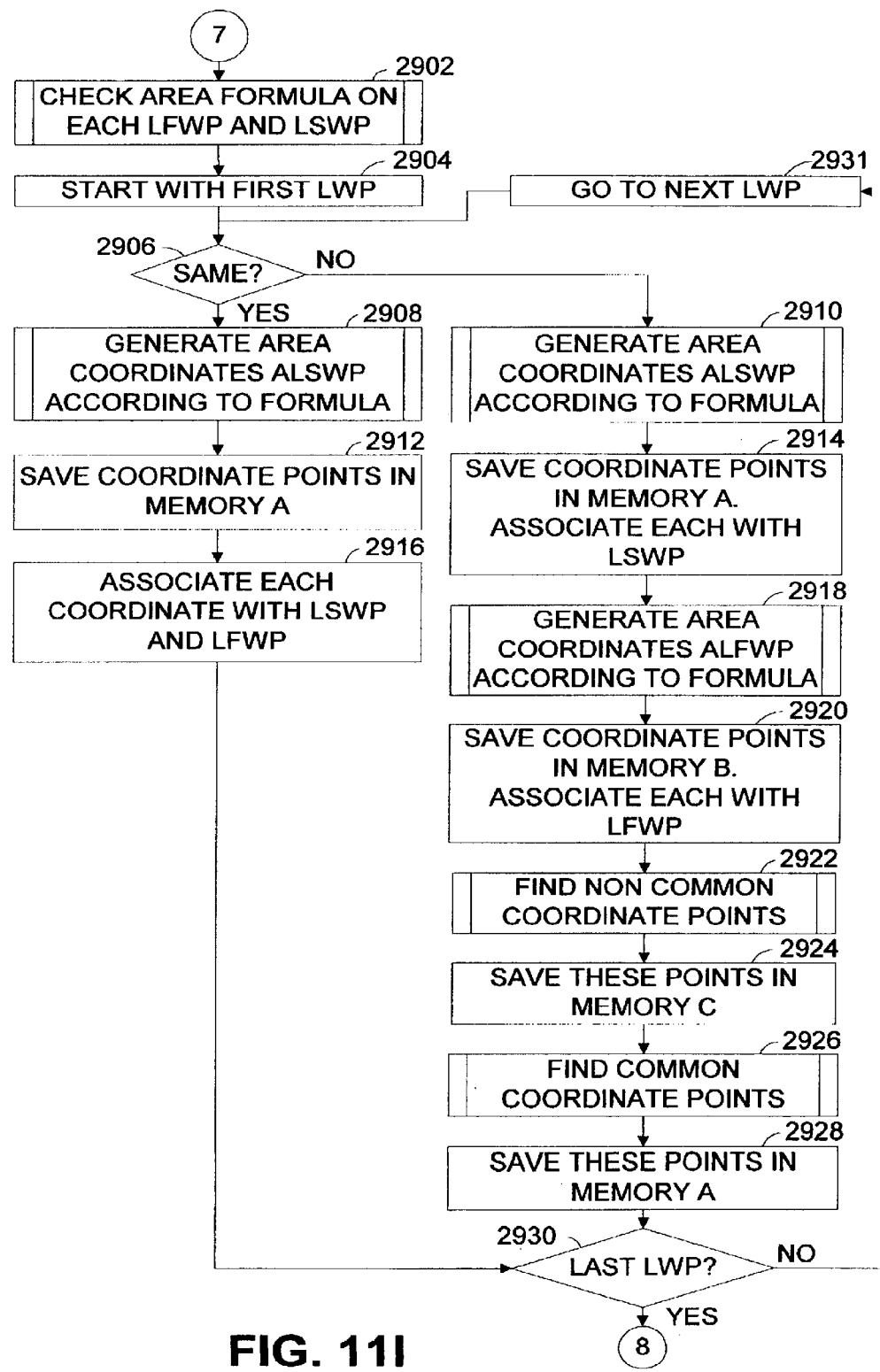

The first step of the associated area pre-processing is a module 2902 on FIG. 11I that checks and compares the associated area formulas on each waypoint, i.e. for the attributes as a finishing waypoint FWP and as a starting waypoint SWP.

The process starts comparing the first waypoint at step 2904 and if the area formulas are the same for the finishing and starting waypoint attributes, at decision point 2906, the process continues to a generating module 2908, that generates all coordinates that belong to the associated area, which are calculated with the corresponding area formula for the starting attributes (which are the same, in this case, as the finishing area attributes), the waypoint coordinate location and the density of the geographical grid chosen The coordinate points that compose the associated area are stored to memory A through a save to memory module 2912.

Each of the coordinated points saved to memory A at 2912, are then given a tag or link that relations them with the LFWP and the LSWP of the concerned waypoint at module 2916. The coordinate points that compose the associated area are stored to memory A through a save to memory module 2914

If as result of the comparator module 2902, the area formulas were not the same at decision point 2906 the process would continue first with a generating module 2910 similar to module 2908. The coordinate points that compose the associated area are stored to memory A through a save to memory module 2914, which also gives these coordinates a tag or link that relations them only with the LSWP of the concerned waypoint.

The process continues secondly with a generating module 2918 similar to module 2908, but that generates all coordinates that belong to the associated area, which are calculated with the corresponding area formula for the finishing area attributes, instead of the starting ones.

The coordinate points that compose the associated area are stored to memory "B" through a save to memory module 2920, which also gives these coordinates a tag or link that relations them only with the LFWP of the concerned waypoint.

Having two different associated areas for the same waypoint instead of one, is likely to affect the speed of the search process when checking for matches. In order to make the search process more efficient and avoid redundant checking, the process further continues to a comparison module 2922 that compares the coordinate points saved at module 2914 with those saved at module 2920, in order to find the coordinate points that are not common to both modules, i.e. non common coordinate points, which are stored to memory C in a save to memory module 2924.

A similar comparator module 2926 finds the coordinates common to both modules 2914 and 2920, i.e. common coordinate points, which are stored to memory A in a save to memory module 2928.

Both save to memory modules 2924 and 2928 will saved the coordinate points with their corresponding tags, links or relations, which will relate to either the starting or the finishing waypoint attributes in the case of the non-common coordinates, or to both in the case of the common coordinates.

The process continues to decision point 2930, also reached after module 2916, which checks if there are more waypoints to analyse for the transport path. If there are, the process recalls the next waypoint at step 2931 and the process is repeated from decision points 2906 to 2930, until all the waypoints have been analysed.

In the previous stages, all the transport path waypoints have been filtered to only the linkable ones, all the coordinates that compose the associated areas of these linkable waypoints have been generated and related to the waypoints, which, as well as the associated areas, are further grouped into starting and/or finishing attributes for each waypoint.

Figure 11J:
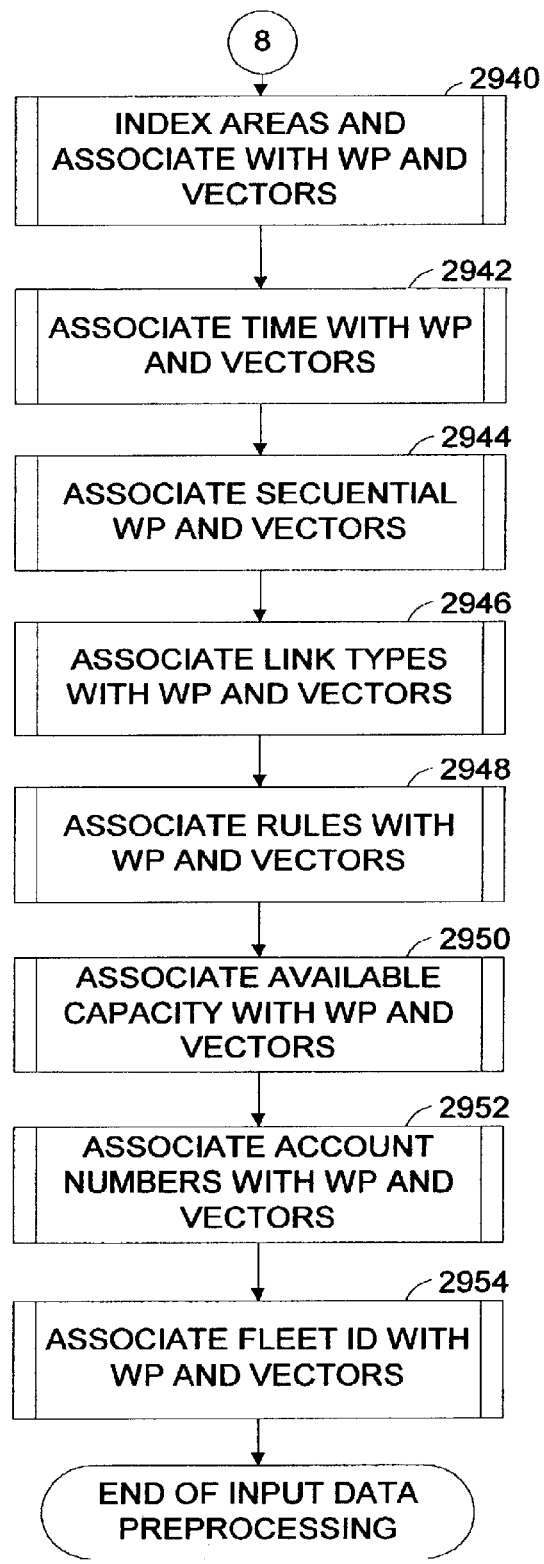

The next stages of the process will involve indexing the area coordinates and associating or relating them to the waypoints, the starting and finishing attributes of the waypoints and the vectors that are related to these waypoints at a module 2940 on FIG. 11J, associating or relating the time windows to the waypoints, the starting and finishing attributes of the waypoints and the vectors that are related to these waypoints at a module 2942, associating or relating sequential waypoints between each other, the sequential vectors between each other and the corresponding vectors with their waypoints at a module 2944, associating or relating the link types to the waypoints, the starting and finishing attributes of the waypoints and the vectors that are related to these waypoints at a module 2946, associating or relating the rules to the waypoints, the starting and finishing attributes of the waypoints and the vectors that are related to these waypoints at a module 2948, associating or relating the available capacity to the vectors, their corresponding waypoints and the starting and finishing attributes of the waypoints at a module 2950, associating or relating the account numbers to the waypoints, the starting and finishing attributes of the waypoints and the vectors that are related to these waypoints at a module 2952 and associating or relating the fleet, vehicle and other transport related topical identification to the waypoints, the starting and finishing attributes of the waypoints and the vectors that are related to these waypoints at a module 2954. According to the exact application of the system, further associations or relations could be made to the waypoints, the waypoint attributes and the vectors and/or between each other, of any of the so called transport path components, after which the system completes the pre-processing and storage of carrier or service provider data input.

Service User Interface and Data Input

FIG. 12 shows the structure of the search user interface and data input.

Figure 12A:
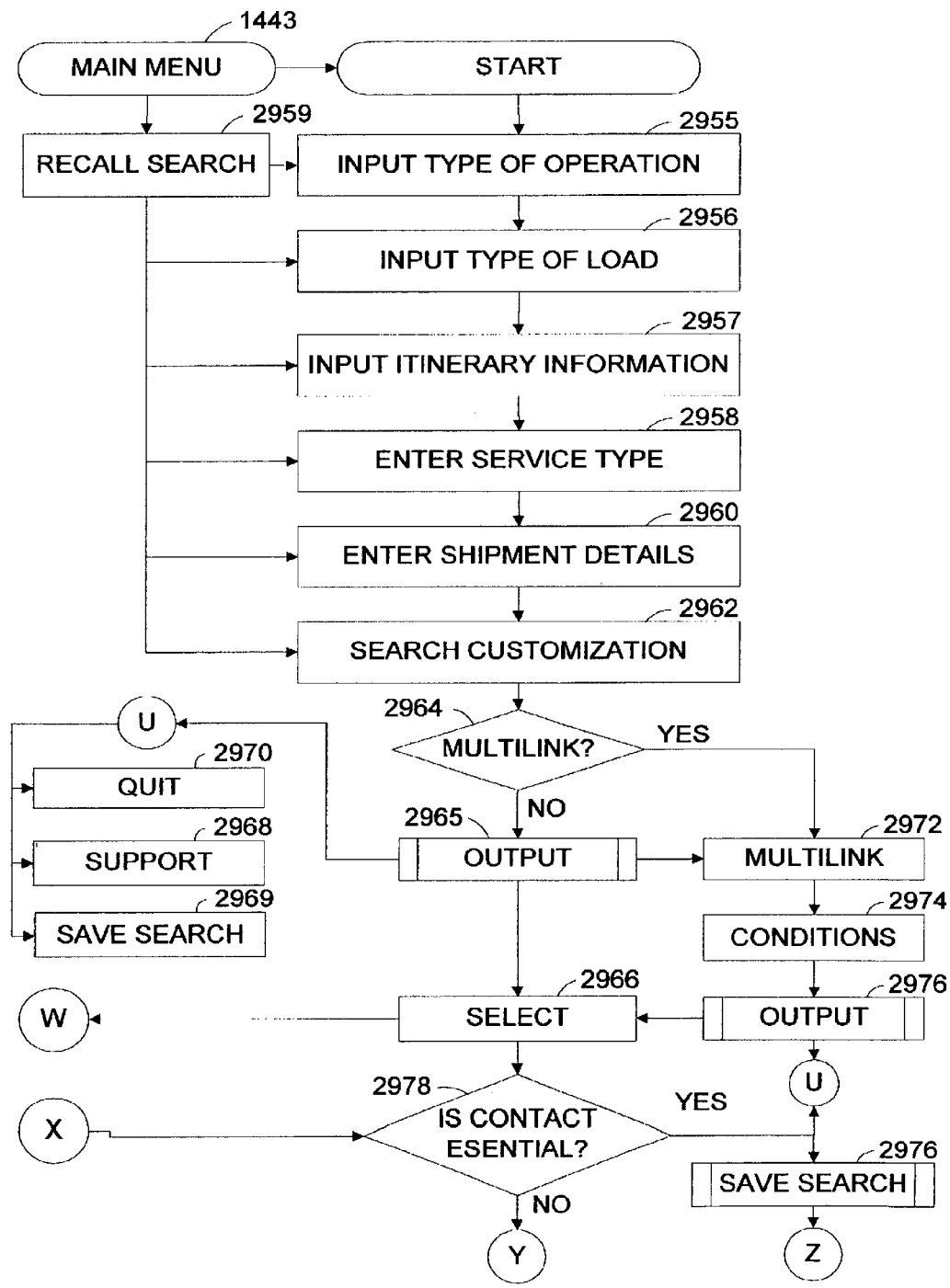
FIGS. 12A to 12D—show the structure of the search user interface and data input process.
Figure 12B:
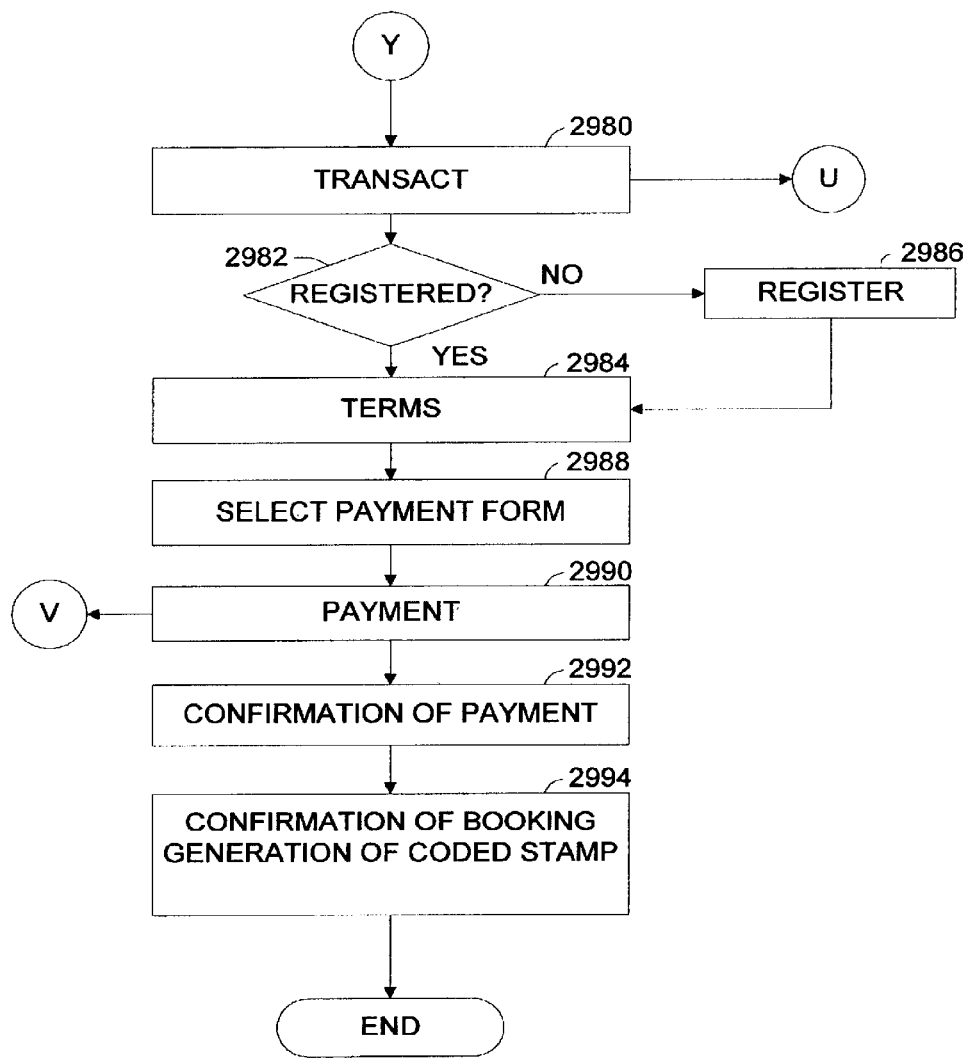

The user, more often than not a information seeker, also including concepts such as shipper, arbitrageur, clearinghouse agent, transport broker, travel agent, logistic subcontractors, distributors, supply chain managers and network managers, can start after selecting the user search option in the main menu 1443, the initial data input at interface module 2955 on FIG. 12A for selecting the type of operation, the type of load at interface module 2956, the load itinerary information, i.e. origin point, destination point and allowable time windows at interface module 2957 which also includes a facility for case of a user or shipper that having defined a load origin address, can if necessary, transport the load to a nearby depot, in order to benefit from further or better opportunities. The user or shipper can also define the area they are willing to transport the load from the intended origin point through an interface facility similar to the one used by the carriers or service providers to define the associated areas of for the waypoints defining their transport paths, i.e. choosing functions and setting values for variables defining the size of the areas. If a search has been executed before, the user can choose to recall the former search parameters to repeat the same search or partially modify it at module 2959.

The user continues the data input with the service type at interface module 2958, the shipment details at interface module 2962 and the search customisation at interface module 2962. The user can also recall a formerly done search through a module 2956 that auto completes all interface modules from 2955 to 2962 and up to module 2974 if the multi-link option is chosen.

As a example we can have a first user that as type of operation, could choose multimodal less than container load LCL, as type of load could choose general dry and within general dry subselect euro-pallets, as itinerary information could choose an origin address in Paris, France and a destination address in Denver, U.S.A., stating an earliest departure time at 7.30 am on 27$^{th}$ February, a maximum departure time at 5.30 pm on 3$^{rd}$ March, an earliest time arrival as "any" and a maximum time of arrival as "any" time on 3$^{rd}$ April, as service type "door to door" fully insured, as shipment details 6 euro pallets non stackable sub-selecting 300 kg each, describing the cargo as machinery parts, non hazardous and as search customisation could choose within multimodal sub-select options land-sea-land further sub-selecting only the road freight option as land transport and use only service providers with their own means of loading at origin.

We also can have a second user that, as type of operation could choose full truck load FTL, as type of load could choose general dry and within general dry sub-select building materials-wood, as itinerary information could choose an origin address in Vancouver, Canada and a destination address in Dallas, U.S.A., stating an earliest departure time "any", a maximum departure time at 9.00 pm on 14$^{th}$ July, an earliest time arrival as "any" and a maximum time of arrival at 12.00 am on 18$^{th}$ July, as service type "depot to depot" insured by third party, as shipment details 2 m height, 2 m width, 6 m length, total weight 25,000 lbs. describing the cargo as red cedar 3"×4" beams, non hazardous and as search customisation use only up to two carriers.

At the decision point 2964 the user can confirm or not on the multi-link nature of the transport path search, i.e. if they are willing to accept transport options using one or more carriers. If the user agrees, the process continues to an interface module 2972 explaining the options and possible advantages and drawbacks, which is followed by an interface module 2974 where the user can customize the conditions for the multi-link operations, such as the maximum number of carriers, as well as the ability to limit the types of transport mode for each leg.

Once these conditions are completed the "start search" process is launched and as a result when the search is completed or partially completed, the multi-link output interface module appears at 2976, along with a selecting facility 2966.

Figure 12C:
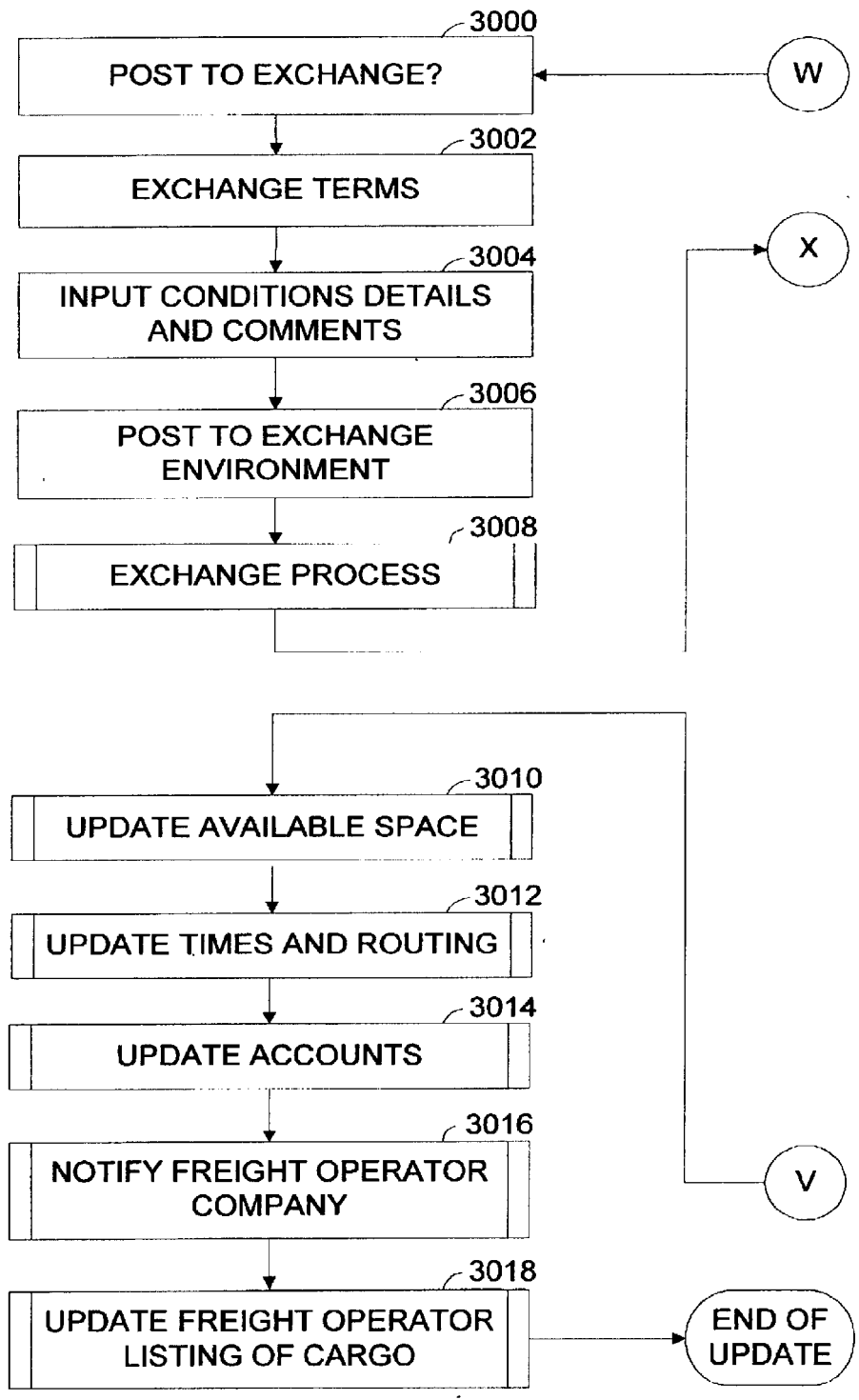
Figure 12D:
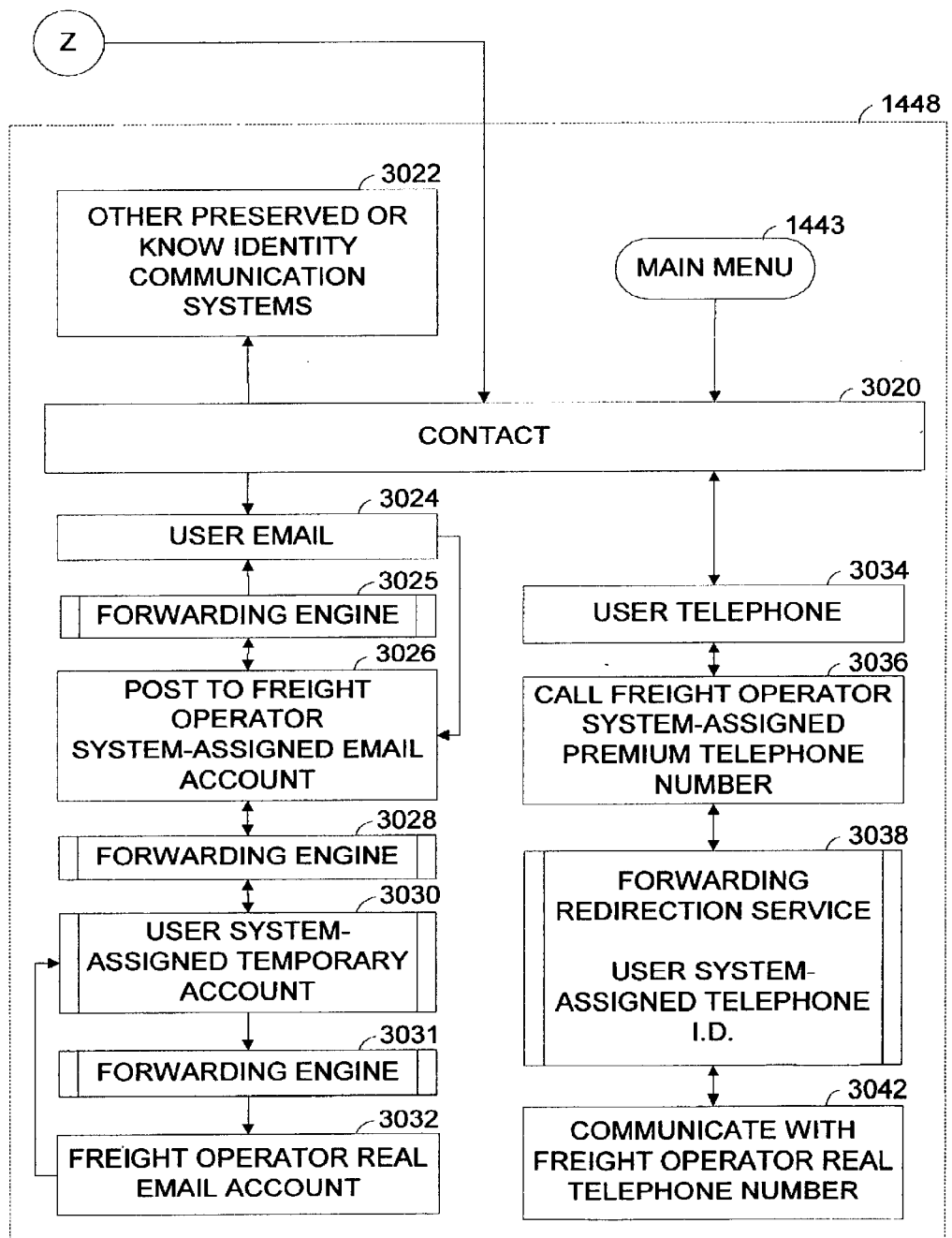

If the user is not willing to accept multi-link operations at 2964 completed the "start search" process is launched and as a result when the search is completed or partially completed, the standard output interface module appears at 2965, along with the selecting facility 2966, which is also complemented by a "post to exchange system" facility connecting to an existing exchange or auction system, represented on FIG. 12C as interface modules and processes 3000 to 3008, after which, if a carrier that is registered with the main system object of the invention, is selected through this system, the user is given the option of making contact at 2978 of FIG. 12A.

Both outputs are linked to a support interface module 2968, a save to memory facility 2969 that saves all search parameters as well as the initial output for future recall and an exit facility 2970. The standard output 2965 is also linked to the multi-link interface module in case the user wishes to explore further possibilities after the initial single carrier results. The search save facility 2969 can also be constructed not only to save the search parameters, but also to offer an option to automatically query the system at predefined intervals until the predefined expiry time, and notify the user of any match through the communication system 066.

Once a solution is selected at 2966, the decision point 2978 enquires if contact with these carriers is essential due to the complexity or nature of the operation. If the contact is not essential the process continues directly to an e-commerce transaction system represented by interface modules 2980 to 2992 of FIG. 12B. Once the payment operation has been confirmed at module 2990 on FIG. 12B, the process automatically updates all relevant parameters, including updating the available space at module 3010 of FIG. 12C, updating times, time windows, routing times and routing instructions at module 3012, updating user and service provider's accounts at 3014, notifying through preferred communication methods the booking to the service providers at 3016 and updating the listing of loads or cargo for the service provider's control at 3018.

A specially designed interface module 2994 on FIG. 12B produces a printable confirmation of booking, printable confirmation of operation and generates a printable coded stamp attachable to the load or shipping documents, after which the process terminates and/or returns to the main menu facility.

If the user considers the contact is essential at 2978 on FIG. 12A, the search parameters and provisional output are stored automatically through a save to memory module 2979 similar to the module 2969. The system administrators can set up the system to offer either preserved or known identity communications options at interface module 3020 on FIG. 12D, which includes options such as preserved identity e-mail communication, which is represented by steps 3024 to 3032, an known identity premium charge telephone communication, which is represented by steps 3034 to 3042 and other alternative communication systems 3022 that allow or preserve the identity of the participants, including fax, video, radio communications, mail, telex, internet based communication systems, chat systems, discussion boards and general single media or multimedia communication using intermediate agents including operators, traducers, transducers and transporters.

As an example of a preserved identity communication system, a user or information seeker of service providers, having selected a service provider, can communicate by e-mail first entering the actual e-mail address that the user intends to use for receiving messages at interface module 3024 and then sending or posting the message to a service provider's system-assigned e-mail account 3026. This system-assigned e-mail is an account created by the system for the service provider, which is complementary to the service provider's main, fixed or actual e-mail account.

The messages are then redirected and forwarded via a two-way forwarding engine 3028, to a temporal e-mail account generated by the system to mask with a temporal, system-assigned email account, the user's main e-mail account, input at module 3024, which is forwarded with the account 3030 figuring as sender, via a forwarding engine 3031 to an actual or fixed e-mail account 3032 commonly used by the service provider for general communication.

When the service provider receives the e-mail message which appears as coming from a system-assigned user account 3030, he or she can continue communication by just replying to the sender account 3030, where the message is redirected and forwarded via the two-way forwarding engine 3028 back to the service provider's system-assigned account 2026 where it is further forwarded with the account 3026 figuring as sender, via forwarding engine 3025 to the user's actual e-mail account input at 3024.

The system-assigned accounts 3026 are preferably of the web mail type, i.e. Internet based, so they can be easily accessible via the Internet from any location, hosted by servers that are directly or indirectly related to the system. The two-way forwarding system changes the redirection addresses according to whether the incoming message is from a user system domain or from service provider system domain and to the relations that exist between the system-assigned and the main accounts, of the users as well as of the service providers. Any of the forwarding engines can also include message-filtering modules in order to control exchange of information that may be illegal or in breach of the accepted conditions on which the communication is enabled. This filtering could include telephone numbers, company names or other basic forms of identification.

Another example of a communication system that might be used as a revenue generating mechanism is prior assignment of individual premium call rate telephone numbers to each service provider, which will be linked via a telephone exchange forwarding or redirection service to the service provider's own standard rate telephone numbers.

The process is represented by the execution of a telephone call, which may be subjected to a minimum charge, by the user or transport information seeker at 3034, to a premium call rate telephone number 3036 assigned to a service provider and linked via an exchange with a redirection service 3038 and optionally a caller number masking facility, showing either no information, or an instantly generated system-assigned premium call rate telephone number 3040, linked via the same exchange and service, to the telephone that the user or information seeker is using for making the call, therefore real identity can only be transmitted through voice. Optionally this type of communication can be partially converted to an unknown identity communication system by the use of real-time message filtering through voice recognition software, or by the use of human or "intelligent" operators as intermediate or translating agents to convey filtered information between the user and the service providers.

Service Provider Interface

Figure 13A:
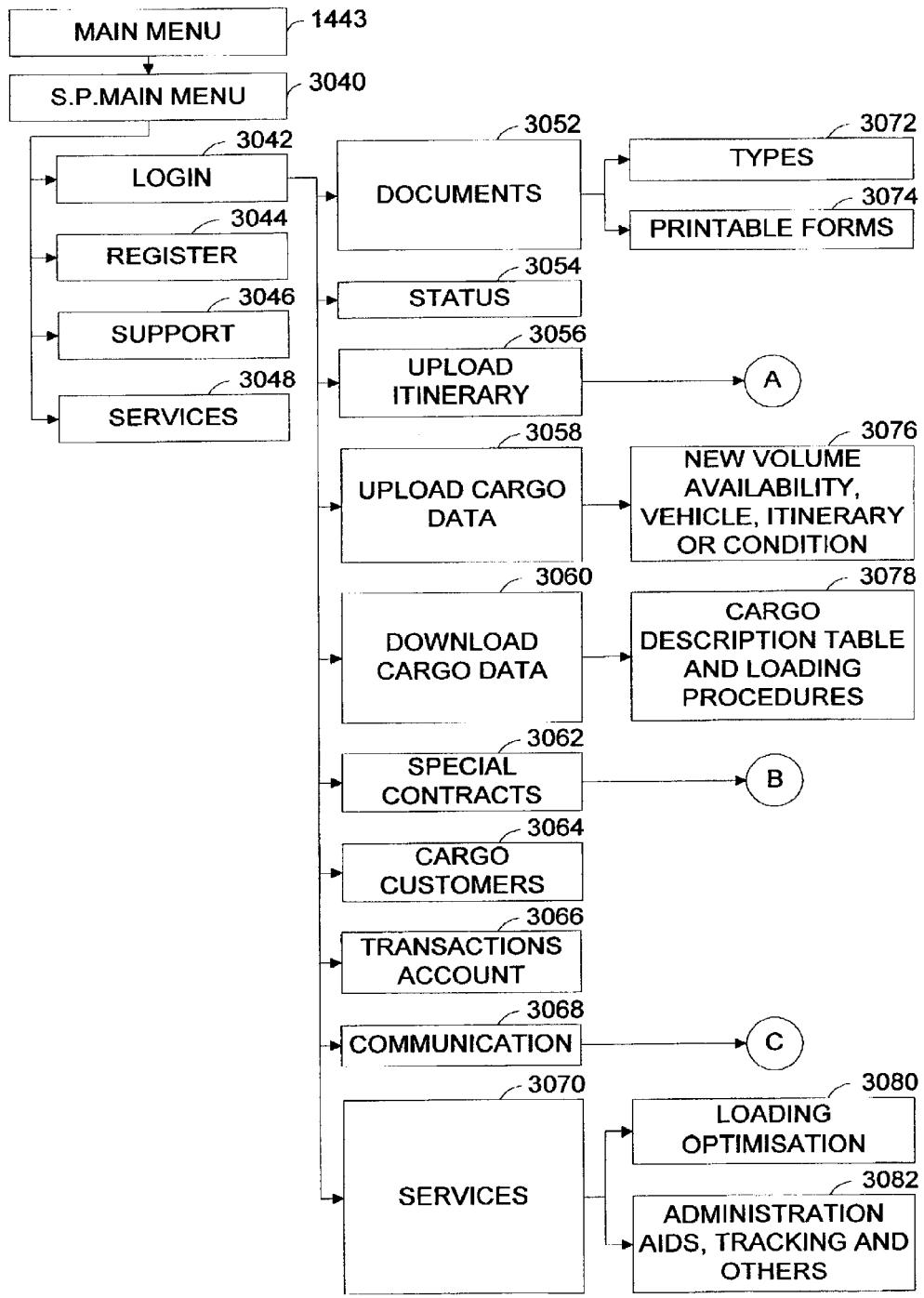
FIGS. 13A to 13B—show the interface structure of a small transport management application for carriers or service providers interacting with the system.
Figure 13B:
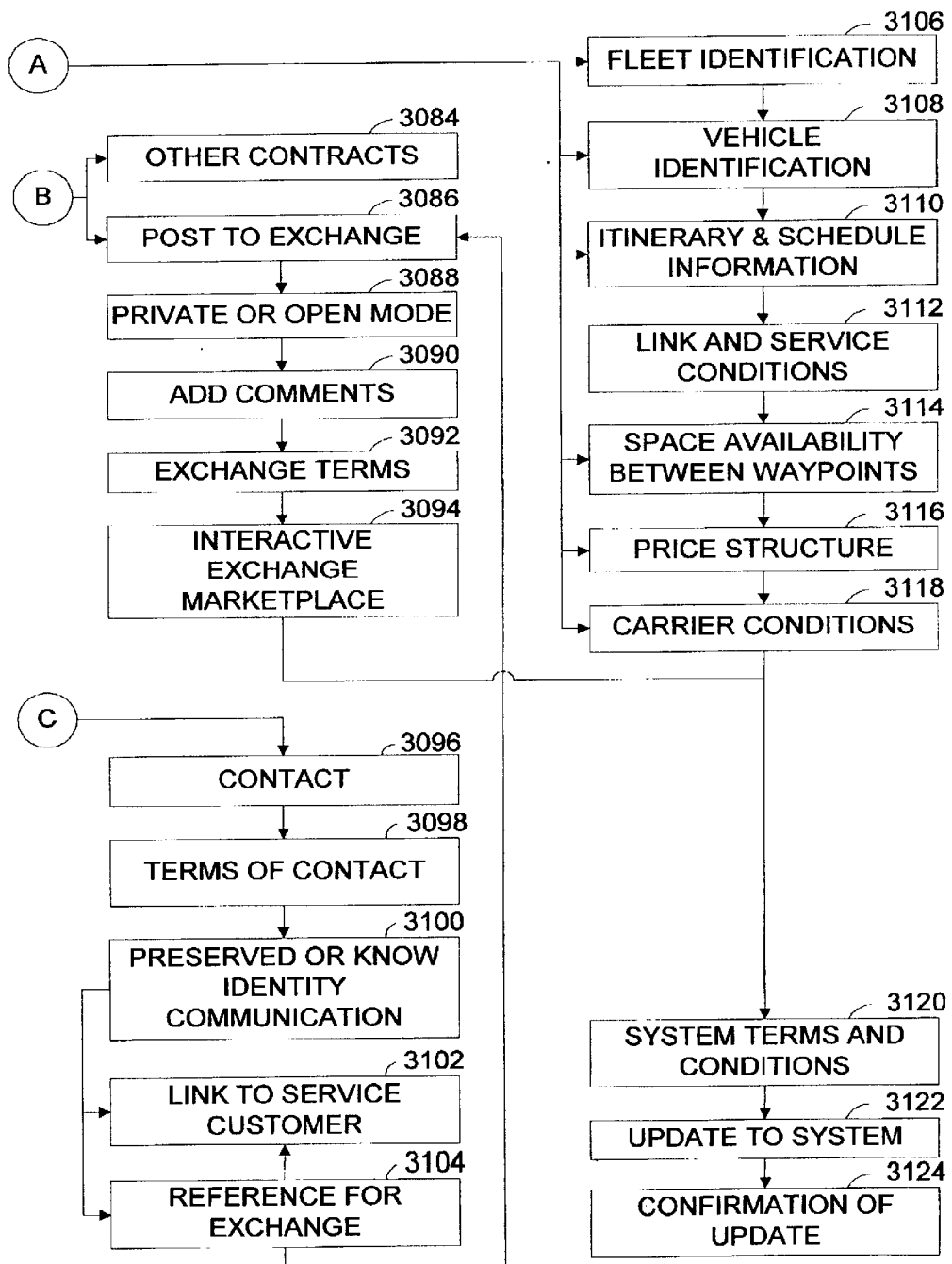

FIGS. 13A to 13B show the interface structure of a small transport management application for carriers or service providers interacting with the system. The application is either stand-alone, stand alone and connectable to the Internet, or web based as an extension of the system limited to the service providers.

The object of the application is to provide the service providers with a fast, user friendly and efficient way of loading transport path data and transport related information to the main system, to retrieve and organize information from the main system and to include convenient transport related management facilities as part of an integrated package.

FIG. 13A—The first level of selection, on the main menu 3040, includes a login interface 3042, a register interface 3044, a support interface 3046 and a services interface 3048 providing description of the services offered by the system.

Once the service providers have registered at 3044, they can subsequently log in directly at interface 3042 where they will be presented with a second level selection menu or control panel including as options:

a documents link 3052 connecting to an interface with links to an interface 3072 having a dictionary of document types, their function and their relation respect to the different industries, modes of transport, regions and countries. The documents link also connects to an interface 3074, which has a selection of typical transport related documents and forms, in printable format and accompanied with instructions regarding their use.

a status link 3054 connecting to an interface providing last minute information on accounts, bookings, progress of deliveries and routing changes for the particular service provider account and the specific vehicles within it.

an itinerary upload link 3056 for the uploading of new itineraries or the updating or correction of existing ones, connecting to interfaces 3106 to 3118 for the input of transport path related information, followed by an interface 3120 regarding the system specific terms and conditions, which may vary according to mode, geographic location and other parameters or characteristics of the particular transport path. Once these are accepted the service provider can link to an update or upload to system interface 3122 where all the data input regarding the transport path can be loaded to the system via a cable or wireless connection, operation which, when completed leads to a printable confirmation of update or upload interface 3124.

an upload cargo data link 3058 for connecting to an interface 3076 for uploading, updating or notifying the system, of the latest capacity availabilities due to changes in transport contracts independent of the system, new vehicles added to perform the same itinerary due to demand and changes in the length of the carried cargo itinerary parameters or conditions.

a download cargo data link 3060 for downloading and presenting via an interface 3078 information from the system to the service provider, regarding the latest consignment bookings or reservations, with the characteristics and description of the existing as well as the latest cargo consignments organised in a table, accompanied by suggested loading procedures and conditions.

a special contracts link 3062 which connects an interface 3084 having links with existing customers not related with the system and a description of the pending contract with them and links to other possible commercial environments. Link 3062 also connects to an exchange type facility represented by interfaces 3086 to 3098 on FIG. 13B, where the service provider can see information and place bids regarding particular loads or regarding particular contracts posted by shippers. The exchange system information has also it's own terms and conditions shown at interface 3120, followed by update to system interface 3122 and a printable confirmation of update interface 3124.

a cargo customers' link 3064, which basically connects to an address book with the customer's data, and links to the respective accounts and balances held with those customers. a transactions account link 3066 which connects with an interface showing the respective accounts and balances held with respect to a main administrator, i.e. the system, if the system is acting also as a transport broker, or as an intermediate agent.

A communication link 3068, is connected to a contact interface 3096 explaining the options for contact and the terms and conditions of the contact at interface 3098, followed by a selection of the communication system at interface 3100 and links to communication system at interface 3102 which is used to discuss details and reach an arrangement with the shipper or user.

In order to formalise the agreement, the service provider can offer the service with the agreed conditions on the exchange system, with a certain reference and preferably in private mode, i.e. open only to selected parties. The user or shipper will be able to view the offer on the same exchange via the reference, which will identify it on a normal exchange open mode, or will serve as a password to enter a private mode where the offer will be isolated. Thereon conditions and payments can proceed according to the exchange framework.

For this reason the interface 3100 has also a facility for linking to a reference generator interface 3104 with a messaging facility for attaching the agreed information and posting it simultaneously to the exchange as well as communicating it to the user, shipper or service customer.

A services link 3070 to a loading optimisation interface 3080 which is connected to the space management module 072 of FIG. 3A, for the optimisation of the load listed at interface 3078 and is also connected to an interface 3082 having further links to more complete administration services and aids, tracking services and others that may be created in the future.

The application can of course be further extended or reduced, as well as further personalized or adapted to particular or different needs.

Description of the Structure of Some Modules Within the Search Process

It is worth mentioning that in all the disclosure and especially in FIG. 14 to FIG. 22 whenever the process compares or checks for matches a point or a waypoint, against another waypoint, or against an area described by area coordinates, the process does not necessarily imply checking the coordinates one by one. As is typical in a Geographical database management, the process is usually a multi-stage process involving hierarchically related files and folders that are used to organize and manage spatial or geographic data with reference to matrices of quadrangular grids, tiles or frames, or also with reference to functions or algorithms that may be used to define an area as well as to verify if a point is within that area.

FIG. 14 shows a detailed structure of the "one vector" linking, matching and filtering modules 606 to 414 of FIG. 6A.

Figure 14A:
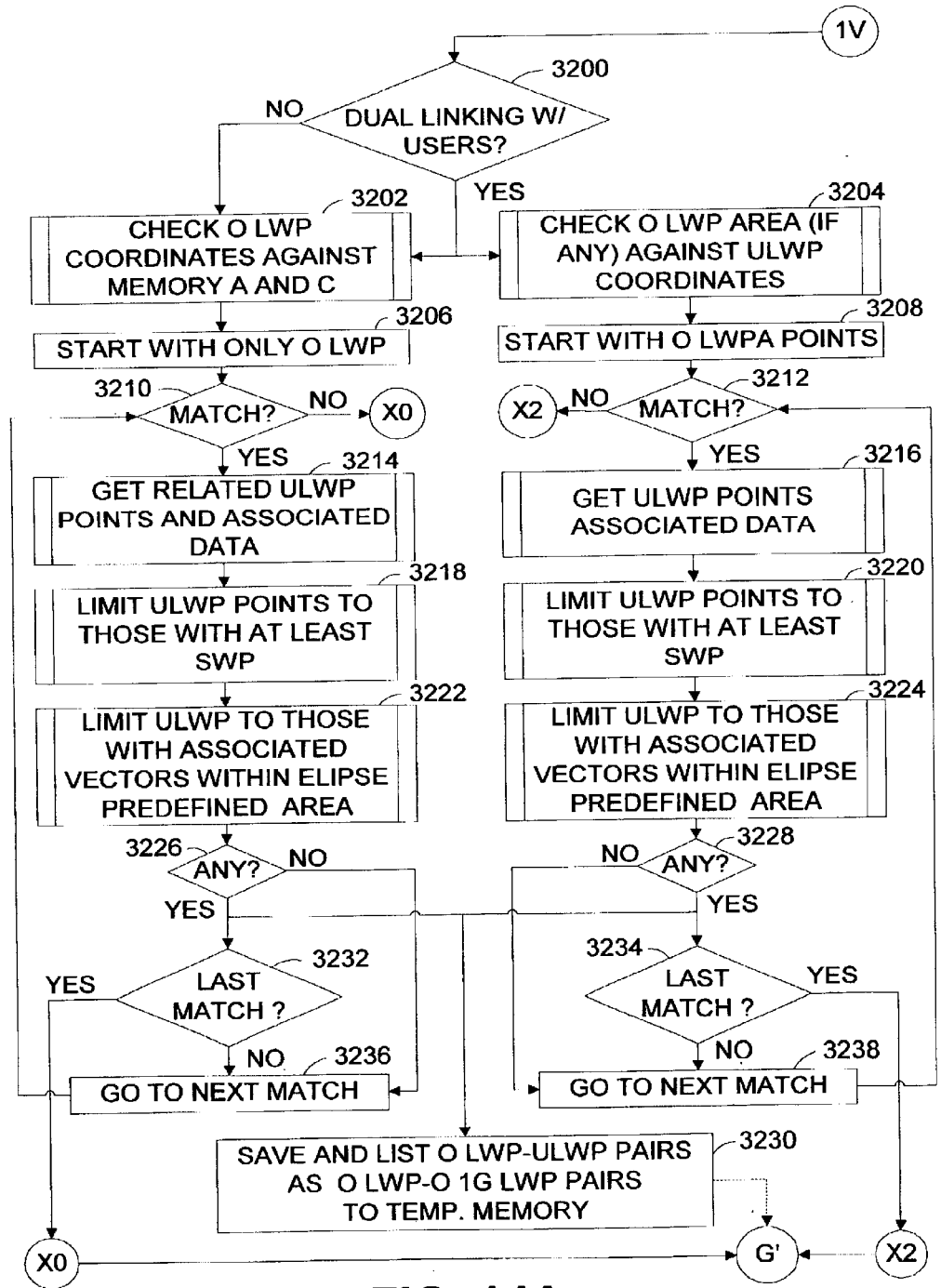
FIGS. 14A to 14C—show a more detailed structure of the "one vector" linking, matching and filtering modules 606 to 414 of FIG. 6A.

FIG. 14A shows a detailed structure of the origin linking and matching module 606 of FIG. 6A.

This disclosure defines a single linking option as an option for analysing match possibilities between a first and a second waypoint, by analysing the match possibilities between the associated area coordinates of the first waypoint and the coordinates of the second waypoint.

This disclosure defines a dual linking option as an option for analysing match possibilities between a first and a second waypoint, by analysing the match possibilities between the associated area coordinates of the first waypoint and the coordinates of the second waypoint and by also analysing the match possibilities between the coordinates of the first waypoint and the associated area coordinates of the second waypoint.

It is also worth mentioning that in the more detailed FIGS. 14 to FIG. 22, there are specific modules that perform similar or identical functions, to specific modules in the more general FIG. 6A to FIG. 6W to which they are related, respectively. Some of these specific modules are therefore redundant, but are included in both related figures, i.e. the more detailed, as well as the more general, for ease of understanding when viewing the figures independently. The process can work anyway with redundant modules and the process rearrangement for sacrificing any redundant module is known to be simple for anybody familiar in the art of computer programming.

The first step of this process is a decision module 3200 regarding the nature of the linking or matching. If the option is dual linking, the process continues simultaneously to a module 3202 and a module 3204. If the option is not dual linking, i.e. is single linking, the process continues only to module 3202.

Module 3202 checks the coordinates of the load origin address O LWP, against all the area coordinates in memory 0 filtered from memory allocations A and C, originally stored by the system after pre-processing of service provider data input, performed at save to memory modules 2912, 2924 and 2928 on FIG. 11I. The area coordinates are all the coordinates composing the associated area of a waypoint. Memory allocations A and C store the area coordinates for all the linkable waypoints belonging to all the paths that are loaded into the system and that may belong to a certain group or classification. The elements on these memory allocations may also be limited by a condition, generally a geographical condition, for example, such as one falling within an imperfect elliptical area between two specific points.

We will also define the group of all the linkable waypoints belonging to all the paths that are loaded into the system, that may belong to a certain group or classification and that may be limited by conditions, including a geographical condition, as "unstructured linkable waypoints" ULWP, as they have not yet been related to any point, or classified by the search process under any "generation" category.

As the origin address is a single waypoint, i.e. point, the module 3206 only performs the operation for that point. If the origin point is matched with other coordinates at decision point 3210 the process continues to a module 3214 that retrieves the ULWP waypoints associated with those area coordinates that have been matched, as well as the remaining ULWP waypoint attributes, including the LSWP and the LFWP attributes.

The next step at a module 3218 limits the ULWP waypoints found in module 3214 to those with at least a starting SWP waypoint, which means that the waypoint that has been matched with the origin will either be the starting, or an intermediate waypoint, of a transport path possibly capable of transporting the load away from the origin.

The ULWP waypoints left, are then limited, at a module 3222 to those which have the vectors associated to their SWP waypoint completely within the predefined area such as the imperfect elliptical area mentioned before, i.e. that also the finishing waypoints FWP of those vectors are within the predefined area, meaning in practice that at least on the first leg the service provider is transporting the load, it will be within the boundaries of an acceptable route deviation towards the final destination, with the acceptable route deviation being represented by the predefined area. This module is redundant if this limitation has already been performed at module 604 of FIG. 6A and can optionally be eliminated.

If any ULWP waypoints remain after step 3222 at decision point 3226, they are termed O 1G LWP, listed as matching O 1G LWP-O LWP pairs and saved to a temporal memory at a save to memory module 3230. Before continuing, the process checks if there are any more matches left to process at a decision point 3232 and if all possible matches have been completed, the process continues to connector G' through connector X0, also reached if there are no matches at decision point 3210.

If no ULWP waypoints remain after step 3226, or if there are still matches left to process at decision point 3232, the process continues at step 3236 to a next match. If there is no further match available at decision point 3210, the process continues to connector G' through connector X0.

If the option is dual linking, the process continues simultaneously to a module 3202 and to a module 3204. The module at 3204 is for the case of a service user or shipper that, having defined a load origin address, can, if necessary, transport the load to a nearby depot, in order to benefit from further, or better, opportunities. The user defined area, representing the points up to which the service user or shipper is willing to transport the load from the intended origin point, will be termed O LWP AREA or O LWPA. This area can be defined by the service user or shipper, in a similar way as the service providers define the associated area for the waypoints conforming their transport paths.

The module 3204 will check whether any unstructured linkable waypoints ULWP complying with former process constraints and within memory 0, can be matched with any coordinate points composing the O LWPA area The process starts with the O LWPA coordinate points at a module 3208 and if there are matches of the format O LWPA-ULWP coordinate point at a decision point 3212, these are processed at a module 3216 which recalls the ULWP waypoints' associated data or attributes, followed by modules 3220 and 3224, which are similar and perform identical function to modules 3218 and 3222 respectively, although the pairs, points or waypoints processed, may of course be different.

If there are any ULWP waypoints remaining after the modules 3216, 3220 and 3224 at a decision point 3228, they are termed O 1G LWP, listed as matching O LWP-O 1G LWP pairs and saved to a temporal memory, at a save to memory module 3230. Before continuing, the process checks if there are any matches left to process at a decision point 3234 and if all possible matches have been completed, the process continues to connector G' through connector X2, also reached if there are no matches at decision point 3212.

If no ULWP waypoints remain after step 3228, or if there are still matches left to process at decision point 3234, the process continues at step 3238 to a next match If there is no further match available at decision point 3212, the process continues to connector G' through connector X2.

While the process from step 3206 to step 3236 has been presented as to be performed in series for each matched pair, it can also be arranged by somebody familiar in the art of computer programming, to be performed in parallel, for many, or all, matched pairs at a time. Similarly, the same could be said of the process from step 3204 to step 3238, as well as of the processes in FIGS. 15, 16, 17, 18, 19, 20, 21 and 22.

Figure 14B:
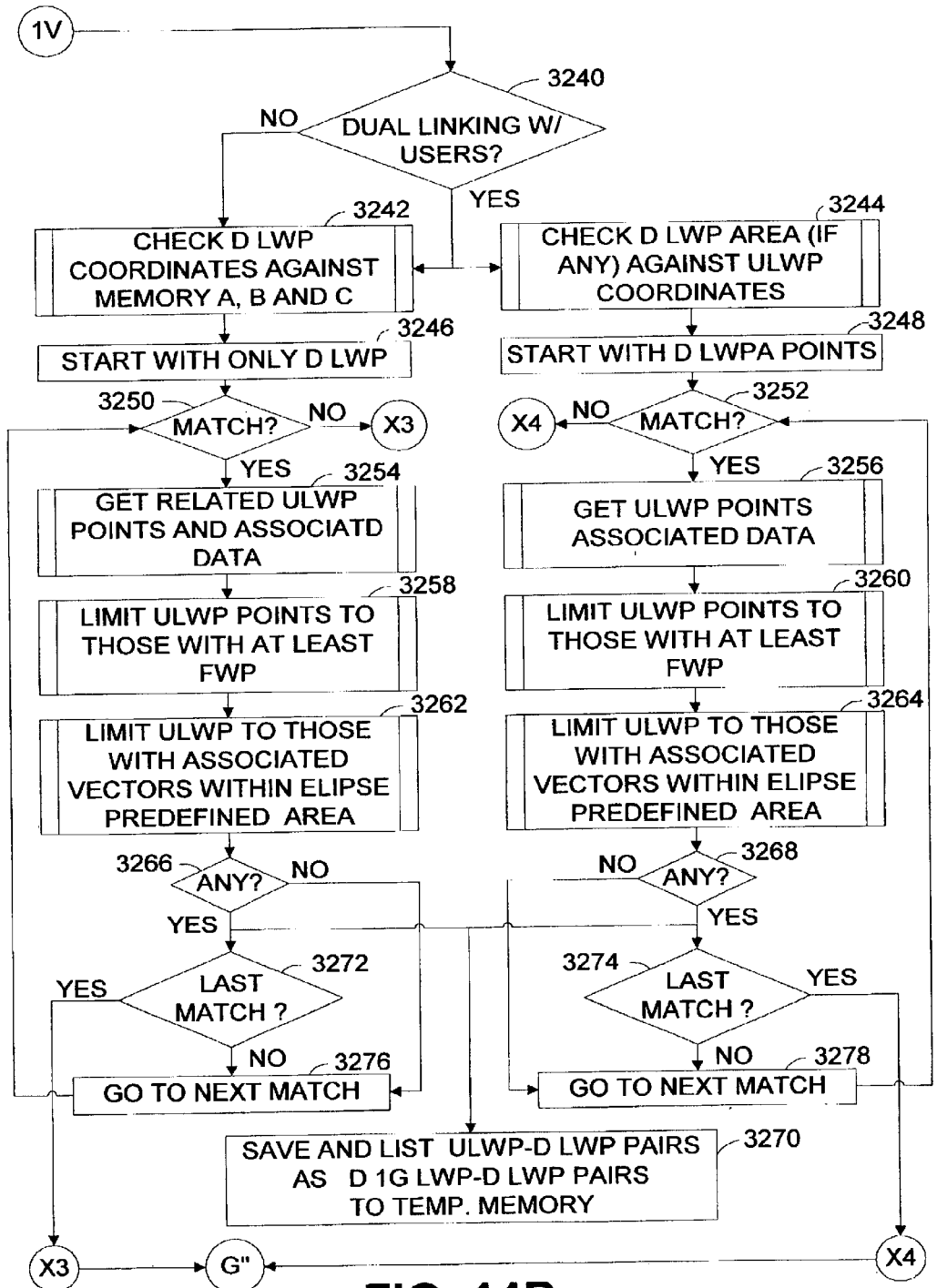

FIG. 14B shows a detailed structure of the destination linking and matching module 608 of FIG. 6A.

The first step of this process is a decision module 3240 regarding the nature of the liking or matching. If the option is dual linking, the process continues simultaneously to a module 3242 and a module 3244. If the option is not dual linking, i.e. is single linking, the process continues only to module 3242.

Module 3242 checks the coordinates of the load destination address D LWP, against all the area coordinates in memory allocations A and C, originally stored by the system after pre-processing of service provider data input, performed at the save to memory modules 2912, 2924 and 2928 on FIG. 11I. The area coordinates are all the coordinates composing the associated area of a waypoint.

As the destination address is a single waypoint, i.e. point, the module 3246 only performs the operation for that point. If the destination point is matched with other coordinates at decision point 3250, the process continues to a module 3254, that retrieves the ULWP waypoints associated with those area coordinates that have been matched, as well as the remaining ULWP waypoint attributes, including the LSWP and the LFWP attributes.

The next step at a module 3258 limits the ULWP waypoints found in module 3254 to those with at least a finishing FWP waypoint, which means that the waypoint that has been matched with the destination, will either be the a finishing or an intermediate waypoint of a transport path possibly capable of transporting the load towards the destination.

The ULWP waypoints left are then limited, at a module 3262, to those which have the vectors associated to their FWP waypoint completely within the predefined area such as the imperfect elliptical area mentioned before, i.e. that also the starting waypoints SWP of those vectors are within the predefined area, meaning in practice that at least on the last leg the service provider is transporting the load, it will be within the boundaries of an acceptable route deviation from the origin of the load, with the acceptable route deviation being represented by the predefined area. This module is redundant if this limitation has already been performed at module 604 of FIG. 6A and can optionally be eliminated.

If any ULWP waypoints remain after step 3262 at decision point 3266, they are termed D 1G LWP, listed as matching D 1G LWP-D LWP pairs and saved to a temporal memory at a save to memory module 3270. Before continuing, the process checks if there are further matches left to process, at a decision point 3272 and if all possible matches have been completed, the process continues to connector G'' through connector X3, also reached if there are no matches at decision point 3250.

If no ULWP waypoints remain after step 3262, or if there are still matches left to process at decision point 3272, the process continues at step 3250 to a next match. If there is no further match available at decision point 3250, the process continues to connector G'' through connector X3.

If the option is dual linking, the process continues simultaneously to a module 3242 and to a module 3244.

The module at 3244 is for the case of a service user or shipper that, having defined a load destination address, can, if necessary, arrange for the pick up of the load from a depot that is nearby the final load destination, in order to benefit from further or better opportunities. The user-defined area representing the points up to which the user or shipper is willing to arrange for the pick up of the load, from the intended destination point, will be termed D LWP AREA or D LWPA.

The module 3244 will check whether any unstructured linkable waypoints ULWP complying with former process constraints, can be matched with any coordinate points composing the D LWPA area. This starts with the D LWPA coordinate points at a module 3248 and if there are matches of the format D LWPA-ULWP coordinate point at a decision point 3252, these are processed at a module 3256, which recalls the matched ULWP waypoints' associated data and attributes, followed by modules 3260 and 3264, which are similar and perform identical function to modules 3258 and 3262 respectively, although the pairs, points or waypoints processed, may of course be different.

If there are any ULWP waypoints remaining after the modules 3256, 3260 and 3264 at a decision point 3268, they are termed D 1G LWP, listed as matching D LWP-D 11G LWP pairs and saved to a temporal memory, at a save to memory module 3230. Before continuing, the process checks if there are any matches left to process at a decision point 3274 and if all possible matches have been completed, the process continues to connector G" through connector X4, also reached if there are no matches at decision point 3252.

If no ULWP waypoints remain after step 3264, or if there are still matches left to process at decision point 3274, the process continues at step 3278 to a next match. If there is no further match available at decision point 3252, the process continues to connector G" through connector X4.

Figure 14C:
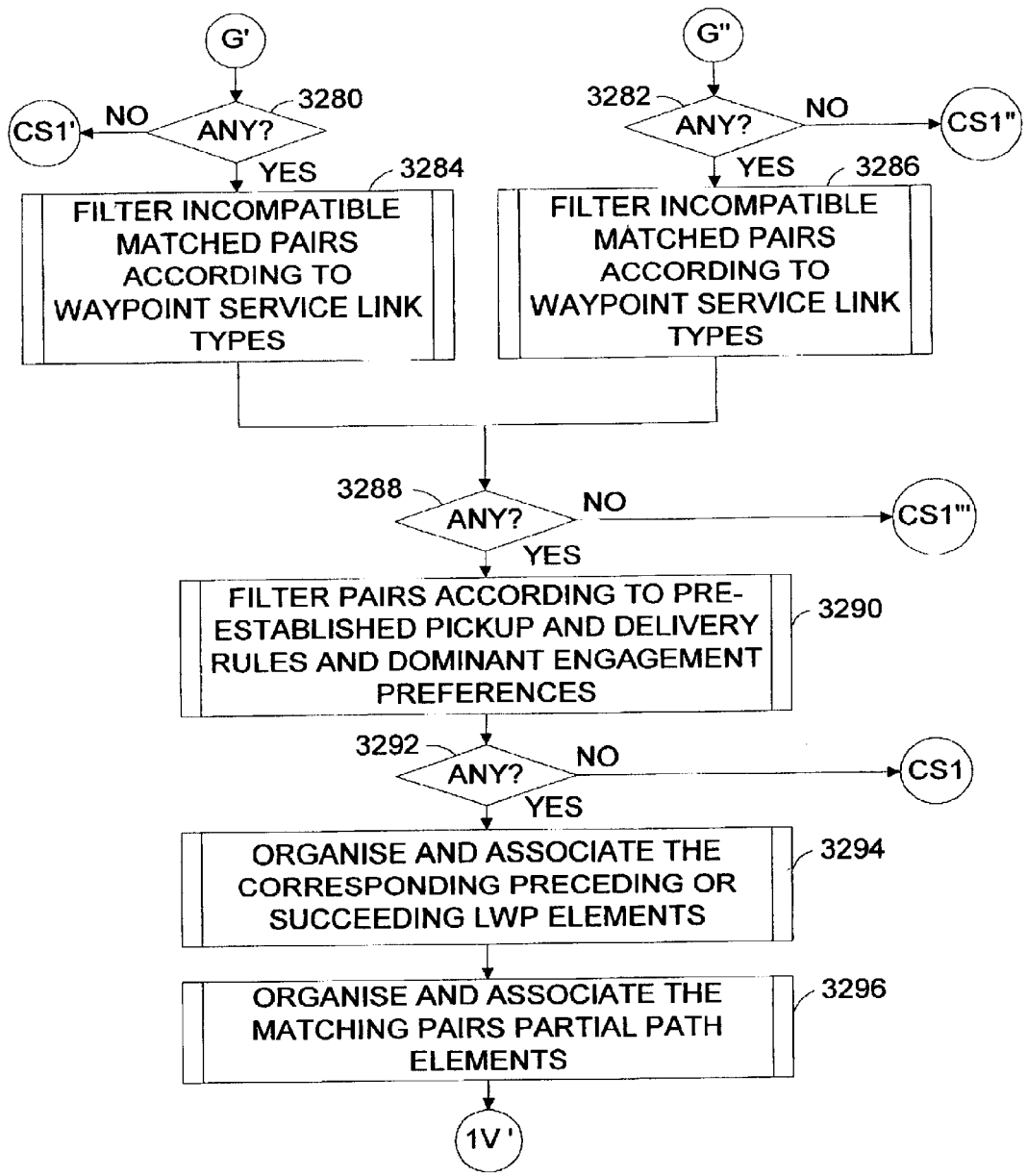

FIG. 14C shows the structure of the filtering module 614 of FIG. 6A.

The process from connector G' of FIG. 14A continues to a decision point 3280, which checks if there are any pairs at the temporary memory allocation saved by module 3270 of FIG. 14A and if there are existing O LWP-O 1G LWP or O 1G LWP-O LWP pairs, the pairs are analysed, at a module 3284, according to the waypoint service link types, which are attributes described in FIG. 5A. If the pairs are found to be incompatible between each other because of this reason, they are eliminated or filtered at this stage. In this case, for example, one of the waypoints or points of the pair, is actually the origin point, so any waypoint service type compatible with an address, is in fact a compatible pair. If the user or shipper has also defined an O LWPA area, any waypoint service type compatible with a depot, even if it were not compatible with an address, would also be a compatible pair.

Similarly, The process from connector G" of FIG. 14B continues to a decision point 3282 which checks if there are any pairs at the temporary memory allocation saved by module 3270 of FIG. 14A and if there are existing D 1G LWP-D LWP or D LWP-D 1G LWP pairs, the pairs are analysed, at a module 3286, according to the waypoint service link types, which are attributes described in FIG. 5A. If the pairs are found to be incompatible between each other because of this reason, they are eliminated or filtered at this stage. In this case, for example, one of the waypoint or points of the pair is actually the destination point, so any waypoint service type compatible with an address is in fact a compatible pair. If the user or shipper has also defined a D LWPA area, any waypoint service type compatible with a depot, but maybe not with an address, would also be a compatible pair.

If at decision point 3280 and/or at decision point 3282, there were no pairs at the temporary memory allocation saved by module 3270 the process would continue to module 1360 of FIG. 6Y.

The next step, after modules 3284 and 3286 have performed their tasks, is a decision point 3288, which checks for remaining pairs left after these filtering modules. If there are pairs left, the next step is a further filtering module 3290, that analyses the pairs according to pre-established pick up and delivery rules and dominant engagement preferences, which are rules set up by the system administrator to organize matching situations for cases including those described in FIGS. 5E, 5F and 5G, fulfilling a function similar to that of traffic lights and traffic regulations for the case of general traffic.

Having the dual matching option enabled, the system may find one or two matches for identical pairs, the first involving a "passive" service user role, where the service provider picks up from the user specified load origin address, or delivers to the user specified load destination address and the second involving an "active" service user role, where the user delivers the load to a nearby service provider depot, or picks up from a nearby service provider depot. If the two solutions are possible, the rules in this module can be set so to eliminate the less convenient option, according to a defined criteria, or on the other hand leave both.

Although a simple framework of rules can be first envisaged, it is foreseeable that this framework can be further extended to cater for very complex situations.

If there are pairs left after filtering module 3290, the process at a decision point 3292, continues to a module 3294, that recalls, organizes, associates and/or relations the corresponding immediately preceding and succeeding elements for the origin-related O 1G LWP waypoints of the OLWP-O 1G LWP as well as the O 1G LWP-OLWP pairs and the preceding and succeeding elements for the destination-related D 1G LWP waypoints D 1G LWP-DLWP as well as the DLWP-D 1G LWP pairs. Among the attributes recalled, are the existing 1G LFWP and the 1G LSWP waypoint attributes and for each 1G LWP pair left, up to two sets of matching pairs are developed, one with the finishing waypoint attributes any and one with the starting waypoint attributes, if any was linkable, respectively.

It is likely that this module will produce an expansion of possibilities by developing path solutions using the 1G LFWP and the 1G LSWP waypoint attributes, instead of only the 1G LWP waypoint, as components of a matched pair.

This is followed by a module 3296 that recalls, organizes, associates and/or relations the relevant partial path elements that are associated to the matched pairs, with relevant partial path elements being in this case, the elements and attributes of a path that are immediately associated to the matched waypoint attribute, plus all the downstream path elements of the matched waypoint if the waypoint is an origin-related LWP waypoint or all the upstream path elements of the matched waypoint if the waypoint is a destination-related LWP waypoint.

As a descriptive example, if there was a path defined by ten vectors on which the system detected the waypoint between the third and fourth vectors as an origin-related matched waypoint, such as an O 1G LWP waypoint, the relevant partial path elements for the O 1G LWP finishing attributes would be those directly associated with the third, fourth, fifth, sixth, seventh, eight, ninth and tenth vectors and the relevant partial path elements for the O 1G LWP starting attributes would be those directly associated with the fourth, fifth, sixth, seventh, eight, ninth and tenth vectors.

Similarly is if there was a path defined by 4 vectors on which the system detected the waypoint between the second and third vectors as a destination-related matched waypoint, such as an D 1G LWP waypoint, the relevant partial path elements for the D 1G LWP finishing attributes would be those directly associated with the first and second vectors and the relevant partial path elements for the D 1G LWP starting attributes would be those directly associated with the first, second and third vectors.

If there aren't any pairs left after filtering module 3290, the process at a decision point 3292, would continue to module 1376 of FIG. 6Y which may suggest changing the matching rules or preferences that the user may have input, which for example, may have been that only matching engagements between, or with, certain type of transport modes could be performed.

If there aren't any pairs left after filtering modules 3284 and 3286, the process at a decision point 3288 would continue to module 1374 of FIG. 6Y, which may suggest changing the service types or linking preferences that the user may have input, which for example, may have been that only matching engagements between, or with, certain type of transport services could be performed.

The possible expansion of possibilities by developing path solutions using the LFWP and the LSWP waypoint attributes at module 3294, could lead to having two slightly similar solutions involving the same transport path, which are tested and filtered through the modules of FIG. 6A and FIG. 6B. If after these filters the two solutions are still possible, a further filtering module at FIG. 6ZA could eliminate redundant paths according to predefined rules.

FIG. 15 shows a detailed structure of the "two vector" lining, matching and filtering modules 732 to 740 of FIG. 6E.

Figure 15A:
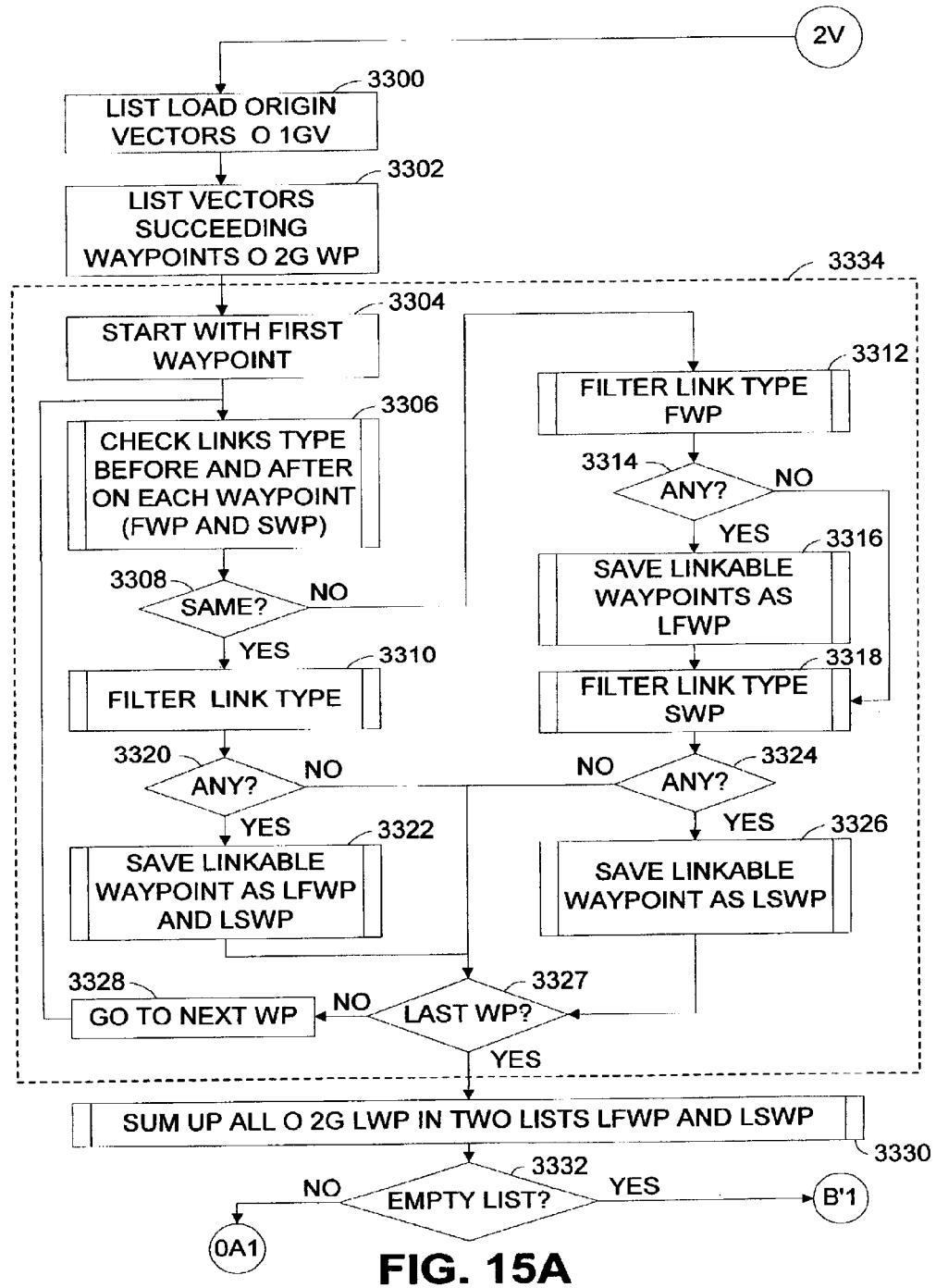
FIGS. 15A to 15G—show a more detailed structure of the "two vector" linking, matching and filtering modules 732 to 740 of FIG. 6E.

FIG. 15A shows a detailed structure of the "two vector" origin-related link type filtering-module 732 of FIG. 6E.

Figure 15B:
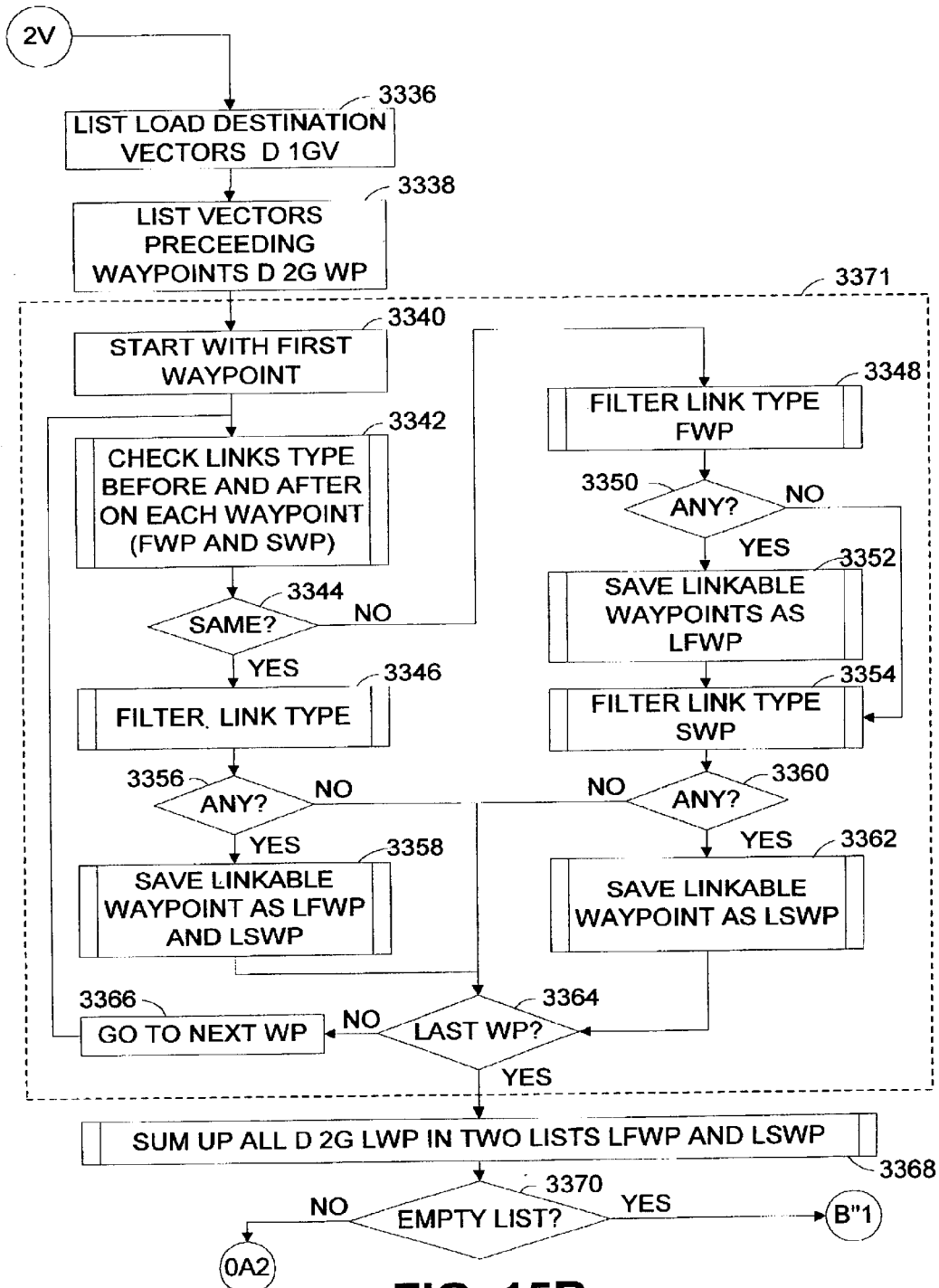

The process, which also flows simultaneously to module 3336 of FIG. 15B, starts at a module 3300 which lists the origin-related first generation O 1GV vectors and is followed by a module 3302, which lists the O 1GV vectors' succeeding waypoint, i.e. the second generation O 2GWP waypoints.

If the service providers' transport path waypoints have been pre-processed, the process continues straight to a module 3330, that lists all origin-related second generation linkable waypoints 2G LWP in two separate lists, one of all the linkable waypoints with finishing attributes O 2G LFWP and another of all the linkable waypoints with starting attributes O 2G LSWP.

If the service provider's path waypoints have not been pre-processed, they can be processed by the modules enclosed in a subsystem 3334, that filters the waypoints to allow only the linkable types and sorts them according to their finishing and starting attributes respectively.

The subsystem 3334 starts at a module 3304 that commences with the first waypoint of the list of module 3302, which is analysed by a module 3306, that checks the starting and finishing link types of the waypoint, to see if they are the same.

If they are the same at a decision point 3308, the common link type is then filtered by a module 3310 that allows for waypoints with link types compatible for matching, i.e. linkable waypoints.

If the waypoint is in fact linkable, then at decision point 3320, the process continues with a save to memory module 3322, that saves the linkable waypoint LWP, as a linkable waypoint with finishing attribute LFWP, as well as a linkable waypoint with starting attribute LSWP.

If there are more waypoints on list 3302, at decision point 3327, the process continues to the next waypoint on the list, at a module 3328 and the process returns to step 3306.

If the starting and finishing link types are not the same at the decision point 3308, the process first continues to a filtering module 3312 that allows for waypoints with finishing attribute FWP link types compatible for matching. If the finishing attribute of the waypoint is in fact linkable, then at decision point 3314, the process continues with a save to memory module 3316, that saves the linkable waypoint LWP as a linkable finishing attribute of waypoint LFWP. The process continues afterwards to a filtering module 3318, that allows for waypoints with starting attribute SWP link types compatible for matching. If the starting attribute of the waypoint is in fact linkable, then at decision point 3324, the process continues with a save to memory module 3326, that saves the linkable waypoint LWP as a linkable starting attribute of waypoint LSWP. The process continues then to decision point 3327 also reached if no linkable waypoints are available at decision modules 3320 or 3324.

Figure 15C:
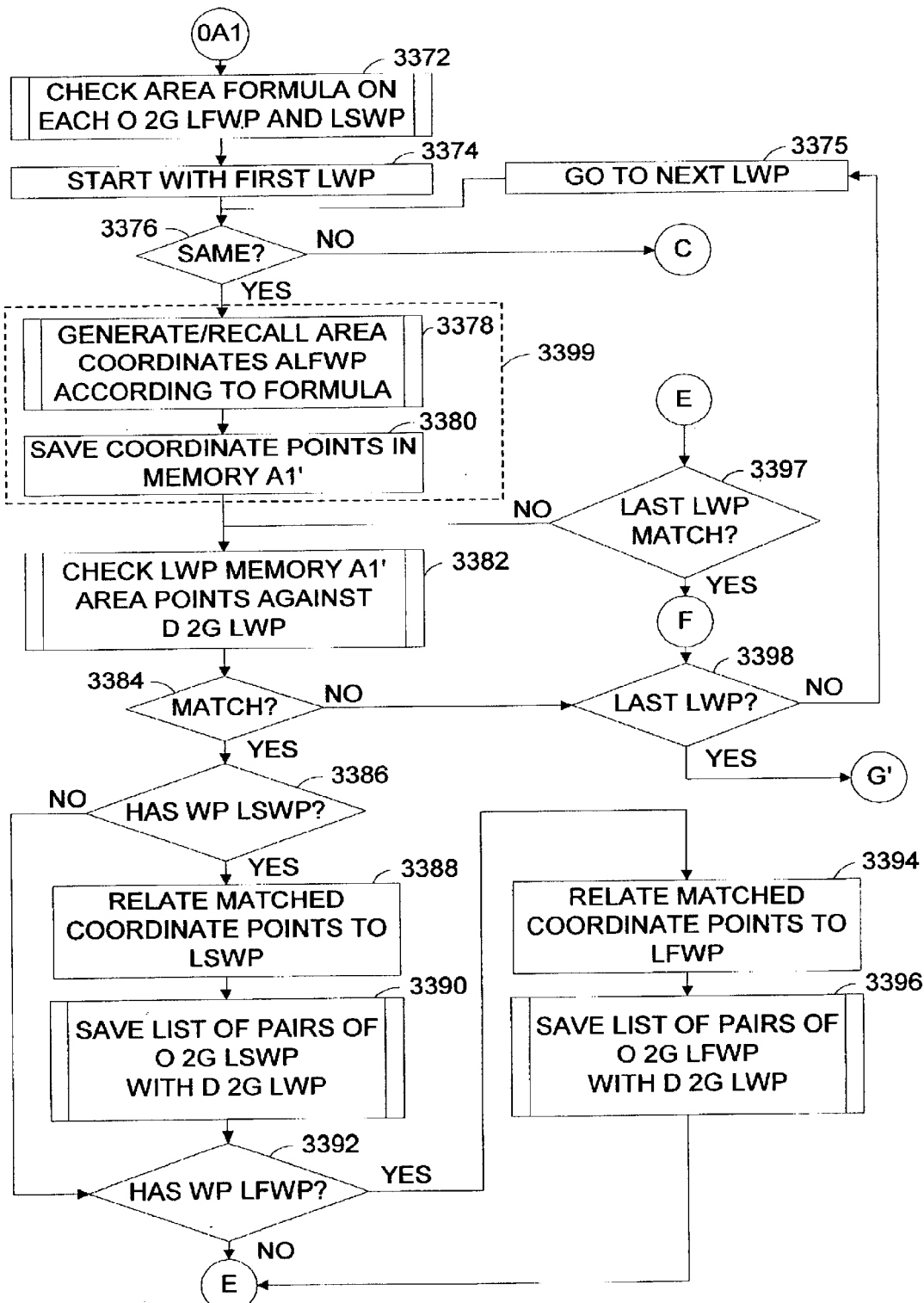

If the list at module 3330 results empty at a decision point 3332 the process continues to module 1360 of FIG. 6Y through connector B'1 and if the list is not empty the process continues to module 3372 on FIG. 15C through connector 0A1.

FIG. 15B shows a detailed structure of the "two vector" destination-related link type filtering-module 736 of FIG. 6E.

The process, which also flows simultaneously to module 3330 of FIG. 15A, starts at a module 3336, which lists the destination-related first generation D 1GV vectors and is followed by a module 3338, which lists the D 1GV vectors' preceding waypoint, i.e. the second generation D 2GWP waypoints.

If the service providers' transport path waypoints have been pre-processed, the process continues straight to a module 3368, that lists all destination-related second generation linkable waypoints 2G LWP in two separate lists, one of all the linkable waypoints with finishing attributes D 2G LFWP and another of all the linkable waypoints with starting attributes D 2G LSWP.

If the service provider's path waypoints have not been pre-processed, they can be processed by the modules enclosed in a subsystem 3371, that filters the waypoints to allow only the linkable types and sorts them according to their finishing and starting attributes respectively.

The subsystem 3371 is a process involving a module 3340 to a module 3366 that performs a function similar to that of module 3304 to module 3328 of FIG. 15A respectively, but that is performed for destination-related, instead of for the origin-related waypoints.

Figure 15D:
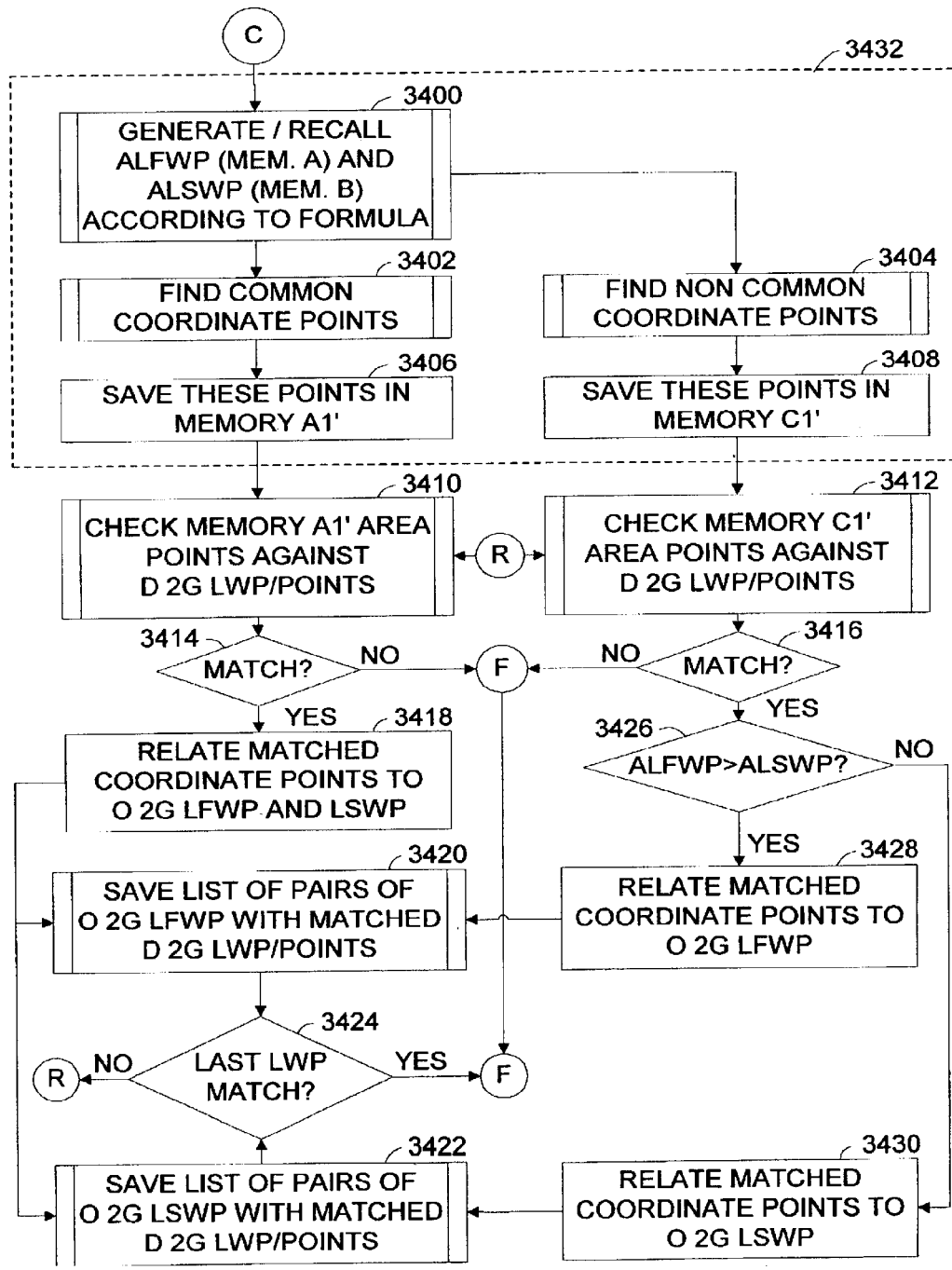
Figure 15E:
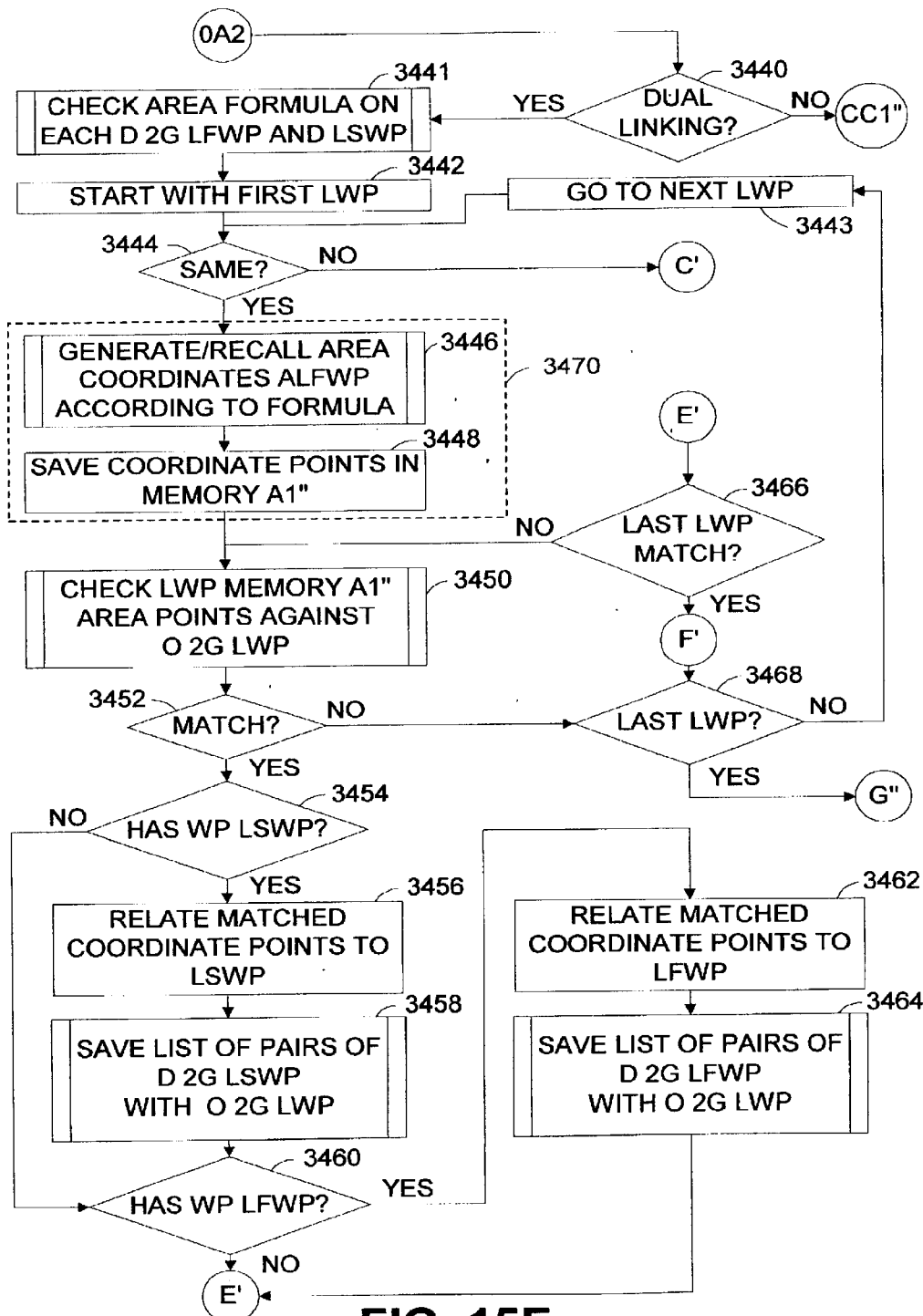

If the list at module 3368 results empty at a decision point 3370 the process continues to module 1360 of FIG. 6Y through connector B"1 and if the list is not empty the process continues to a decision point 3440 on FIG. 15E through connector 0A2.

FIG. 15C and FIG. 15D show a detailed structure of the "two vector" origin-related associated area matching-module 734 of FIG. 6E.

The process continues from FIG. 15A through connector 0A1 to module 3372 that compares the associated area formulas, or functions, for the finishing attributes and for the starting attributes of the origin related O 2G LWP waypoints listed at module 3330 on FIG. 15A.

At a step 3374 the process starts with the first LWP waypoint of the list and if the functions are the same at a decision point 3376, the process continues to a subsystem 3399. If the functions are not the same at decision point 3376 the process continues through connector C to a subsystem 3432 in FIG. 15D.

The subsystem 3399 includes a module 3378 that either generates according to the function formula, in the case of when the service providers' transport path data has not been preprocessed, or recalls, from the data stored to memory A in FIG. 11I, in the case when the transport path data has been pre-processed, the associated area coordinates corresponding to the O 2G LWP waypoints, found in the list of module 3330.

These area coordinates associated with the O 2G LWP are saved to a temporary allocation of memory A1' at a save to memory module 3380. The subsystem 3399 is defined to identify the modules that have slightly different functions whether the transport path data has been preprocessed or not.

The process continues to a matching module 3382, that checks for matches, the O 2G LWP associated area coordinate points, previously stored at the module 3380, against the D 2G LWP, found in list 3368 and if any match is found, at a decision point 3384, the process continues to a further decision point 3386, that checks if the O 2G LWP waypoint in question is linkable at the starting attribute of the waypoint, i.e. if the waypoint has a linkable starting attribute LSWP and if it has, a module 3388 replaces the matched coordinate points, already related to the O 2G LWP waypoint in question, with the starting attribute LSWP of the same waypoint, i.e. the O 2G LSWP of the waypoint in question.

This is followed by a save to memory module 3390 that progressively saves the matched pairs O 2G LSWP-D 2G LWP in a list.

The process continues to a decision point 3392, that checks if the O 2G LWP waypoint in question is linkable at the finishing attribute of the waypoint, i.e. if the waypoint has a linkable finishing attribute LFWP and if it has, a module 3394 replaces the matched coordinate points, already related to the O 2G LWP waypoint in question, with the finishing attribute LFWP of the same waypoint, i.e. the O 2G LSWP of the waypoint in question.

This is followed by a save to memory module 3396 that progressively saves the matched pairs O 2G LFWP-D 2G LWP in another list.

The process continues then through connector E, also reached if no linkable finishing attribute is available at decision point 3392, to a decision module 3397, that checks if there are further matches for the same O 2G LWP, in which case, the process returns to step 3382. If no further matches are detected for the same waypoint, the process continues though connector F, also reached from decision points 3414, 3416 and 3424 of FIG. 15D, to a decision point 3398, that checks if the waypoint in question is the last one of list 3330. If there are further waypoints to process, the next waypoint is selected at step 3375 and processed starting at step 3376.

Figure 15F:
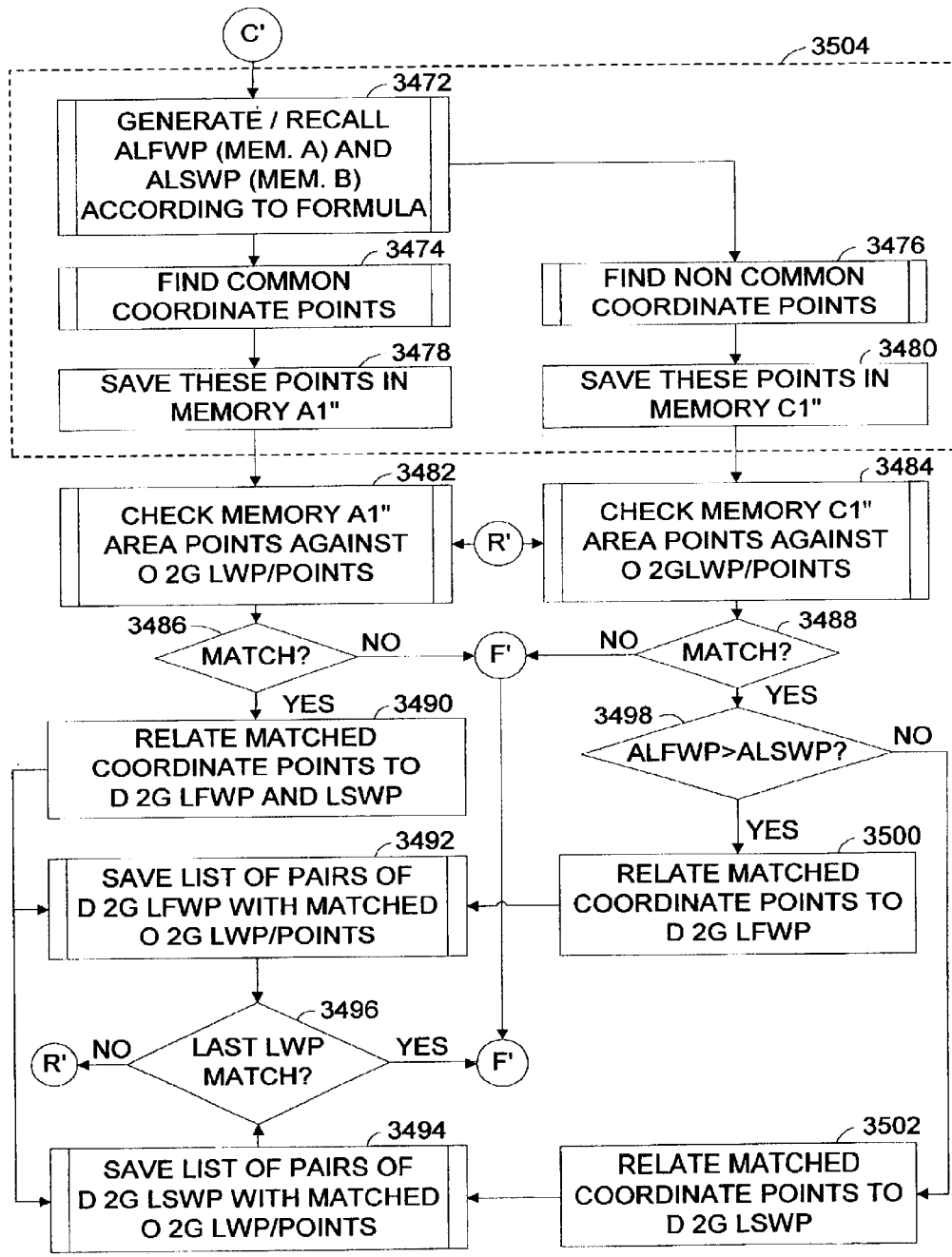
Figure 15G:
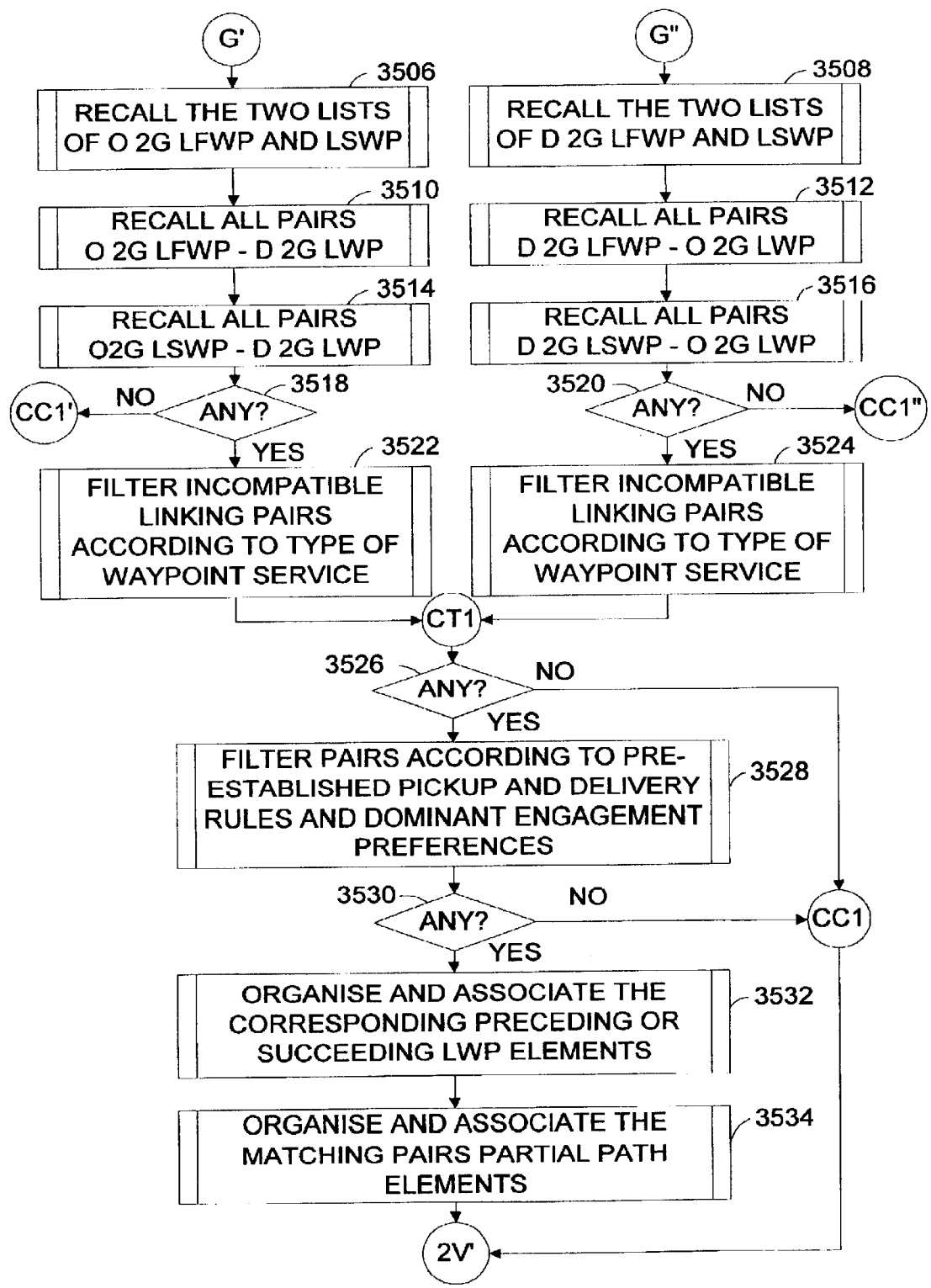

If the waypoint is the last in the list, the process continues through connector G' to module 3506 in FIG. 15G.

FIG. 15D is reached if the associated area functions for the waypoint at decision point 3376 of FIG. 15C are not the same for the finishing and the starting attributes.

The subsystem 3432 includes a module 3400 that either generates, according to the function formula, in the case of when the service providers' transport path data has not been pre-processed, or recalls from the data stored to memory A in FIG. 11I, in the case when the transport path data has been pre-processed, the associated area coordinates corresponding to the starting and finishing attributes of the O 2G LWP waypoints found in list 3330.

If the transport path data has not been pre-processed, the process now continues simultaneously to a comparator module 3402, that identifies the associated area coordinate points common to the starting and the finishing attributes and also to a comparator module 3404, that identifies the associated area coordinate points which are not common to both of the starting and the finishing attributes. If the transport path data has already been pre-processed, i.e. by modules 2922 to 2928 on FIG. 11I, these last two modules can be eliminated.

The area coordinates associated with the O 2G LWP that are common, identified at module 3402, are saved to a temporary allocation of memory A1', at a save to memory module 3406 and the area coordinates associated with the O 2G LWP that are not common, identified at module 3404, are saved to a temporary allocation of memory C1', at a save to memory module 3408.

The subsystem 3432 is defined to determine the modules that have slightly different functions whether the transport path data has been pre-processed or not.

The coordinate points saved at module 3406, are checked for match possibilities against the destination-related D 2G LWP waypoints of list 3368, at a matching module 3410 and if any matches are found at a decision point 3414, the process creates two relations for each, at a module 3418, one with the finishing attribute O 2G LFWP, provided it exists as linkable and one with the starting attribute O 2G LSWP, provided it also exists as linkable, which are saved and listed progressively, at a save to memory module 3420, as a list of O 2G LFWP-D 2G LWP pairs and at a save to memory module 3422, as a list of O 2G LSWP-D 2G LWP pairs.

The coordinate points saved at module 3408, are checked for match possibilities against the destination-related D 2G LWP waypoints of the list of module 3368, at a matching module 3412 and if any matches are found at a decision point 3416, the process, at a decision module 3426, checks if, provided they are substantially concentric, the finishing attribute's associated area is greater than the starting attribute's associated area and if it is greater, creates a relation for each matched O 2G LWP with the finishing attribute O 2G LFWP at a module 3428, provided this attribute exists as linkable and if it is not greater, creates a relation for each matched O 2G LWP with the starting attribute O 2G LSWP at a module 3430, provided this attribute also exists as linkable.

The relations obtained at modules 3428 and 3430, are saved and listed, progressively, at a save to memory module 3420 as a list of O 2G LFWP-D 2G LWP pairs and at a save to memory module 3422, as a list of O 2G LSWP-D 2G LWP pairs, respectively.

The process then continues to check whether there are any more matches involving the O 2G LWP in question, at a decision point 3424 and if there are not, the process continues to decision point 3398 of FIG. 15C through connector F, also reached if no matches are found at decision points 3414 and 3416.

FIG. 15E and FIG. 15F show a detailed structure of the "two vector" destination-related associated area matching-module 738 of FIG. 6E.

The process continues from FIG. 15B through connector 0A2 to a decision point 3440 that checks if the dual linking option is enabled and if it is, the process continues to a module 3441, that compares the associated area formulas, or functions, for the finishing attributes and for the starting attributes of the destination-related D 2G LWP waypoints listed on module 3368 of FIG. 15B. If the dual option is not enabled at decision point 3440 the process continues through a connector CC1" to the sequencing module 1350 of FIG. 23.

At a step 3442 the process starts with the first LWP waypoint of the list and if the functions are the same at a decision point 3444, the process continues to a subsystem 3470. If the functions are not the same at decision point 3444, the process continues through connector C' to a subsystem 3504 in FIG. 15F.

The subsystem 3470 includes a module 3446 that either generates according to the function formula, in the case of when the service providers' transport path data has not been preprocessed, or recalls, from the data stored to memory A in FIG. 11I, in the case when the transport path data has been pre-processed, the associated area coordinates corresponding to the D 2G LWP waypoints found in the list of module 3368.

These area coordinates associated with the D 2G LWP, are saved to a temporary allocation of memory A1" at a save to memory module 3448. The subsystem 3470 is defined to identify the modules that have slightly different functions whether the transport path data has been preprocessed or not.

The process continues to a matching module 3450, that checks for matches the D 2G LWP associated area coordinate points previously stored at the module 3448, against the O 2G LWP found in list 3330 and if any match is found at a decision point 3452, the process continues to a decision point 3454, that checks if the D 2G LWP waypoint in question is linkable at the starting attribute of the waypoint, i.e. if the waypoint has a LSWP and if it has, a module 3456 replaces the matched coordinate points already related to the D 2G LWP waypoint in question, with the starting attribute LSWP of the same waypoint.

This is followed by a save to memory module 3458 that progressively saves the matched pairs D 2G LSWP-O 2G LWP in a list.

The process continues to a decision point 3460 that checks if the D 2G LWP waypoint in question is linkable at the finishing attribute of the waypoint, i.e. if the waypoint has a LFWP and if it has, a module 3462 replaces the matched coordinate points, already related to the D 2G LWP waypoint in question, with the starting attribute LFWP of the same waypoint.

This is followed by a save to memory module 3464 that progressively saves the matched pairs D 2G LFWP-O 2G LWP in another list.

The process continues then through connector E', also reached if no linkable finishing attribute is available at decision point 3460, to a decision module 3466, that checks if there are further matches for the same D 2G LWP waypoint, in which case, the process returns to step 3450. If no further matches are detected for the same waypoint, the process continues though connector F', also reached from decision points 3486, 3488 and 3496 of FIG. 15F, to a decision point 3468 that checks if the waypoint in question is the last one of the list 3368. If there are further waypoints to process, the next waypoint is selected at step 3443 and processed, starting at step 3444.

If the waypoint is the last in the list, the process continues through connector G" to module 3508 in FIG. 15G.

FIG. 15F is reached if the associated area functions for the waypoint at decision point 3444 of FIG. 15E are not the same for the finishing and the starting attributes.

The subsystem 3504 includes a module 3472 that either generates according to the function formula, in the case of when the service providers' transport path data has not been preprocessed, or recalls from the data stored to memory A in FIG. 11I, in the case when the transport path data has been pre-processed, the associated area coordinates corresponding to the starting and finishing attributes of the D 2G LWP waypoints found in list 3368.

If the transport path data has not been pre-processed, the process now continues simultaneously to a comparator module 3474, that identifies the associated area coordinate points common to the starting and the finishing attributes and also to a comparator module 3476, that identifies the associated area coordinate points which are not common to both of the starting and the finishing attributes. If the transport path data has already been pre-processed, i.e. by modules 2922 to 2928 on FIG. 11I, these last two modules can be eliminated The common area coordinates associated with the D 2G LWP, identified at module 3474, are saved to a temporary allocation of memory A1" at a save to memory module 3478 and the area coordinates associated with the D 2G LWP that are not common, identified at module 3476, are saved to a temporary allocation of memory C1" at a save to memory module 3480.

The subsystem 3504 is defined to determine the modules that have slightly different functions whether the transport path data has been pre-processed or not.

The coordinate points saved at module 3478, are checked for match possibilities against the origin-related O 2G LWP waypoints of the list of module 3330, at a matching module 3482 and if any matches are found at a decision point 3486, the process creates two relations for each, at a module 3490, one with the finishing attribute D 2G LFWP, provided it exists as linkable and one with the starting attribute D 2G LSWP, provided it also exists as linkable, which are saved and listed progressively at a save to memory module 3492 as a list of D 2G LFWP-O2G LWP pairs and at a save to memory module 3494 as a list of D 2G LSWP-O 2G LWP pairs.

The coordinate points saved at module 3480, are checked for match possibilities against the origin-related O 2G LWP waypoints of the list of module 3330, at a matching module 3484 and if any matches are found at a decision point 3488, the process, at a decision module 3498, checks if, provided they are substantially concentric, the finishing attribute's associated area is greater than the starting attribute's associated area and if it is greater, creates a relation for each matched D 2G LWP with the finishing attribute D 2G LFWP, provided this attribute exists as linkable, at a module 3500 and if it is not greater, creates a relation for each matched D 2G LWP with the starting attribute D 2G LSWP, provided also this attribute also exists as linkable, at a module 3502.

The relations obtained at modules 3500 and 3502, are saved and listed progressively at a save to memory module 3492 as a list of D 2G LFWP-O 2G LWP pairs and at a save to memory module 3494 as a list of D 2G LSWP-O 2G LWP pairs, respectively.

The process then continues to check whether there are any more matches involving the D 2G LWP in question at a decision point 3496 and if there are not, the process continues to decision point 3468 of FIG. 15E through connector F', also reached if no matches are found at decision points 3486 and 3488.

FIG. 15G shows the structure of the "two vector" filtering-module 740 of FIG. 6E.

The process, which is followed from decision points 3398 of FIG. 15C and 3468 of FIG. 15E, continues to a module 3506 and a module 3508 respectively.

The module 3506 recalls the lists with the two attributes of the O 2G LWP waypoints, O 2G LFWP and O 2G LSWP from module 3330 of FIG. 15A.

The module 3508 recalls the lists with the two attributes of the D 2G LWP waypoints, D 2G LFWP and D 2G LSWP from module 3368 of FIG. 15B.

Module 3506 is followed by a module 3510 that recalls all O 2G LFWP-D 2G LWP pairs from modules 3396 and 3420 of FIG. 15C and FIG. 15D respectively.

With each pair, the module assembles up to two specific pairs by incorporating the linkable attributes of the destination-related waypoint, a task done with the information retrieved from the destination-related lists of module 3508. Module 3510 would then recall the existing O 2G LFWP-D 2G LFWP and O 2G LFWP-D 2G LSWP pairs.

The process continues with a module 3514 that recalls all O 2G LSWP-D 2G LWP pairs from modules 3390 and 3422 of FIG. 15C and FIG. 15D respectively.

With each pair, the module assembles up to two specific pairs by incorporating the linkable attributes of the destination-related waypoint, a task done with the information retrieved from the destination-related lists of module 3508. Module 3514 would then recall the existing O 2G LFWP-D 2G LFWP and O 2G LFWP-D 2G LSWP pairs and if there are any, at a decision module 3518, they are filtered by a filtering module 3522 which analyses the pairs according to the waypoint service link types, which are attributes described in FIG. 5A and if the pairs are found to be incompatible between each other because of this reason, they are eliminated, or filtered, at this stage.

After this, the process continues through a connector CT1, where it waits for the complete input of the destination-related sequence started at module 3508, to a decision point 3526, regarding the existence of any remaining pairs.

The destination-related sequence is similar, with the module 3508 followed by a module 3512 that recalls all D 2G LFWP-O 2G LWP pairs from modules 3464 and 3492 of FIG. 15E and FIG. 15F respectively.

With each pair, the module assembles up to two specific pairs by incorporating the linkable attributes of the origin-related waypoint, a task done with the information retrieved from the origin-related lists of module 3506. Module 3512 would then recall the existing D 2G LFWP-O 2G LFWP and D 2G LFWP-O 2G LSWP pairs.

The process continues with a module 3516 that recalls all D 2G LSWP-O 2G LWP pairs from modules 3358 and 3494 of FIG. 15E and FIG. 15F respectively.

With each pair, the module assembles up to two specific pairs by incorporating the linkable attributes of the origin-related waypoint, a task done with the information retrieved from the origin-related lists of module 3506. Module 3516 would then recall the existing D 2G LFWP-O 2G LFWP and D 2G LFWP-O 2G LSWP pairs and if there are any, at a decision module 3520, they are filtered by a filtering module 3524 which analyses the pairs according to the waypoint service link types, which are attributes described in FIG. 5A and if the pairs are found to be incompatible between each other because of this reason, they are eliminated, or filtered, at this stage.

After this the process continues through a connector CT1, where it waits for the complete input of the origin-related sequence started at module 3506, to a decision point 3526, regarding the existence of any remaining pairs.

If there are remaining pairs, the next step is a further filtering module 3528, that analyses the pairs according to pre-established pick up and delivery rules and dominant engagement preferences, which are rules set up by the system administrator to organize matching situations for cases including those described in FIGS. 5E, 5F, and 5G, fulfilling a function similar to that of traffic lights and traffic regulations in the case of general traffic.

Having the dual matching option enabled, the system may find one or two matches for identical pairs, as a result of the origin and the destination related sequence, the first, for example, involving a "passive" succeeding path service provider role, where the preceding path service provider picks up from, or delivers to the succeeding service provider's specified waypoint and the second involving an "active" succeeding service provider role, where it is the succeeding service provider, the one that picks up from, or delivers to, the preceding service provider's specified waypoint. If the two solutions are possible, the rules in this module can be set so to eliminate the less convenient options, according to a defined criteria, or set on the other hand to allow both.

Although a simple framework of rules can be first envisaged, it is foreseeable that this framework can be further extended, to cater for very complex situations.

If there are pairs left after filtering module 3528, the process at a decision point 3530 continues to a module 3532 that recalls, organizes, associates and/or relations the corresponding immediately associated elements for the starting and finishing attributes of the origin-related O 2G LWP waypoints, as well as for the destination-related D 2G LWP waypoints of the O 2G LWP-D 2G LWP pairs This is followed by a module 3534 that recalls, organizes, associates and/or relations the relevant partial path elements that are associated to the matched pairs, with relevant partial path elements being in this case, the elements and attributes of a path that are immediately associated to the matched 2G LWP waypoint attributes, plus all the path elements immediately associated to the matched 1G LWP waypoint attributes corresponding to the same vectors as the matched 2GLWP waypoint attributes, plus the elements between each the matched 1G and 2G LWP waypoints of a same path.

As a descriptive example, if we had a matched pair of the type O 2G LSWP-D 2G LSWP with the O 2G LSWP belonging to a path defined by ten vectors, on which the system has already detected a waypoint between the third and fourth vectors as an origin-related matched waypoint, such as an O 1G LFWP waypoint and the matched D 2G LSWP belonging to a path defined by 4 vectors, on which the system detected a waypoint between the second and third vectors as a destination-related matched waypoint, such as an D 1G LSWP, so i.e. the O 2G LSWP would be at the beginning of the fifth vector of the first path, the D 2G LSWP would be at the beginning of the second vector of the second path, the O 1G LFWP would be at the end of the third vector of the first path and the D 1G LSWP would be at the beginning of the third vector of the second path. The relevant partial path elements would be therefore the third, fourth and fifth vectors of the first path and second and third vectors of the second path.

It is worth noting that only the fourth vector of the first path and the second vector of the second path, are vectors that transport the load from their starting to their finishing waypoints, i.e. their full vector length. The others only perform pick up or delivery within their waypoint associated area, but nevertheless they need to be considered for the calculations.

If there aren't any pairs left after filtering module 3528, the process at a decision point 3530 would continue to through connector CC1 the decision point 744 of FIG. 6E, also reached if there aren't any pairs left after filtering modules 3522 and 3524.

Figure 23:
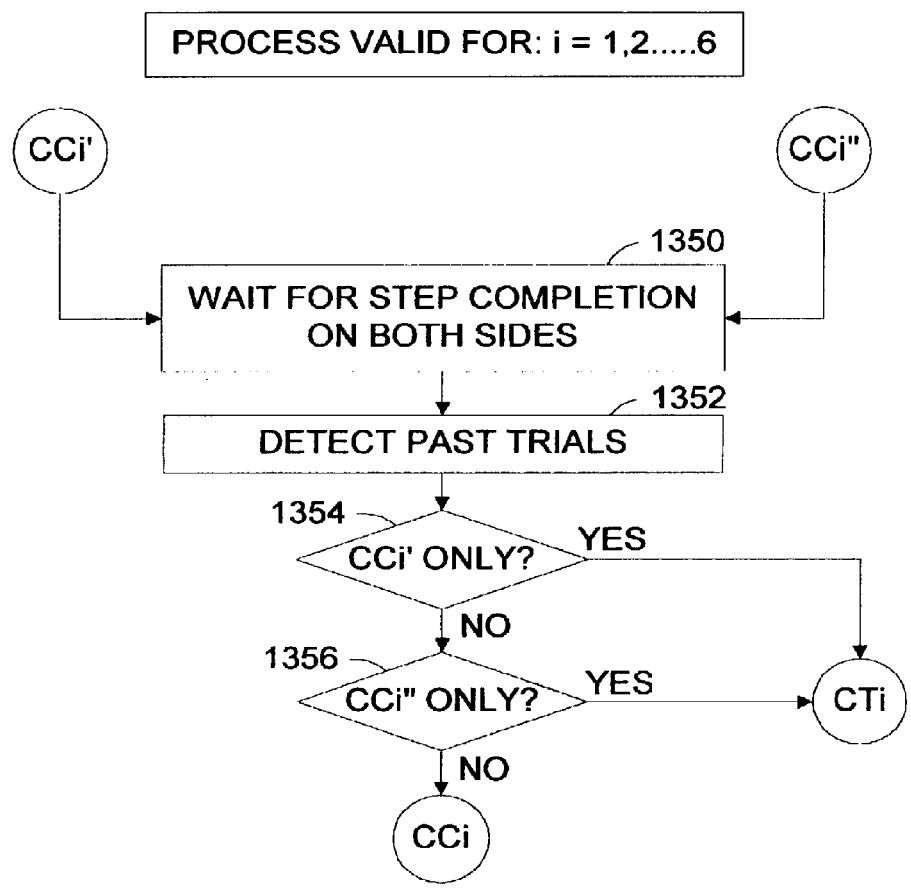
FIG. 23—shows the structure of a sequencing module that is used by FIGS. 15, 16, 18, 19, 21 and 22.

If the aren't any pairs at decision points 3518 and/or 3520 the process continues to a sequencing module 1350 on FIG. 23, that waits for the completion of processing at filtering modules 3522 or 3524 if any pairs are being processed and which is followed by a module 1352 on FIG. 23, that detects the passage of electronic trails through connectors CC1' and CC1". The process on FIG. 23 continues to a decision point 1354, that checks if the trail has passed through CC1' only and if not continues to another decision point 1356, that checks if the trail has passed through CC1" only. If the trail has passed only through either CC1' or CC1", the process continues through a connector CT1 to decision point 3526 in FIG. 15G and if the trial has passed through both CC1' and CC1", the process continues through a connector CC1 and a connector 2V' to the decision point 744 in FIG. 6E.

The possible expansion of possibilities by developing path solutions using the LFWP and the LSWP waypoint attributes, could lead to having two slightly similar solutions involving the same transport path, which are tested and filtered through the modules of FIG. 6E and FIG. 6F. If after these filters the two solutions are still possible, a further filtering module 1401 in FIG. 6ZA could eliminate redundant paths according to predefined rules.

Figure 16A:
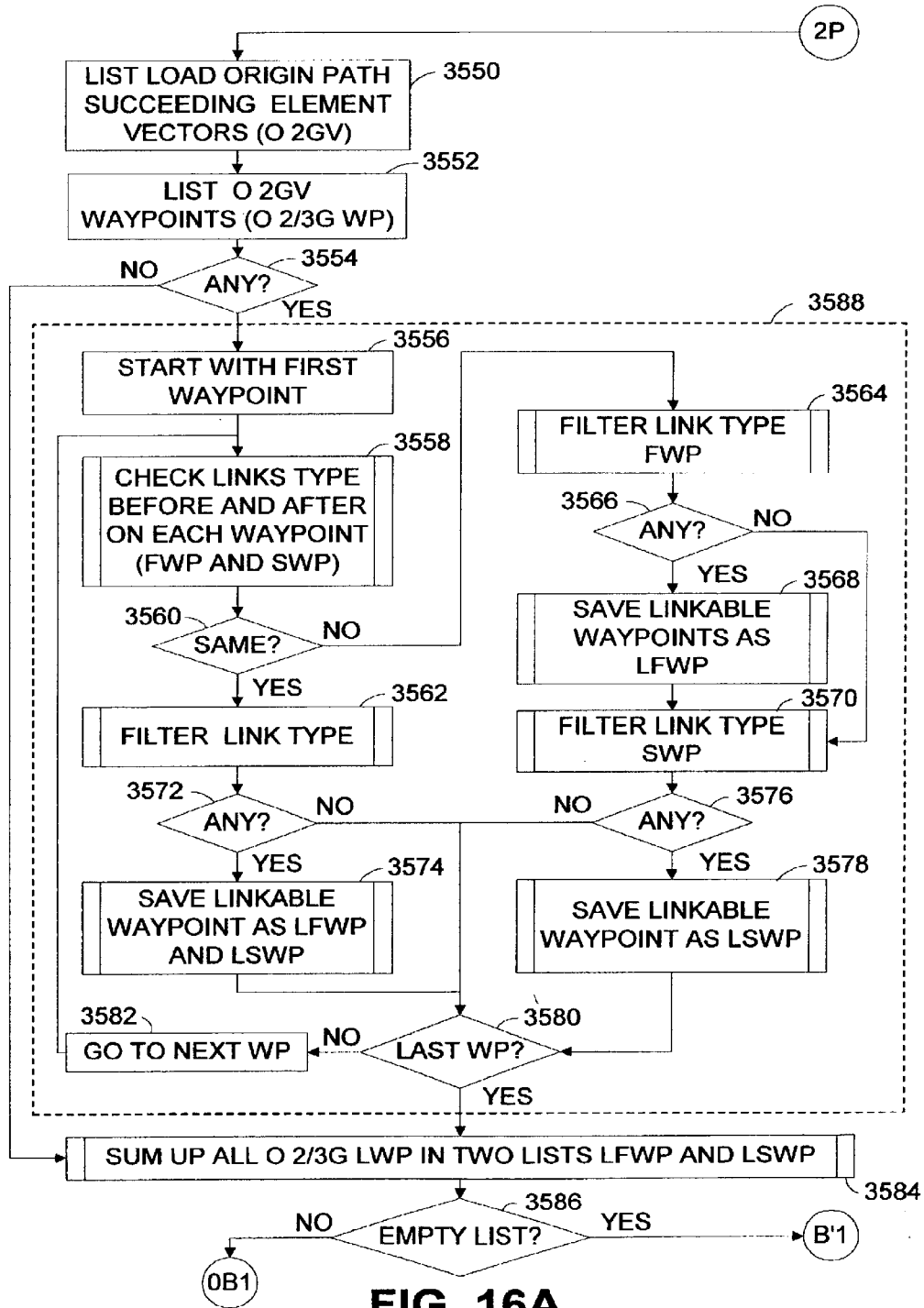
FIGS. 16A to 16G—show a more detailed structure of the "two path" linking, matching and filtering modules 800 to 808 of FIG. 6G.
Figure 16B:
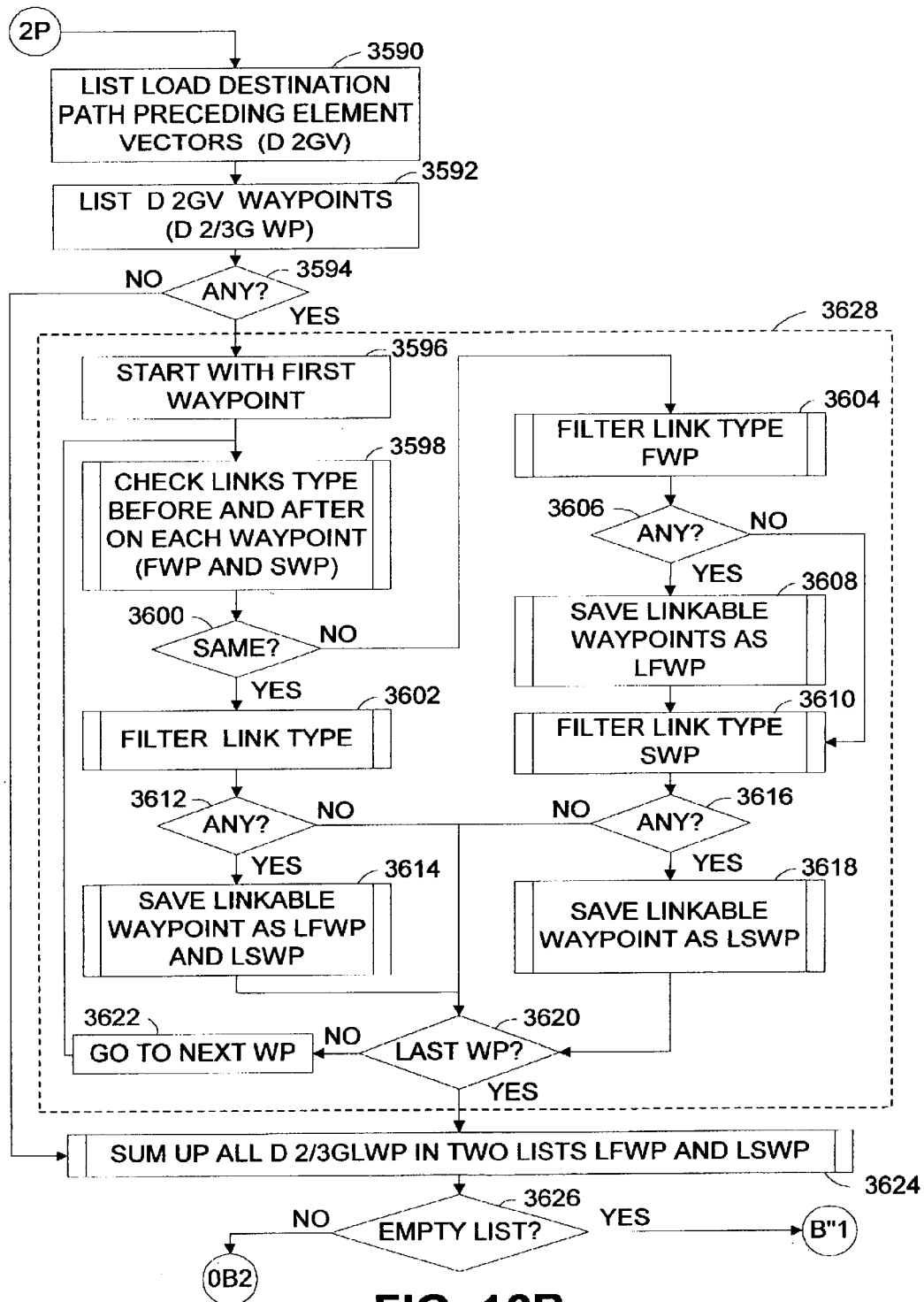
Figure 16C:
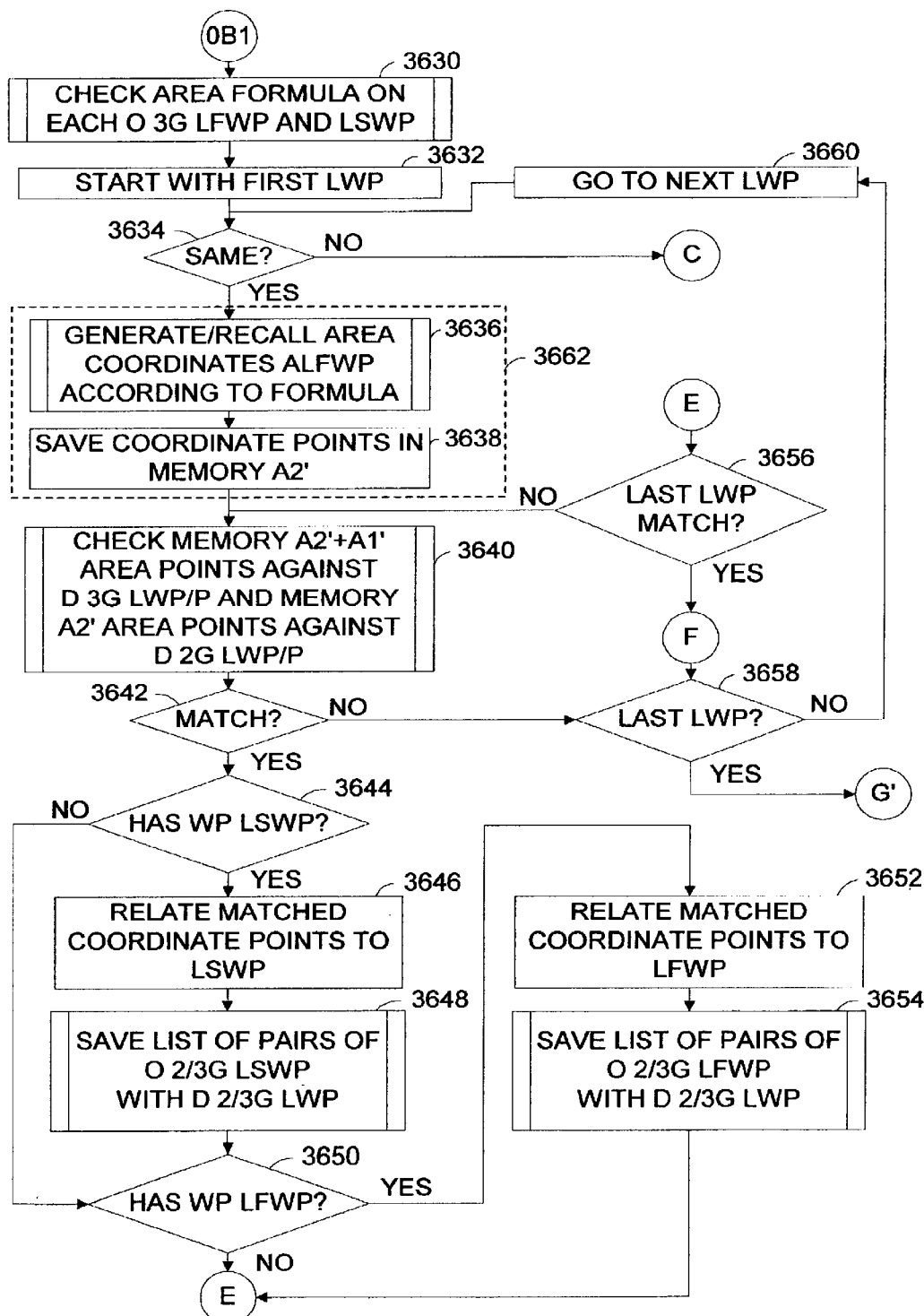
Figure 16D:
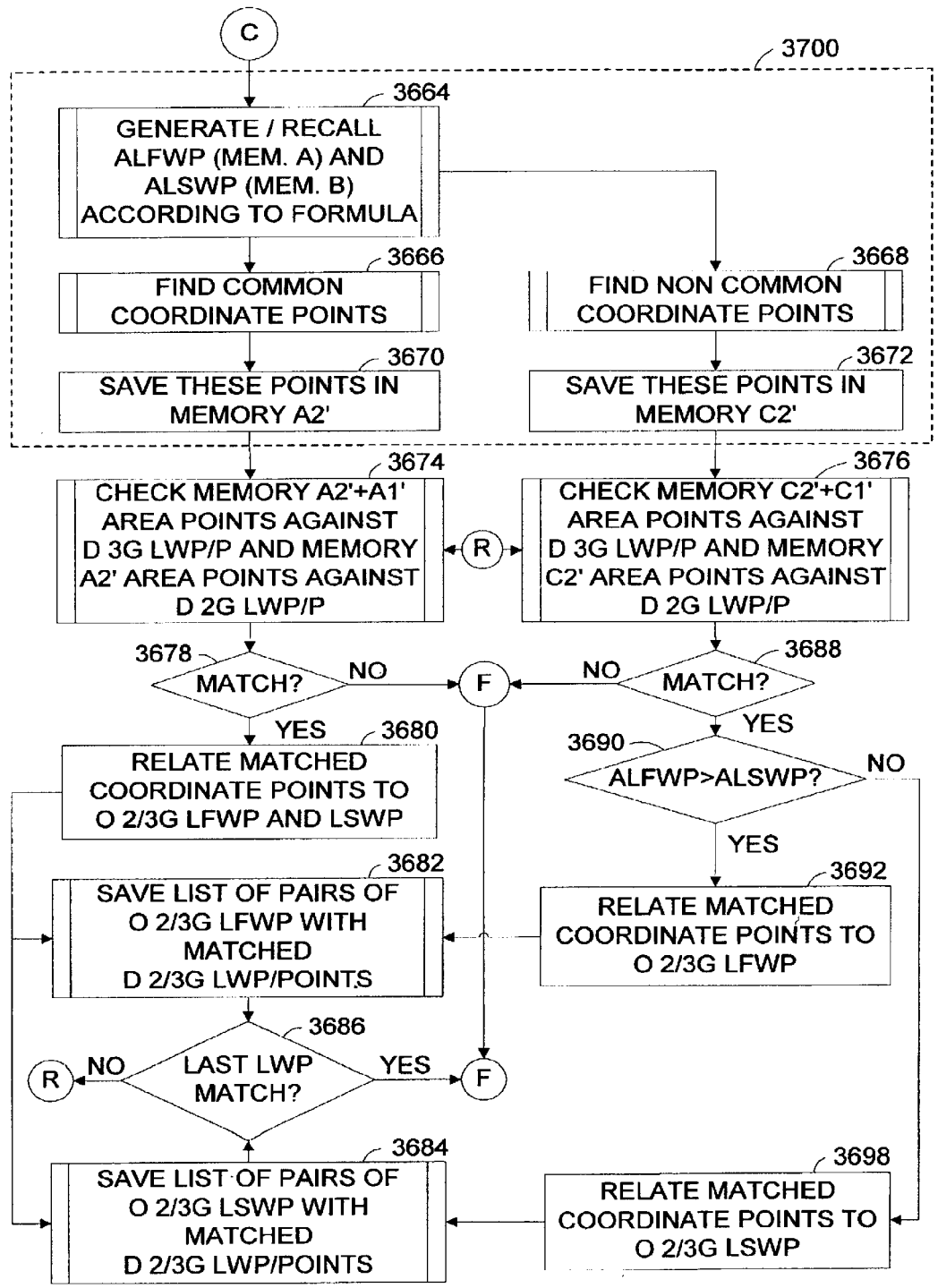

It should be noted to avoid confusion that the connectors C, C', E, E', F, F', R and R' always refer other C, C', E, E', F, F', R and R' connectors in the same figure number, i.e. for example the connector C in FIG. 15C will refer to connector C in FIG. 15D, or to any figure within FIG. 15, but not to connector C in FIG. 16D. This applies to FIGS. 15, 16, 18, 19, 21 and 22

FIG. 16 shows a detailed structure of the "two path" linking, matching and filtering modules 800 to 808 of FIG. 6G.

The process of FIG. 16 is similar to that FIG. 15, but more intensive, processing not only the 2G LWP, but also all the 3G LWP, to produce possible combined pairs by matching 2G-3G, 3G-3G and 3G-2G LWP, but not 2G-2G LWP which were already analysed in FIG. 15.

FIG. 16A shows a detailed structure of the "two path" origin-related link type filtering-module 800 of FIG. 6G.

The process, which also flows simultaneously to module 3590 of FIG. 16B, starts at a module 3550, which lists the origin-related vectors that succeed the first generation O 1GV vectors, i.e. the downstream or second generation O 2GV vectors and is followed by a module 3552, which lists the O 2GV vectors succeeding waypoints, i.e. the downstream or third generation O 3G WP waypoints. The description of the process that continues involving a group of modules 3556 to 3588, is similar to the process in FIG. 15A involving modules 3304 to 3334. The Module 3584 groups the O 2G LWP recalled from module 3330 in FIG. 15 and the O 3G LWP in two lists, one having finishing linkable waypoint attributes LFWP and the other having starting linkable waypoint attributes LSWP.

FIG. 16B shows a detailed structure of the "two path" destination-related link type filtering-module 804 of FIG. 6G.

The process, which also flows simultaneously to module 3550 of FIG. 16A, starts at a module 3590 which lists the destination-related vectors that precede the first generation D 1GV vectors, i.e. the upstream or second generation D 2GV vectors and is followed by a module 3592 which lists the D 2GV vectors preceding waypoints, i.e. the upstream or third generation D 3G WP waypoints. The description of the process that continues involving a group of modules 3596 to 3628, is similar to the process in FIG. 15B involving modules 3340 to 3371. The Module 3624 groups the D 2G LWP recalled from module 3368 in FIG. 15B and the D 3G LWP in two lists, one having finishing linkable waypoint attributes LFWP and the other having starting linkable waypoint attributes LSWP.

FIG. 16C and FIG. 16D show a detailed structure of the "two path" origin-related matching module 802 of FIG. 6G.

The process continues from FIG. 16A through connector 0B1 to module 3630 on FIG. 16C, that compares the associated area formulas, or functions, for the finishing and the starting attributes, of each of the O 3G LWP waypoints on the list 3584 of FIG. 16A.

At step 3632 the process starts with the first LWP waypoint of the list and the process from there, up to a matching module 3640 is similar to that of up to module 3382 on FIG. 15C, but now matching module 3640 checks for possible matches of the coordinate points stored to memory A1', at module 3380 of FIG. 15C plus the ones stored to memory A2', at module 3638, against the D 3G LWP starting and finishing attributes of list 3624 on FIG. 16B. Module 3640 also checks for matches of the coordinate points stored to memory A2', against only the D 2G LWP starting and finishing attributes, also on list 3624 of FIG. 16B or alternatively on list 3368 of FIG. 15B.

In a similar way, as that up to a module 3388 of FIG. 15C, the process continues up to a relational module 3646 that replaces the matched origin-related area coordinate points, with the starting attribute of the linkable waypoint they are related to, provided the waypoint has a linkable starting attribute at decision point 3644. This is followed by a save to memory module 3648 that saves progressively, in a list, all matched pairs, previously related at module 3646 to the origin-related starting waypoint attributes, in a format including O 2G LSWP-D3G LWP, O 3G LSWP-D3G LWP and O 3G LSWP-D2G LWP pairs.

After this, in a similar way, as from module 3390 to a module 3394 of FIG. 15C, the process continues from module 3648 to a relational module 3652, that replaces the matched origin-related area coordinate points with the finishing attribute of the linkable waypoint they are related to, provided the waypoint has a linkable finishing attribute at decision point 3650. This is followed by a save to memory module 3654, that saves progressively, in a list, all matched pairs, previously related at module 3652 to the origin-related finishing waypoint attributes, in a format including O 2G LFWP-D3G LWP, O 3G LFWP-D3G LWP and O 3G LFWP-D2G LWP pairs, to then continue simlarly to FIG. 15C again.

If the area formula functions are not the same at a decision point 3634, the process continues through connector C up to a matching module 3674 and a matching module 3676 on FIG. 16D, which is processed in a similar way to that of FIG. 15D up to modules 3410 and 3412.

Matching module 3674 performs a function similar to that of matching module 3640 on FIG. 16C, but recalls the points saved at save to memory module 3670, instead of recalling them from module 3638 in FIG. 16C.

Matching module 3676, is similar to module 3412 of FIG. 15D, but matching module 3676 now checks for possible matches of the O 2G LWP area coordinate points stored to memory C1' at module 3408 of FIG. 15D plus the O 3G LWP area coordinate points stored to memory C2' at module 3672, against only the D 3G LWP starting and finishing attributes, of list 3624 on FIG. 16B. Module 3676 also checks for matches of the O 3G LWP area coordinate points stored to memory C2' against only the D 2G LWP starting and finishing attributes, also on list 3624 of FIG. 16B or alternatively list 3368 of FIG. 15B.

Figure 16E:
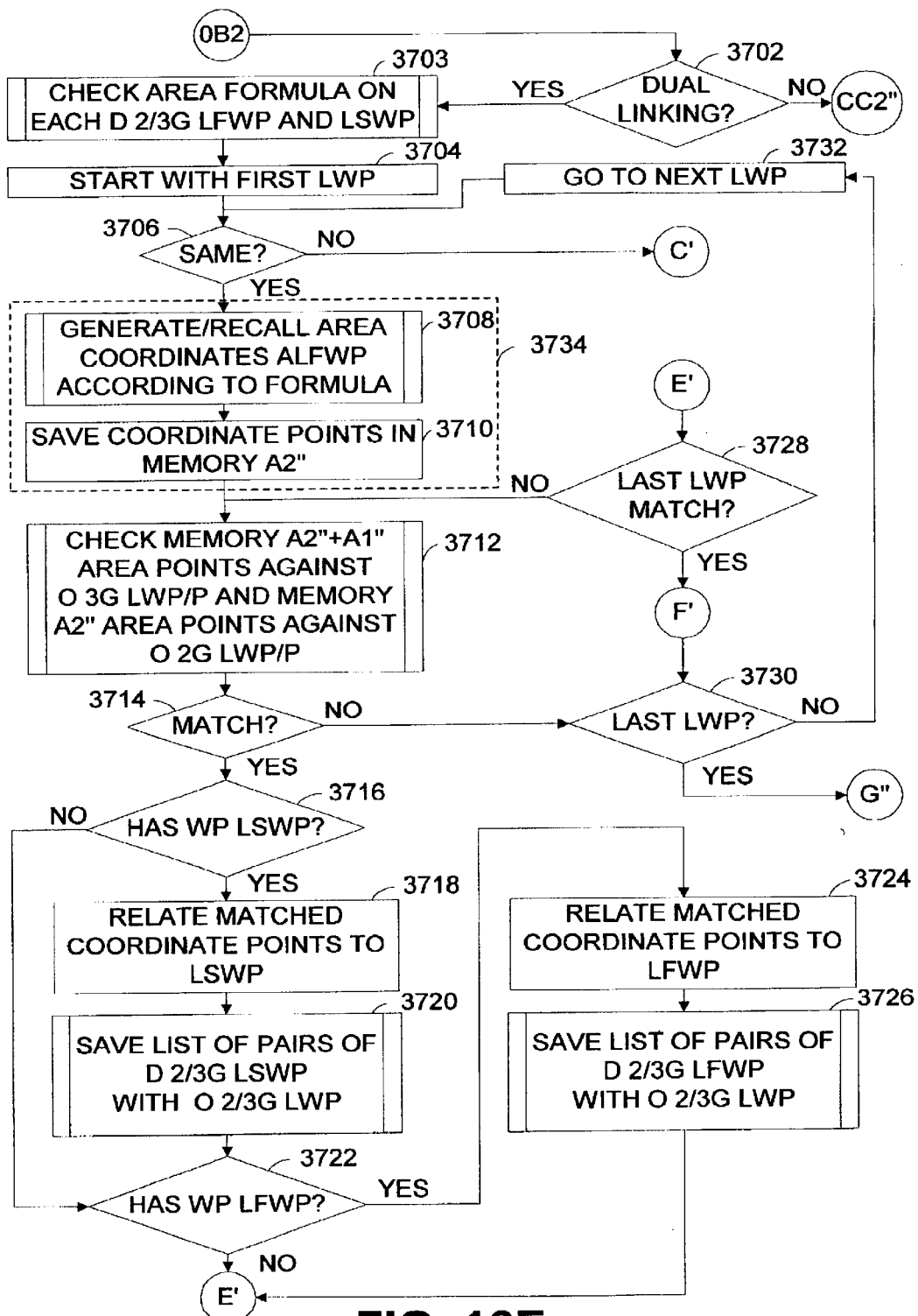
Figure 16F:
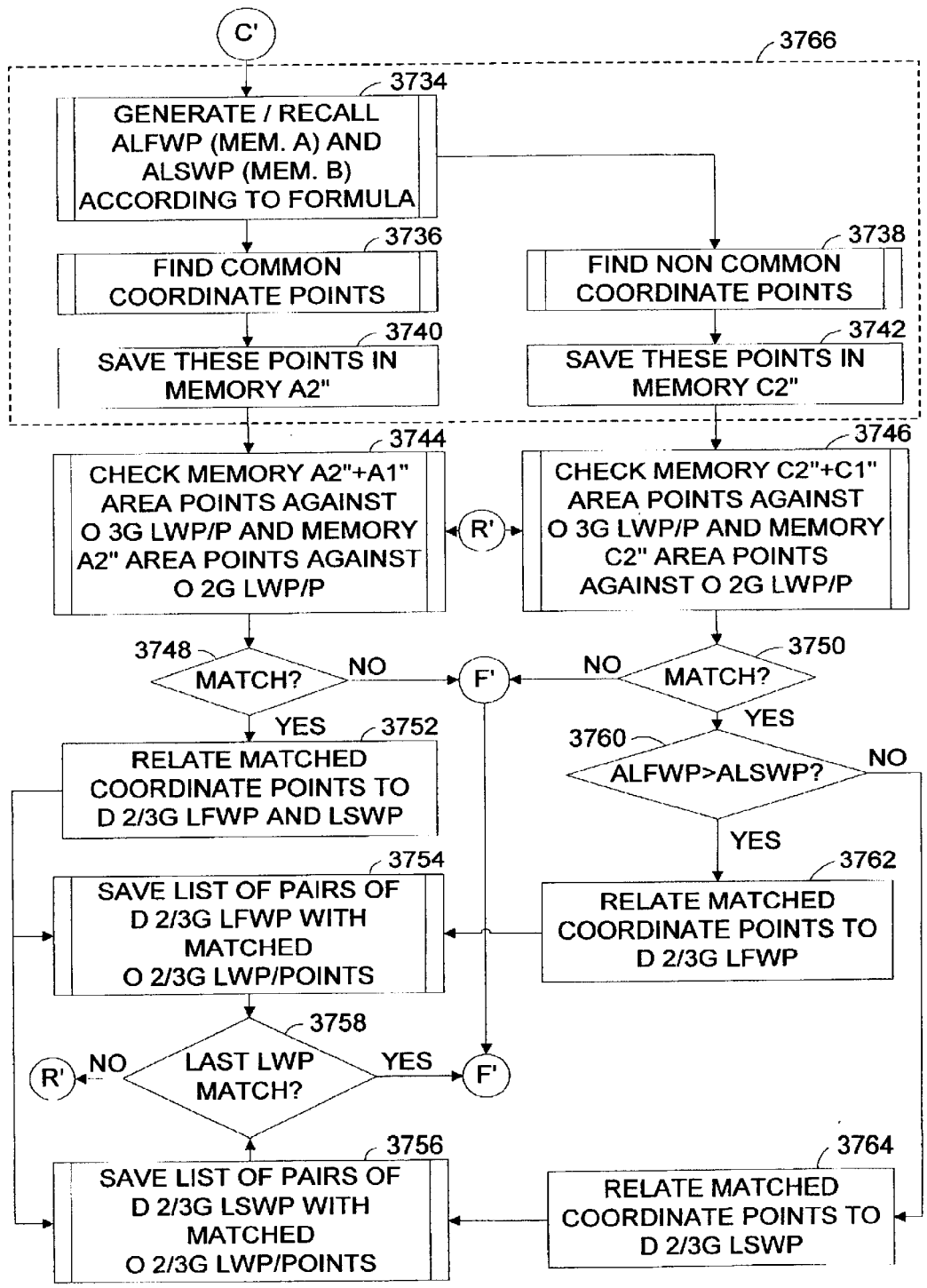

The process continues from these two modules up to a module 3698 in a similar way to as from modules 3410 and 3412, up to module 3430 of FIG. 15D, replacing the matched origin-related area coordinate points with either the O 2G LWP? or the O 3G LWP waypoints they are related to and relating these with their starting and/or finishing attributes, provided they exist as linkable, in each case and later saving these at a save to memory module 3682 that saves progressively, in a list, all matched pairs related at modules 3680 and/or 3692, to the origin-related finishing waypoint attributes, in a format including O 2G LFWP-D 3G LWP, O 3G LFWP-D 3G LWP and O 3G LFWP-D 2G LWP pairs and at a save to memory module 3684 that saves progressively, in a list, all matched pairs related at modules 3680 and/or 3698, to the origin-related starting waypoint attributes, in a format including O 2G LSWP-D 3G LWP, O 3G LSWP-D 3G LWP and O 3G LSWP-D 2G LWP pairs FIG. 16E and FIG. 16F show a detailed structure of the "two path" destination-related matching module 806 of FIG. 6G.

The process continues from FIG. 16B through connector 0B2 to a decision point 3702 that checks if the process is enabled for dual liking and if so, continues to a module 3703 on FIG. 16E that compares the associated area formulas or functions, for the finishing and the starting attributes of each of the D 3G LWP waypoints, on the list 3624 of FIG. 16B.

At step 3704 the process starts with the first LWP waypoint of the list and the process from there up to a matching module 3712, is similar to that up to module 3450 of FIG. 15E, but now matching module 3712 checks for possible matches of the coordinate points stored to memory A1", at module 3448 of FIG. 15E plus the ones stored to memory A2", at module 3710, against the O 3G LWP starting and finishing attributes of list 3584 on FIG. 16A. Module 3712 also checks for matches of the coordinate points stored to memory A2", against the O 2G LWP starting and finishing attributes, also on list 3584 of FIG. 16A or alternatively on list 3300 of FIG. 15A.

In a similar way, as that up to a module 3456 of FIG. 15E, the process continues up to a relational module 3718, that replaces the matched destination-related area coordinate points, with the starting attribute of the linkable waypoint they are related to, provided the waypoint has a linkable starting attribute at decision point 3716. This is followed by a save to memory module 3720, that saves progressively, in a list, all matched pairs related at module 3718 to the destination-related starting waypoint attributes, in a format including D 2G LSWP-O3G LWP, D 3G LSWP-O3G LWP and D 3G LSWP-O2G LWP pairs.

After this, in a similar way, as from module 3458 to a module 3462 of FIG. 15E, the process continues from module 3720 to a relational module 3724, that replaces the matched destination-related area coordinate points with the finishing attribute of the linkable waypoint they are related to, provided the waypoint has a linkable finishing attribute at decision point 3722. This is followed by a save to memory module 3726, that saves progressively, in a list, all matched pairs related at module 3724 to the destination-related finishing waypoint attributes, in a format including D 2G LFWP-O3G LWP, D 3G LFWP-O3G LWP and D 3G LFWP-O2G LWP pairs, to then continue similarly to FIG. 15E again.

If the area formula functions are not the same at a decision point 3704, the process continues through connector C' up to a matching module 3744 and a matching module 3746 on FIG. 16F, which is processed in a similar way to that of FIG. 15F up to modules 3482 and 3484.

Matching module 3744 performs a function similar to that of matching module 3712 on FIG. 16E, but recalls the points saved at save to memory module 3740, instead of recalling them from module 3710 in FIG. 16E.

Matching module 3746, is similar to module 3484 of FIG. 15F, but now matching module 3746 checks for possible matches of the D 2G LWP area coordinate points stored to memory C1" at module 3480 of FIG. 15F plus the D 3G LWP area coordinate points stored to memory C2" at module 3742, against the O 3G LWP starting and finishing attributes, of list 3584 on FIG. 16A. Module 3746 also checks for matches of the D 3G LWP area coordinate points stored to memory C2", against only the O 2G LWP starting and finishing attributes, also on list 3584 of FIG. 16A or alternatively on list 3300 of FIG. 15A.

The process continues from these two modules up to a module 3764 in a similar way to as from modules 3482 and 3484, up to module 3502 of FIG. 15F, replacing the matched destination-related area coordinate points with either the D 2G LWP or the D 3G LWP waypoints they are related to and relating these with their starting and/or finishing attributes, provided they exist as linkable, in each case and later saving these at a save to memory module 3754 that saves progressively, in a list, all matched pairs related at modules 3752 and/or 3762, to the destination-related finishing waypoint attributes, in a format including D 2G LFWP-O3G LWP, D 3G LFWP-O3G LWP and D 3G LFWP-O 2G LWP pairs and a at a save to memory module 3756 that saves progressively, in a list, all matched pairs related at modules 3752 and/or 3764, to the destination-related starting waypoint attributes, in a format including D 2G LSWP-O 3G LWP, D 3G LSWP-O 3G LWP and D 3G LSWP-O 2G LWP pairs.

Figure 16G:
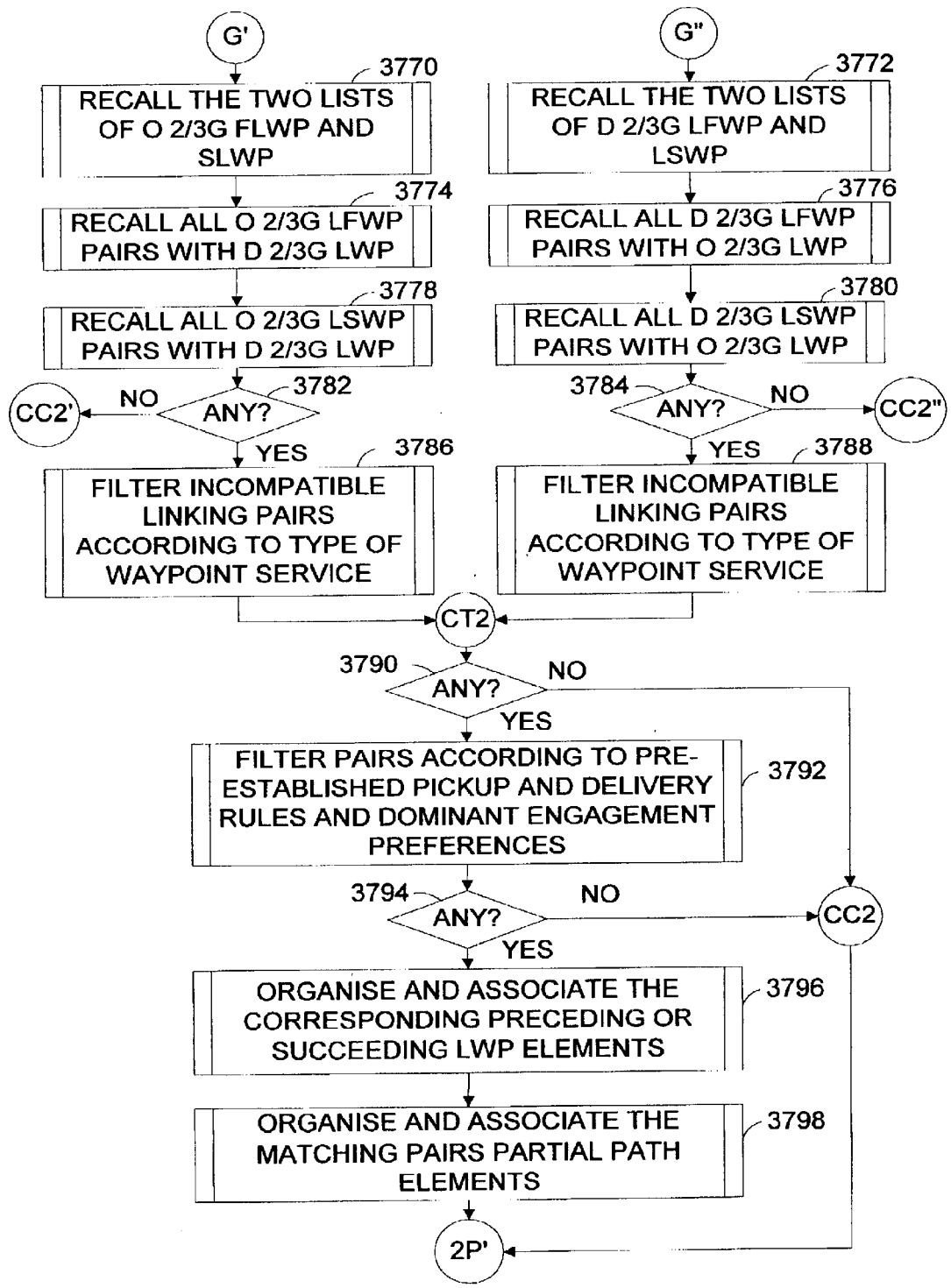

FIG. 16G shows the structure of the "two path" filtering-module 808 of FIG. 6G.

The process, which is followed from decision points 3658 and 3730 of FIG. 16C and FIG. 16E respectively, continues to a module 3770 and a module 3772 respectively.

The module 3770 recalls the lists with the two attributes of the O 2G LWP waypoints, O 2G LFWP and O 2G LSWP plus the lists with the two attributes of the O 3G LWP waypoints, O 3G LFWP and O 3G LSWP from module 3584 of FIG. 16A.

The module 3772 recalls the lists with the two attributes of the D 2G LWP waypoints, D 2G LFWP and D 2G LSWP plus the lists with the two attributes of the D 3G LWP waypoints, D 3G LFWP and D 3G LSWP from module 3624 of FIG. 16B.

Module 3770 is followed by a module 3774 that recalls all O 2G LFWP-D 3G LWP, O 3G LFWP-D 3G LWP and O 3G LFWP-D 2G LWP pairs from modules 3654 and 3682 of FIG. 16C and FIG. 16D respectively.

With each pair, the module assembles up to two specific pairs by incorporating the linkable attributes of the destination-related waypoint, a task done with the information retrieved from the destination-related lists of module 3772. Module 3774 would then recall the existing O 2G LFWP-D 3G LFWP, O 2G LFWP-D 3G LSWP pairs, the existing O 3G LFWP-D 3G LFWP, O 3G LFWP-D 3G LSWP pairs and the existing O 3G LFWP-D 2G LFWP, O 3G LFWP-D 2G LSWP pairs.

The process continues with a module 3778 that recalls all O 2G LSWP-D 3G LWP, O 3G LSWP-D 3G LWP and O 3G LSWP-D 2G LWP pairs from modules 3648 and 3684 of FIG. 16C and FIG. 16D respectively.

With each pair, the module assembles up to two specific pairs by incorporating the linkable attributes of the destination-related waypoint, a task done with the information retrieved from the destination-related lists of module 3772. Module 3774 would then recall the existing O 2G LSWP-D 3G LFWP, O 2G LSWP-D 3G LSWP pairs, the existing O 3G LSWP-D 3G LFWP, O 3G LSWP-D 3G LSWP pairs and the existing O 3G LSWP-D 2G LFWP, O 3G LSWP-D 2G LSWP pairs and if there are any, at a decision module 3782, they are filtered by a filtering module 3786 which analyses the pairs according to the waypoint service link types, which are attributes described in FIG. 5A and if the pairs are found to be incompatible between each other because of this reason, they are eliminated or filtered at this stage.

After this the process continues through a connector CT2, where it waits for the complete input of the destination-related sequence started at module 3772, to a decision point 3790, regarding the existence of any remaining pairs.

The destination-related sequence is similar, with the module 3772, followed by a module 3776, that recalls all D 2G LFWP-O 3G LWP, D 3G LFWP-O 3G LWP and D 3G LFWP-O 2G LWP pairs from modules 3726 and 3754 of FIG. 16E and FIG. 16F respectively.

With each pair, the module assembles up to two specific pairs by incorporating the linkable attributes of the origin-related waypoint, a task done with the information retrieved from the origin-related lists of module 3770. Module 3776 would then recall the existing D 2G LFWP-O 3G LFWP, D 2G LFWP-O 3G LSWP pairs, the existing D 3G LFWP-O 3G LFWP, D 3G LFWP-O 3G LSWP pairs and the existing D 3G LFWP-O 2G LFWP, D 3G LFWP-O 2G LSWP pairs.

The process continues with a module 3780 that recalls all D 2G LSWP-O 3G LWP, D 3G LSWP-O 3G LWP and D 3G LSWP-O 2G LWP pairs from modules 3720 and 3756 of FIG. 16E and FIG. 16F respectively.

With each pair, the module assembles up to two specific pairs by incorporating the linkable attributes of the origin-related waypoint, a task done with the information retrieved from the origin-related lists of module 3770. Module 3780 would then recall the existing D 2G LSWP-O 3G LFWP, D 2G LSWP-O 3G LSWP pairs, the existing D 3G LSWP-O 3G LFWP, D 3G LSWP-O 3G LSWP pairs and the existing D 3G LSWP-O 2G LFWP, D 3G LSWP-O 2G LSWP pairs and if there are any, at a decision module 3784, they are filtered by a filtering module 3788 which analyses the pairs according to the waypoint service link types and if the pairs are found to be incompatible between each other because of this reason, they are eliminated or filtered at this stage.

After this the process continues through a connector CT2, where it waits for the complete input of the origin-related sequence started at module 3770, to a decision point 3790, regarding the existence of any remaining pairs.

If there are remaining pairs, the next step is a further filtering module 3792 that analyses the pairs according to pre-established pick up and delivery rules and dominant engagement preferences, which are rules set up by the system administrator to organize matching situations for cases including those described in FIGS. 5E, 5F, and 5G, fulfilling a function similar to that of traffic lights and traffic regulations for the case of general traffic.

Having the dual matching option enabled, the system may find one or two matches for identical pairs, as a result of the origin and the destination related sequence, the first involving a "passive" succeeding path service provider role, where the preceding path service provider picks up from, or delivers to the succeeding service provider's specified waypoint and the second involving an "active" succeeding service provider role, where it is the succeeding service the one that picks up from, or delivers to the preceding service provider's specified waypoint. If the two solutions are possible, the rules in this module, can be set so to eliminate the less convenient options, according to a defined criteria, or set, on the other hand, to allow both.

Again, although a simple framework of rules can be first envisaged, it is foreseeable that this framework can be further extended to cater for very complex situations.

If there are pairs left after filtering module 3792, the process at a decision point 3794 continues to a module 3796 that recalls, organizes, associates and/or relations the corresponding immediately associated elements for the starting and finishing attributes of the origin-related O 2G LWP and O 3G LWP waypoints, as well as for the destination-related D 2G LWP and D 3G LWP waypoints of the O 2G LWP-D 3G LWP pairs, the O 3G LWP-D 3G LWP pairs and the O 3G LWP-D 2G LWP pairs.

This is followed by a module 3798 that recalls, organizes, associates and/or relations the relevant partial path elements that are associated to the matched pairs, with relevant partial path elements defined as the elements and attributes of a path that are immediately associated to the matched 2G LWP waypoint attributes, plus all the path elements immediately associated to the matched 1G LWP waypoint attributes, corresponding to the same paths as the matched 2GLWP waypoint attributes, plus all the elements between each the matched 1G and 2G LWP waypoints of a same path.

As a descriptive example, if we had a matched pair of the type O 3G LSWP-D 2G LSWP with the O 3G LSWP being the waypoint between the eighth and ninth vectors of a path defined by ten vectors, on which the system has formerly detected a waypoint between the third and fourth vectors as an origin-related matched waypoint, such as an O 1G FLWP waypoint and the matched D 2G LSWP belonging to a path defined by 5 vectors on which the system detected a waypoint between the second and third vectors as a destination-related matched waypoint, such as an D 1G LFWP, so i.e. the O 3G LSWP would be at the beginning of the ninth vector of the first path, the D 2G LSWP would be at the beginning of the second vector of the second path, the O 1G LFWP would be at the end of the third vector of the first path and the D 1G LFWP would be at the end of the second vector of the second path. The relevant partial path elements would be therefore the third, fourth, fifth, sixth, seventh, eight and ninth vectors of the first path and the second vector of the second path.

It is worth noting that only the fourth, fifth, sixth, seventh and eighth vectors of the first path and the second vector of the second path, are vectors that transport the load from their starting to their finishing waypoints, i.e. their fill vector length. The others only perform pick up or delivery within their waypoint associated area, but nevertheless they need to be considered for all the calculation.

The rest of the process performs similar functions to that of FIG. 15G with connectors CC2', CC2", CT2 and CC2 interacting with the process of FIG. 23 with value "i=2".

If there aren't any pairs left after filtering module 3792, the process at a decision point 3794 would continue to through connector CC2 the decision point 810 of FIG. 6G, also reached if there aren't any pairs left after filtering modules 3796 and 3798.

The possible expansion of possibilities by developing path solutions using the LFWP and the LSWP waypoint attributes, could lead to having two slightly similar solutions involving the same transport path, which are tested and filtered through the modules of FIG. 6G and FIG. 6H. If after these filters the two solutions are still possible, a further filtering module 1401 in FIG. 6ZA could eliminate redundant paths according to predefined rules.

FIG. 17 shows a detailed structure of the "two path, one vector" linking, matching and filtering modules 860 to 868 of FIG. 6I.

Figure 17A:
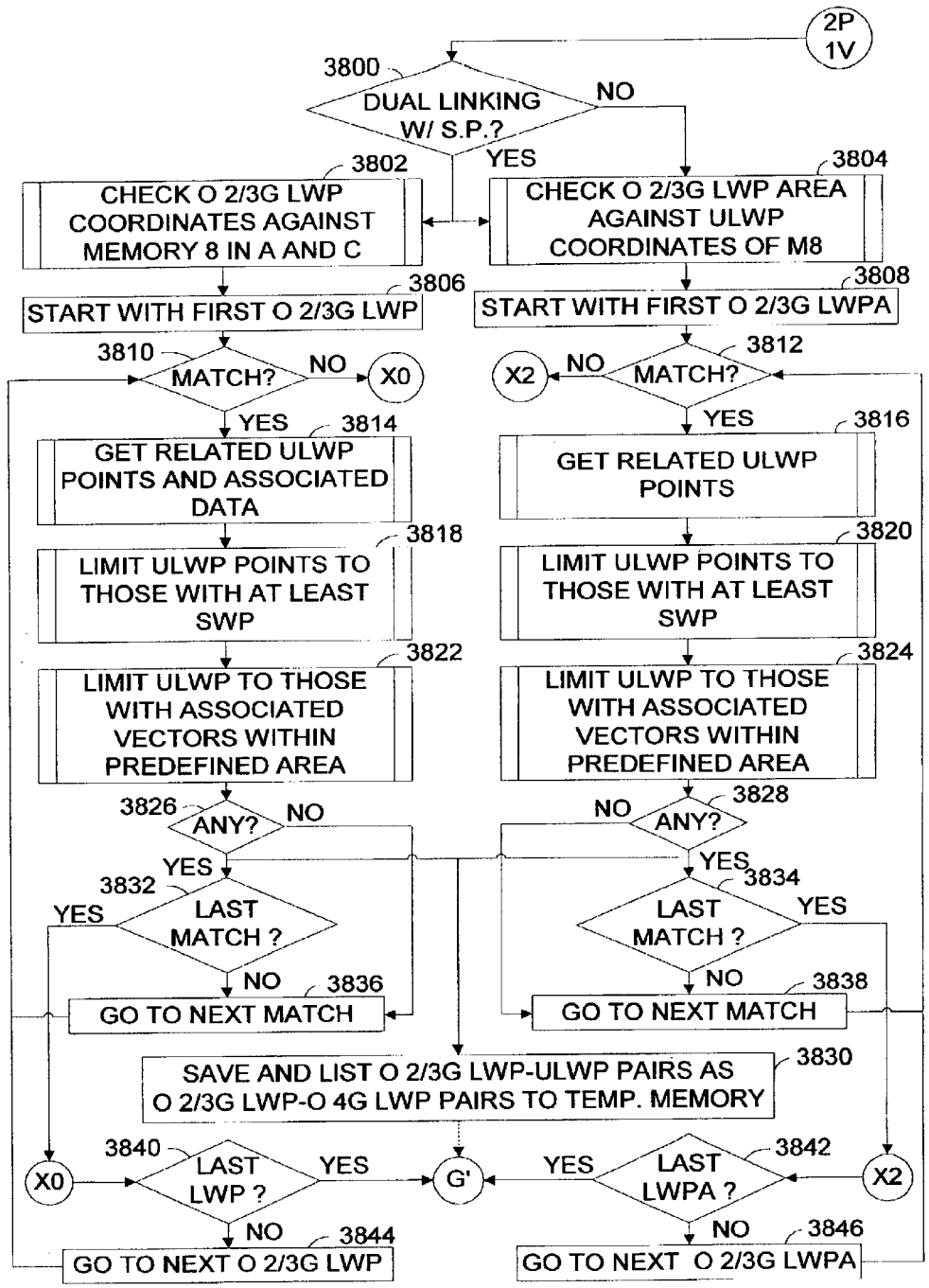
FIGS. 17A to 17C—show a more detailed structure of the "two path, one vector" linking, matching and filtering modules 860 to 868 of FIG. 6I.

FIG. 17A shows a detailed structure of the origin lining and matching module 860 of FIG. 6I.

The function of a group of modules 3800 to 3846, belonging to this figure, is comparable to those of the group of modules 3200 to 3238, in FIG. 14A.

Figure 17B:
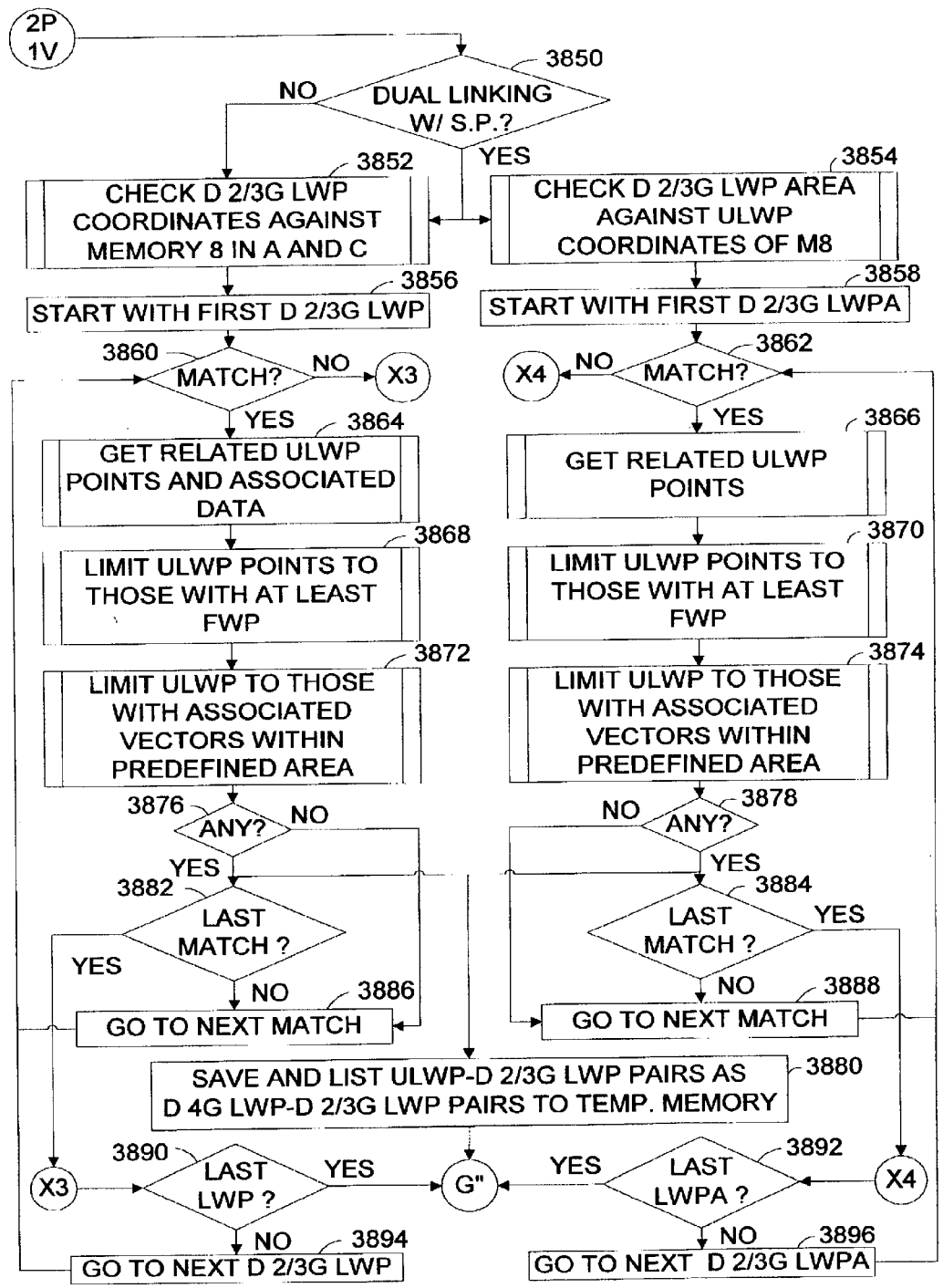

The process starts flowing simultaneously to a decision point 3800 as well as to a decision point 3850 in FIG. 17B.

Decision point 3800 differs from 3200 in FIG. 14A in that it now checks for dual lining or two-way linking between service providers, where the default single linking is that a first origin-related path service provider delivers to, or picks up from a second origin-related path service provider, whereas decision point 3200 checked for dual linking between the service provider and the service user, where the default single linking is that the service provider picks up from the service user.

Modules 3802, 3804, 3806, 3808, 3844 and 3846 differ from modules 3202, 3204, 3206, 3208, 3236 and 3238 in FIG. 14A in that instead of referring to the origin point, or the origin associated area in the case of dual linking, these modules now refer the origin-related O 2G LWP waypoints and/or the O 3G LWP waypoints, formerly listed at module 3584 of FIG. 16A, which are the linkable elements used by the preferred version of the system, for combining, or matching, the origin-related first generation path O 1GP, with some other path. Other embodiments could also use the O 1G LWP waypoints as linkable elements for this stage, which would lead to the service provider accepting transit consignments only within the O 1G LWP associated area, but that will be further explained later.

The waypoint coordinates of module 3802 and the associated area coordinates of module 3804, are checked now against filtered path elements ULWP associated areas and ULWP waypoints, respectively, of memory A and C, which are path elements likely to be more relevant in the search of an adequate solution and which have been previously saved to memory 8 in module 854 of FIG. 6I, instead of to memory 0 in module 604 in FIG. 6A. The definition of the area or areas produced by filtering module 854, which refilters the elements stored to memory 0 and saves these to memory 8, is likely to be more complex, than that of filtering module 604 which saves to memory 0, as many more waypoints and therefore waypoint pairs, are involved, but the resulting areas are likely to be more focused. Nevertheless, in absence of module 854 producing more focused areas efficiently, the system can always resort to the elements filtered to memory 0.

If there are any ULWP waypoints remaining after the modules 3822 and 3824, at decision points 3826 and 3828, they are termed O 4G LWP, listed and saved to a temporal memory, at a save to memory module 3830, as matching O 2G LWP-O 4G LWP pairs and O 3G LWP-O 4G LWP pairs, as well as O 4G LWP-O 2G LWP and O 4G LWP-O 3G LWP pairs if the dual linking was enabled.

FIG. 17B shows a detailed structure of the destination linking and matching module 864 of FIG. 6I. The function of a group of modules 3850 to 3896, belonging to this figure, is comparable to those of the group of modules 3240 to 3278, in FIG. 14B.

The process starts flowing simultaneously to a decision point 3850 as well as to a decision point 3800 in FIG. 17A.

Decision point 3850 differs from 3240 in FIG. 14B in that in now checks for dual linking or two-way linking between service providers, where the default single lining is that a second destination-related D 2GP path service provider delivers to, or picks up from a first destination-related D 1GP path service provider, whereas decision point 3240 checked for dual linking between the service provider and the service user, where the default single linking is that the service provider delivers to the service user.

Modules 3852, 3854, 3856, 3858, 3894 and 3896 differ from modules 3242, 3244, 3246, 3248, 3276 and 3278 in FIG. 14B in that instead of referring to the destination point, or the destination associated area, in the case of dual linking, these modules now refer the destination-related D 2G LWP waypoints and/or the D 3G LWP waypoints, formerly listed at module 3624 of FIG. 16B, which are the linkable elements used by the preferred version of the system, for combining, or matching, the destination-related first generation path D 1GP, with some other path. Other embodiments could also use the D 1G LWP waypoints as linkable elements for this stage, which would lead to the service provider accepting transit consignments only within the D 1G LWP associated area, but that will be further explained later.

The waypoint coordinates of module 3852 and the associated area coordinates of module 3854, are checked now against filtered path elements ULWP associated areas and ULWP waypoints, respectively, of memory A and C, which are path elements likely to be more relevant in the search of an adequate solution and which have been previously saved to memory 8 in module 854 of FIG. 6I, instead of to memory 0 in module 604 in FIG. 6A. The definition of the area or areas produced by filtering module 854 is the same as in FIG. 14A.

If there are any ULWP waypoints remaining after the modules 3872 and 3874, at decision points 3876 and 3878, they are termed D 4G LWP, listed and saved to a temporal memory, at a save to memory module 3880, as matching D 4G LWP-D 2G LWP pairs and D 4G LWP-D 3G LWP pairs, as well as D 2G LWP-D 4G LWP and D 3G LWP-D 4G LWP pairs if the dual linking was enabled.

Figure 17C:
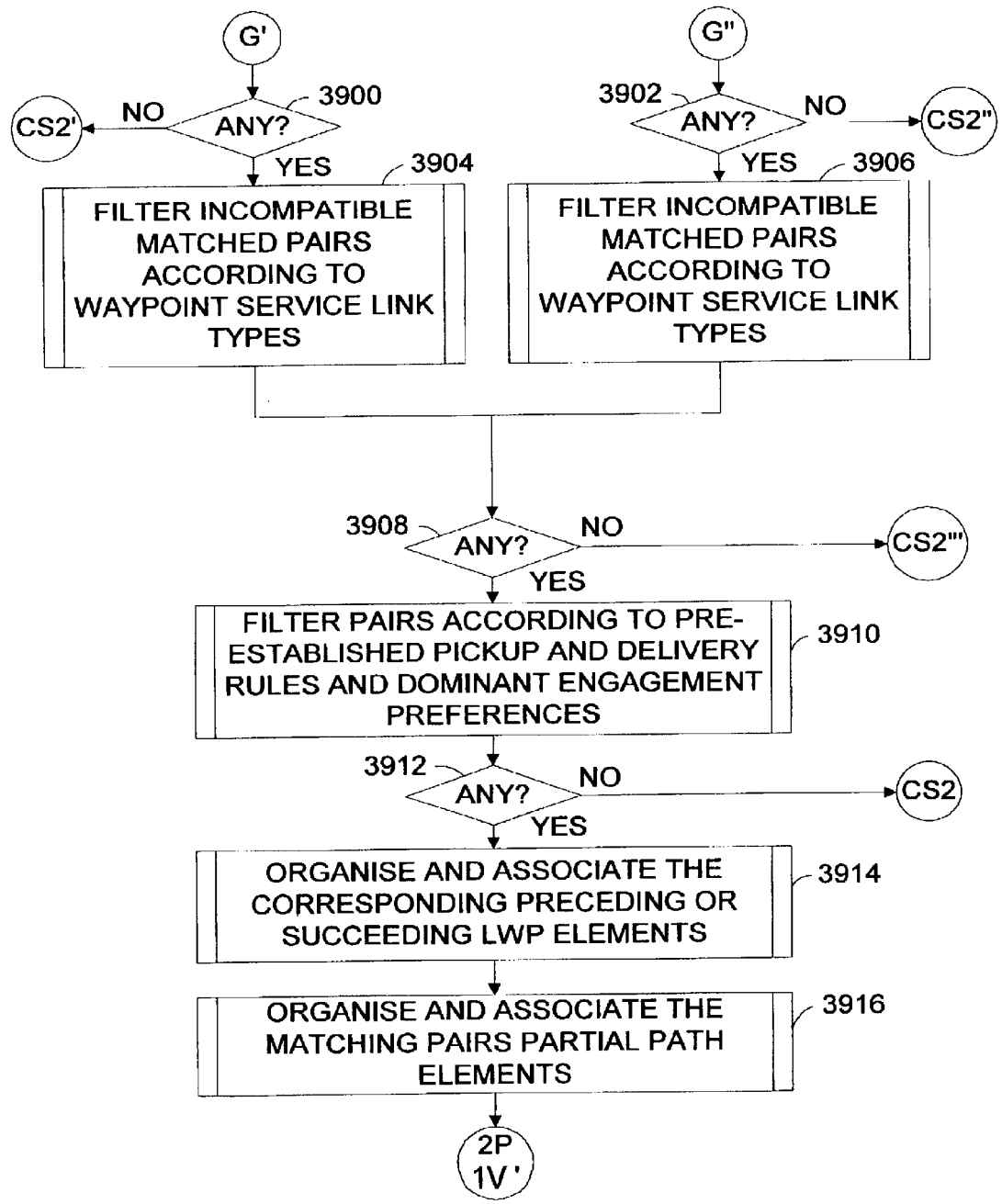

FIG. 17C shows the structure of the filtering module 614 of FIG. 6I.

The function of a group of modules 3900 to 3916, belonging to this figure, is comparable to those of the group of modules 3280 to 3296, in FIG. 14C.

The pairs saved to module 3830 in FIG. 17A and the pairs saved to module 3880 in FIG. 17B, if any, are analysed at modules 3904 and 3906 respectively, according to the waypoint service link types, which are attributes described in FIG. 5A and if the pairs are found to be incompatible between each other because of this reason, they are eliminated or filtered at this stage.

If there are pairs left after filtering module 3910, the process at a decision point 3912 continues to a module 3914, that recalls, organizes, associates and/or relations the corresponding immediately preceding and succeeding elements for the origin-related O 1G LWP, O 2G LWP, O 3G LWP and O 4G LWP waypoints for the origin-related pairs and the preceding and succeeding elements for the destination-related D 1G LWP, D2G LWP, D 3G LWP and D 4G LWP waypoints for the destination-related pairs. Among the attributes recalled, are the existing 1G LFWP and the 1G LSWP waypoint attributes and for each pair of the format 1GP LWP-4G LWP as well as for each pair of the format 4G LWP-1GP LWP left after the filtering stages, up to four sets of matching pairs are developed, represented by the four possible combinations of the finishing and the starting waypoint attributes, if any was linkable, between the waypoints of the pair, It is likely that this module will produce an expansion of possibilities by developing path solutions using the 1GP LFWP and/or the 1GP LSWP waypoint attributes, to match the 4G LFWP and/or the 4G LSWP, instead of only the 1GP LWP waypoint to match the 4G LWP, as components of a matched pair.

This is followed by a module 3616 that recalls, organizes, associates and/or relations the relevant partial path elements that are associated to the matched pairs, with relevant partial path elements defined as the elements and attributes of a path that are immediately associated to the matched waypoint attribute, i.e. either LSWP and LFWP, plus all the downstream path elements of the matched 4G LWP waypoint if the waypoint is an origin-related LWP waypoint, or all the upstream path elements of the matched waypoint if the waypoint is a destination-related LWP waypoint, plus all the path elements between the matched 1GP LWP waypoint and the 1G LWP waypoint of the same origin-related or destination-related path, plus the elements immediately associated to the matched attributes of the O 1G LWP and D 1G LWP waypoints.

FIG. 18 shows a detailed structure of the "two path, two vector" linking, matching and filtering modules 990 to 998 of FIG. 6M.

Figure 18A:
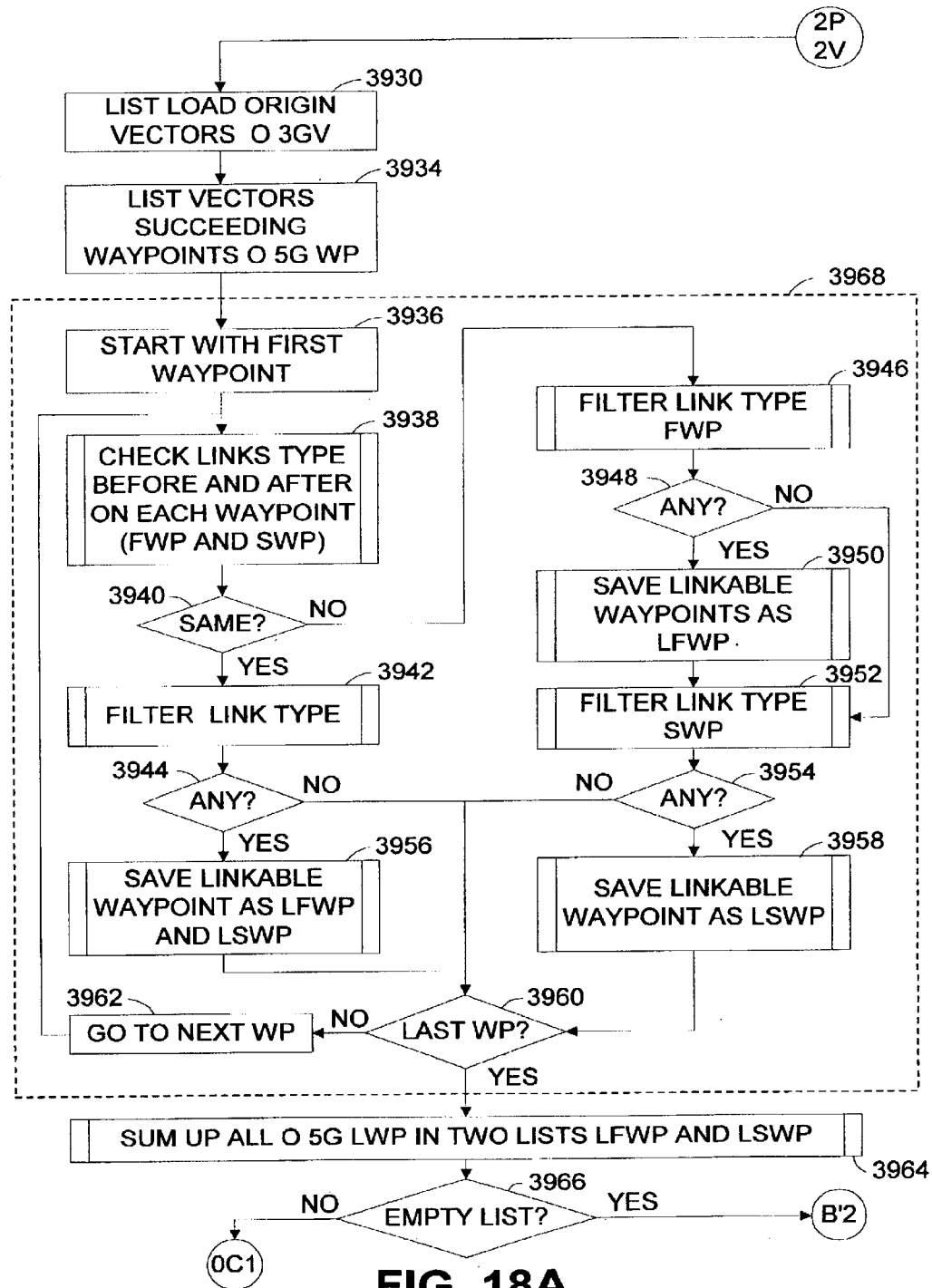
FIGS. 18A to 18G—show a more detailed structure of the "two path, two vector" linking, matching and filtering modules 990 to 998 of FIG. 6M.

FIG. 18A shows a detailed structure of the "two path, two vector" origin-related link type filtering-module 990 of FIG. 6M.

Figure 18B:
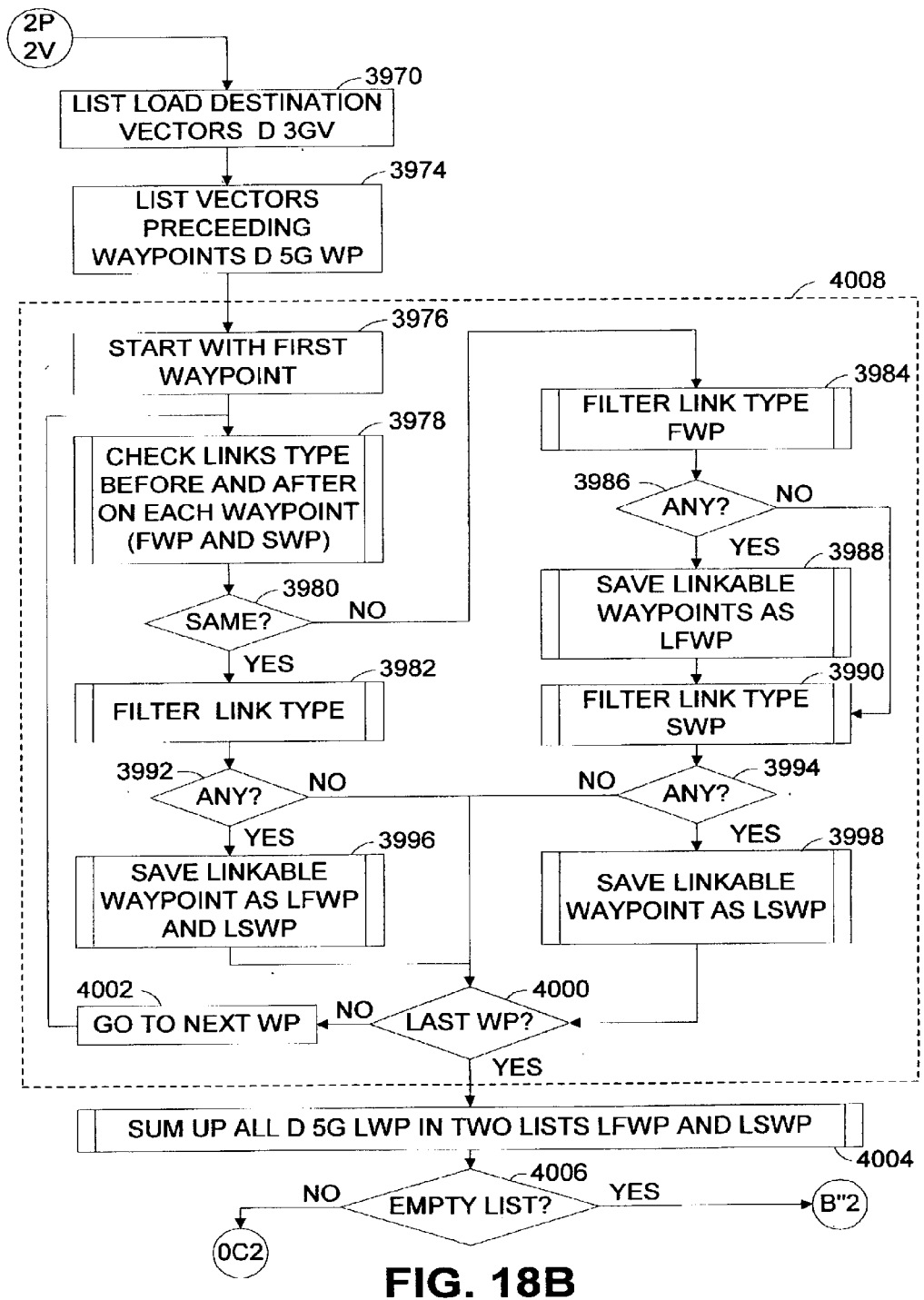

The process, which also flows simultaneously to module 3970 of FIG. 18B, starts at a module 3930 which lists the origin-related vectors that succeed the 4G LWP waypoints, i.e. the downstream or third generation O 3GV vectors and is followed by a module 3934 which lists the O 3GV vectors succeeding waypoint, i.e. the downstream or fifth generation O 5G WP waypoints. The description of the process that continues, involving a group of modules 3936 to 3966, is similar and comparable to the process in FIG. 15A involving modules 3304 to 3332, except that the process refers now to the 5G WP or 5G LWP instead of the 2G WP or 2G LWP respectively.

FIG. 18B shows a detailed structure of the "two path, two vector" destination-related link type filtering-module 994 of FIG. 6M.

The process, which also flows simultaneously to module 3930 of FIG. 18A, starts at a module 3970 which lists the destination-related vectors that precede the forth generation D 4G LWP, i.e. the upstream or third generation D 3GV vectors and is followed by a module 3974 which lists the D 3GV vectors preceding waypoint, i.e. the upstream or fifth generation D 5G WP waypoints. The description of the process that continues, involving a group of modules 3976 to 4006, is similar and comparable to the process in FIG. 15B involving modules 3340 to 3370, except that the process refers now to the 5G WP or 5G LWP instead of the 2G WP or 2G LWP respectively.

Figure 18C:
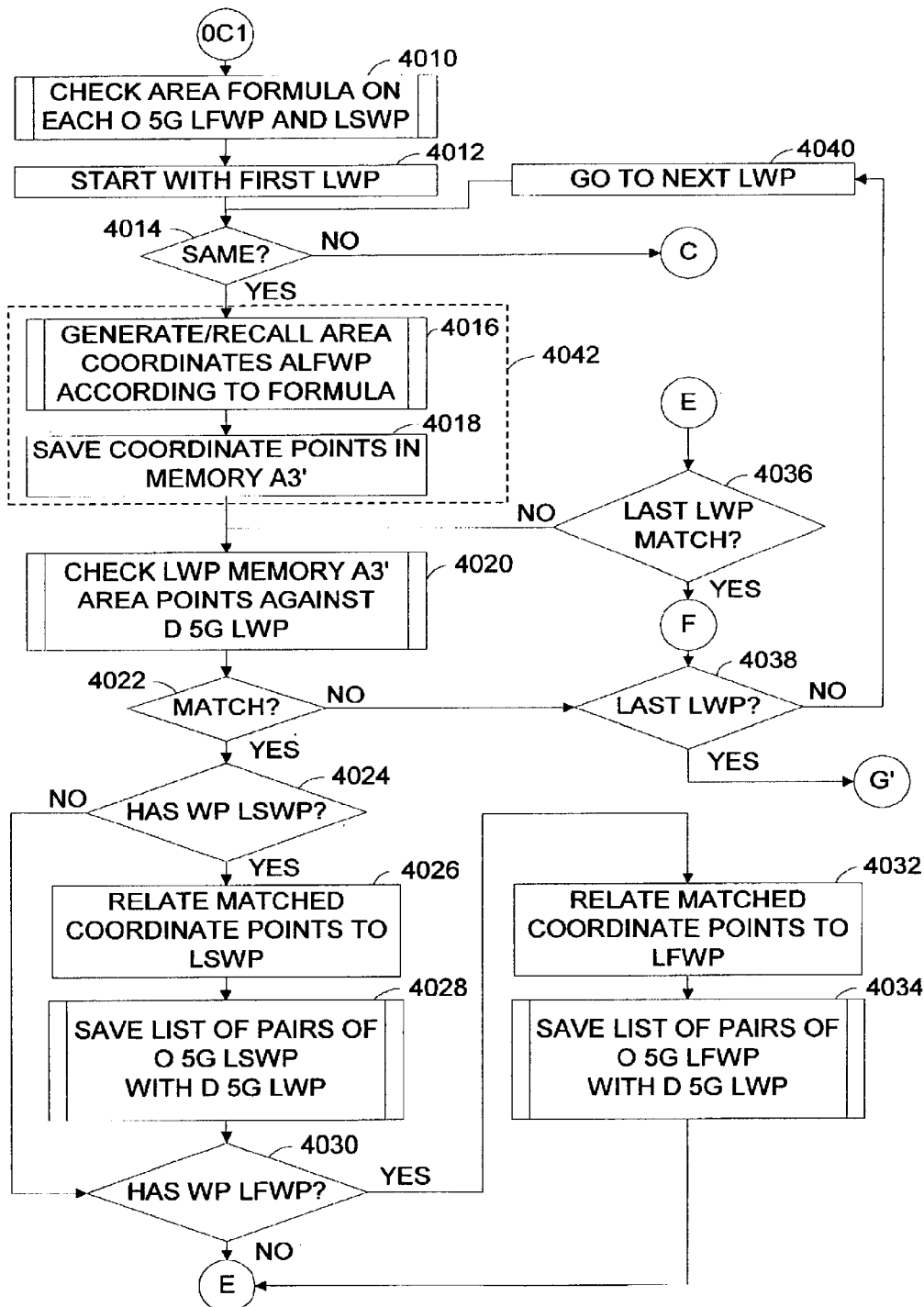
Figure 18D:
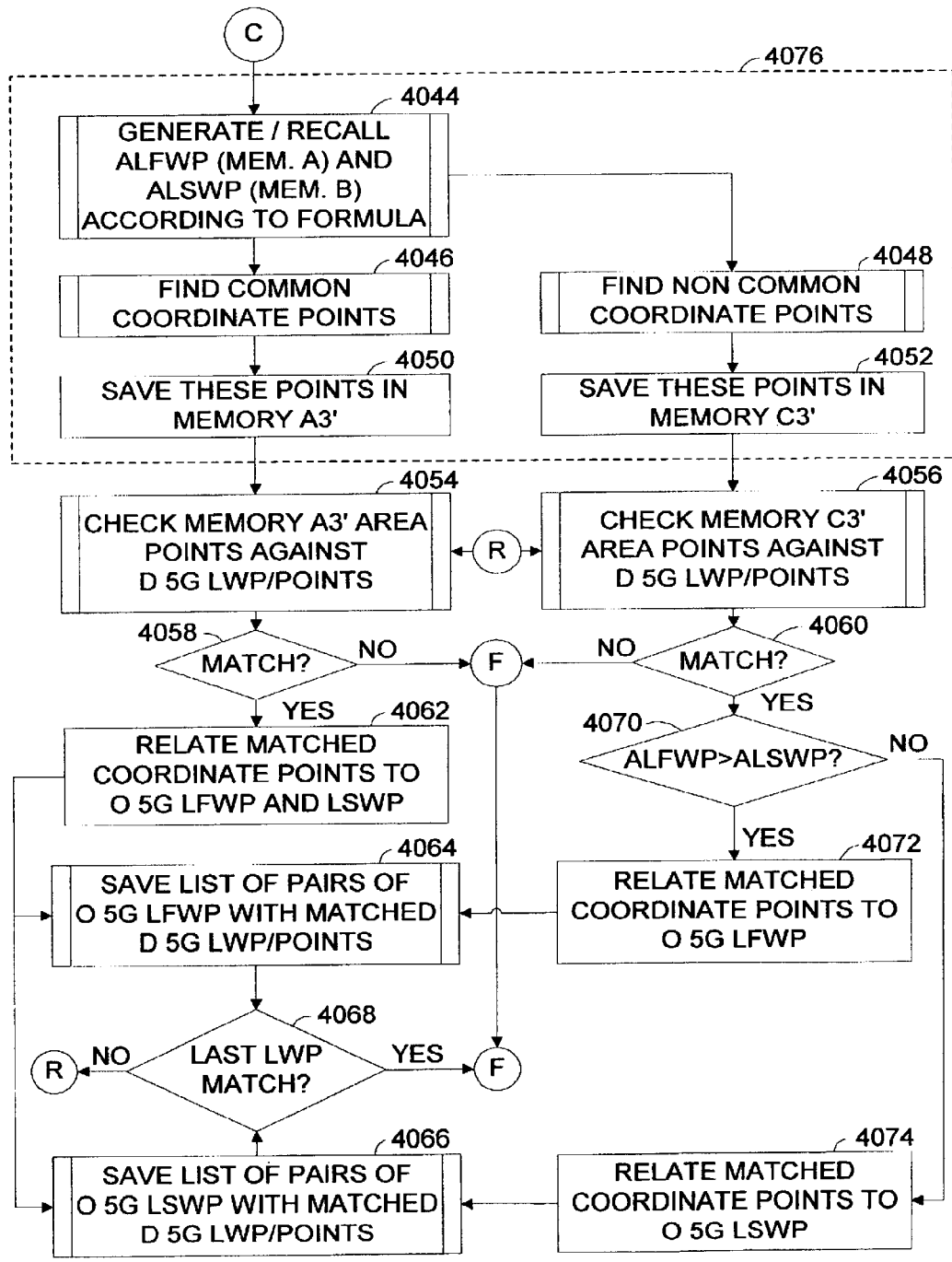

FIG. 18C and FIG. 18D show a detailed structure of the "two path, two vector" origin-related associated area matching-module 992 of FIG. 6M.

The process from a module 4010 in FIG. 18C to a module 4074 in FIG. 18D is similar and comparable to that of module 3372 in FIG. 15C to module 3430 in FIG. 15D, except basically that the process refers now to the 5G LWP waypoints and attributes, instead of the 2G LWP waypoints and attributes. The reason of the similarity lies in that the 5G LWP waypoints of the main process are equivalent to 2G LWP waypoints for the new 2GP paths, recently detected by the system through the 4G LWP waypoints.

The other difference being that the associated area coordinates, are now saved or indexed, to a memory allocations A3' and C3', instead of to memory allocations A1' and C1'.

Figure 18E:
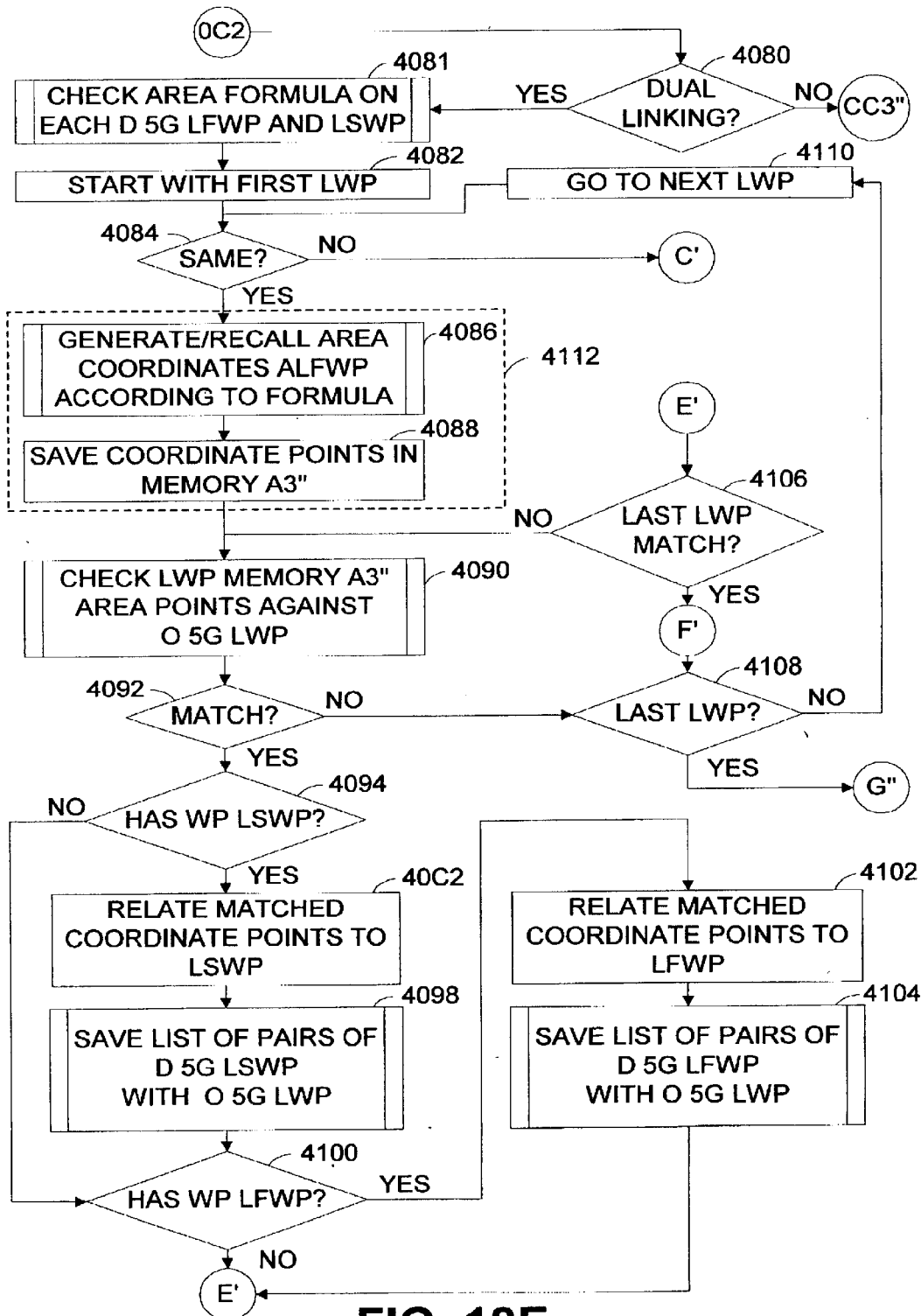
Figure 18F:
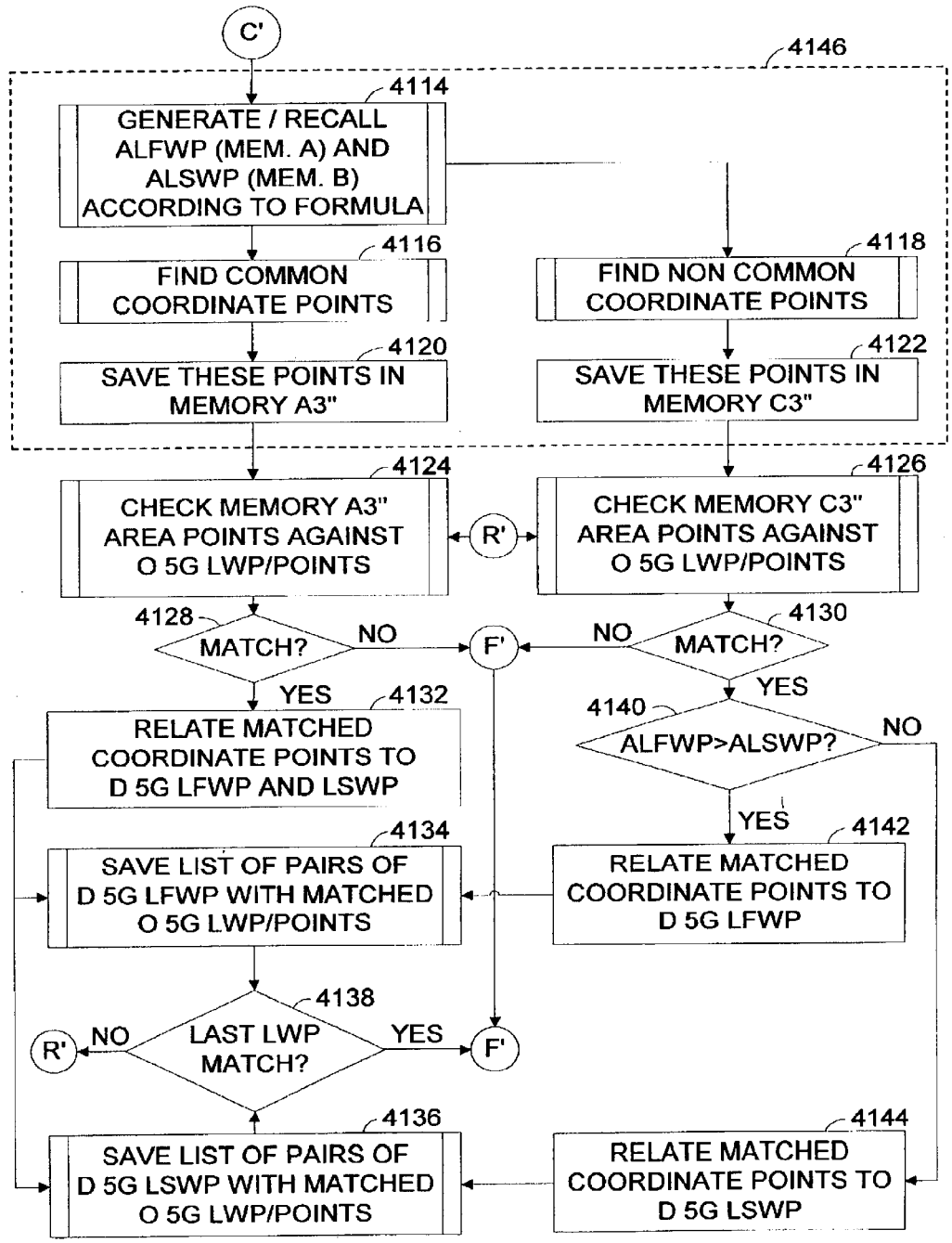

FIG. 18E and FIG. 18F show a detailed structure of the "two path, two vector" destination-related associated area matching-module 996 of FIG. 6M.

The process from a module 4080 in FIG. 18E to a module 4144 in FIG. 18F is similar and comparable to that of module 3440 in FIG. 15E to module 3502 in FIG. 15F, except basically, that the process refers now to the 5G LWP waypoints and attributes, instead of the 2G waypoints and attributes.

The other difference being that the associated area coordinates, are now saved or indexed, to a memory allocations A3" and C3", instead of to memory allocations A1" and C1".

Figure 18G:
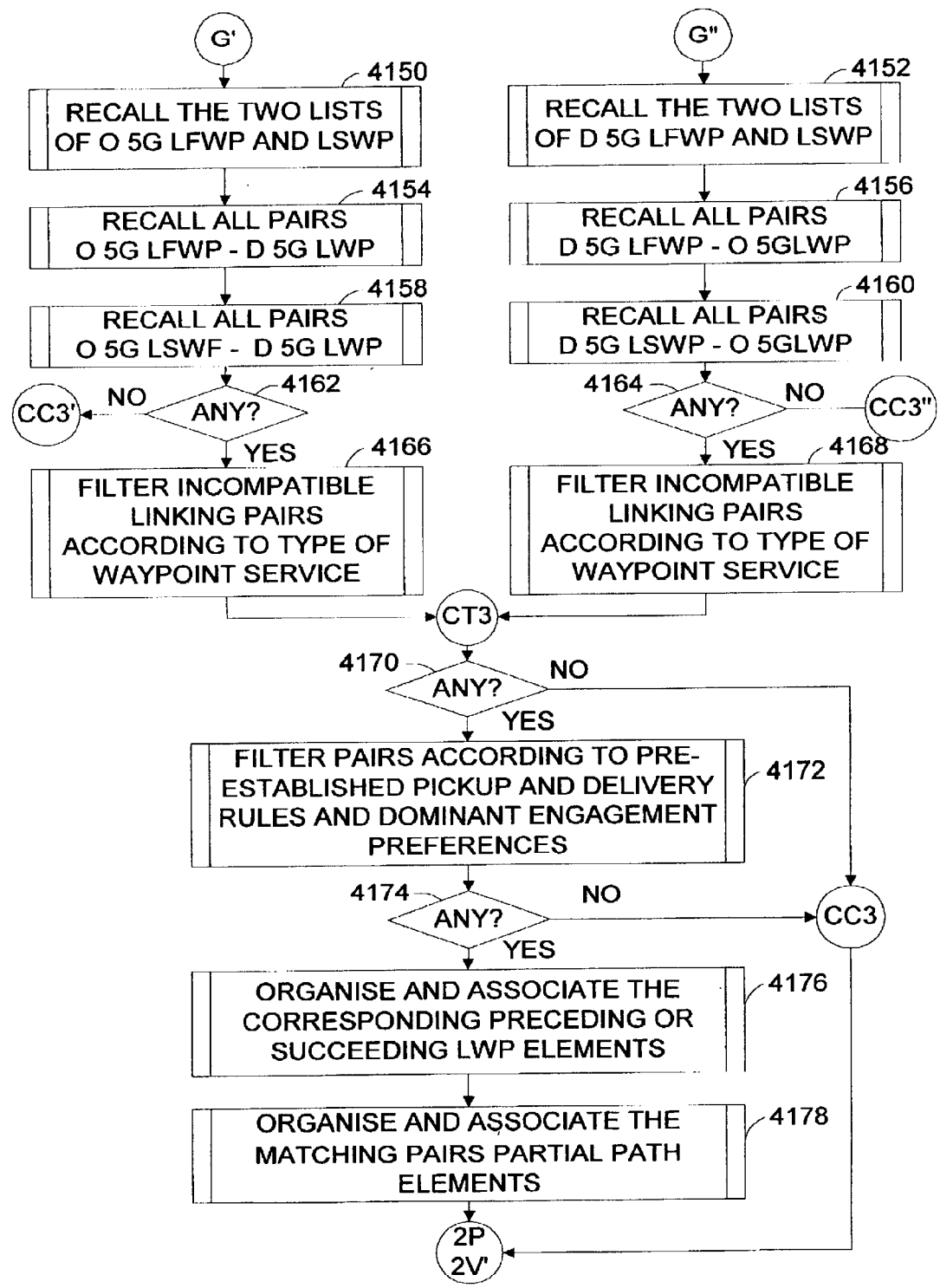

FIG. 18G shows the structure of the "two path, two vector" filtering module 998 of FIG. 6M.

The process from a module 4150 and a module 4152 to a module 4178 is similar and comparable to that from module 3506 and 3508 to module 3534 in FIG. 15G, except basically that the process refers now to the 5G LWP waypoints and attributes, instead of the 2G LWP waypoints and attributes, as well as refers now to modules within FIG. 18 instead of the similar and comparable modules within FIG. 15.

The interaction with FIG. 23 will now be for a value of "i=3", instead of "i=1".

A further understandable difference would be found at a module 4178 that recalls, organizes, associates and/or relations the relevant partial path elements that are associated to the matched pairs, with relevant partial path elements, now defined as the elements and attributes of a path, that are immediately associated to the matched 5G LWP waypoint attributes, plus all the path elements immediately associated to the matched 4G LWP waypoint attributes, corresponding to the same path as the matched 5GLWP waypoint attributes, plus the elements between each of the matched 4G and 5G LWP waypoints of a same path, plus all the elements immediately associated to the 3G LWP or 2G LWP waypoint attributes formerly matched with the 4G LWP waypoint attributes that belong to the same path as the matched 5G LWP waypoint, plus all the path elements immediately associated to the 1G LWP waypoint attributes of the same paths as the 3G LWP or 2G LWP waypoint matched to the 4G LWP waypoint mentioned above, plus the elements between each of the matched 1G LWP waypoint and 2G or 3G LWP waypoints of a same path.

The elements from the O 1G LWP to the matched O 2G LWP or O 3G LWP represent the first carrier, the elements from the O 4G LWP to the O 5G LWP represent the second carrier, the elements from the D 5G LWP to the D 4G LWP represent the third carrier and the elements from the matched D 2G LWP or D 3G LWP to the D 1G LWP represent the fourth carrier. The elements immediately associated with matched waypoint attributes with which each of the waypoints of the transport path was assembled also count as elements of the relevant transport path FIG. 19 shows a detailed structure of the "two path, two vector" linking, matching and filtering modules 990 to 998 of FIG. 6M.

Figure 19A:
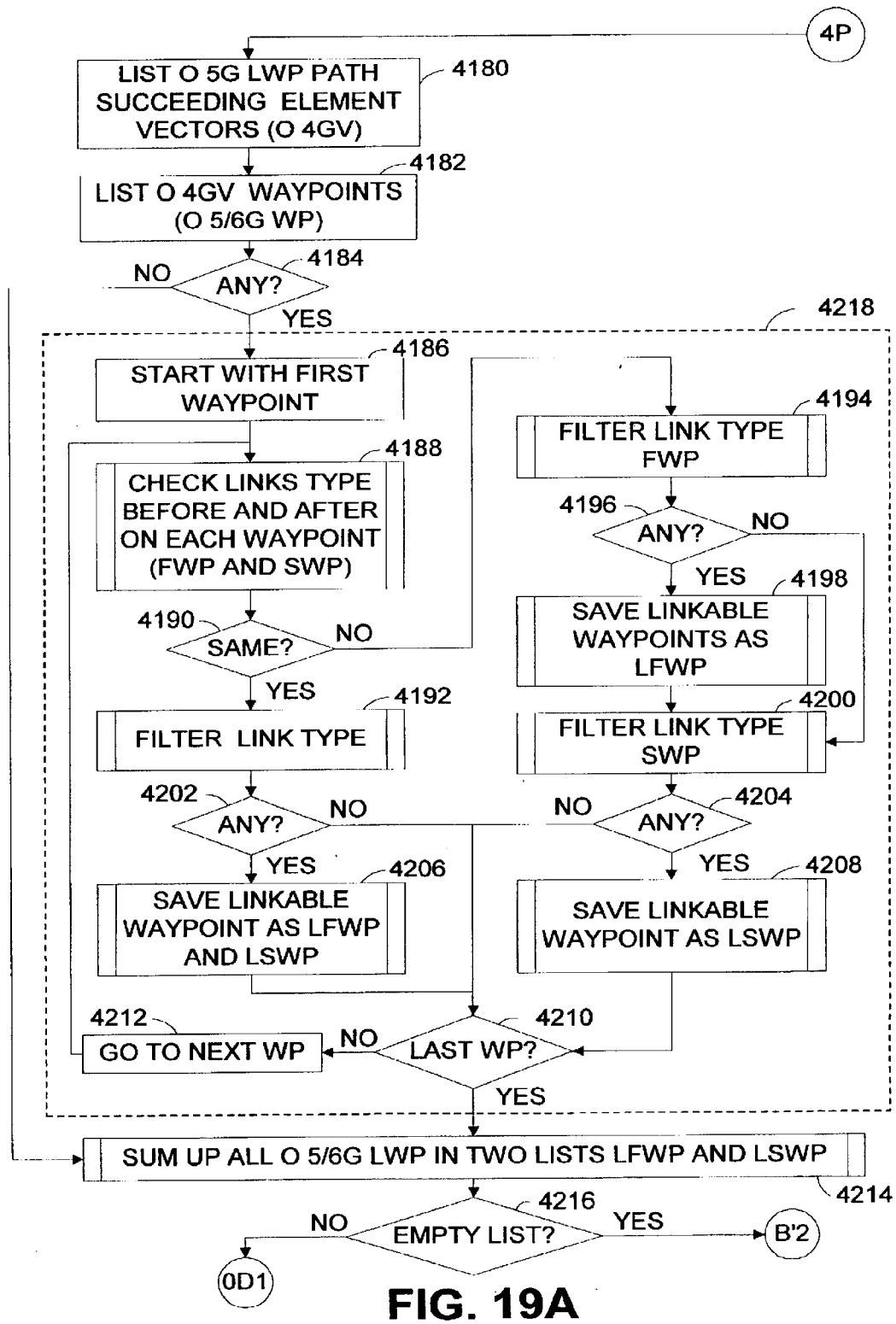
FIGS. 19A to 19G—show a more detailed structure of the "two path, two vector" linking, matching and filtering modules 990 to 998 of FIG. 6M.

FIG. 19A shows a detailed structure of the "four path" origin-related link type filtering-module 1050 of FIG. 6O.

Figure 19B:
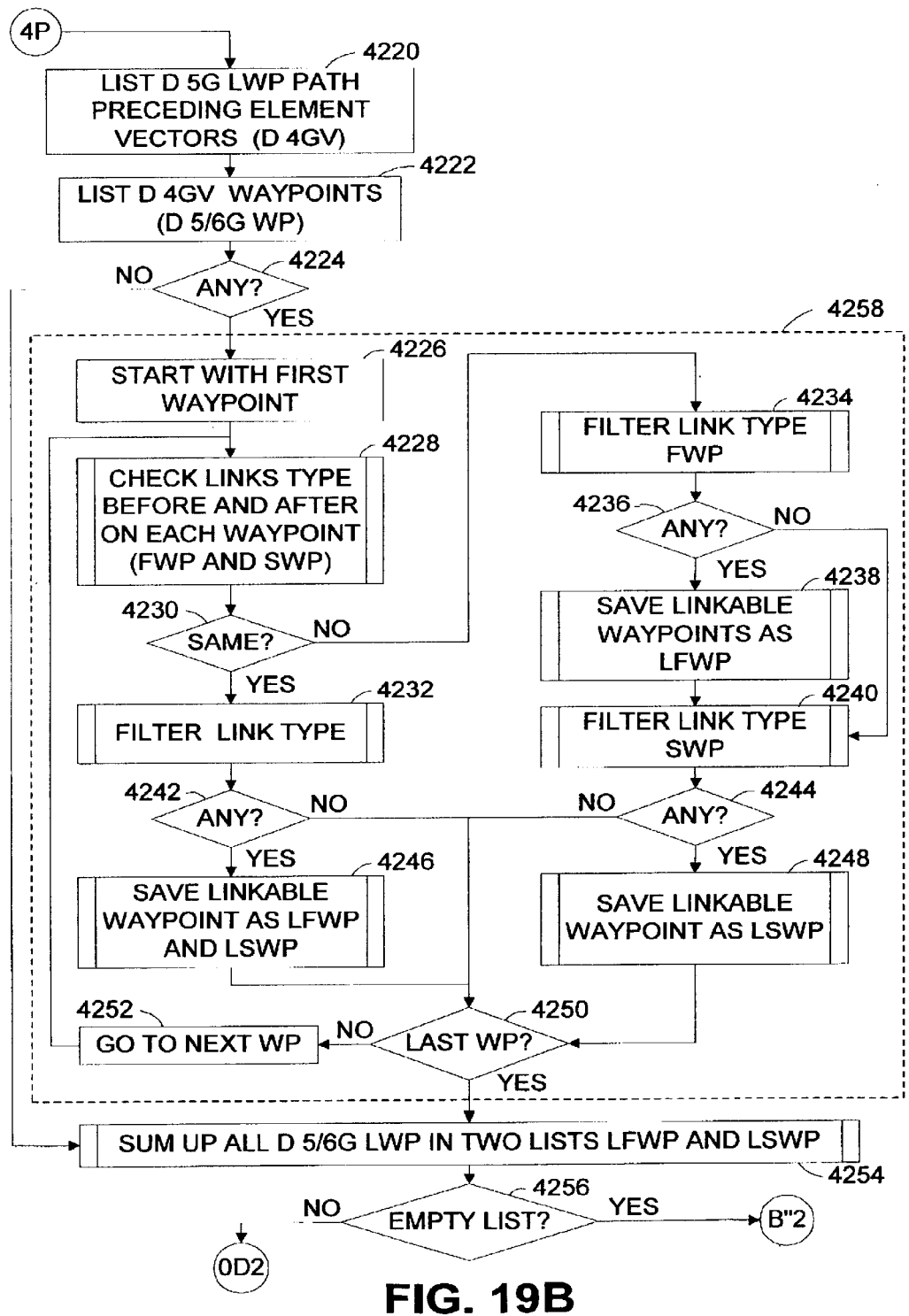

The process, which also flows simultaneously to module 4220 of FIG. 19B, starts at a module 4180, which lists the origin-related vectors that succeed the fifth generation O 5G LWP waypoints, i.e. the downstream, or fourth generation O 4GV vectors and is followed by a module 4182 which lists the O 4GV vectors succeeding waypoints, i.e. the downstream or sixth generation O 6G WP waypoints. The description of the process that continues, involving a group of modules 4184 to 4216, is similar and comparable to the process in FIG. 16A, involving modules 3554 to 3586, except that the process refers now to the 5G WP or 5G LWP, instead of the 2G WP or 2G LWP respectively and to the 6G WP of 6G LWP, instead of the 3G WP or 3G LWP respectively.

The reason of the similarity lying also in that apart of the 5G LWP waypoints of the main process being equivalent to the 2G LWP of the 2GP paths detected by the system through the 4G LWP waypoints, the 6G LWP of the main process, are also equivalent to the 3G LWP waypoints of the same 2GP paths.

FIG. 19B shows a detailed structure of the "four path" destination-related link type filtering-module 994 of FIG. 6O.

The process, which also flows simultaneously to module 4180 of FIG. 18A, starts at a module 4220 which lists the destination-related vectors that precede the 5G LWP waypoints, i.e. the upstream or fourth generation D 4GV vectors and is followed by a module 4222 which lists the D 4GV vectors preceding waypoints, i.e. the upstream or sixth generation D 6G WP waypoints.

The description of the process that continues, involving a group of modules 4224 to 4256, is similar and comparable to the process in FIG. 16B involving modules 3594 to 3626, except that the process refers now to the 5G WP or 5G LWP, instead of the 2G WP or 2G LWP respectively and to the 6G WP of 6G LWP, instead of the 3G WP or 3G LWP respectively.

Figure 19C:
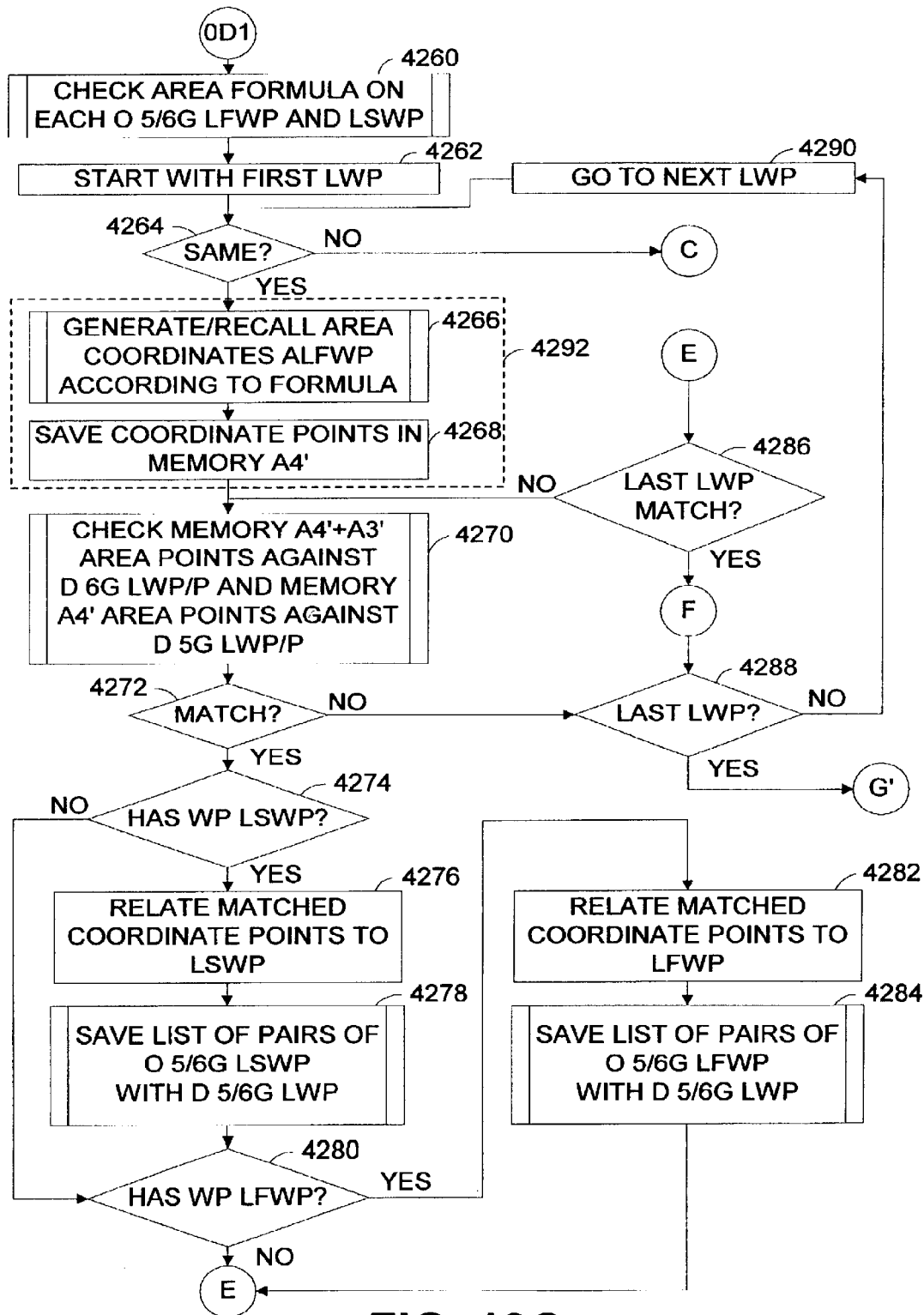
Figure 19D:
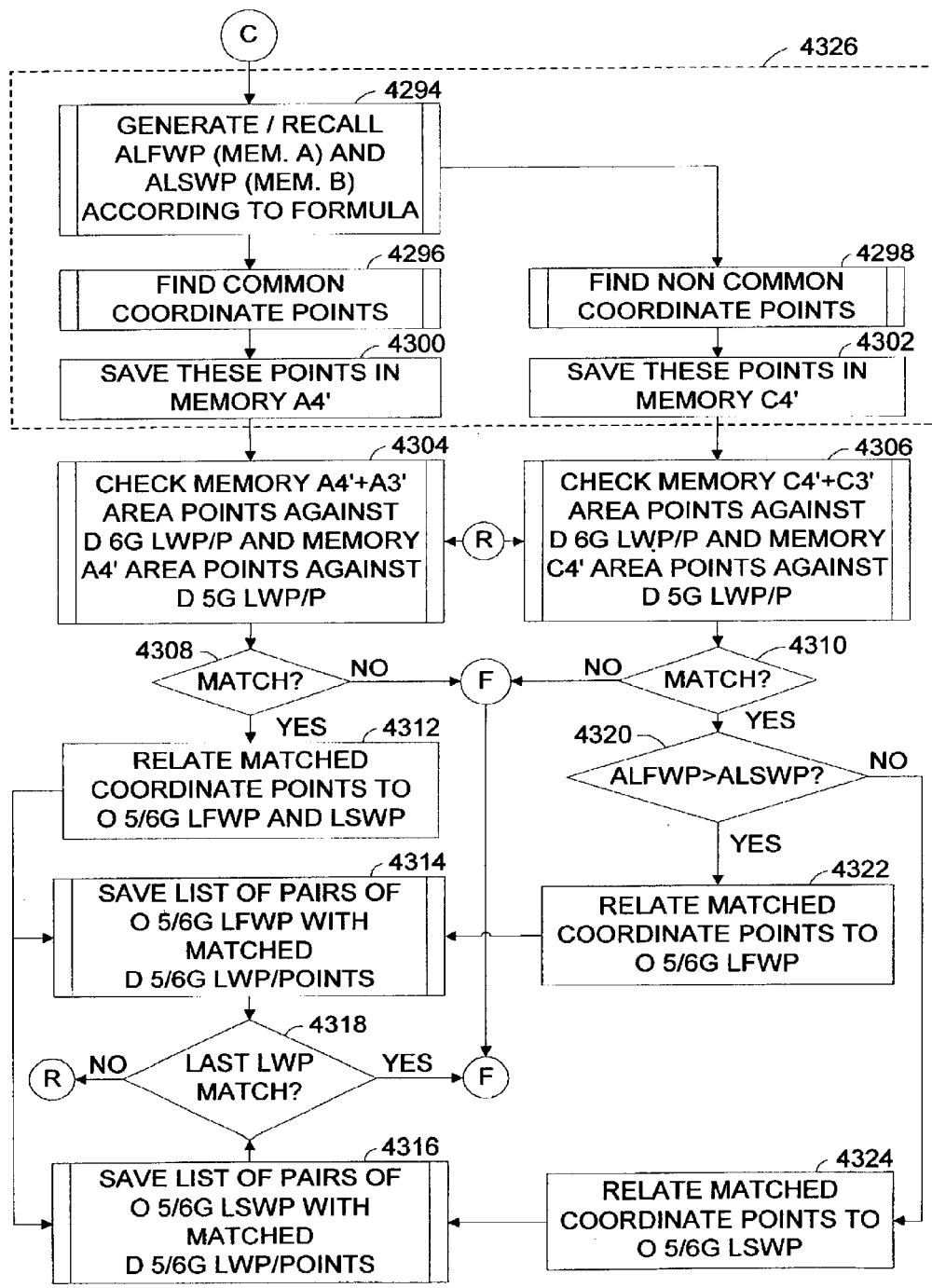

FIG. 19C and FIG. 19D show a detailed structure of the "four path" origin-related associated area matching-module 1052 of FIG. 6O.

The process from a module 4260 in FIG. 19C to a module 4324 in FIG. 19D is similar and comparable to that of module 3630 in FIG. 16C to module 3698 in FIG. 16D, except basically that the process refers now to the 5G LWP waypoints and attributes, instead of the 2G LWP waypoints and attributes and to the 6G LWP waypoints and attributes instead of the 3G LWP waypoints and attributes, respectively.

The other difference being that the associated area coordinates, are now saved or indexed, to and from memory allocations A4' and C4', instead of to memory allocations A2' and C2' and also recalled from memory allocations A3', of module 4018 in FIG. 18C and A3' and C3', of modules 4050 and 4052 in FIG. 18D, instead of from the memory allocations A1', of module 3380 in FIG. 15C and A1' and C1', of modules 3406 and 3408 in FIG. 15D, respectively.

Figure 19E:
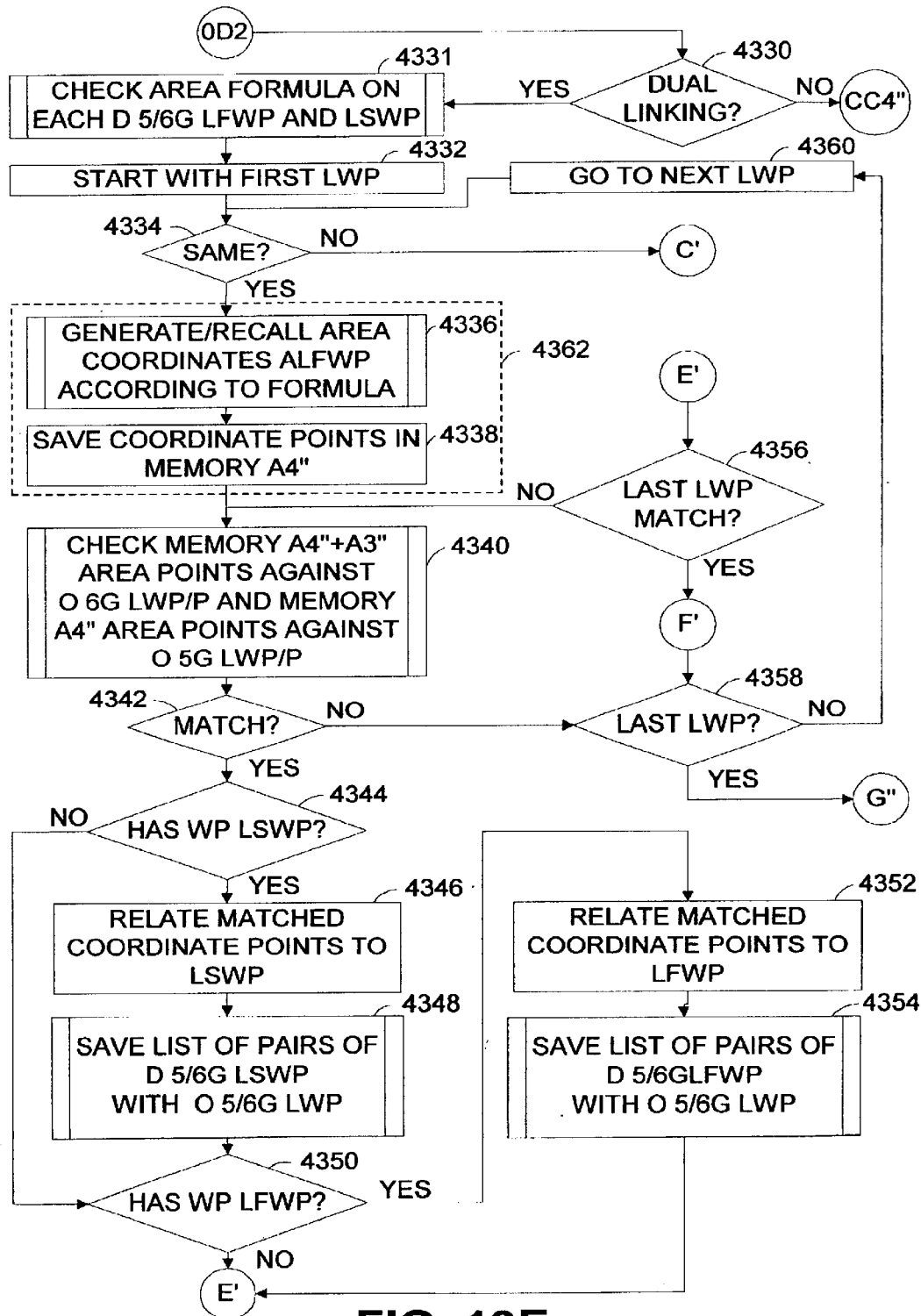
Figure 19F:
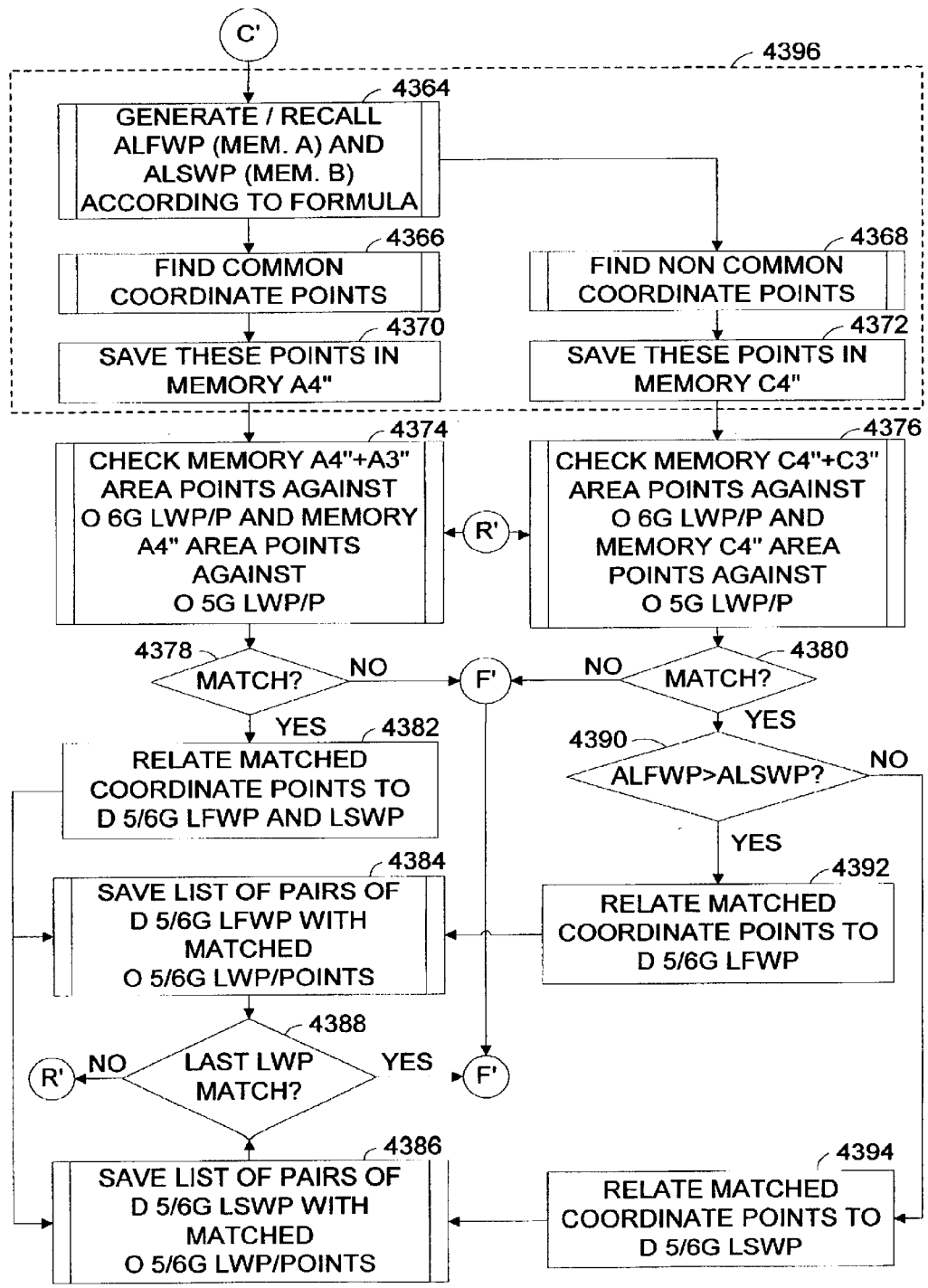

FIG. 19E and FIG. 19F show a detailed structure of the "four path" destination-related associated area matching-module 1056 of FIG. 6O.

The process from a module 4294 in FIG. 19E to a module 4354 in FIG. 19F is similar and comparable to that of module 3702 in FIG. 16E to module 3764 in FIG. 16F, except basically that the process refers now to the 5G LWP waypoints and attributes, instead of the 2G LWP waypoints and attributes and to the 6G LWP waypoints and attributes instead of the 3G LWP waypoints and attributes, respectively.

The other difference being that the associated area coordinates, are now saved or indexed, to and from memory allocations A4" and C4", instead of to memory allocations A2" and C2" and also recalled from memory allocations A3", of module 4088 in FIG. 18E and A3" and C3", of modules 4120 and 4122 in FIG. 18F, instead of from the memory allocations A1", of module 3448 in FIG. 15E and A1" and C1", of modules 3478 and 3480 in FIG. 15F, respectively.

Figure 19G:
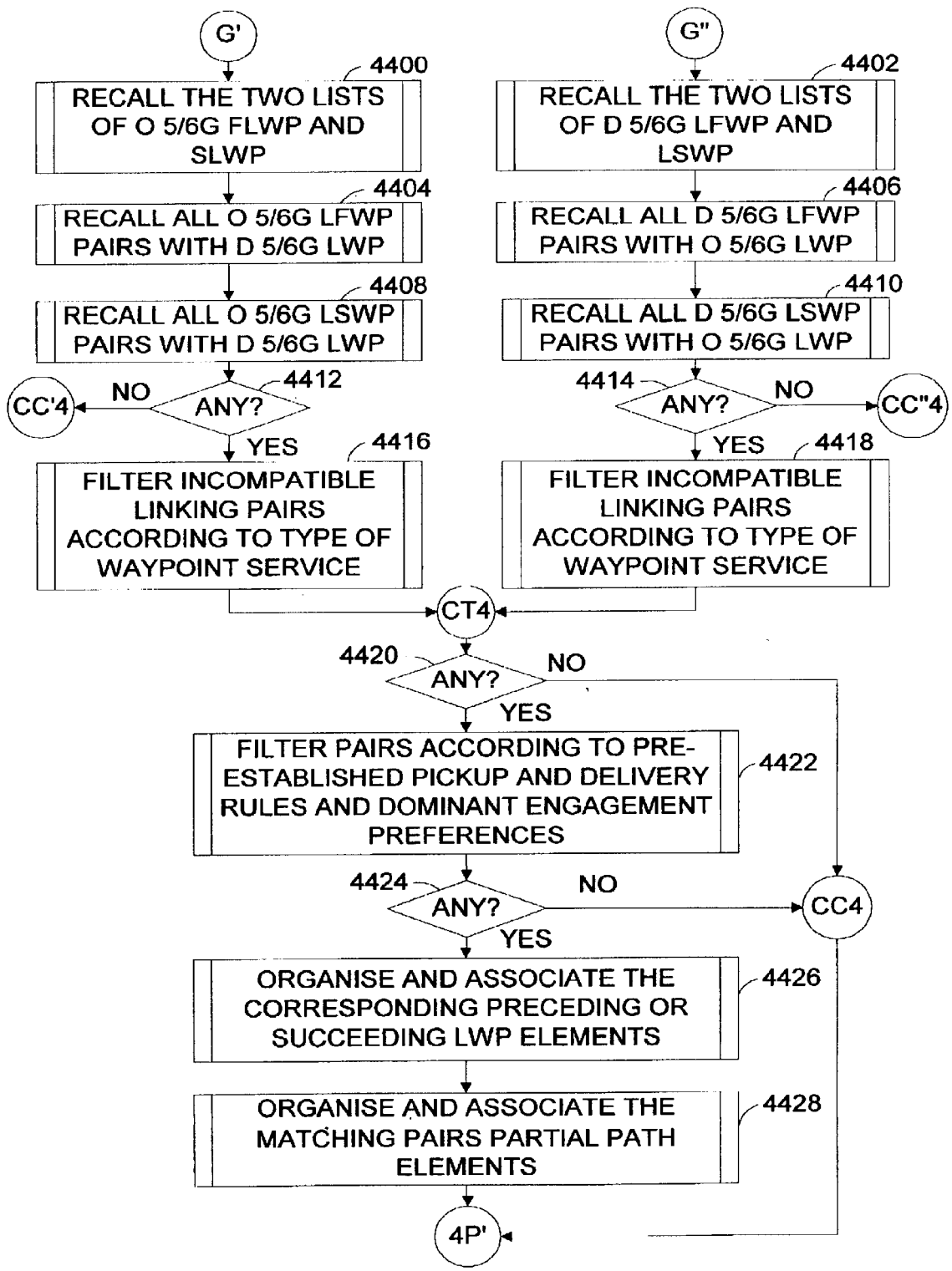

FIG. 19G shows the structure of the "four path" filtering-module 1058 of FIG. 6O.

The process from a module 4400 and a module 4402 to a module 4428 is similar and comparable to that from module 3770 and 3772 to module 3798 in FIG. 16G, except basically that the process refers now to the 5G LWP waypoints and attributes, instead of the 2G LWP waypoints and attributes and to the 6G LWP waypoints and attributes instead of the 3G LWP waypoints and attributes, respectively.

Also, the process refers now to modules within FIG. 19 instead of the similar and comparable modules within FIG. 16.

The interaction with FIG. 23 will now be for a value of "i=4", instead of "i=2".

A further understandable difference would be found at a module 3798 that recalls, organizes, associates and/or relations the relevant partial path elements that are associated to the matched pairs, with relevant partial path elements now defined as the elements and attributes of a path that are immediately associated to the matched 5G LWP or 6G LWP waypoint attributes, plus all the path elements immediately associated to the formerly matched 4G LWP waypoint attributes corresponding to the same path as the matched 5G LWP or 6G LWP waypoint attributes, plus the elements between each of these matched 4G and 5G LWP or 6G LWP waypoints belonging to the same path, plus all the elements immediately associated to the 3G LWP or 2G LWP waypoint attributes formerly matched with the 4G LWP waypoint attributes that belong to the same path as the matched 5G LWP or 6G LWP waypoint, plus all the path elements immediately associated to the 1G LWP waypoint attributes of the same paths as the 3G LWP or 2G LWP waypoint matched to the 4G LWP waypoint mentioned above, plus the elements between each of the matched 1G LWP waypoint and 2G LWP or 3G LWP waypoints of a same path.

The elements from the O 1G LWP to the matched O 2G LWP or O 3G LWP represent the first carrier, the elements from the O 4G LWP to the O 5G LWP or O 6G LWP represent the second carrier, the elements from the D 6G LWP or D 5G LWP to the D 4G LWP represent the third carrier and the elements from the matched D 3G LWP or D 2G LWP to the D 1G LWP represent the fourth carrier.

The elements immediately associated with matched waypoint attributes with which each of the waypoints of the transport path was assembled also count as elements of the relevant transport path.

FIG. 20 shows a detailed structure of the "four path, one vector" linking, matching and filtering modules 1102 to 1118 of FIG. 6Q.

Figure 20A:
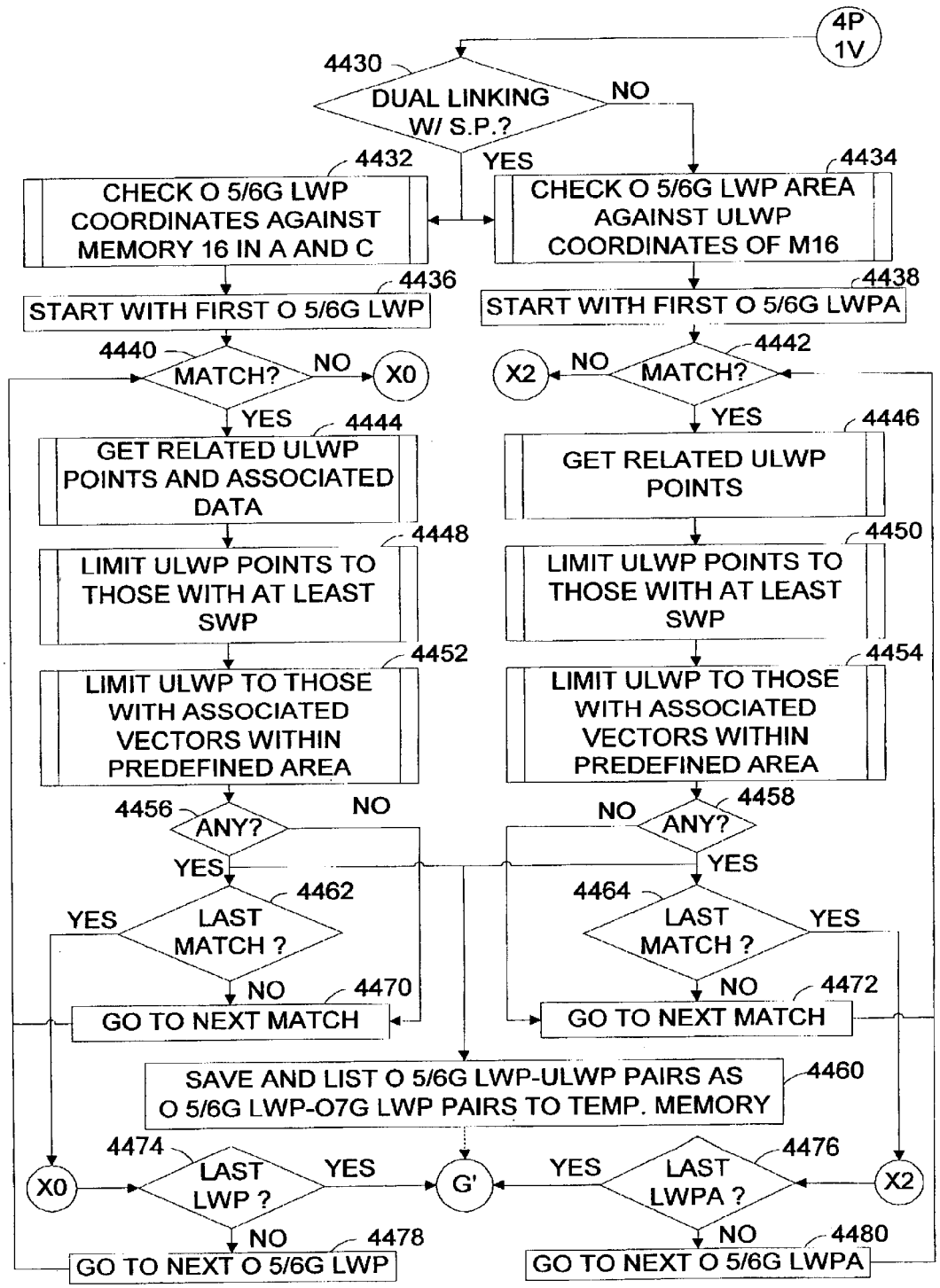
FIGS. 20A to 20C—show a more detailed structure of the "four path, one vector" linking, matching and filtering modules 1102 to 1118 of FIG. 6Q.

FIG. 20A shows a detailed structure of the origin linking and matching module 1110 of FIG. 6Q. The function of a group of modules 4430 to 4480, belonging to this figure, is similar and comparable to those of the group of modules 3800 to 3846, in FIG. 17A.

Figure 20B:
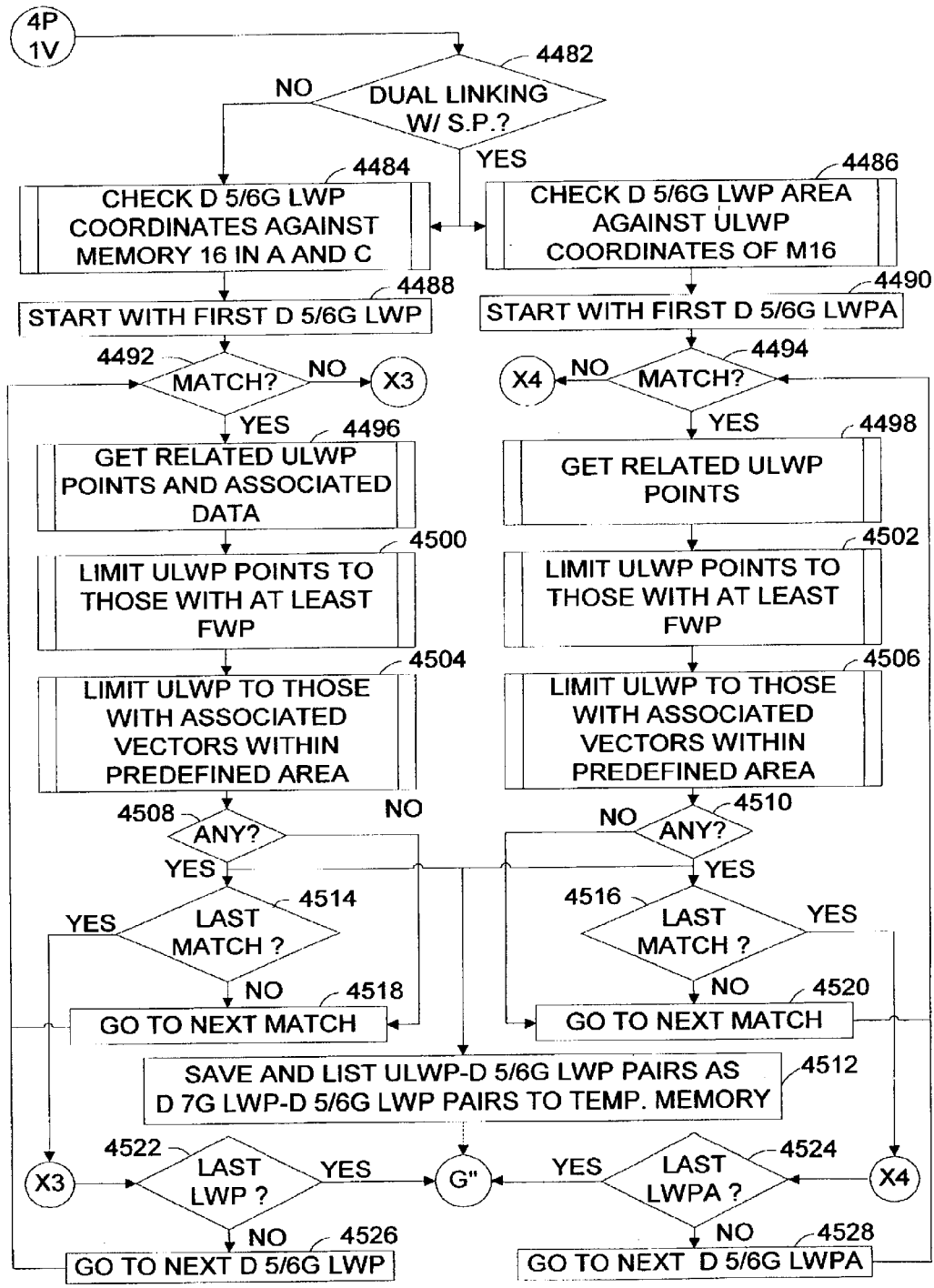

The process starts flowing simultaneously to a decision point 4430 as well as to a decision point 4482 in FIG. 20B.

Modules 4432, 4434, 4436, 4438, 4478 and 4480 differ from modules 3802, 3804, 3806, 3808, 3844 and 3846 in FIG. 17A in that, instead of referring to the origin related O 2G LWP and/or the O 3G LWP waypoints or their associated area in the case of dual linking, these modules now refer the origin-related O 5G LWP waypoints and/or the O 6G LWP waypoints, formerly listed at module 4214 of FIG. 19A, which are the linkable elements used by the preferred version of the system, for combining, or matching, the origin-related second generation path O 2GP, with some other path. Other embodiments could also use the O 4G LWP waypoints as linkable elements for this stage, which would lead to the service provider accepting transit consignments only within the O 4G LWP associated area, but that case will be further explained later.

The waypoint coordinates of module 4432 and the associated area coordinates of module 4434, are checked now against filtered path elements ULWP associated areas and ULWP waypoints, respectively, of memory A and C, which are path elements likely to be more relevant in the search of an adequate solution and which have been previously saved to memory 16 in module 1104 of FIG. 6Q, instead of to memory 8 in module 854 in FIG. 6I. The definition of the area, or areas, produced by filtering module 1104, which re-filters the elements stored to memory 8 and saves these to memory 16, is likely to be even more complex, than that of filtering module 854 which saves to memory 8, as even more waypoints and therefore waypoint pairs, are involved, but the resulting areas are likely to be more focused. Nevertheless, in absence of module 1104 producing more focused areas efficiently, the system can always resort to the elements filtered to memory 8, or to alternatively to memory 0.

If there are any ULWP waypoints remaining after the modules 4452 and 4454 at decision points 4456 and 4458, they are termed O 7G LWP, listed and saved to a temporal memory, at a save to memory module 4460, as matching O 5G LWP-O 7G LWP pairs and O 6G LWP-O 7G LWP pairs, as well as O 7G LWP-O 5G LWP and O 7G LWP-O 6G LWP pairs if the dual liking was enabled.

FIG. 20B shows a detailed structure of the destination linking and matching module 864 of FIG. 6I. The function of a group of modules 4482 to 4528, belonging to this figure, is similar and comparable to those of the group of modules 3850 to 3896, in FIG. 17B.

The process starts flowing simultaneously to a decision point 4482 as well as to a decision point 4430 in FIG. 20A.

Modules 4484, 4486, 4488, 4490, 4526 and 4528 differ from modules 3852, 3854, 3856, 3858, 3894 and 3896 in FIG. 17B in that instead of referring to the destination-related D 2G LWP and/or D 3G LWP waypoints, or the destination associated areas, in the case or dual linking, these modules now refer the destination-related D 5G LWP waypoints and/or the D 6G LWP waypoints, formerly listed at module 3624 of FIG. 16B, which are the linkable elements used by the preferred version of the system, for combining, or matching, the destination-related second generation path D 2GP, with some other path. Other embodiments could also use the D 4G LWP waypoints as linkable elements for this stage, which would lead to the service provider accepting transit consignments only within the D 4G LWP associated area, but that case will be further explained later.

The waypoint coordinates of module 4484 and the associated area coordinates of module 4486, are checked now against filtered path elements ULWP associated areas and ULWP waypoints, respectively, of memory A and C, which are path elements likely to be more relevant in the search of an adequate solution and which have been previously saved to memory 16 in module 1104 of FIG. 6Q, instead of to memory 8 in module 854 in FIG. 6I. The definition of the area or areas produced by filtering module 1104 is the same as in FIG. 20A.

If there are any ULWP waypoints remaining after the modules 4504 and 4506 at decision points 4508 and 4510, they are termed D 7G LWP, listed and saved to a temporal memory, at a save to memory module 4512, as matching D 7G LWP-D 5G LWP pairs and D 7G LWP-D 6G LWP pairs, as well as D 5G LWP-D 7G LWP and D 6G LWP-D 7G LWP pairs, if the dual linking was enabled.

Figure 20C:
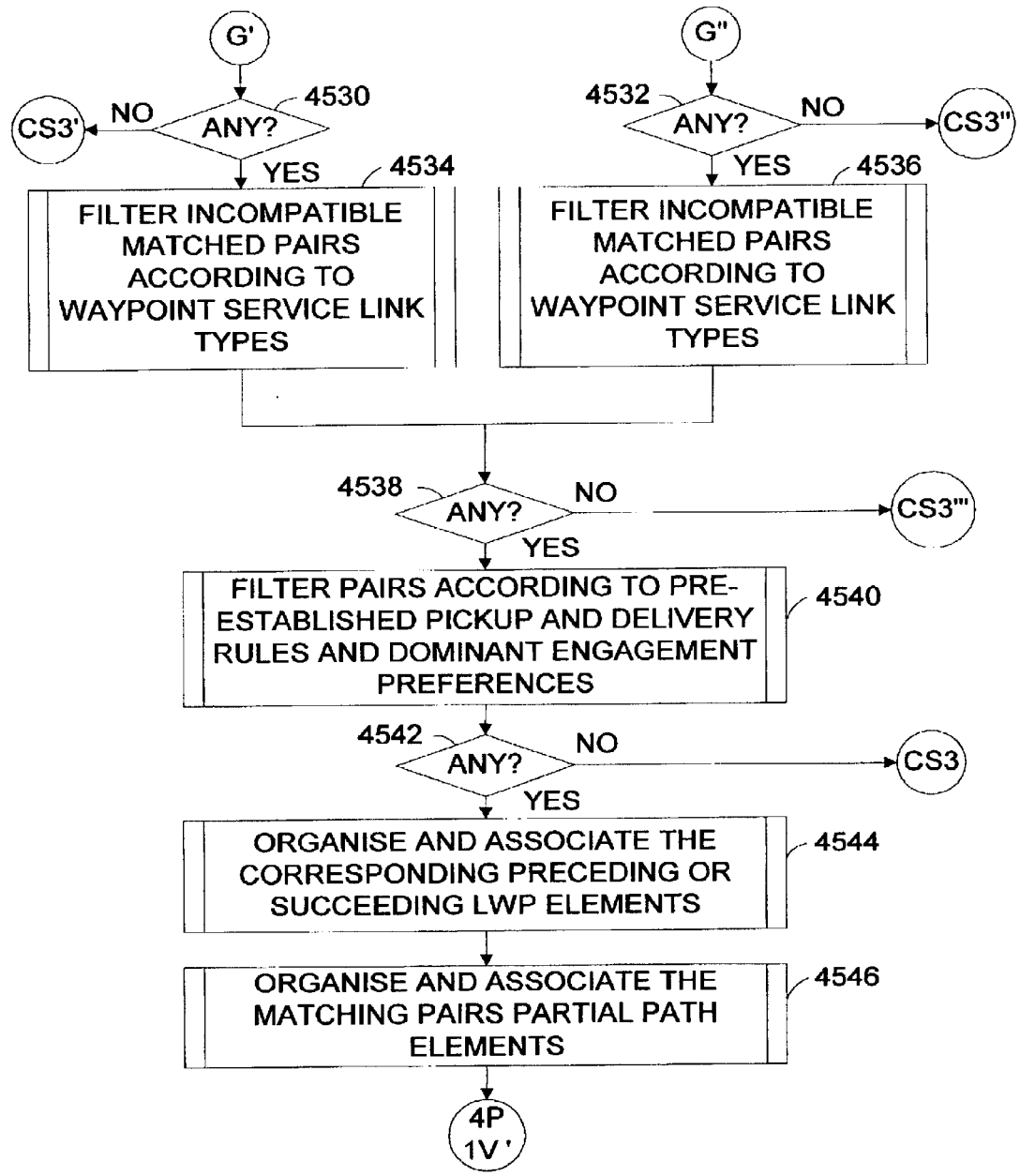

FIG. 20C shows the structure of the filtering module 1118 of FIG. 6Q.

The function of a group of modules 4530 and 4532 to 4546, belonging to this figure, is comparable to those of the group of modules 3900 and 3902 to 3916 in FIG. 17C.

The pairs saved to module 4460 in FIG. 20A and the pairs saved to module 4512 in FIG. 20B, if any, are analysed at modules 4530 and 4536 respectively, according to the waypoint service link types, which are attributes described in FIG. 5A and if the pairs are found to be incompatible between each other because of this reason, they are eliminated or filtered at this stage.

If there are pairs left after filtering module 4540, the process, at a decision point 4542 continues to a module 4544, that recalls, organizes, associates and/or relations the corresponding immediately preceding and succeeding elements for the origin-related O 1G LWP, O 2G LWP, O 3G LWP, O 4G LWP, O 5G LWP, O 6G LWP and O 7G LWP waypoints of the origin-related pairs and the preceding and succeeding elements for the destination-related D 1G LWP, D2G LWP, D 3G LWP, D 4G LWP, D5G LWP, D 6G LWP and D 7G LWP waypoints for the destination-related pairs. Among the attributes recalled, are the existing 2G LFWP and the 2G LSWP waypoint attributes and for each pair of the format 2GP LWP-7G LWP, as well as for each pair of the format 7G LWP-2GP LWP left after the filtering stages, up to four sets of matching pairs are developed, representing the four possible combinations of the finishing and the starting waypoint attributes, if any were linkable, between the waypoints of the pair, It is likely that this module will produce an expansion of possibilities by developing path solutions using the 2GP LFWP and/or the 2GP LSWP waypoint attributes, to match the 7G LFWP and/or the 7G LSWP, instead of only the 2GP LWP waypoint to match the 7G LWP, as components of a matched pair.

This is followed by a module 4546 that recalls, organizes, associates and/or relations the relevant partial path elements that are associated to the matched pairs, with relevant partial path elements defined as, the elements and attributes of a path that are immediately associated to the matched waypoint attribute, i.e. either LSWP and LFWP, plus all the downstream path elements of the matched 7G LWP waypoint if the waypoint is an origin-related LWP waypoint, or all the upstream path elements of the matched waypoint if the waypoint is a destination-related LWP waypoint, plus all the path elements between the matched 2GP LWP waypoint and the matched 1GP LWP, plus all the elements between the matched 1GP LWP and the 1G LWP waypoint of the same origin-related or destination-related path, plus the elements immediately associated to the matched attributes of the matched waypoints of the same origin-related or destination-related paths.

FIG. 21 shows a detailed structure of the "four path, two vector" lining, matching and filtering modules 1240 to 1248 of FIG. 6U.

Figure 21A:
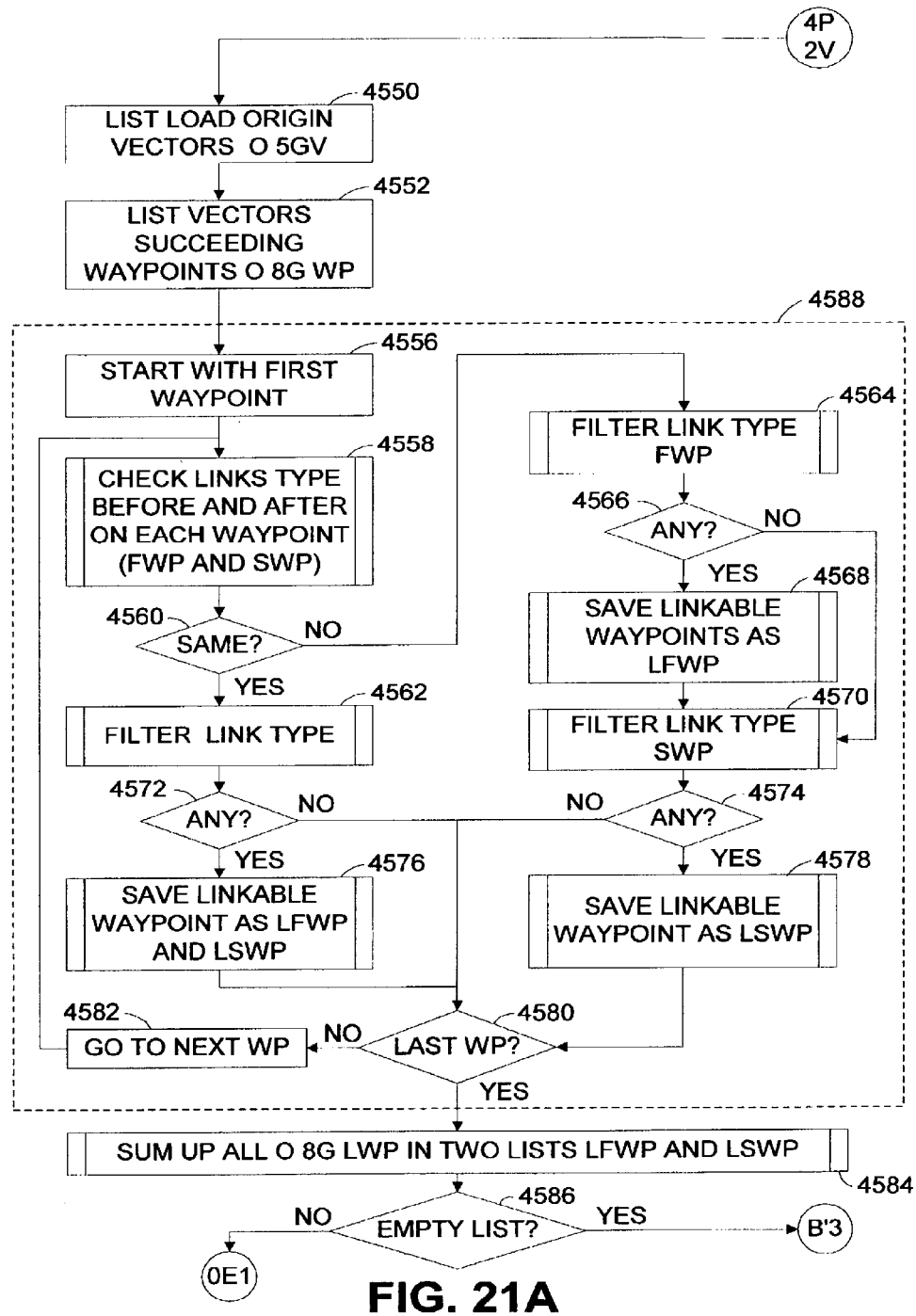
FIGS. 21A to 21G—shows a more detailed structure of the "four path, two vector" linking, matching and filtering modules 1240 to 1248 of FIG. 6U.

FIG. 21A shows a detailed structure of the "four path, two vector" origin-related link type filtering-module 1240 of FIG. 6U.

Figure 21B:
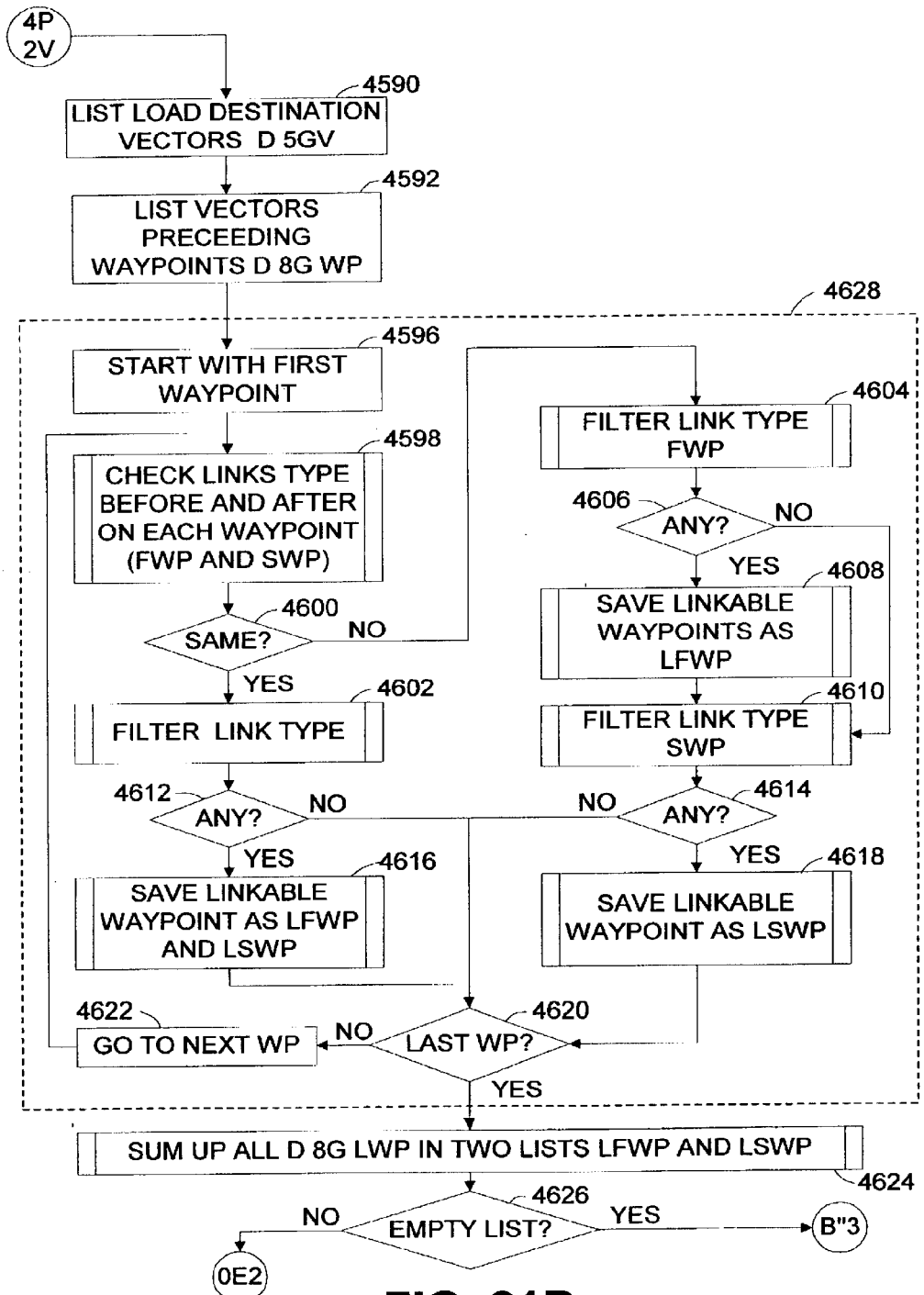

The process, which also flows simultaneously to module 4590 of FIG. 21B, starts at a module 4550 which lists the origin-related vectors that succeed the 7G LWP waypoints, i.e. the downstream or fifth generation O 5GV vectors and is followed by a module 4552 which lists the O 5GV vectors' succeeding waypoints, i.e. the downstream or eighth generation O 8G WP waypoints. The description of the process that continues, involving a group of modules 4556 to 4586, is similar and comparable to the process in FIG. 15A involving modules 3304 to 3332, except that the process refers now to the 8G WP or 8G LWP instead of the 2G WP or 2G LWP respectively.

FIG. 21B shows a detailed structure of the "four path, two vector" destination-related link type filtering-module 1244 of FIG. 6U.

The process, which also flows simultaneously to module 4550 of FIG. 21A, starts at a module 4590 which lists the destination-related vectors that precede the seventh generation D 7G LWP, i.e. the upstream or fifth generation D 5GV vectors and is followed by a module 4592 which lists the D 5GV vectors preceding waypoint, i.e. the upstream or eighth generation D 8G WP waypoints. The description of the process that continues, involving a group of modules 4596 to 4626, is similar and comparable to the process in FIG. 15B involving modules 3340 to 3370, except that the process refers now to the 8G WP or 8G LWP instead of the 2G WP or 2G LWP respectively.

Figure 21C:
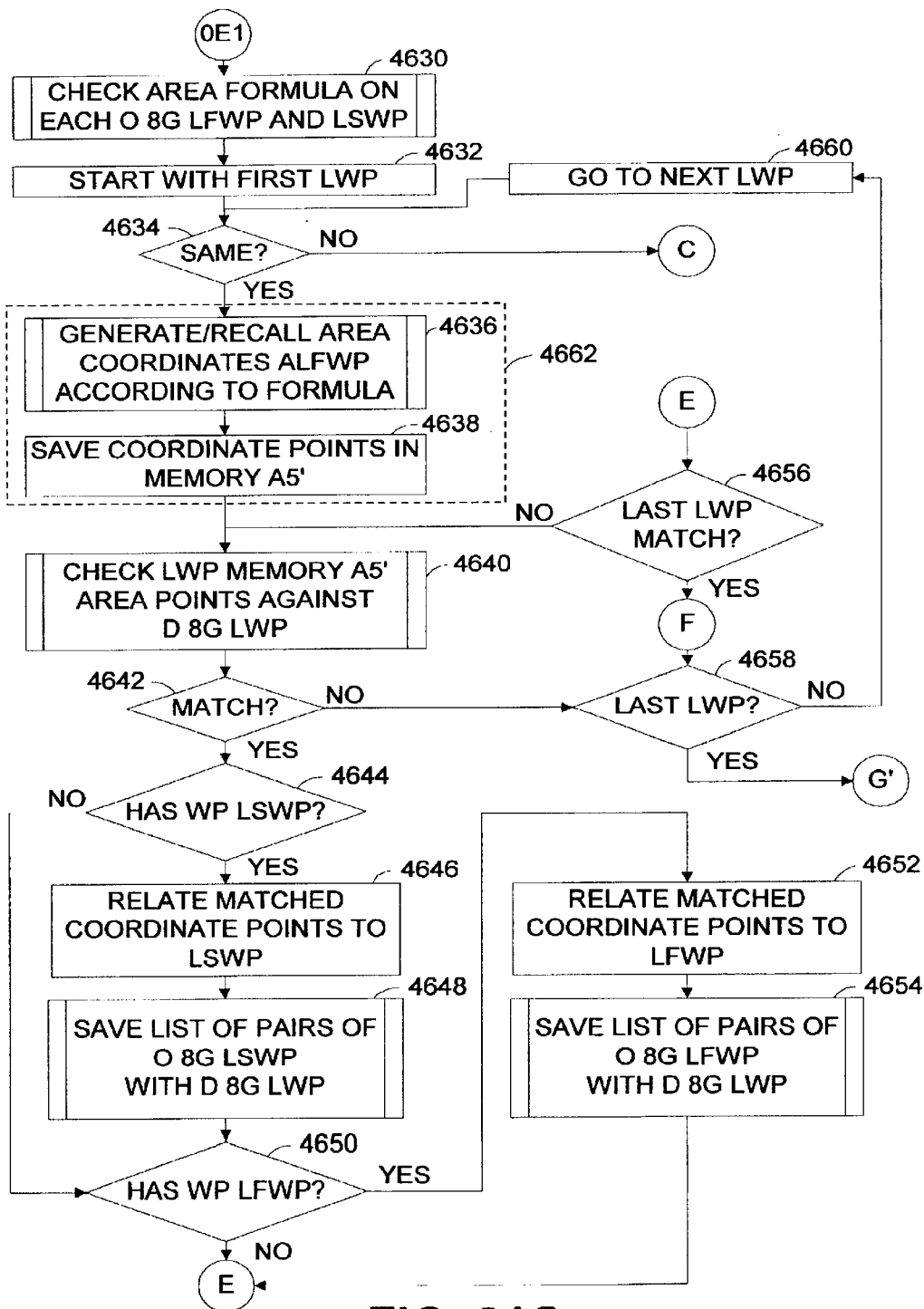
Figure 21D:
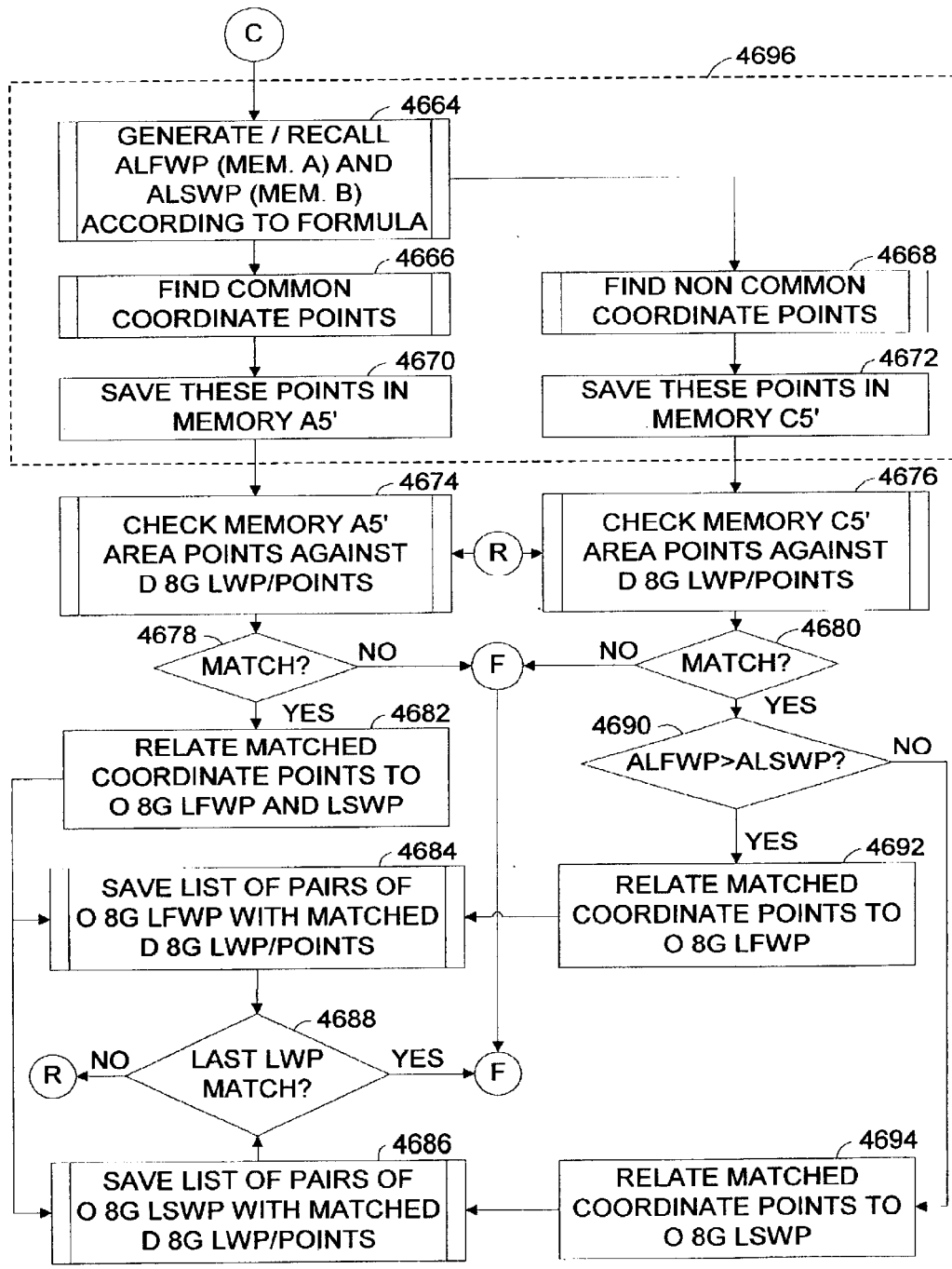

FIG. 21C and FIG. 21D show a detailed structure of the "four path, two vector" origin-related associated area matching-module 1242 of FIG. 6U.

The process from a module 4630 in FIG. 21C to a module 4694 in FIG. 21D is similar and comparable to that of module 3372 in FIG. 15C to module 3430 in FIG. 15D, except basically, that the process refers now to the 8G LWP waypoints and attributes, instead of the 2G LWP waypoints and attributes. The reason of the similarity lies in that the 8G LWP waypoints of the main process, are equivalent to 2G LWP waypoints for the new 3GP paths recently detected by the system through the 7G LWP waypoints.

The other difference being that the associated area coordinates, are now saved or indexed, to a memory allocations A5' and C5', instead of to memory allocations A1' and C1'.

Figure 21E:
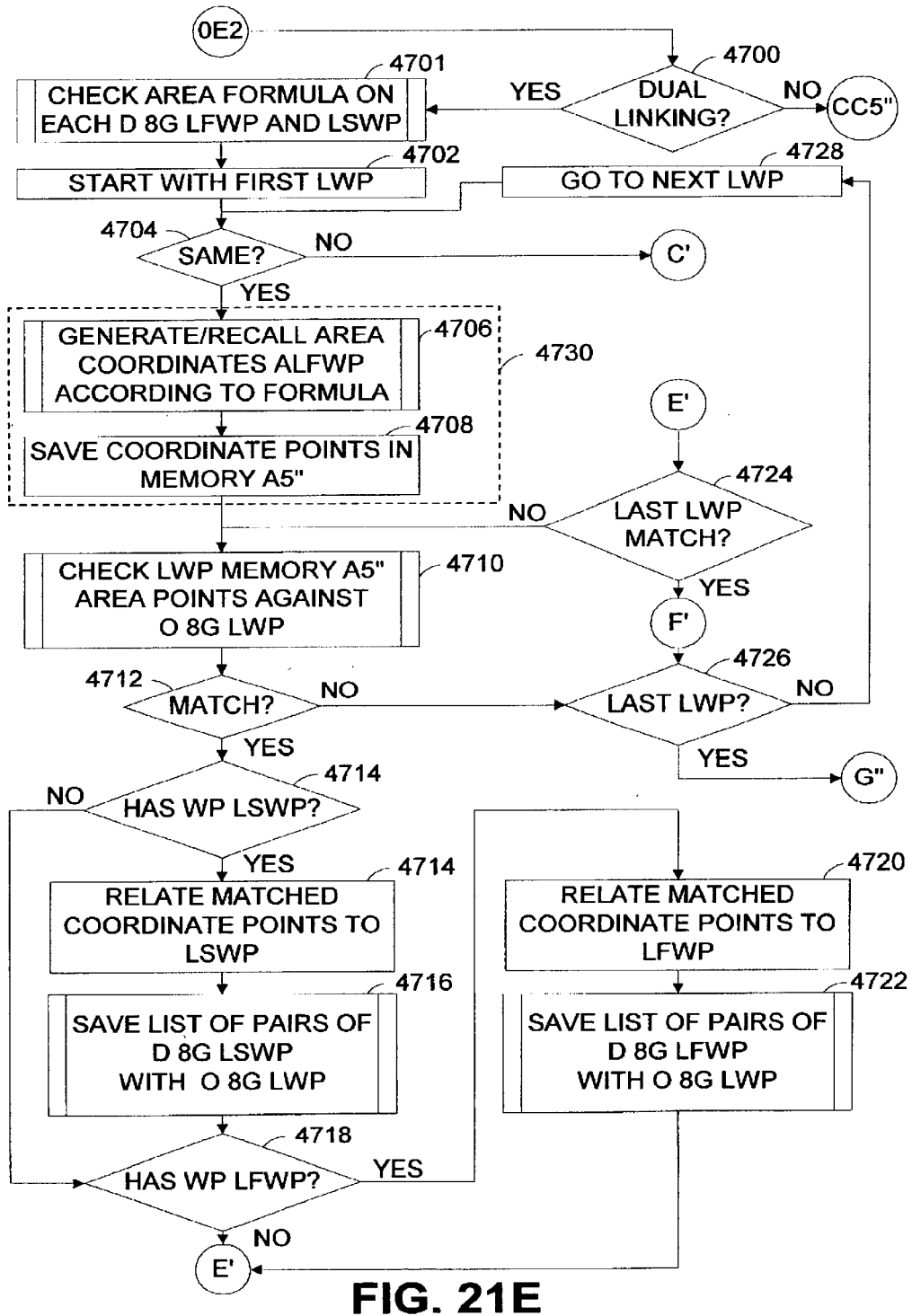
Figure 21F:
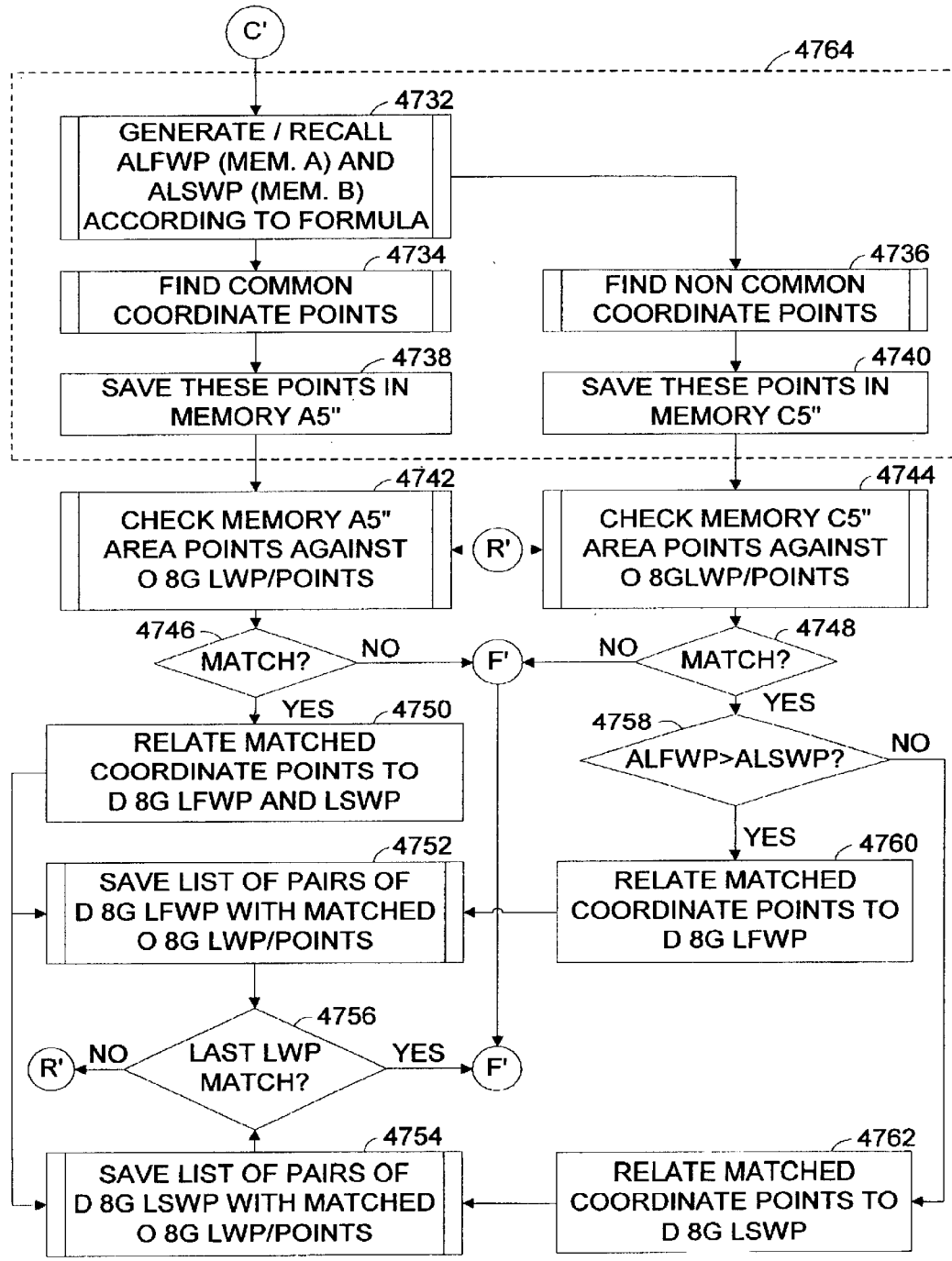

FIG. 21E and FIG. 21F show a detailed structure of the "four path, two vector" destination-related associated area matching-module 1246 of FIG. 6U.

The process from a module 4700 in FIG. 21E to a module 4762 in FIG. 21F is similar and comparable to that of module 3440 in FIG. 15E to module 3502 in FIG. 15F, except basically, that the process refers now to the 8G LWP waypoints and attributes, instead of the 2G waypoints and attributes.

The other difference being that the associated area coordinates, are now saved or indexed, to a memory allocations A5" and C5", instead of to memory allocations A1" and C1".

Figure 21G:
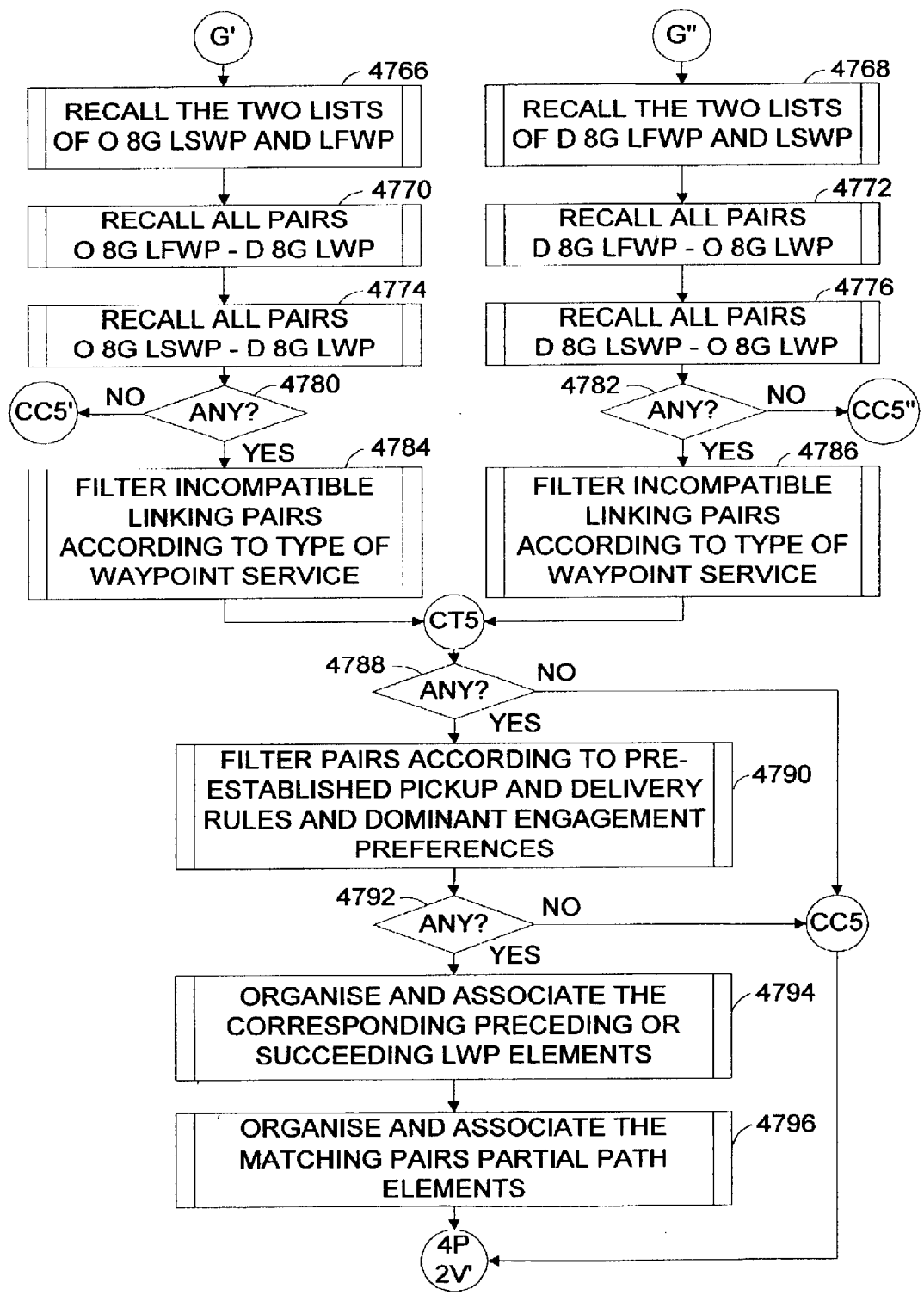

FIG. 21G shows the structure of the "four path, two vector" filtering module 1248 of FIG. 6U.

The process from a module 4766 and a module 4768, to a module 4796, is similar and comparable to that from module 3506 and 3508, to module 3534 in FIG. 15G, except basically, that the process refers now to the 8G LWP waypoints and attributes, instead of the 2G LWP waypoints and attributes, as well as refers now to modules within FIG. 21 instead of the similar and comparable modules within FIG. 15.

The interaction with FIG. 23 will now be for a value of "i=5", instead of "i=1".

A further understandable difference would be found at a module 4796 that recalls, organizes, associates and/or relations the relevant partial path elements that are associated to the matched pairs, with relevant partial path elements, now defined as the elements and attributes of a path, that are immediately associated to the matched 8G LWP, plus all the elements between the matched 8G LWP and the 7G LWP of the same path, plus all the elements immediately associated with the matched 7G LWP of the same path, plus all the 2GP LWP waypoint attributes matched to the 7G LWP mentioned before, plus all the path elements between the matched 2GP LWP mentioned before and the 4G LWP on the same path, plus all the path elements immediately associated to the matched 4G LWP waypoint attributes, plus all the elements immediately associated to the 3G LWP or 2G LWP waypoint attributes formerly matched with the 4G LWP waypoint attributes that belong to the same path as the matched 2GP LWP waypoint, plus all the path elements immediately associated to the 1G LWP waypoint attributes of the same paths as the 3G LWP or 2G LWP waypoints mentioned above, plus the elements between each of the matched 1G LWP waypoint and 2G or 3G LWP waypoints of a same path.

The elements from the O 1G LWP to the matched O 2G LWP or O 3G LWP represent the first carrier, the elements from the O 4G LWP to the 5G LWP or the O 6G LWP represent the second carrier, the elements from O 7G LWP to the O 8G LWP represent the third carrier, the elements from D 8G LWP to the D 7G LWP represent the fourth carrier, the elements from the D 6G LWP or the D 5G LWP to the D 4G LWP represent the fifth carrier and the elements from the matched D 2G LWP or D 3G LWP to the D 1G LWP represent the sixth carrier. The elements immediately associated with matched waypoint attributes, with which each of the waypoints of the transport path was assembled, also count as elements of the relevant transport path.

FIG. 22 shows a detailed structure of the "six path" linking, matching and filtering modules 1302 to 1308 of FIG. 6W.

Figure 22A:
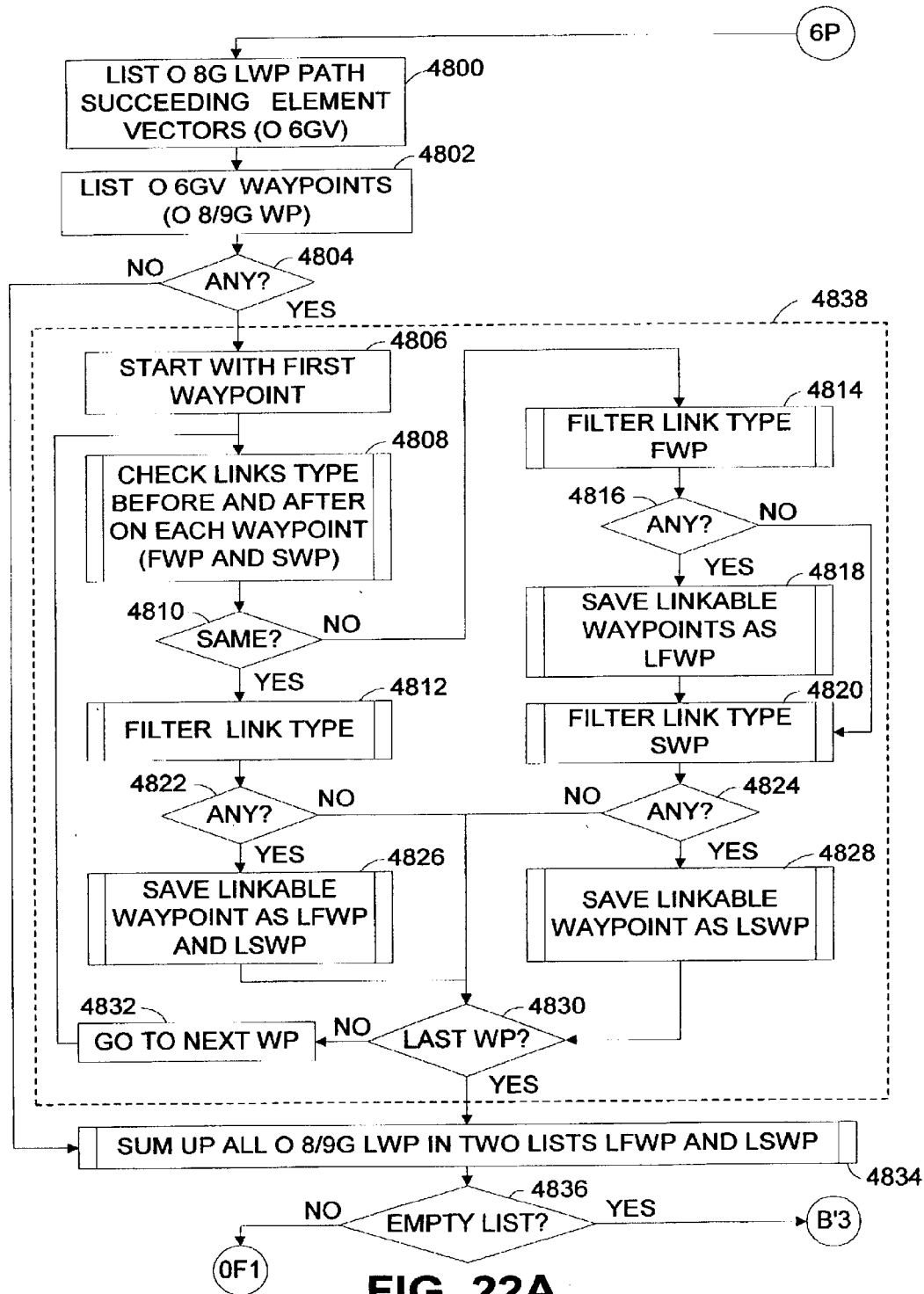
FIGS. 22A to 22G—show a more detailed structure of the "six path" linking, matching and filtering modules 1302 to 1308 of FIG. 6W.

FIG. 22A shows a detailed structure of the "six path" origin-related link type filtering-module 1302 of FIG. 6W.

Figure 22B:
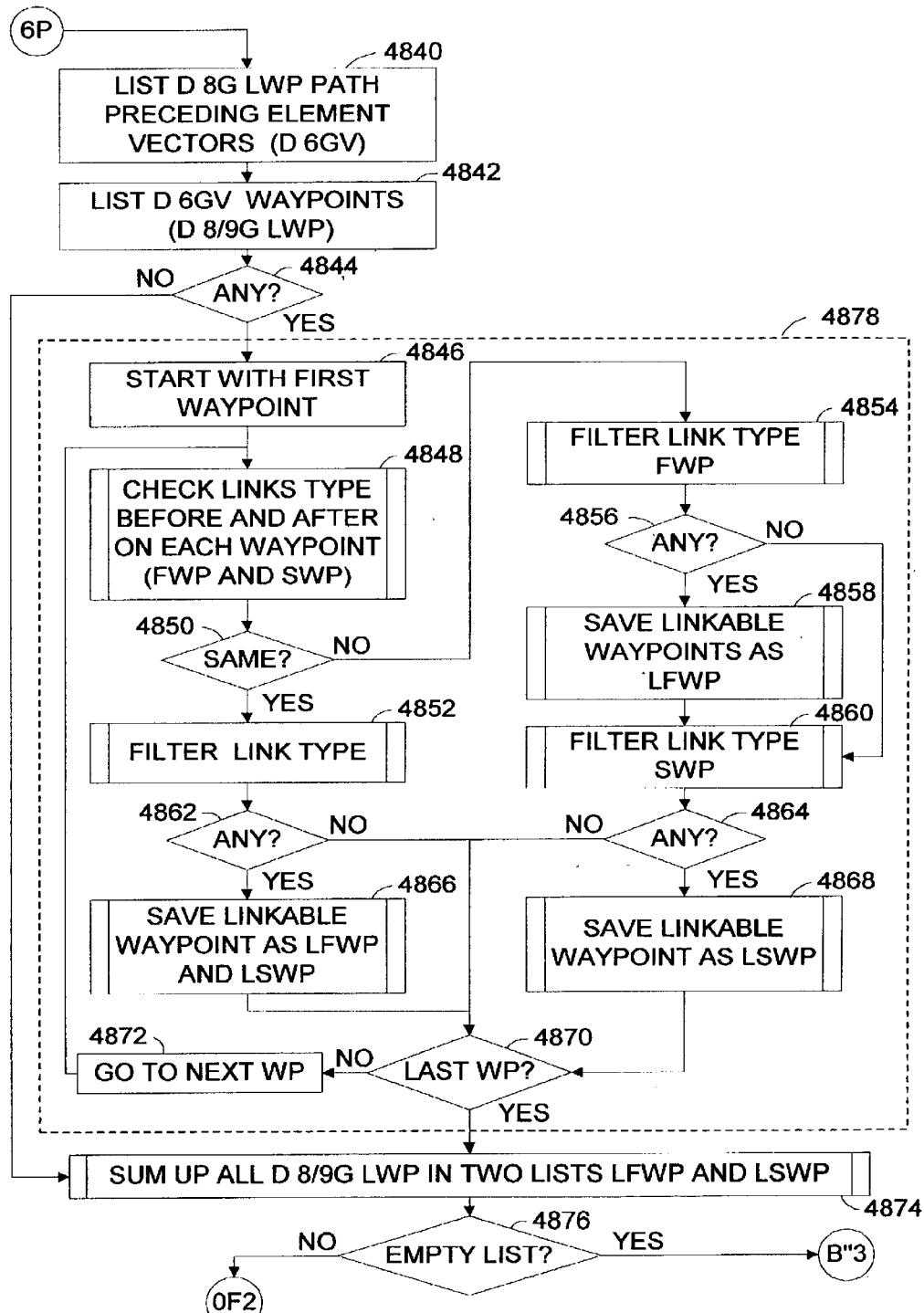

The process, which also flows simultaneously to module 4840 of FIG. 22B, starts at a module 4800, which lists the origin-related vectors that succeed the eighth generation O 8G LWP waypoints, i.e. the downstream, or sixth generation O 6GV vectors and is followed by a module 4802 which lists the O 6GV vectors succeeding waypoints, i.e. the downstream or ninth generation O 9G WP waypoints. The description of the process that continues, involving a group of modules 4804 to 4836, is similar and comparable to the process in FIG. 16A, involving modules 3554 to 3586, except that the process refers now to the 8G WP or 8G LWP, instead of the 2G WP or 2G LWP respectively and to the 9G WP of 9G LWP, instead of the 3G WP or 3G LWP respectively.

The reason of the similarity lying also in that, apart of the 8G LWP waypoints of the main process being equivalent to the 2G LWP for the 3GP paths detected by the system through the 7G LWP waypoints, the 9G LWP of the main process, are also equivalent to the 3G LWP waypoints for the same 3GP paths.

FIG. 22B shows a detailed structure of the "six path" destination-related link type filtering-module 1304 of FIG. 6W.

The process, which also flows simultaneously to module 4800 of FIG. 22A, starts at a module 4840 which lists the destination-related vectors that precede the 8G LWP waypoints, i.e. the upstream or fourth generation D 6GV vectors and is followed by a module 4842 which lists the D 6GV vectors preceding waypoints, i.e. the upstream or ninth generation D 9G WP waypoints. The description of the process that continues, involving a group of modules 4844 to 4876, is similar and comparable to the process in FIG. 16B involving modules 3594 to 3626, except that the process refers now to the 8G WP or 8G LWP instead of the 2G WP or 2G LWP respectively and to the 9G WP of 9G LWP, instead of the 3G WP or 3G LWP respectively.

Figure 22C:
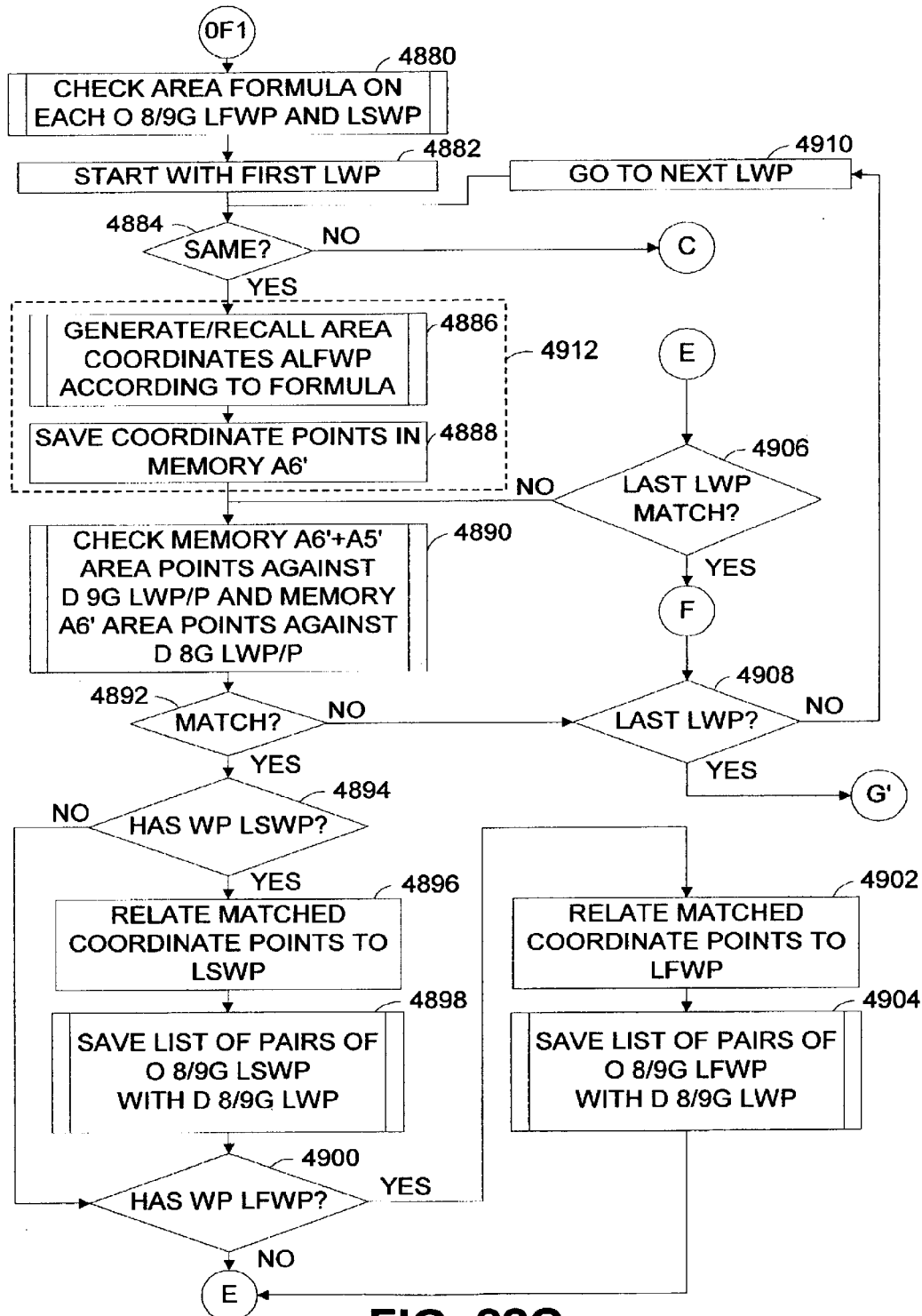
Figure 22D:
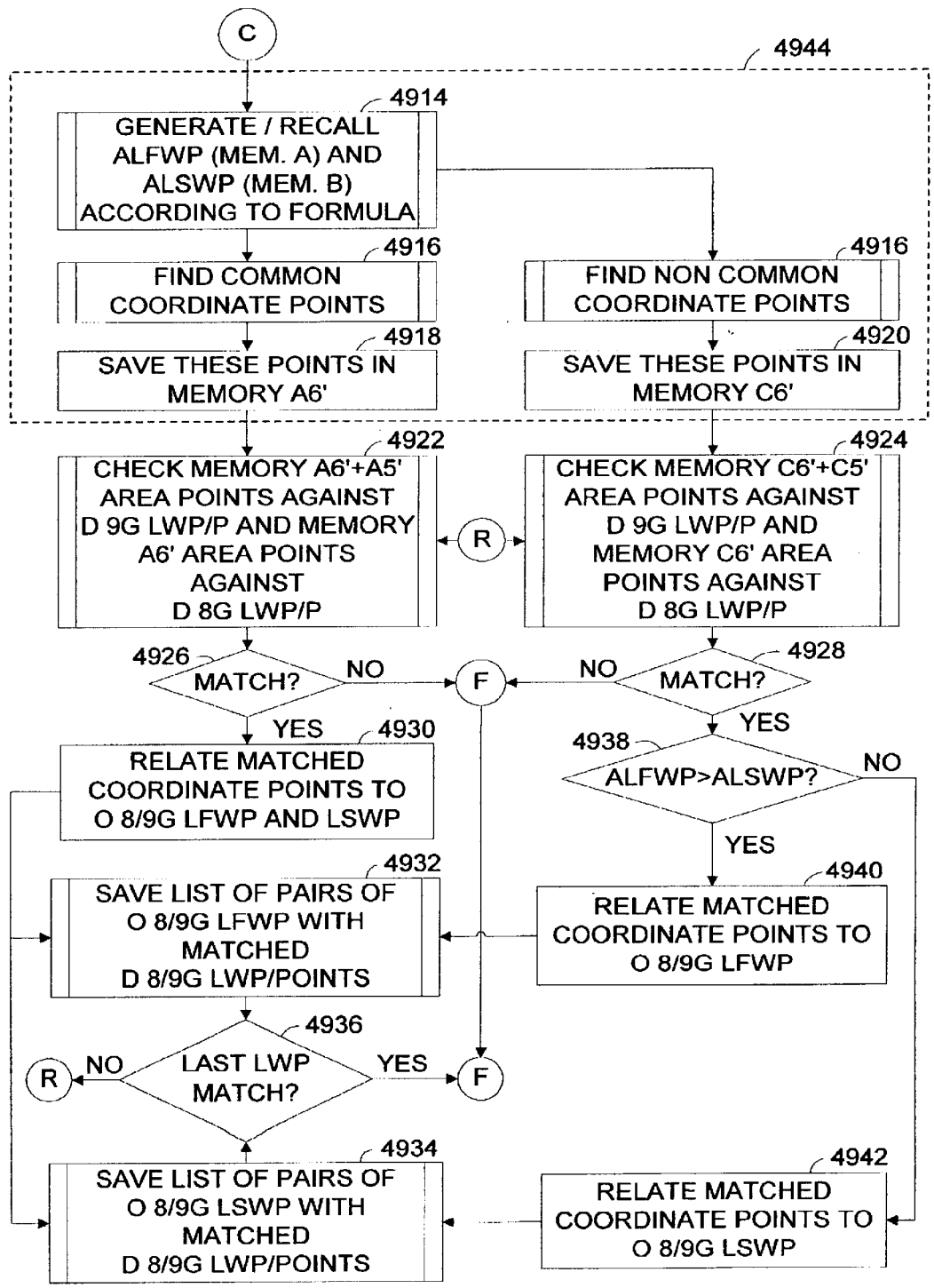

FIG. 22C and FIG. 22D show a detailed structure of the "six path" origin-related associated area matching-module 1304 of FIG. 6W.

The process from a module 4880 in FIG. 22C to a module 4242 in FIG. 22D is similar and comparable to that of module 3630 in FIG. 16C to module 3698 in FIG. 16D, except basically, that the process refers now to the 8G LWP waypoints and attributes, instead of the 2G LWP waypoints and attributes as well as to the 9G LWP waypoints and attributes instead of the 3G LWP waypoints and attributes, respectively.

The other difference being that the associated area coordinates, are now saved or indexed, to and from memory allocations A6' and C6', instead of to and from memory allocations A2' and C2' and also recalled from memory allocations A5', of module 4638 in FIG. 21C and A5' and C5', of modules 4670 and 4677 in FIG. 21D, instead of from the memory allocations A1', of module 3380 in FIG. 15C and A1' and C1', of modules 3406 and 3408 in FIG. 15D, respectively.

Figure 22E:
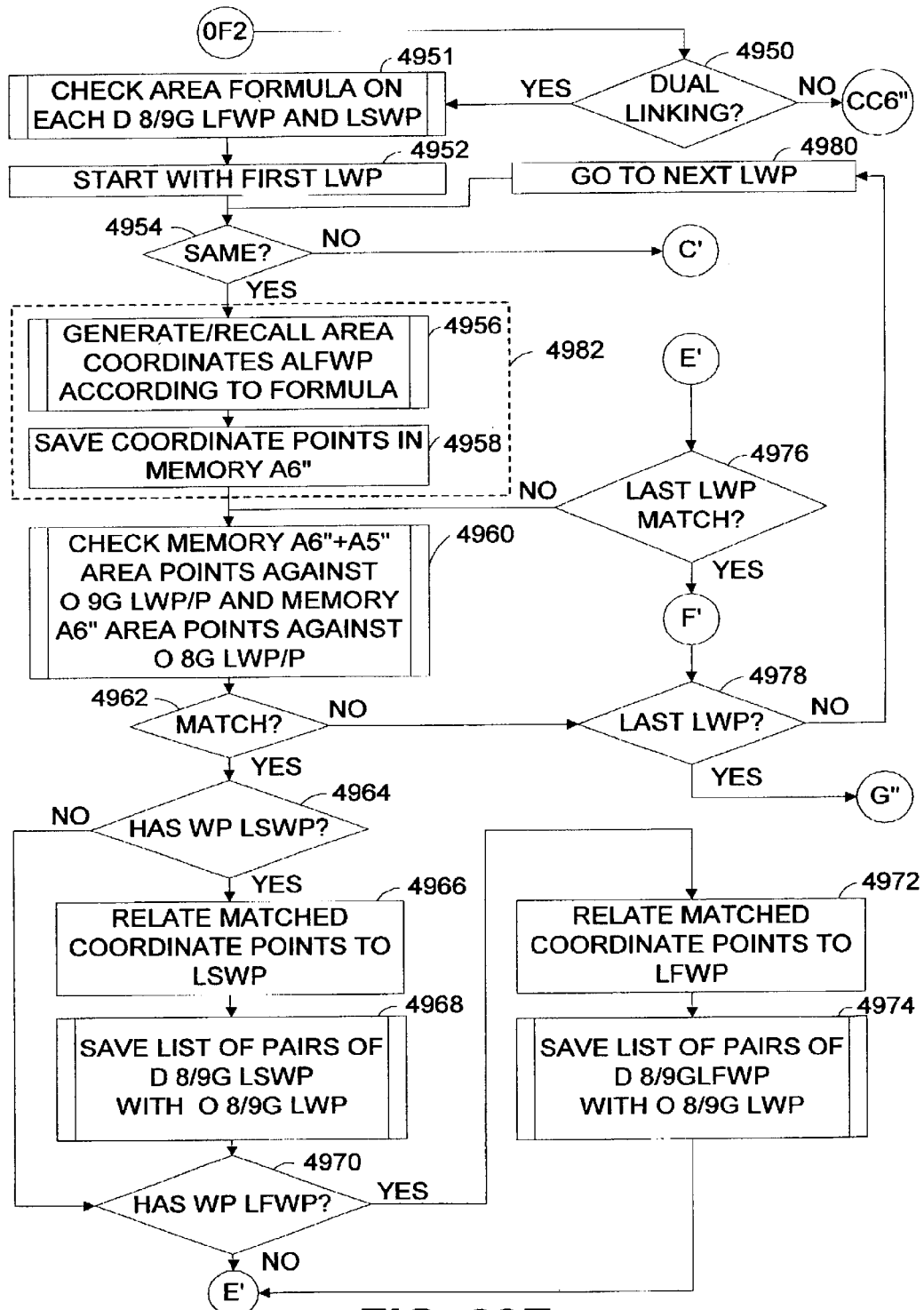
Figure 22F:
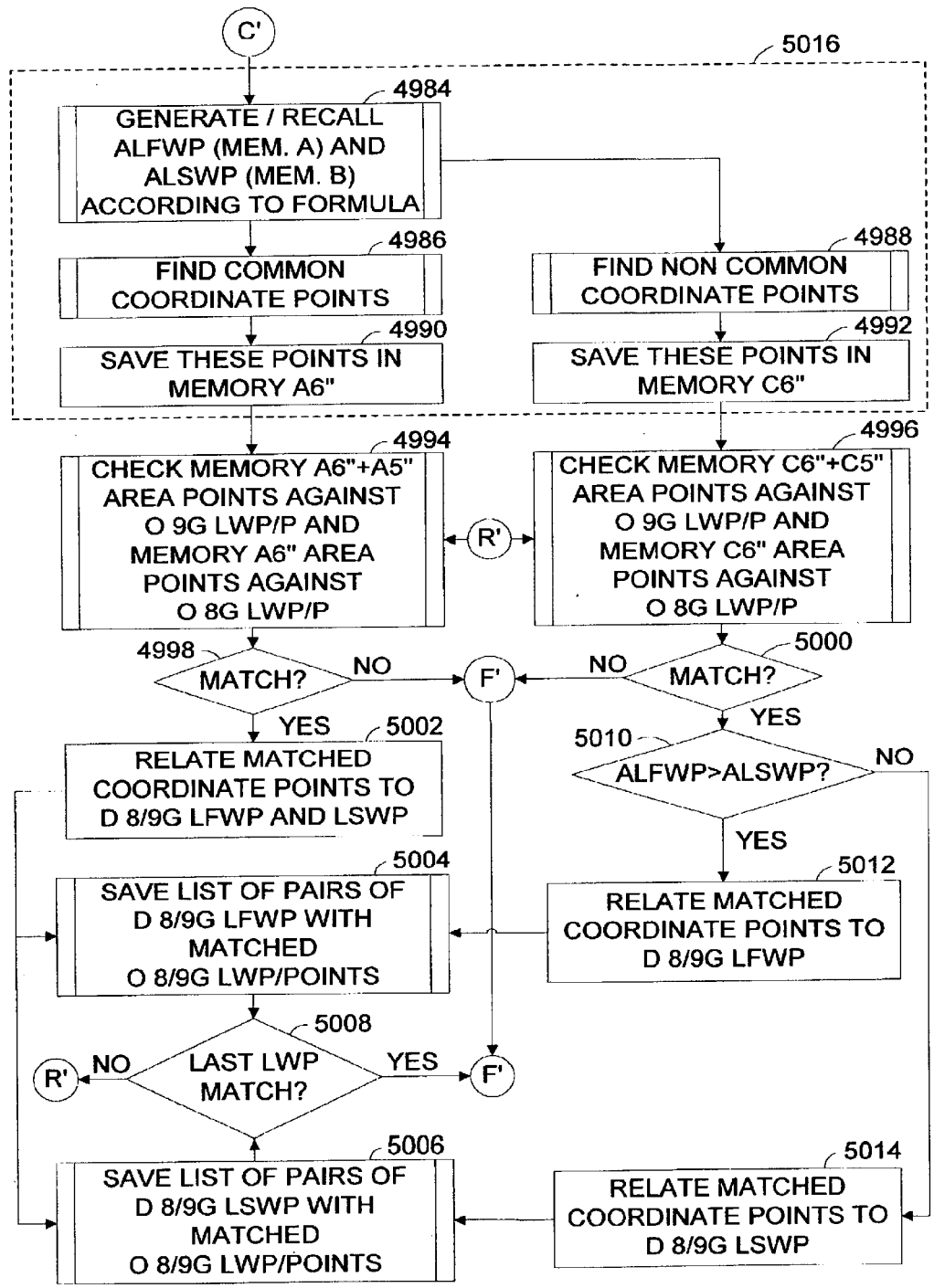

FIG. 22E and FIG. 22F show a detailed structure of the "six path" destination-related associated area matching-module 1306 of FIG. 6W.

The process from a module 4950 in FIG. 22E to a module 5014 in FIG. 22F is similar and comparable to that of module 3702 in FIG. 16E to module 3764 in FIG. 16F, except basically, that the process refers now to the 8G LWP waypoints and attributes, instead of the 2G LWP waypoints and attributes as well as to the 9G LWP waypoints and attributes instead of the 3G LWP waypoints and attributes, respectively.

The other difference being that the associated area coordinates, are now saved or indexed, to and from memory allocations A6" and C6", instead of to and from memory allocations A2" and C2" and also recalled from memory allocations A5", of module 4708 in FIG. 21E and A5" and C5", of modules 4738 and 4740 in FIG. 21F, instead of from the memory allocations A1", of module 3448 in FIG. 15E and A1" and C1", of modules 3478 and 3480 in FIG. 15F, respectively.

Figure 22G:
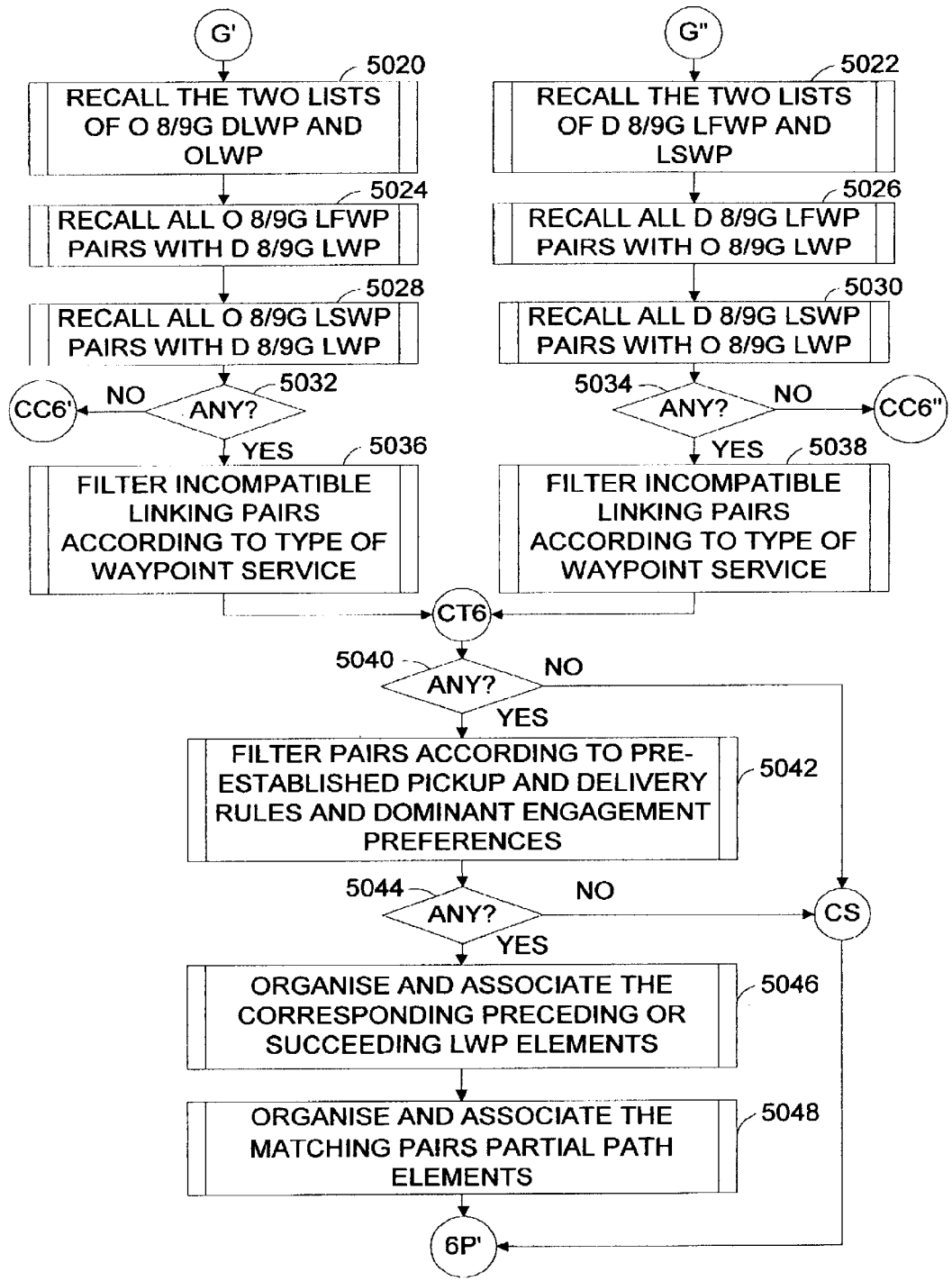

FIG. 22G shows the structure of the "six path" filtering-module 1308 of FIG. 6W.

The process from a module 5020 and a module 5022 to a module 5048 is similar and comparable to that from module 3770 and 3772 to module 3798 in FIG. 16G, except basically, that the process refers now to the 8G LWP waypoints and attributes, instead of the 2G LWP waypoints and attributes as well as to the 9G LWP waypoints and attributes instead of the 3G LWP waypoints and attributes, respectively.

Also, the process refers now to modules within FIG. 22 instead of the similar and comparable modules within FIG. 16.

The interaction with FIG. 23 will now be for a value of "i=6", instead of "i=2".

A further understandable difference would be found at a module 5048 that recalls, organizes, associates and/or relations the relevant partial path elements that are associated to the matched pairs, with relevant partial path elements being in this case the elements and attributes of a path that are immediately associated to the matched 8G LWP or 9G LWP waypoint attributes, plus all the path elements immediately associated to the formerly matched 7G LWP waypoint attributes corresponding to the same path as the matched 8G LWP or 9G LWP waypoint attributes, plus the elements between each of the matched 7G and 8G LWP or 9G LWP waypoints of a same path, plus the elements immediately associated to the 5G LWP or 6G LWP matched with the 7G LWP of the path mentioned above, plus all the elements immediately associated with the 4G LWP of the same path as the above mentioned 5G LWP or 6G LWP, plus all the elements between each of the matched 4G LWP and the 5G LWP or 6G LWP waypoints of the same path, plus all the elements immediately associated to the 3G LWP or 2G LWP waypoint attributes formerly matched with the 4G LWP waypoint attributes that belong to the same path as the matched 5G LWP or 6G LWP waypoint, plus all the path elements immediately associated to the 1G LWP waypoint attributes of the same paths as the 3G LWP or 2G LWP waypoint matched to the 4G LWP waypoint mentioned above, plus the elements between each of the matched 1G LWP waypoint and 2G LWP or 3G LWP waypoints of a same path.

The elements from the O 1G LWP to the matched O 2G LWP or O 3G LWP represent the first carrier, the elements from the O 4G LWP to the O 5G LWP or O 6G LWP represent the second carrier, the elements from the D 6G LWP or D 5G LWP to the D 4G LWP represent the third carrier and the elements from the matched D 3G LWP or D 2G LWP to the D 1G LWP represent the fourth carrier.

The elements immediately associated with matched waypoint attributes with which each of the waypoints of the transport path was assembled also count as elements of the relevant transport path.

FIG. 23 shows the structure of a sequencing module that is used by FIGS. 15, 16, 18, 19, 21 and 22.

The process continues from either a connector CCi' only, a connector CCi" only, or both, to a sequencing module 1350, that waits for the completion of processing at the origin-related or the destination-related filtering modules, if any pairs are being processed, which connect to connector CTi on FIGS. 15, 16, 18, 19, 21 and 22, with values for i=1, 2, 3, 4, 5 and 6 respectively.

This is followed by a module 1352, that detects the passage of electronic trails through connectors CCi' and CCi". The process continues to a decision point 1354, that checks if the trail has passed through CCi' only and if not continues to another decision point 1356, that checks if the trail has passed through CCi" only. If the trail has passed only through either CCi' or CCi", the process continues through a connector CTi to the corresponding connector in FIGS. 15, 16, 18, 19, 21 and 22. If the trial has passed through both CCi' and CCi", the process continues through a connector CCi to the corresponding connector in FIGS. 15, 16, 18, 19, 21 and 22.

Description of Example Data Structures

Figure 24A:
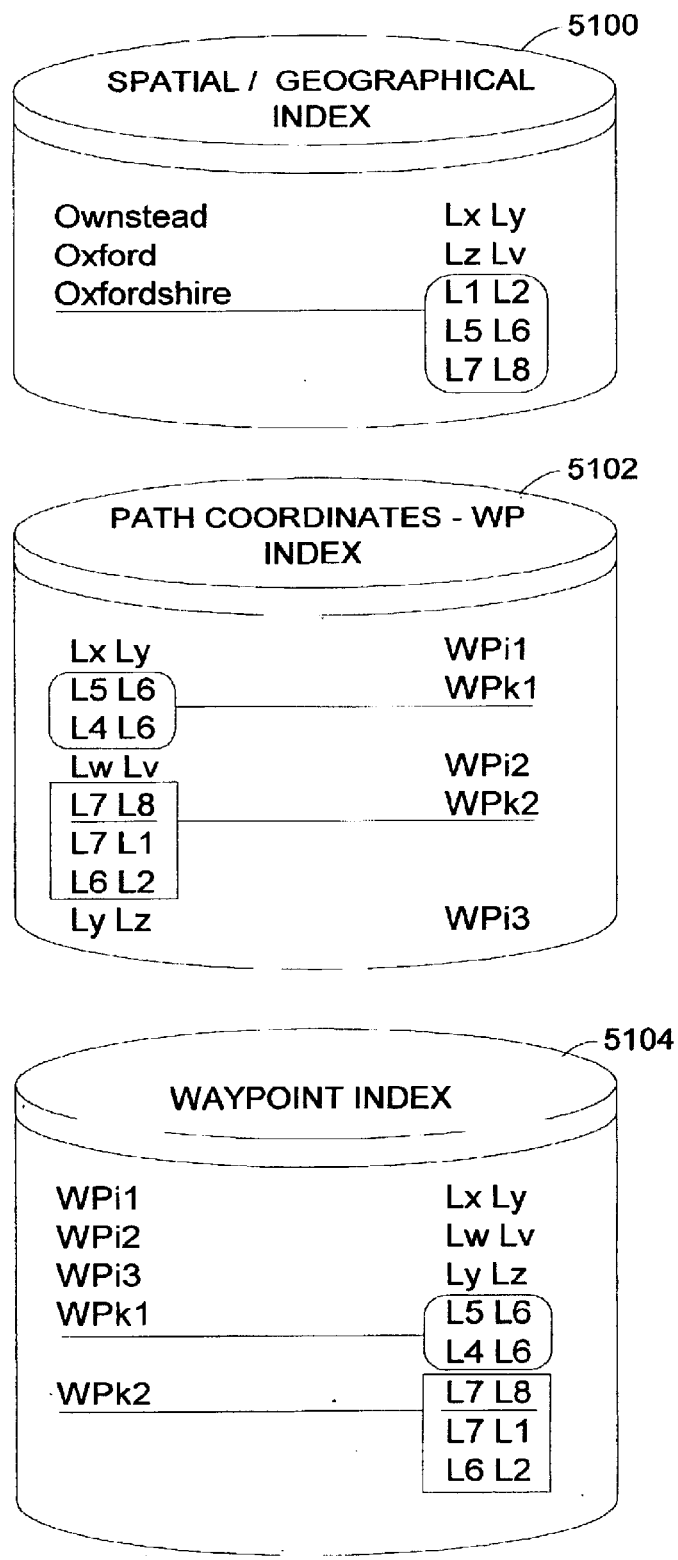
FIG. 24A—shows the basic data structure for the spatial/geographical index, the path coordinate index-waypoint and the waypoint index.

FIG. 24A shows the basic data structure for the spatial/geographical index also, the path coordinate index and the waypoint index.

The spatial or geographical index 5100 is a spatial or geographical index of locations each cross-referenced to at least a spatially corresponding set of coordinates in a predefined spatial or geographical coordinate system. It is typically part of a geographical location or spatial database.

The index 5100 shows for example a list of locations such as a town called Ownstead represented by a set of coordinates such as longitude Lx and Latitude Ly or a city called Oxford represented by a set LzLv.

Other more extensive locations such as the Oxfordshire County could be defined by various sets of coordinates such as L1L2, L5L6 and L7L8 in this case.

The Path Coordinates—Waypoint index 5102 is categorised by coordinates in the same predefined geographical or spatial coordinate system, cross-referenced to path waypoints or path waypoint attributes, where the said coordinates spatially correspond to the path waypoints or the path waypoint attributes themselves, as well as to the associated areas related to the above mentioned waypoints.

The index 5102 shows for example a list of coordinates sets and coordinate areas corresponding to paths "i" and "k".

The first row shows a path "i" starting with a first waypoint "Wpi1" at Ownstead (LxLy) with no associated area The following two rows show the coordinate sets (L5L6 and L4L6) defining a more extended area of a first waypoint (WPk1) of a path "k", by cross-reference with the geographical index we can also see that this extended waypoint area obviously is within or partially within Oxfordshire.

Other coordinate sets such as L7L8, L7L1 and L6L2 can belong to associated functions having for example L7L8 representing a second waypoint WPk2 of the path "k" and L7L8 and L6L2 remaining coordinates which directly or through functions represent the associated area corresponding to the said second waypoint WPk2. Here also by cross-reference with the geographical index we can also see that this second waypoint WPk2, obviously is within or partially within Oxfordshire.

The Waypoint index 5104 is categorised by waypoints or waypoint attributes each cross-referenced to a spatially corresponding set of coordinates in the predefined coordinate system and to a set of coordinates or coordinate function corresponding to the associated area related to the waypoint.

This index is similar to an inverted path coordinate-waypoint index 5102.

The index 5104 shows for example a list of waypoints like WPi1 cross-referenced to LxLy (Ownstead) and the extensive waypoint WPk1 cross-referenced the sets of coordinates L5L6 and L4L6. As can be seen in this case this index looks like the inverse function of index 5102. In this case WPi1 and WPk1 were not defined with any associated area. In the case of WPk2 which did have an associated area it can be seen that it is cross-referenced to L7L8 (waypoint) and to L7L1 and L6L2 (corresponding to the associated area).

Figure 24B:
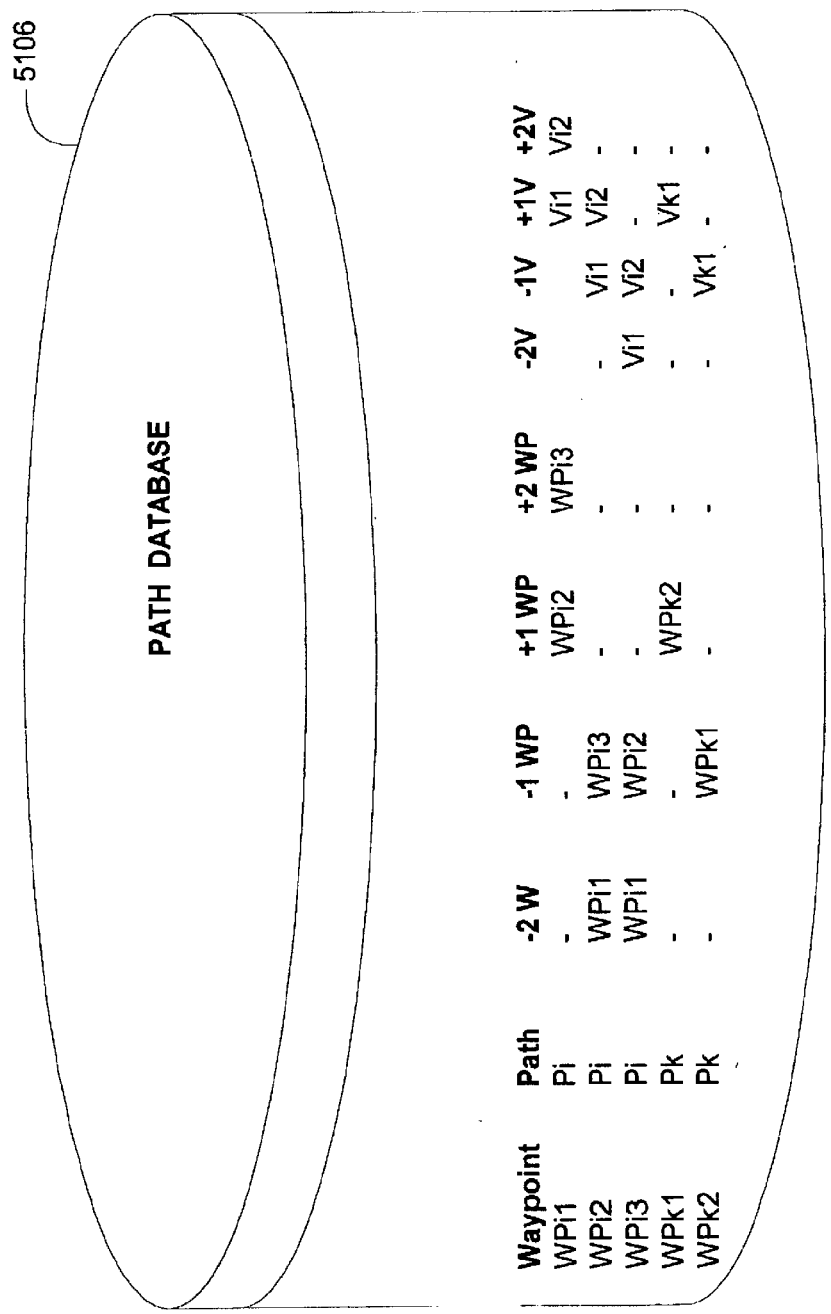
FIG. 24B—shows the basic data structure for the path database

FIG. 24B shows the basic data structure for the path database.

The Path Database 5106 is in general a plurality of path files or database, each of said path files at least cross-referencing path attributes comprising path vectors, path waypoints or path waypoint attributes between each other within the same path In this example it is categorised by waypoints or waypoint attributes cross-referenced to the vectors and the remaining waypoints of the corresponding path in a manner that also provides information of their relative and sequential order Although the data structures and indexes have been shown as an example for waypoints, it would be obvious to somebody familiar in the art of relational databases to also incorporate the remaining attributes corresponding to the waypoints and other path elements.

Figure 24C:
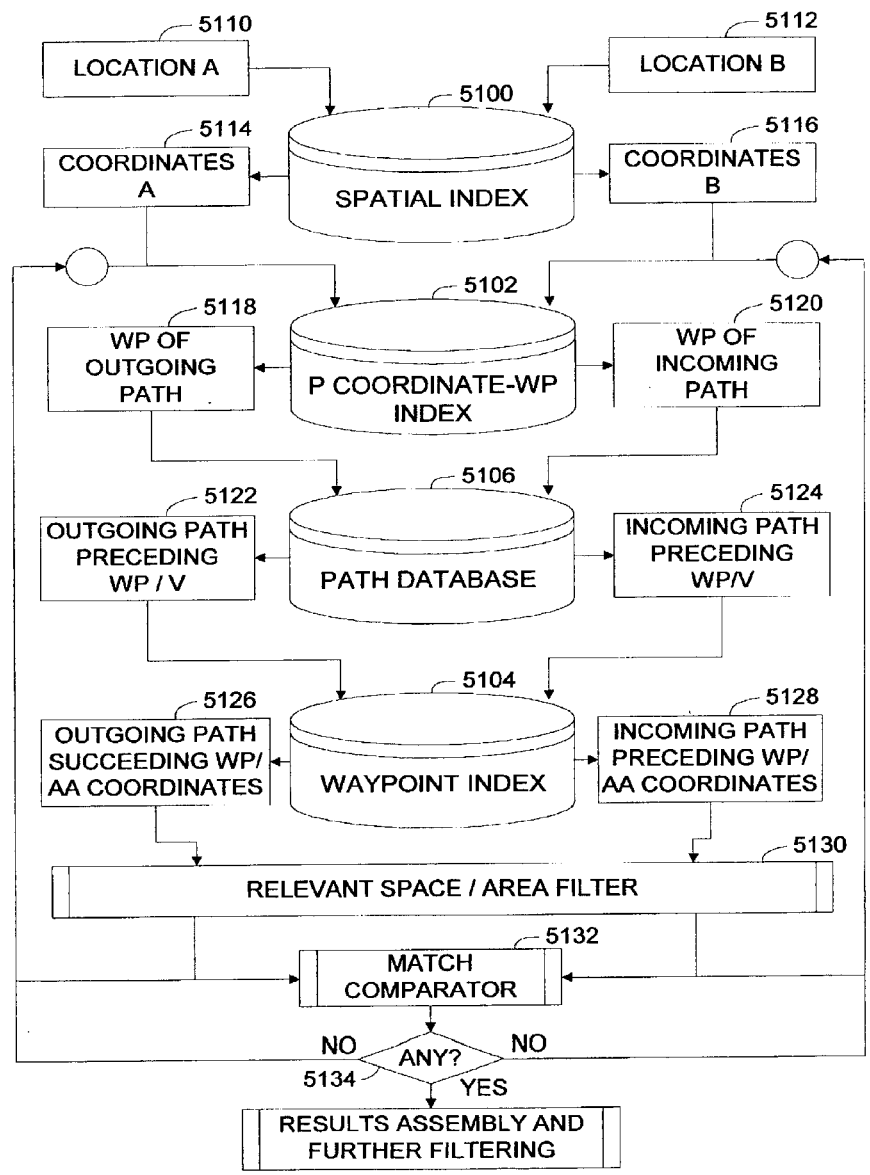
FIG. 24C—shows the geographic/spatial elements of a double tree type path search flow diagram incorporating the spatial index/database structures.

FIG. 24C shows the geographic/spatial elements of a double tree type path search flow diagram incorporating the spatial index/database structures.

The geographical/spatial part of the search process starts with the input of the origin location "A" 5100 and the destination location "B" 5112 and these are converted via the spatial index 5100 into the corresponding origin coordinates "A" 5114 and the corresponding destination coordinates "B" 5116. This coordinate data is compared with the coordinate data of the Path Coordinate-Waypoint index 5102 to find the paths waypoints of the paths which are able to serve the coordinates corresponding to "A" and "B". These path waypoints are detected as waypoint or waypoints of outgoing paths at 5118 and as waypoint or waypoints of incoming paths at 5120.

The next step is retrieving the remaining elements of the paths of the path waypoints that can serve the coordinates and "B", by entering the waypoint information 5118 and 5120 into the path database 5106. As a result we obtain all the elements of the outgoing paths comprising succeeding waypoints and vectors 5122 and all the elements of the incoming paths comprising preceding waypoints and vectors 5124.

With this information on the universe of path elements that can serve the transport related requirement, a filtering process takes place to see if there are paths in common serving coordinates "A" and B, as also a further filtering concerning other conditions such as time frame compliance, capacity availability, linking ability, among other transport related conditions. Further steps would also involve obtaining the waypoint coordinates and waypoint associated area coordinates or functions through the waypoint index 5104, obtaining the outgoing waypoint and associated area elements 5126 and the incoming waypoint and associated area elements 5128.

Before comparing them, a relevant area filter 5130 such as a rectangle or ellipse can be applied to eliminate the elements that are beyond a certain search scope between any two coordinates. After this filter, a match comparator 5132 can compare for matches the waypoint coordinates of 5126 with the waypoints coordinates and associated areas coordinate functions of 5128 as well as vice-versa compare for matches the waypoint coordinates of 5128 with the waypoints coordinates and associated areas coordinate functions of 5126, in the search for possible links between outgoing and incoming paths. If results are found at decision point 5134 they are assembled as the relevant part of paths involved and if necessary these can be further filtered. If there are no results at 5134 or if the search preferences allow for further combinations of transport related service providers the process retrieves only the waypoint coordinates among the filtered elements found at step 5126 and step 5128, and builds all combinations of pairs comprising outgoing waypoint coordinates with incoming waypoint coordinates which are then recycled through the process in the same way as the pair of coordinates of "A" and "B" were initially through index 5102. Though this process we can obtain the second and third generation of paths of the double-tree construction.

Alternative Embodiments of the Invention

Other alternative embodiments of the invention are obtained by changing the order in which the elements are retrieved and filtered.

The detailed description of the embodiment shows a search process where elements are first retrieved through geographical analysis and later filtered according to the search criteria and conditions. The process could be done alternatively by first detecting the elements for a given geographical relevant area as an ellipse or a rectangle encompassing the points of interest, secondly applying the filters and thirdly retrieving through geographical analysis the path elements with associated spaces or areas matching locations or matching elements of other paths. The geographical analysis can in most cases be very demanding on the computing resources and therefore it would be sensible to filter as much as possible all the constraints which demand less resources, to eliminate as many irrelevant elements as possible, before concentrating on the constraints that demand most resources. Geographical analysis, routing and dimensional capacity management are typically very demanding operations.

When retrieving preceding or succeeding path elements these elements can therefore be filtered first according to linking conditions, temporal conditions, and volume capacity conditions and secondly according to geographical analysis, routing and dimensional capacity.

Figure 24D:
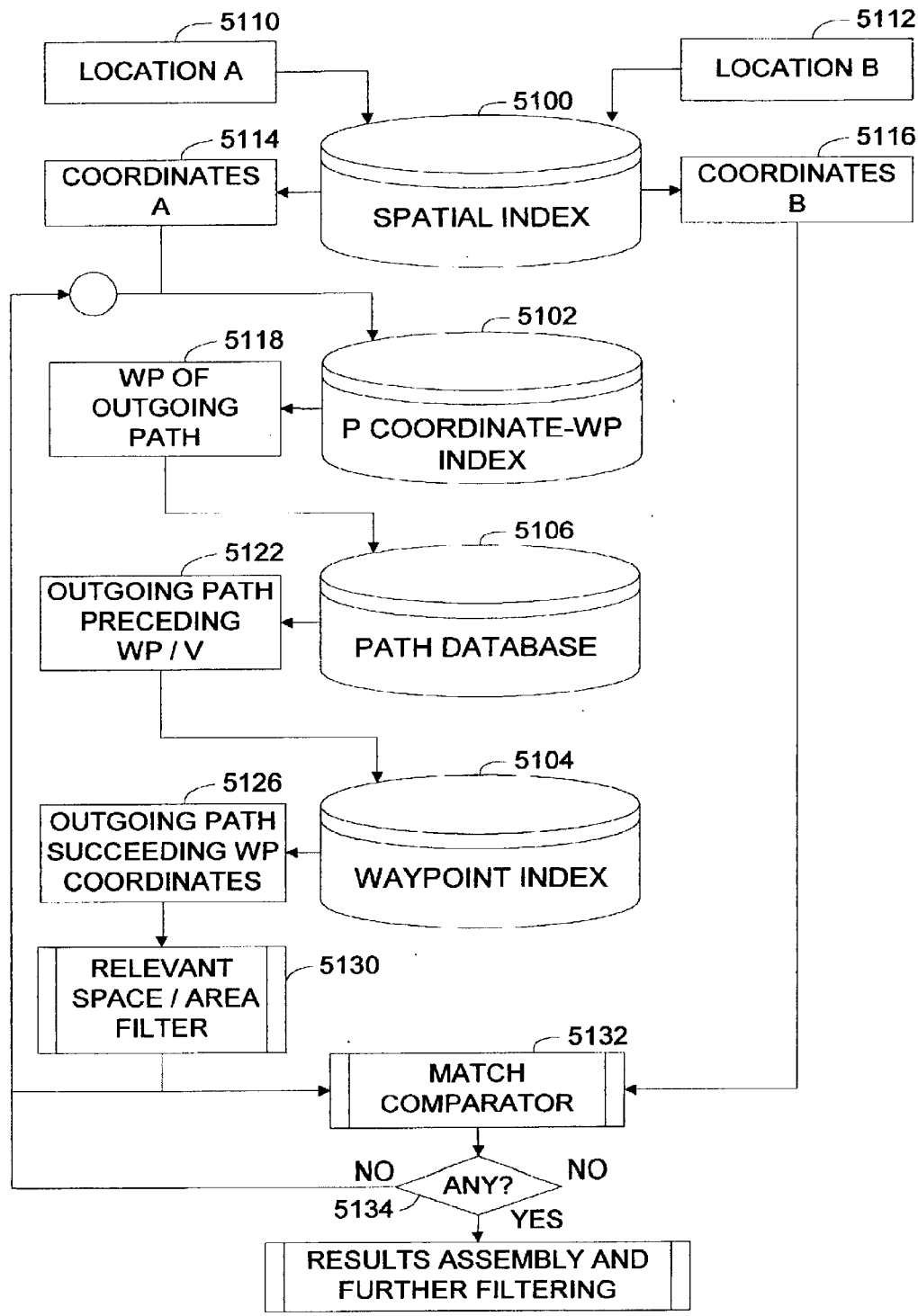
FIG. 24D—shows the geographic/spatial elements of a single origin generated tree type path search flow diagram incorporating the spatial index/database structures.

A skilled programmer could easily rearrange the search and retrieval system to operate on this alternative sequence as well as other sequences using the same elements that are found to be typically more efficient according to the specific environment on which the search system is used Embodiments Using Single-tree Search Algorithms FIG. 24D shows the geographic/spatial elements of a single origin generated tree type path search flow diagram incorporating the spatial index/database structures.

The geographical/spatial part of the search process is similar to the process of FIG. 25C up to module 5116. Modules 5118 and 5102 are also similar.

The next step is retrieving the remaining elements of the paths of the path waypoints that can serve the coordinate set A, by entering the waypoint information 5118 into the path database 5106. As a result we obtain all the elements of the outgoing paths comprising succeeding waypoints.

With this information on the universe of path elements that can serve the transport related requirement, a further filtering concerning other conditions such as time frame compliance, capacity availability, liking ability, among other transport related conditions. Further steps would also involve obtaining the waypoint coordinates and waypoint associated area coordinates or functions through the waypoint index 5104, obtaining the outgoing waypoint and associated area elements 5126.

Before comparing them, a relevant area filter 5130 such as a rectangle or ellipse can be applied to eliminate the elements that are beyond a certain search scope between the coordinates obtained in 5126 and the coordinates corresponding to "B" at 5116. After this filter a match comparator 5132 can compare for matches the waypoint coordinates and associated areas coordinate functions of 5128 with the coordinates of "B" from module 5116, in the search for possible links between outgoing paths and the location B. If results are found at decision point 5134 they are assembled as the relevant part of paths involved and if necessary these can be further filtered. If there are no results at 5134 or if the search preferences allow for further combinations of transport related service providers the process retrieves only the waypoint coordinates among the filtered elements found at step 5126, and builds all combinations of pairs comprising outgoing waypoint coordinates which are then recycled through the process in the same way as the pair of coordinates of "A" and "B" were initially through index 5102. Though this process we can obtain the second, third and further generation of paths of the single origin generated tree type construction.

Figure 24E:
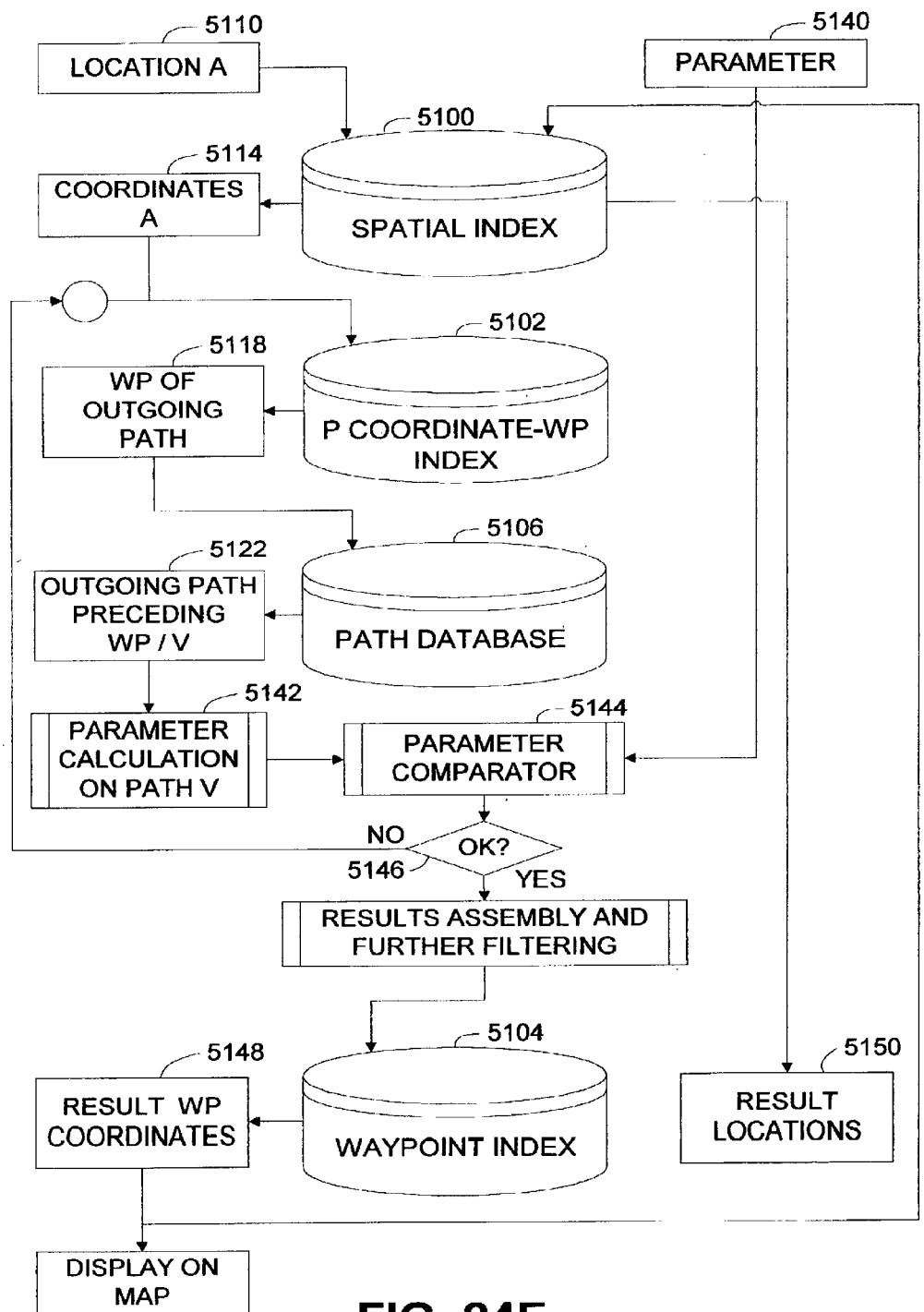
FIG. 24E—shows the geographic/spatial elements of a catchment area generated tree type path search flow diagram incorporating the spatial index/database structures.

Embodiments where the search is arranged towards the definition of a "catchment" area FIG. 24E shows the geographic/spatial elements of a catchment area generated tree-type path search flow diagram incorporating the spatial index/database structures Another alternative use is the search of paths that can configure a catchment or reach area from a location "A".

The process starts with the input of a Location "A" at module 5110 and a Parameter at module 5140. The parameter can be a certain time frame, a certain price frame, a certain distance frame or other variables that can affect a transport related path.

The location "A" is converted to coordinates by the use of the spatial index 5100 at module 5114.

These are then searched in the Path Coordinate-Waypoint index 5102 and by cross-reference the corresponding path waypoints are obtained at 5118.

This data is used in the Path Database 5106 to retrieve the outgoing path waypoints and vectors at module 5122

Once these are obtained, on module 5142 a parameter function can be calculated on each consecutive vector and partial sums can be obtained at each stage to check if the parameter value has been exceeded or not, through the parameter comparator 5144.

On the last vectors with parameter value sums that do not exceed the parameter value 5140, at decision point 5146 these results of the consecutive vector are then logically-assembled and filtered. The finishing waypoints of the last vectors of the paths that are within the parameter value are cross-referenced in the waypoint index 5104 to obtain the waypoint coordinates with form the boundary of the area defined by the parameter frame value. These are then display by techniques well know in the art of geographical information systems on an electronic map or cross-referenced inversely in the Spatial index to obtain a list of locations reachable from location "A" within the parameter frame value.

Examples of the functions that can be obtained this way are known functions having time as a parameter, i.e. isodistances through loosely connected paths and functions having time as a parameter, i.e. isochrones through loosely connected paths. Other possible parameters are total price for a certain volume, number of service providers, or other transport related parameters that increase or decrease with distance.

Embodiments Using the First Generation Waypoints as Matching Options

An alternative embodiment of the present invention is also to use the system-retrieved first generation waypoints or their associated attributes, as matching options to be checked against opposite related paths. If a match is found, the paths associated with these waypoints or waypoint attributes, and their immediately related associated areas, are retrieved by the system as candidates for a transport task that extends only within the above mentioned first generation associated area.

FIG. 25 shows an example of the matching possibilities when the first generation waypoint associated area of a path is used also as a possibility for matching or combining service providers.

Figure 25A:
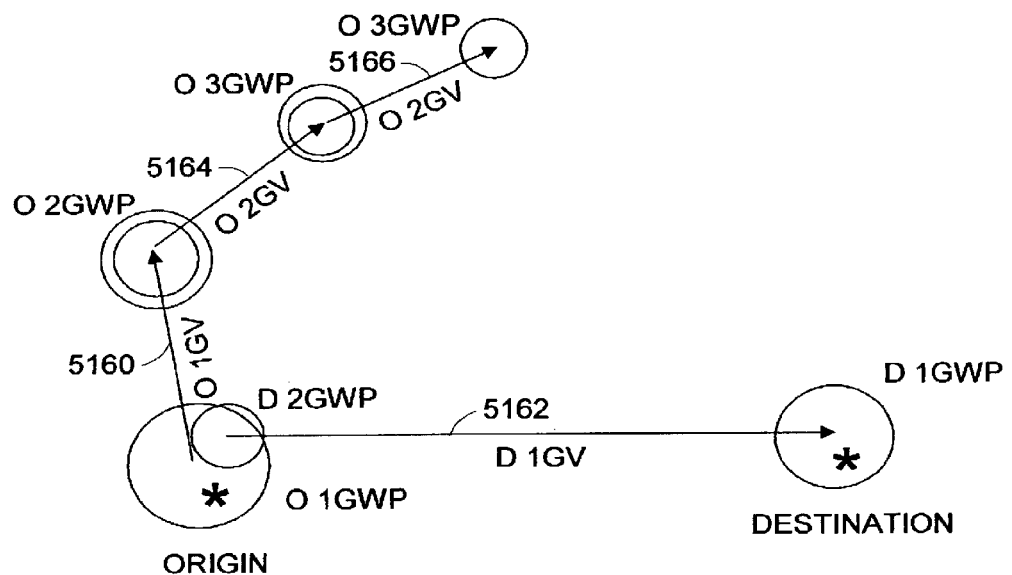
FIGS. 25A to 25B—show graphically the possibilities that are further contemplated when the first generation waypoint associated area of a path is used also as a possibility for matching or combining service providers.

FIG. 25A shows a system-detected origin-related path comprised of an O 1GV vector 5160, an O 2GV vector 5164 and a further O 2GV vector 5166. The figure also shows a system-detected destination-related path comprised of a D 1GV vector 5162.

An alternative embodiment of the invention consists in checking the waypoints and elements of a path, not only against the 2G LWP and the 3G LWP waypoints or associated elements as in the main embodiment, but also against the 1G LWP waypoint or associated elements of the opposite-related path. When the 1G LWP waypoints or associated elements are used for matching purposes, the role of the service provider that has been matched in those circumstances is limited to act only within the specified associated area of the matched 1G LWP waypoint, i.e. taking a "transit consignment" as defined before. The 4G LWP and the 7G LWP waypoints in respect to the general search process are considered as the 1G LWP waypoints in respect to the 2GP paths and the 3GP paths, and therefore similar possibilities arise for them when they are also considered for matching.

FIG. 25A shows a vector 5162 that has D 1G LWP with an associated area encompassing the destination, but with a starting waypoint that is not detected by the system as an O 1G LWP. Nevertheless the system detects the vector 5160 belonging to another path, as an O 1G LWP with an associated area encompassing the origin point.

In this alternative embodiment, the D2G LWP of vector 5162 would not only be checked against the O 2G LWP and the O 3G LWP waypoints and associated elements of vectors 5160, 5164 and 5166 of the detected origin-related path, but also checked against the O 1G LWP waypoint and associated area of the same path, in which case a match of a format O 1G LWP-D 2G LWP would be detected. To transport the load from origin to destination, vector 5160 would only be picking it up from the origin and delivering it to the D 2G LWP of vector 5162, within the same associated area and then vector 5162 would transport it to the final destination. The service provider represented by vector 5160 would only carry the load as a "transit consignment" in this case.

Figure 25B:
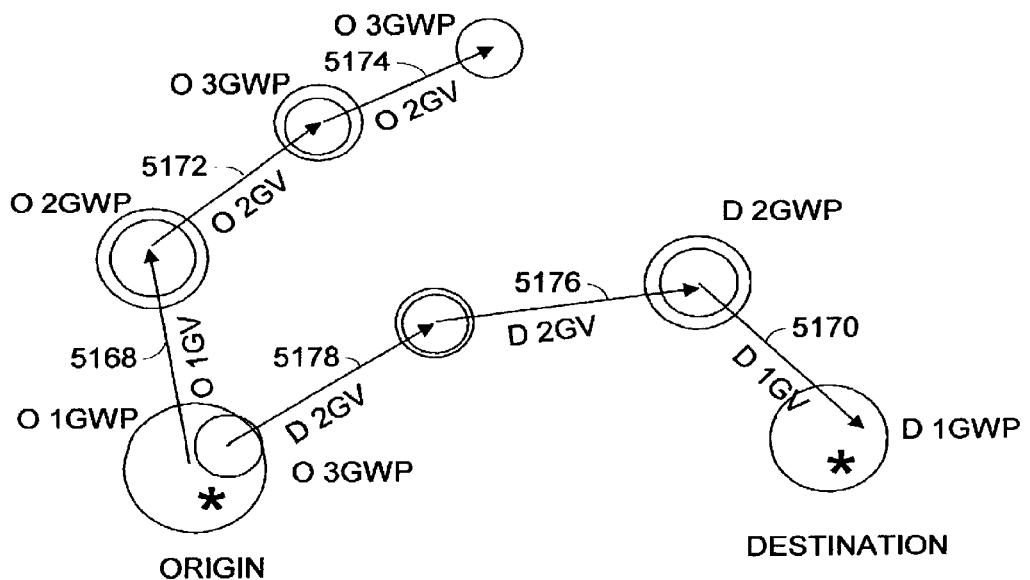

FIG. 25B shows the same system-detected origin-related path of FIG. 25A, but combined with a different system-detected destination-related path. Whereas before it was the D 2G LWP waypoint the one that matched the O 1G LWP associated area, this figure shows the case of a D 3G LWP that is not only checked for matches with the O 2G LWP and the O 3G LWP waypoints and associated elements, but now also to the O 1G LWP waypoints and associated area. This example illustrates the case of a match of the format O 1G LWP-D 3G LWP, where the role service provider represented by vector 5160 is to carry a "transit consignment".

FIG. 25C shows a table 5180 describing the different combination possible between two opposite paths such as those described throughout the description of the preferred embodiment. Here 2V stands for "two vector", 2P stands for "two path" and PV stands for "one path and one vector".

Table 5182 shows the match formats between the linkable waypoints analysed throughout the description of the preferred embodiment with the "generation" nomenclature.

Although show are the first, second and third generation linkable waypoints and attributes, similar combinations apply to the fourth, fifth and sixth, as well as to the seventh, eighth and ninth linkable waypoints and attributes, between each other, respectively.

FIG. 25D shows table 5184 with A representing "area", V representing "vector" and P representing "path". The new introduction is the area A, which is used to describe the case of the part of a transport-related operation that is carried out within a defined associated space of a waypoint.

Table 5186 shows the description in terms of the "generation" nomenclature of the possible new combinations arising from allowing the 1G LWP for matching purposes and therefore establishing the possibility of the service providers acting as carriers of "transit consignments", i.e. transporting only within the associated area of a waypoint. The system disclosed could be modified to incorporate these matching possibilities by persons familiar in the art of computer programming. Although this arrangement is disclosed as an alternative embodiment, it offers superior matching possibilities especially for local delivery service providers, but this is achieved by compromising system performance due to the significant increase in the number of operations.

Although this disclosure has used a particular step-by-step process that constructs sequential trees starting from two points requiring a connection, such as the origin and destination of the transport requirement, with paths i.e. with individual vectors or a group of vectors that share common attributes comprising waypoints, that are in proximity of the waypoints of other paths, it is also possible to implement similar systems using other algorithms including other tree algorithms or other algorithms used in the art of G.I.S. or in Operational Research.

The matching of different paths or service providers, as well as other aspects of the invention could also be arranged to be more effective or efficient by done using methods including heuristics, meta-heuristics and other algorithms known in the art of operational research. Some examples are fuzzy logic data matching, scatter search, neural networks, simplex, multi-simplex and other variations.

The search system could also be implemented to work in a three dimensional environment where the G.I.S. would be a spatial information system, where the associated areas become associated surfaces, and where the two dimensional coordinate system becomes a spatial coordinate system. Some applications of these types of systems could include signal routing through satellites, flexible space transport, flexible submarine transport, and the analysis of transport or distribution through man-made paths, or paths representing natural phenomena.

Other embodiments could also incorporate facilities for an "inverted search" i.e. the search, by service providers, of transport requirements input by the transport service users, although in this case the transport requirement paths, input by the transport service users, would be simpler as they will be defined in geographical terms by only two waypoints. A search of transport requests could consist simply in the matching of two areas by proximity, either to find single transport requests in a similar way as the notice board systems, or it could also involve allowing a combination of complete transport requests for a specified origin and destination, a feature useful to the transport service providers in analysing the feasibility of transport operation between any two given points or locations. In this case, the system should be constructed to allow the service provider to superimpose predefined associated areas around the origin and destination waypoints of the transport service request input, so that the system can produce combinations by defined proximities. Also in this case, the transport service providers will have to define the associated areas for origin and destination because they will represent the area that they are willing to cover between while fulfilling the different consecutive transport requests.

Networks with flexible nodes or loosely connected networks.

Instead of the defined paths which are formerly described as single or multi leg trajectories of a transport-related activity, it could also be feasible to define more complex networks than the single branches formerly used for paths, for example, using radial arrays, tree shapes, ring shapes or combinations of these to mimic various types of existing networks such as transportation networks or networks such as those for distribution of electricity, cable TV signals and cable or wireless communications.

These network segments could be uni-directional or bi-directional and the nodes could be made "flexible" or "loose" by introducing associated areas or spaces to these nodes, as well as possibly other attributes.

A search function can be arranged to find the most efficient connections or routes through a various elements corresponding to a same network or to different networks, i.e. through one or more networks having flexible nodes or through conventional networks combined together by flexible nodes or loosely defined nodes i.e. the predefined "proximity areas".

The vector nomenclature of FIG. 4A could be also rearranged and adapted in the case of networks to produce adequate retrieval of elements in order to produce the growth of the network structure according to single-tree, double-tree of other suitable algorithms used for retrieval analysis on network structures.

Following the previous description of this disclosure, the technique for rearranging the invention to analyse loosely connected networks can be worked out by a person familiar in the art of network analysis, and therefore is not explained in detail.

Automating Service User input

Another option is that the parameters of the transport service request can be input into the system object of the invention through a direct link or an indirect link with a transducer capable of scanning the physical characteristics including dimensions and also graphical characters, or codes, of a load or an object requiring a transport service.

Distributed Computing Power

Further embodiments or alternatives can be constructed to take advantage of distributed computing power and/or distributed data storage which may be idle, available or dedicated, through private or public networks such as the internet, including also state-of-the-art distributed software capable of partially processing and constructing the final output using end user computing resources using similar concepts as those implemented in an application called Flash™ developed by Macromedia™, Inc of San Francisco, Calif., U.S.A.

Although the preferred embodiments of the present invention have been described in detail herein, it is to be understood that these descriptions are merely illustrative. The inventive system may be modified in a variety of ways and equivalents in order to suit a particular purpose while still employing the unique concepts set forth.

Thus the scope of the invention should be determined by the appended claims and their legal equivalents, rather than by the examples given.

I claim:

1. A computer implemented process for the search and retrieval of transportation-related capabilities comprising the steps of:
    a) providing first means for data processing
    b) providing second means for data storage compatible with said first means
    c) providing third means for management and detection of locations comprising a location system
    d) providing fourth means for the definition of one or more paths, said one or more paths comprising flexible paths with predefined degrees of flexibility, said one or more paths having attributes identifiable in said location system and said one or more paths representing one or more available transportation-related capabilities in modes of one or more trajectory-related sections or legs
    e) providing fifth means for entering structured data representing one or more paths defined by said fourth means
    f) storing via said second means, said structured data to a structured data set
    g) providing sixth means for the definition of a required transportation-related capability between a first location and at least a second location, said required transportation capability of a type of transportation compatible with at least one of the types of transportation represented in said structured data set, said required transportation capability comprising at least said first location having a position identifiable directly or by simple cross-reference in said location system
    h) providing seventh means for retrieving from a service user structured data representing at least a request for a required transportation-related capability between a first location and at least a second location, said request defined by said sixth means
    i) providing eighth means for detecting among said structured data set, a structured data subset regarding paths representing available transportation-related capabilities that can provide one or more possible solutions for fulfilling said request, said one or more possible solutions comprising at least a possible solution constructed with a plurality of paths or path sections, said plurality of path or path sections, representing a logically-linked sequence of a plurality of available transportation-related capabilities or independent trajectory-related sections of available transportation-related capabilities and which in combination are capable of performing the required transportation-related task
    j) providing ninth means for conveying information on said one or more possible solutions.

2. The process of claim 1 further including a step of permitting identification of a selection among said one or more possible solutions conveyed by said ninth means.

3. The process of claim 1 wherein said step of conveying information comprises:
    a) permitting identification of an organization criteria for presenting the information on said one or more possible solutions.
    b) organizing and presenting said information according to said organization criteria.

4. The process of claim 2 further including the step of providing means for enabling reservation of said required transportation-related capability on said selection.

5. The process of claim 4 wherein the step of providing means for enabling reservation of said required transportation-related capability on said selection, comprises providing means for capacity management on said selection, said means comprising a mathematically simulated multidimensional model that represents the cargo capacity environment on each of the capabilities within said selection.

6. The process of claim 5 wherein the step of providing means for enabling reservation of said required transportation-related capabilities on said selection, comprises accounting for capacity in a substantially-simulated three dimensional environment.

7. The process of claim 2 further including the step of enabling communication between a service user of said required transportation-related capability and at least one service provider providing the selected available transportation-related capabilities associated with said selection.

8. The process of claim 7 wherein said step of enabling communication, comprises means for enabling concealed-identity communication between the service user and the service provider.

9. A computer implemented method for the search and retrieval of paths representing available transportation capabilities
    a) providing first means for retrieving from service providers selected information associated with available transportation capabilities, said available transportation capabilities representable by paths having predefined time frames, said available transportation capabilities comprising spatially flexible available transportation capabilities representable by said paths further having a service-provider-defined degree of spatial flexibility respect to a route described by waypoints or nodes
    b) retrieving and organizing said selected information associated with available transportation capabilities
    c) storing said selected information associated with available transportation capabilities in a first group
    d) providing second means for retrieving from a service user, selected information associated with at least one required transportation capability comprising at least a first location and a time frame
    e) retrieving from said user said selected information associated with at least one required transportation capability f) Providing third means for matching said selected information associated with at least one required transportation capability, to a second group of selected information associated with one or more available transportation capabilities within said first group, said third means comprising the detection of a plurality of logically-linked sequences of available transportation capabilities among said first group, which when linked in sequence can match said required transportation capability, said plurality of logically-linked sequences of available transportation capabilities, comprising at least one flexible transportation capability g) Providing fourth means for conveying information to the service user or an entity having the role of a service user, on the available transportation capabilities associated with said second group.

10. The process of claim 9 further comprising the step of enabling communication means between the said service user and the at least one service provider associated with at least one selection of available transportation capabilities among said second group.

11. The process of claim 9 further comprising the step of enabling reservation of at least one selection of available transportation capabilities among said second group.

12. A computer implemented search and reservation process for transportation capabilities comprising the steps of:
   a) providing a location system
   b) providing first means for representing one or more available transportation capabilities comprising:
      i. providing spatially-locatable elements identifiable in said location system
      ii. providing at least a parameter for identifying an original available transport capacity corresponding to each of said one or more available transportation capabilities in terms which are convertible to representative multi-dimensional models of said available transport capacity
   c) retrieving from a supply entity having the role of a service provider one or more data-groups and storing said one or more data-groups to a data-group set representing a plurality of available transportation capabilities, said available transportation capabilities defined by said supply entity having the role of a service provider through said first means
   d) receiving a request representing a transportation requirement comprising the connection of a first location with a second location, said first location and said second location defined by a demand entity having the role of a service user through second means for identifying locations, said locations identifiable directly or via cross-reference in said location system, said transportation requirement further defined through at least a parameter identifying a required transport capacity at least in terms convertible to substantially representative mathematical three-dimensional models of said required transport capacity
   e) detecting among said data-group set, a first data-group subset representing available transportation capabilities that can be used in said connection corresponding to said transportation requirement.

13. The process of claim 12 further including the step of enabling communication between said supply entity and a selected demand entity among the represented in said second data-group subset.

14. The process of claim 13 wherein said step of enabling communication comprises enabling concealed-identity communication.

15. The process of claim 13 wherein said step of enabling said communication comprises steps selected from the group consisting of communication forwarding, communication redirecting and identity masking.

16. The process of claim 12 wherein said supply entity and said demand entity are the same entity assuming different roles.

17. The process of claim 12 wherein said step of detecting among said data-group set, a first data-group subset representing available transportation capabilities that can be used in said connection corresponding to said transportation requirement, comprises detecting a plurality of sequentially-combinable data-groups that when arranged in sequential combination represent sequentially-combinable available transportation capabilities that when arranged in sequential combination can produce said connection corresponding to said transportation requirement.

18. A computer implemented process for the reservation of transportation capabilities comprising the steps of:
   a) providing first means for retrieving and storing information on a plurality of available transportation capabilities corresponding to at least a service provider, said available transportation capabilities comprising
      i. trajectory-related information and
      ii. spatial capacity information in terms convertible to substantially representative mathematical multi-dimensional models of said available capacity
   b) providing second means for retrieving from a service user information regarding at least a required transportation capability, comprising capacity-related data convertible to at least to a substantially representative mathematical multi-dimensional model of the required capacity, corresponding to said required transportation capability
   c) providing third means for conveying information on a group of said plurality of available transportation capabilities
   d) providing fourth means for permitting said service user to make a selection of at least an available transportation capability among said group
   e) providing fifth means for capacity management for said plurality of available transportation capabilities, said fifth means comprising a space management subsystem that manages capacity using a mathematically simulated multidimensional environment, said environment at least three-dimensional
   f) providing sixth means, comprising the use of said fifth means, for determining the availability of said selection for fulfilling said at least one required transportation capability
   g) accepting a reservation of said at least one required transportation capability on said selection if on said selection, said required transportation capability is available and declining the reservation if said required transportation capability is unavailable
   h) providing means for conveying information regarding the reservation arrangements to the at least one service provider providing said one or more available transportation capabilities corresponding to said selection.

19. A network analysis process for a network defined by transportation-related paths, comprising:
   (a) providing a location system
   (b) providing data processing means
   (c) providing data storage means compatible with said data processing means (d) providing at least a database executable by said data processing means and operatively connected to said data storage means, said database at least containing cross-references of terms describing locations with spatially-corresponding coded data representing the spatial locus of said locations in said location system (e) providing a component selected from the group consisting of:
  e1) a first input, and
  e2) first means
for entering data corresponding to a phurality of transportation-related entities selected from the group consisting of:
  i) required transportation-related capabilities, and
  ii) available transportation-related capabilities,
said transportation-related capabilities comprising at least one spatially flexible transportation-related capability, said data comprising for each said transportation-related capability at least one element selected from the group consisting of:
waypoints, waypoint attributes and vectors, and said data comprising for each said spatially flexible transportation-related capability, at least one element selected from the group consisting of: waypoints, waypoint attributes and vectors, and further comprising at least one associated space related to the said at least one element, said elements and said associated-space being identifiable through coded data corresponding to locations in said location system by a location analysis system comprising said at least one database (f) retrieving a plurality of data entries corresponding to a phurality of said transportation-related capabilities (g) storing in said data storage means, said plurality of data entries as a structured data set (h) providing a component selected from the group consisting of:
  (h1) said input
  (h2) a second input
  (h3) said first means and
  (h4) a second means
arranged to permit the entering of at least a data request for performing a transportation-related task based on said plurality of transportation-related capabilitie, said transportation-related task requiring a connection, with said transportation-related capabilities, between a first place and at least a second place, said first place and said at least one second place being identifiable through logically-coded elements representing the location of said first place and said at least one second place, respectively, in said location system, by said location analysis system comprising said database, said data request comprising at least an element selected from the group of: waypoints, waypoint attributes and vectors, (i) retrieving said at least one structured data request (j) providing a software algorithm interacting with said processing means, said data storage means and said at least one database, arranged to detect among said set stored in step (g), an existing structured data subset representing at least one possible solution to said transport-related task, said solution coprising a combination of transportation-related capabilities comprising at least a spatially flexible transportation-related capabilities, said combination being one that can fulfil said task (k) providing data output means for conveying data on the said structed data subset, whereby a service user or a service provider can provider can find among a universe of available transportation-related capabilities defined in said set, a subset of capabilities comprising those that when arranged in a relay combination can provide a solution to the requested transportation-related capability between a first place and at least a second place.

20. A process as claimed in claim 19, wherein the software algorithm comprises the step of matching the said logically-coded elements representing the location of said first place with logically-coded elements selected from the group consisting of those that represent:
  a. a part of a first transportation-related capability and
  b. a part of a first spatially flexible transportation-related capability.

21. A process as claimed in claim 20, wherein the software algorithm further comprises the step of matching at least another logically-coded element selected from the group consisting of those that represent:
  c. a second part of said matched first transportation-related capability, and,
  d. a second part of said matched first spatially flexible transportation-related capability,
with logically-coded elements that represent one entity selected from the group consisting of:
  e. a second location,
  f. part of a second transportation-related capability, and,
  g. part of a second spatially-flexible transportation-related capability.

22. A process as claimed in claim 19, wherein the data entered in step (e) further comprises a link ability condition in relation to other transportation-related capabilities.

23. A process as claimed in claim 19, wherein a plurality of said elements of said data in step (e) further comprise starting and finishing attributes.

24. A process as claimed in claim 22, wherein the said link ability condition further comprises starting and finishing attributes.

25. A process as claimed in claim 19, wherein the software algorithm comprises the step of matching the said logically-coded elements corresponding to said transportation-related capabilities and wherein said step of matching comprises matching logically-coded elements that have attributes selected from the group consisting of starting and finishing attributes, and wherein only predefined attribute pairs are searched for matching.

26. A process as claimed in claimed in claim 19, further comprising the step of providing transducer means comprising at least one selected from the group of:
transducers, adaptors, physical signal converters, scanners, sensors or detectors.

27. A process as claimed in claim 19, further comprising the step of providing a capacity management system capable of modelling a multidimensional space in the fashion of prior art loading programs that model at least a three dimension space.

28. The process of claim 19 further including the step of permitting arrangement of a plurality of solutions in said structured data subset, according to at least one predefined criteria.

29. The process of claim 19 wherein the set of said path elements represent transportation routes or partial sections of transportation routes, whereby a transport service user can find among a universe of transportation routes, those that in combination can connect the origin and the destination of a transport requirement.

30. The process of claim 19 wherein said location system is selected from the group consisting of spatial coordinates systems, Euclidean coordinate systems, geographical coordinate systems, postcode systems, administrative area division systems and geographic-feature division systems.

31. The process of claim 19 wherein said at least one associated-space has boundaries definable through functions selected from the group consisting of spheres of user-defined radii, shapes of user-defined radii, circles of user-defined radii, shapes of user-defined dimensions, user-defined isochrones, user-defined isodistances and interactive user-designed shapes.

32. The process of claim 19 further comprising the step selected from the group consisting of enabling reservation of transport capabilities and enabling reservation with means for transaction settlement of transport capabilities.

33. The process of claim 19 where the said available transportation-related capabilities are individually further defined by
   a) an available transport capcity spacified at least in terms of data convertible to a first substantially simulated multi-dimensional model, said first substantially simulated multi-dimensional model comprising a mathematical model of the available transport capacity that is at least three-dimensional and wherein
   b) said data request for performing a task is further defined by a required transport capacity specified in terms of data convertible at least to a second substantially simulated multi-dimensional model, said second substantially simulated multi-dimensional model comprising a mathematical models of the required transport capacity that is at least three-dimensional.

34. The process of claim 28 further comprising the step of providing means for determining the availability of the available transport capabilities corresponding to said structured data selection, for fulfilling the said transportation related task, comprising the management of the required transport capacities within the available transport capacities using a substantially simulated multi-dimensional model or environment, comprising the first model and the at least one second model.

35. The process of claim 34 further including the step selected from the group consisting of enabling reservation of said capacity and enabling reservation with means for transaction settlement, of said capacity.

36. The process of claim 19 wherein the said location system is a geographical coordinate system, the said database is a geographical database and said at least one associated-space is an associated-area.

37. The process of claim 19 wherein said solution, constructed with a combinable sequence of a plurality of total or partial sets of path elements corresponding to at least two available transportation capabilities, comprieses total or partial sets of path elements corresponding to at least one spatially-flexible available transportation capability.

38. A transport-related system comprising:
   a) spatial information and location means capable of discrete storage, retrieval, manipulation and correlation of spatial or geographic data related to spatial or geographic logically-coded elements, capable of identifying a location in said location means,
   b) an electronic path database having stored therein a plurality of transport-related paths representing available, or required, transportation-related capabilities, said paths each defined by at least one element selected from the group consisting of:
      b1) a waypoint,
      b2) a node,
      b3) a vector, and,
      b4) a waypoint parameter and
   c) at least one path defined by having at least one of said elements further related to an associated spatial entity selected from the group consisting of:
   d) an associated area and
   e) an associated space,
   f) means to retrieve data relating to a transport-related connection task between a first location and at least a second location,
   g) a computer-implemented algorithm interacting with said spatial information means, said electronic database and said data retrieved via said means to retrieve, said computer-implemented algorithm arranged to find and assemble combinations of said paths or partial parts of said paths, which when combined through said associated spatial entities related to said at least one path, can perform the said connection task,
   h) means to convey data related to said combinations,
   whereby a service user, or a service provider, of transportation-related capabilities, can find among a universe of available, or required, respectively, transportation-related capabilities defined in database, a set of capabilities comprising those that when arranged in a combination can provide a solution to the transportation-related connection task between a first place and at least a second place.

39. The system of claim 38 wherein said at least one element corresponding to a path comprises a predefined linkability condition regarding linking possibilities in relation to elements corresponding to other paths.

40. The system of claim 38 wherein the said at least one element is identifiable directly or via cross-reference in said location means.

41. The system of claim 40 wherein said at least one element comprises at least one first functional order attribute defining a sequence-related role of the said at least one element with respect to another adjacent element of the same path.

42. The system of claim 40 wherein said at least one element comprises a second functional order attribute defining at least one specific associated spatial entity according to the sequence-related role of the said at least one element with respect to another adjacent element of the same path.

43. The system of claim 38 wherein said electronic path database has stored therein transport-related paths representing available transportation-related capabilities, and wherein said system further comprises means for management of capacities on each of said plurality of transport-related paths, said means for management comprising the use of a substantially simulated enviroment of said capacities, said simulated environment comprising a multi-dimensional mathematical model of said capacities.

44. The system of claim 38, wherein the said computer-implemented algorithm comprises an algorithm for searching paths, or path portions, selected from the group consisting of:
   a. a tree algorithm, arranged to start at said first location and finish at a second location,
   b. a double tree algorithm wherein the first tree is arranged to start at said first location and the second tree is arranged to start at said second located, the algorithm arranged to finish at meeting points between both trees, and,
   c. a catchment-area tree type algorithm, arranged to start at said first location and finish at least at a second location wherein a predefined parameter function calculated along the said paths or path portions reaches a predefined value.

45. The system of claim 12 further comprising the steps of:
  a) permitting a selection of a second data-group subset within said first data-group subset, said second data-group subset representing one or more selected available transportation capabilities that can be used in said connection corresponding to said transportation requirement;
  b) enabling reservation of said transportation capabilities corresponding to said second data-group subset, at least by
    i. confirming availability on said second data-group subset by third means for capacity management comprising deterimining capacity availability as a result of mathematically-modelling in a multi-dimensional environment the interaction of the said required transport capacity within the original or updated available transport capacity, on each of the corresponding said one or more selected available transportation capabilities that can be used in said connection corresponding to said transportation requirement,
    ii. accepting a reservation of the said transportation requirement if said availability is confirmed on said second data-group subset
    iii. updating the capacity availability on said second data-group subset by said third means
    iv. by communication of reservation-related information corresponding to said reservation, to the said at least one supply entity represented in said second data-group subset.

46. The process of claim 18 further comprising means for delivery confirmation comprising:
  a) means for generating and storing an outgoing password cross- referenced to a reservation file
  b) means for communication at a predefined event, of said outgoing password to a predefined receptor defined in said reservation the
  c) means for retrieving an incoming password from a service provider, said service provider supposedly having obtained the password from the said predefined receptor upon predefined delivery-related conditions
  d) means for comparing the said outgoing password with said incoming password Whereby upon a password match, a confirmation of the compliance of the said predefined delivery-related conditions can be established without the resource s required in written-signature graphological comparison and with a level of system security equal to the level of system security of the least secure among the said means for generating the generationg, the said means for communication, the said means for retrieving and the said means for comparing.

47. The process of claim 45 wherein said third means for capacity management comprises management of shaped spatial capacity having position and orientation in a mathematically-simulated three-dimensional environment.

48. The process of claim 45 further including the step of providing means for confirmation of delivery based on password correlation, comprising
  a) automatically forwarding of an outgoing password to a predefined delivery receptor, upon a predefined event, said predefined receptor defined by said demand entity and said predefined receptor instructed to communicate the password to a delivery agent upon predefined delivery reception conditions
  b) retrieving an incoming password from said supply entity or said delivery agent, said delivery agent associated with said supply entity, said incoming password supposedly the same as said outgoing password
  c) correlating said outgoing password with said incoming password to determine if they match, whereby the predefined receptor of the delivery can communicate the password to the delivery agent upon the delivery reception, who then can communicate said password as a confirmation of delivery providing therefore a proof based on a positive password correlation.

* * * * *